(12) United States Patent
Perkowski

(10) Patent No.: US 7,536,324 B2
(45) Date of Patent: May 19, 2009

(54) INTERNET-BASED SYSTEM FOR MANAGING AND DELIVERING CONSUMER PRODUCT BRAND INFORMATION TO CONSUMERS AT POINTS OF PRESENCE ALONG THE WORLD WIDE WEB (WWW)

(75) Inventor: Thomas J. Perkowski, Darien, CT (US)

(73) Assignee: IPF, Inc., Stamford, CT (US)

( * ) Notice: Subject to any disclaimer, the term of this patent is extended or adjusted under 35 U.S.C. 154(b) by 318 days.

(21) Appl. No.: 11/120,638

(22) Filed: May 3, 2005

(65) Prior Publication Data

US 2006/0011716 A1 Jan. 19, 2006

Related U.S. Application Data

(63) Continuation of application No. 09/599,690, filed on Jun. 22, 2000, now abandoned, which is a continuation-in-part of application No. 09/483,105, filed on Jan. 14, 2000, now abandoned, and a continuation-in-part of application No. 09/465,859, filed on Dec. 17, 1999, now abandoned, which is a continuation-in-part of application No. 09/447,121, filed on Nov. 22, 1999, now Pat. No. 6,625,581, and a continuation-in-part of application No. 09/441,973, filed on Nov. 17, 1999, now Pat. No. 6,961,712, which is a continuation-in-part of application No. 09/284,917, filed as application No. PCT/US97/19227 on Oct. 27, 1997, now abandoned, and a continuation-in-part of application No. 08/936,375, filed on Sep. 24, 1997, now abandoned, and a continuation-in-part of application No. 08/871,815, filed on Jun. 9, 1997, now Pat. No. 7,143,055, and a continuation-in-part of application No. 08/854,877, filed on May 12, 1997, now Pat. No. 5,950,173, and a continuation-in-part of application No. 08/826,120, filed on Mar. 27, 1997, now abandoned, and a continuation-in-part of application No. 08/752,136, filed on Nov. 19, 1996, now Pat. No. 6,064,979, and a continuation-in-part of application No. 08/736,798, filed on Oct. 25, 1996, now Pat. No. 5,918,214.

(51) Int. Cl.
*G06F 17/30* (2006.01)

(52) U.S. Cl. .......................................... 705/27; 705/26

(58) Field of Classification Search .................. 705/26, 705/27
See application file for complete search history.

(56) References Cited

U.S. PATENT DOCUMENTS

| 5,694,546 A | 12/1997 | Reisman |
| 5,895,454 A | 4/1999 | Harrington |
| 6,098,106 A * | 8/2000 | Philyaw et al. ............... 709/238 |
| 6,154,738 A * | 11/2000 | Call .............................. 707/4 |
| 6,247,044 B1 | 6/2001 | Gosling et al. |
| 6,434,563 B1 | 8/2002 | Pasquali et al. |
| 2002/0161672 A1 | 10/2002 | Banks et al. |

OTHER PUBLICATIONS

Hunter, Jason, Introducing the new servlet API 2.1; a complete description of what's changed since 2.0, JavaWorld, Dec. 1, 1998.*
DiGiorgio et al, An instrument network for weather data on the web; Use java to display data from realtime devices to web browser clients, JavaWorld, May 1, 1999.*

* cited by examiner

*Primary Examiner*—Mark Fadok
(74) *Attorney, Agent, or Firm*—Thomas J. Perkowski, Esq., P.C.

(57) ABSTRACT

An Internet-based system for managing and delivering consumer product information (CPI) to consumers at points of presence along the World Wide Web (WWW). The Internet-based system includes a subsystem for generating a CPI-requesting and GUI-display subsystem for each registered consumer product, and implemented by: (i) CPIR-enabling servlet stored on and executed within an object-oriented server; and (ii) an HTML servlet tag referencing the CPIR-enabling servlet, and embedded within one or more HTML-encoded pages served by a plurality of Web-based information servers. When an embedded HTML servlet tag is encountered by the consumer's Web browser, the corresponding CPI-requesting and GUI-displaying subsystem generates an object-oriented controlled GUI that displays information content associated with CPI resources served from one or more of the Internet-based CPI servers, for display and review by the consumer at the point of presence along the WWW where the HTML servlet tag has been encountered by the Web browser.

15 Claims, 103 Drawing Sheets

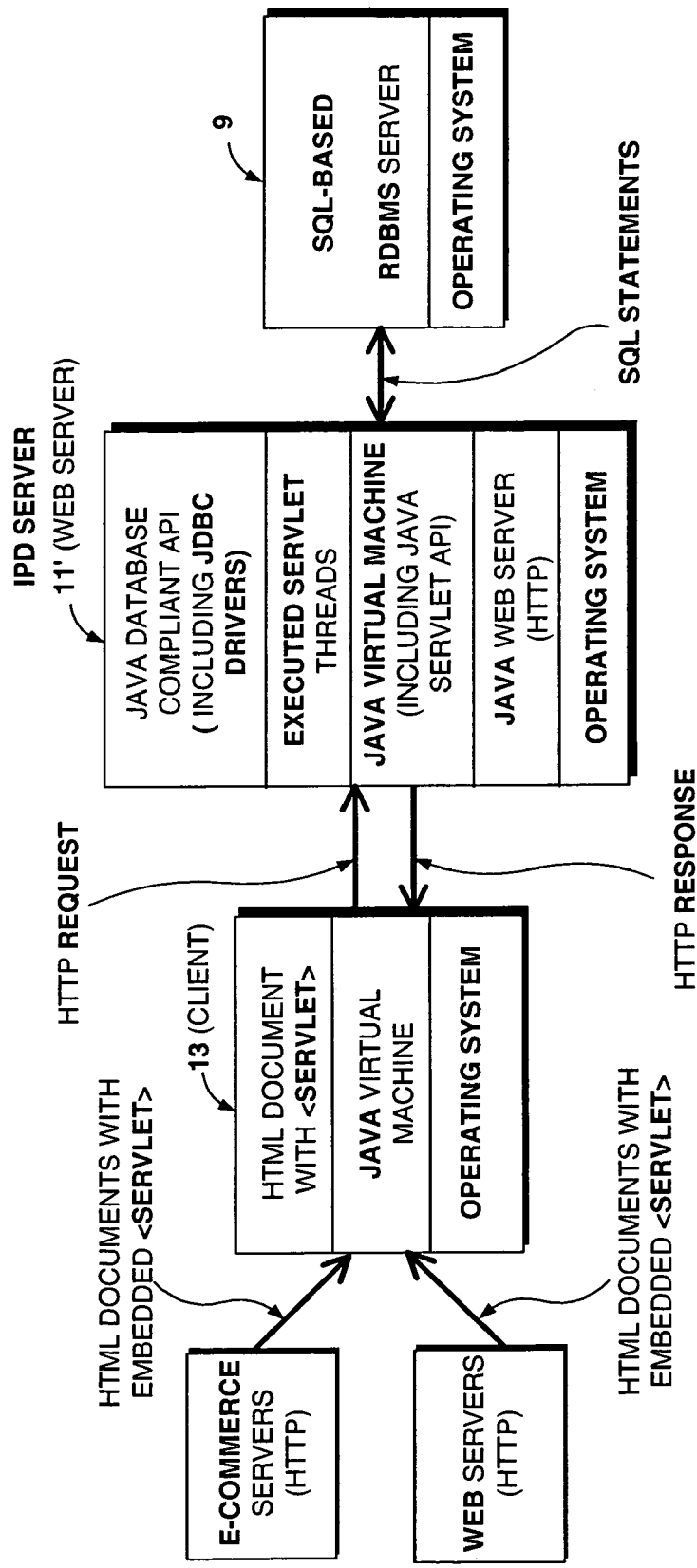
FIG. 2B1

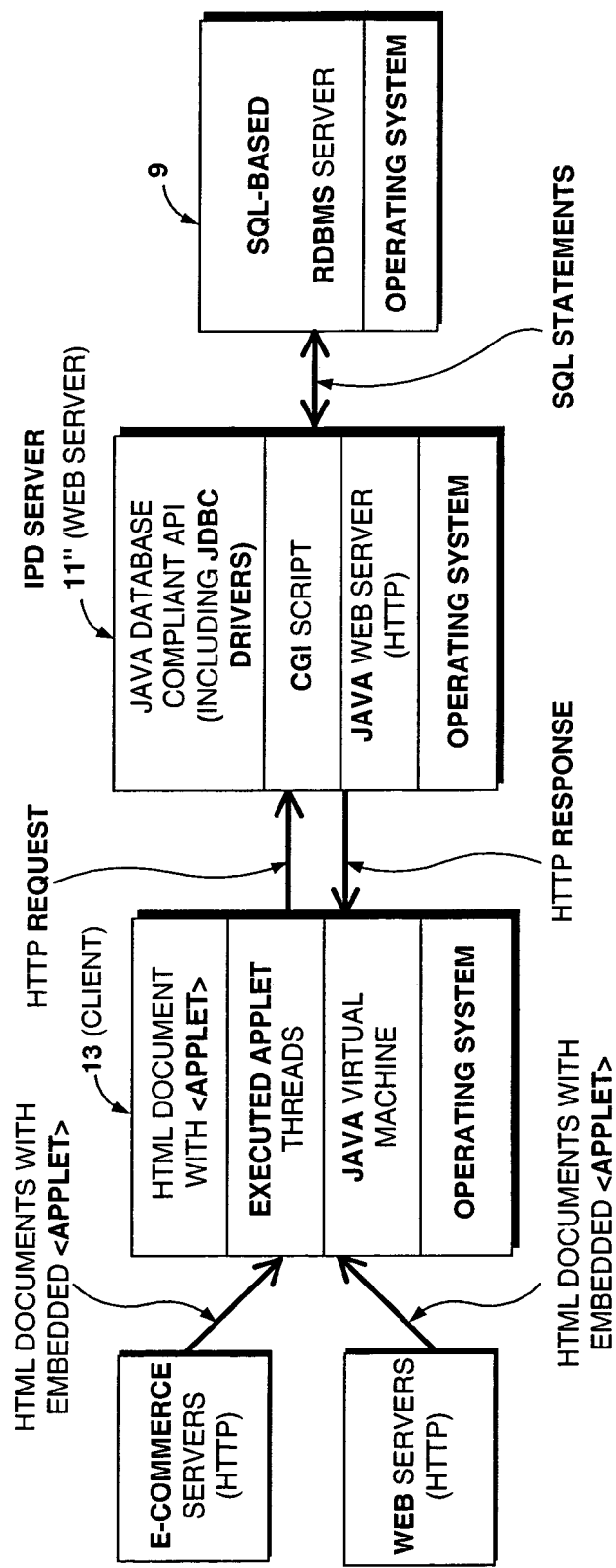
FIG. 2B2

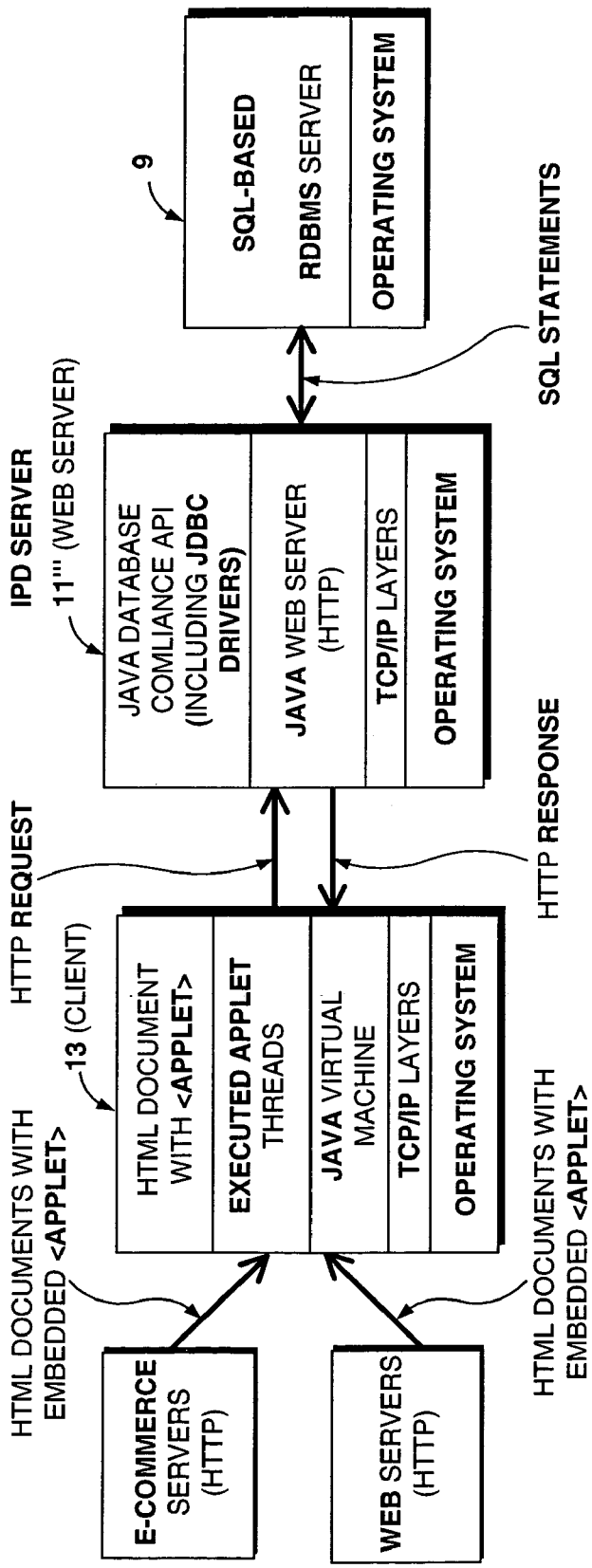
FIG. 2B3

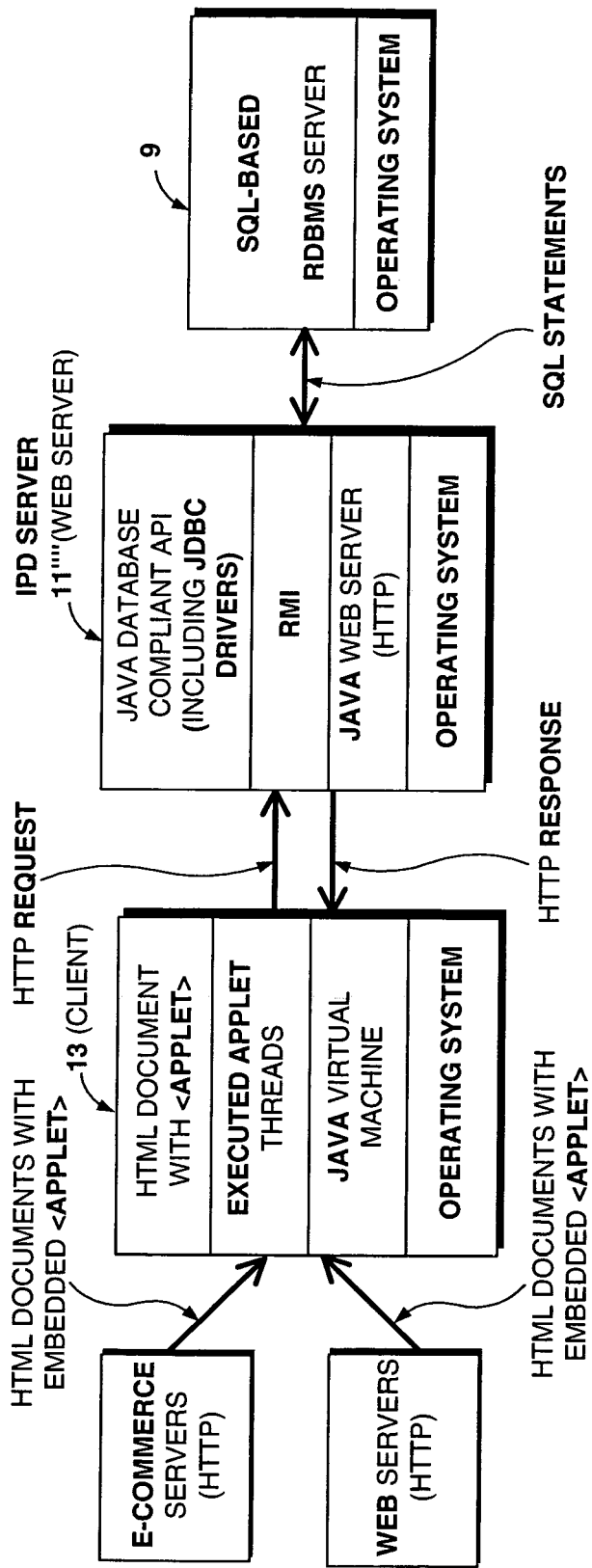
FIG. 2B4

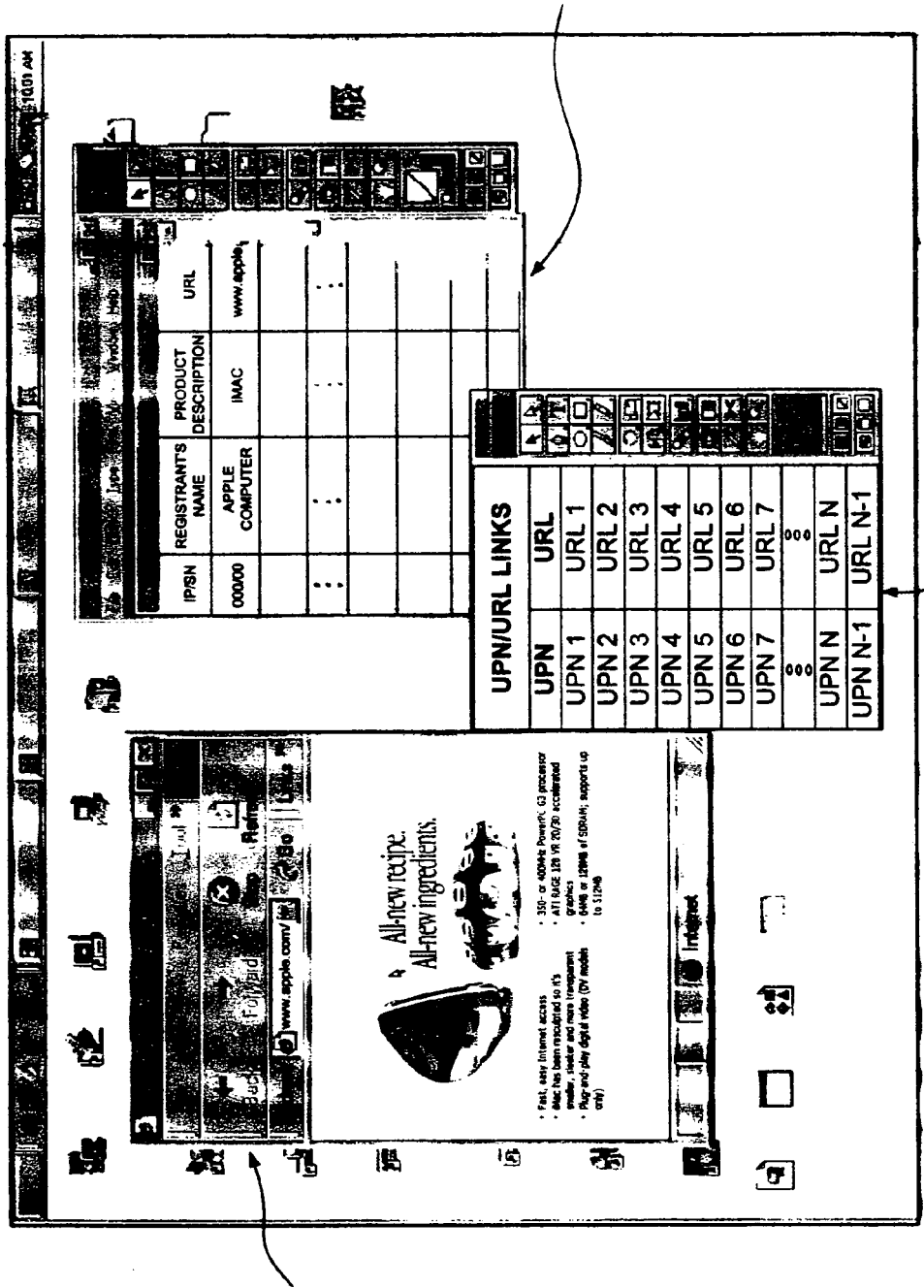
FIG. 2C1

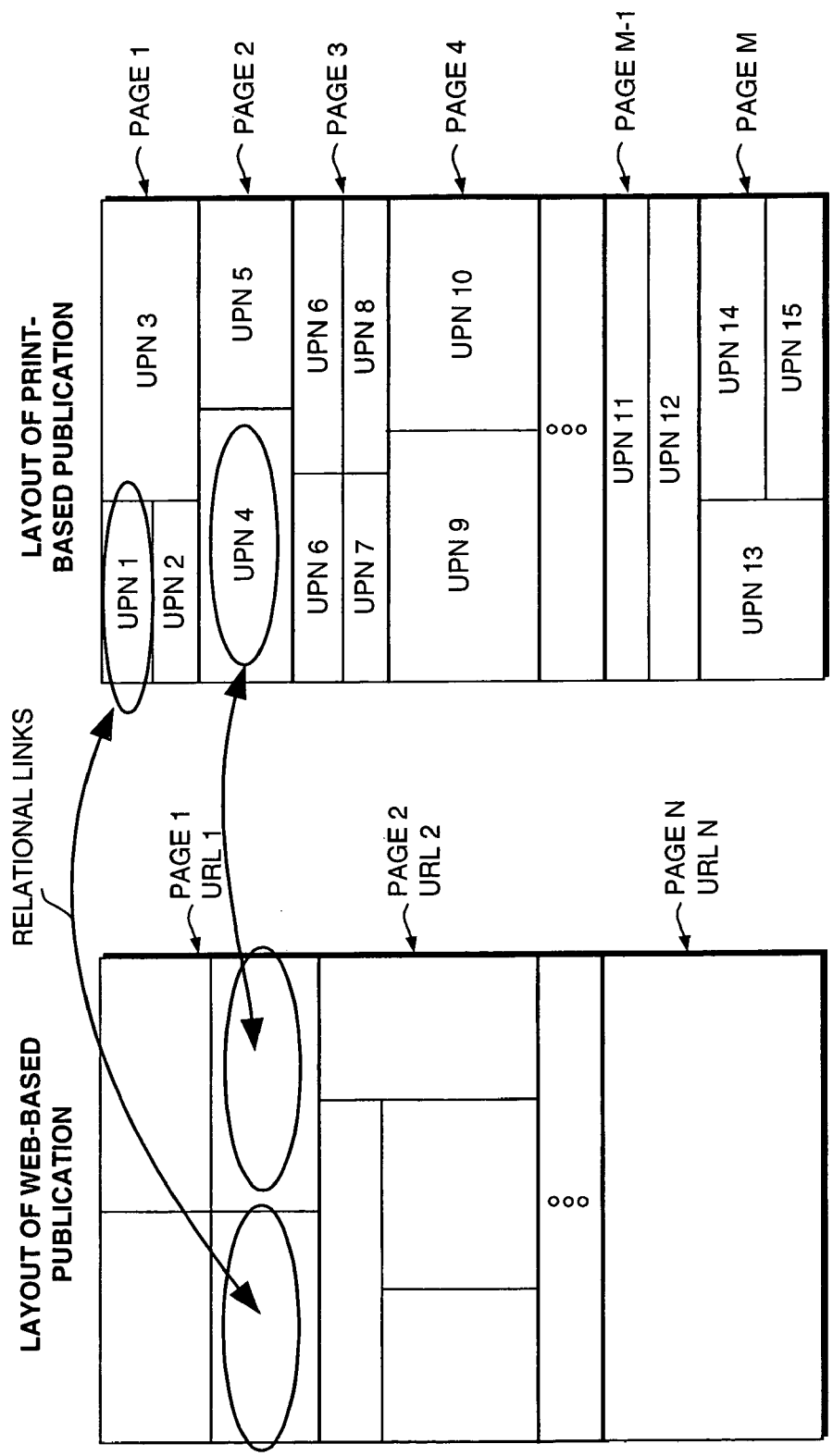

| UPN/URL LINKS | |
|---|---|
| UPN | URL |
| UPN 1 | URL 1 |
| UPN 2 | URL 2 |
| UPN 3 | URL 3 |
| UPN 4 | URL 4 |
| UPN 5 | URL 5 |
| UPN 6 | URL 6 |
| UPN 7 | URL 7 |
| UPN 8 | URL 8 |
| UPN 9 | URL 9 |
| UPN 10 | URL 10 |
| UPN 11 | URL 11 |
| UPN 12 | URL 12 |
| UPN 13 | URL 13 |
| ⋮ | ⋮ |
| UPN N | URL N |
| UPN N-1 | URL N-1 |

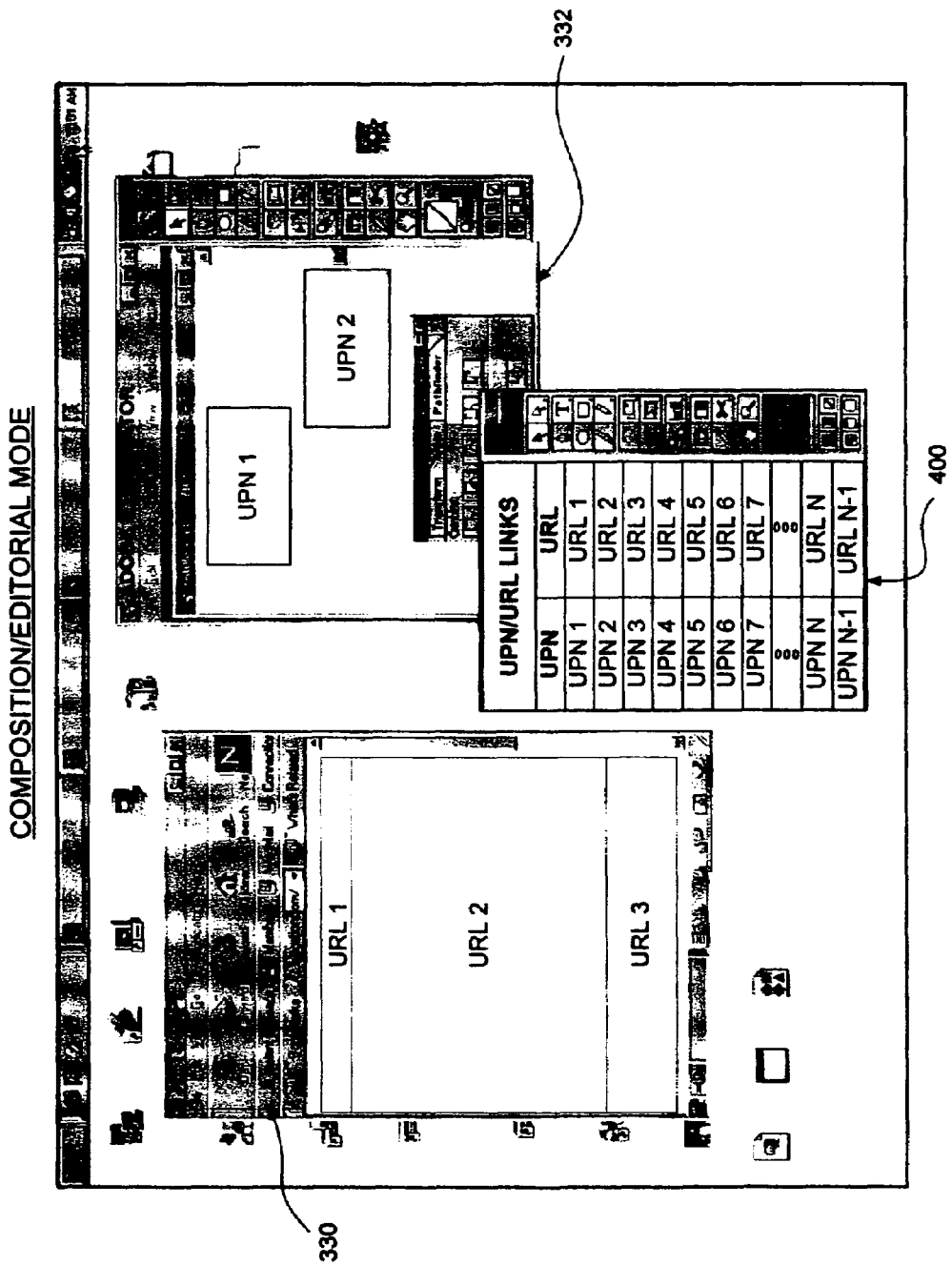
FIG. 2E4

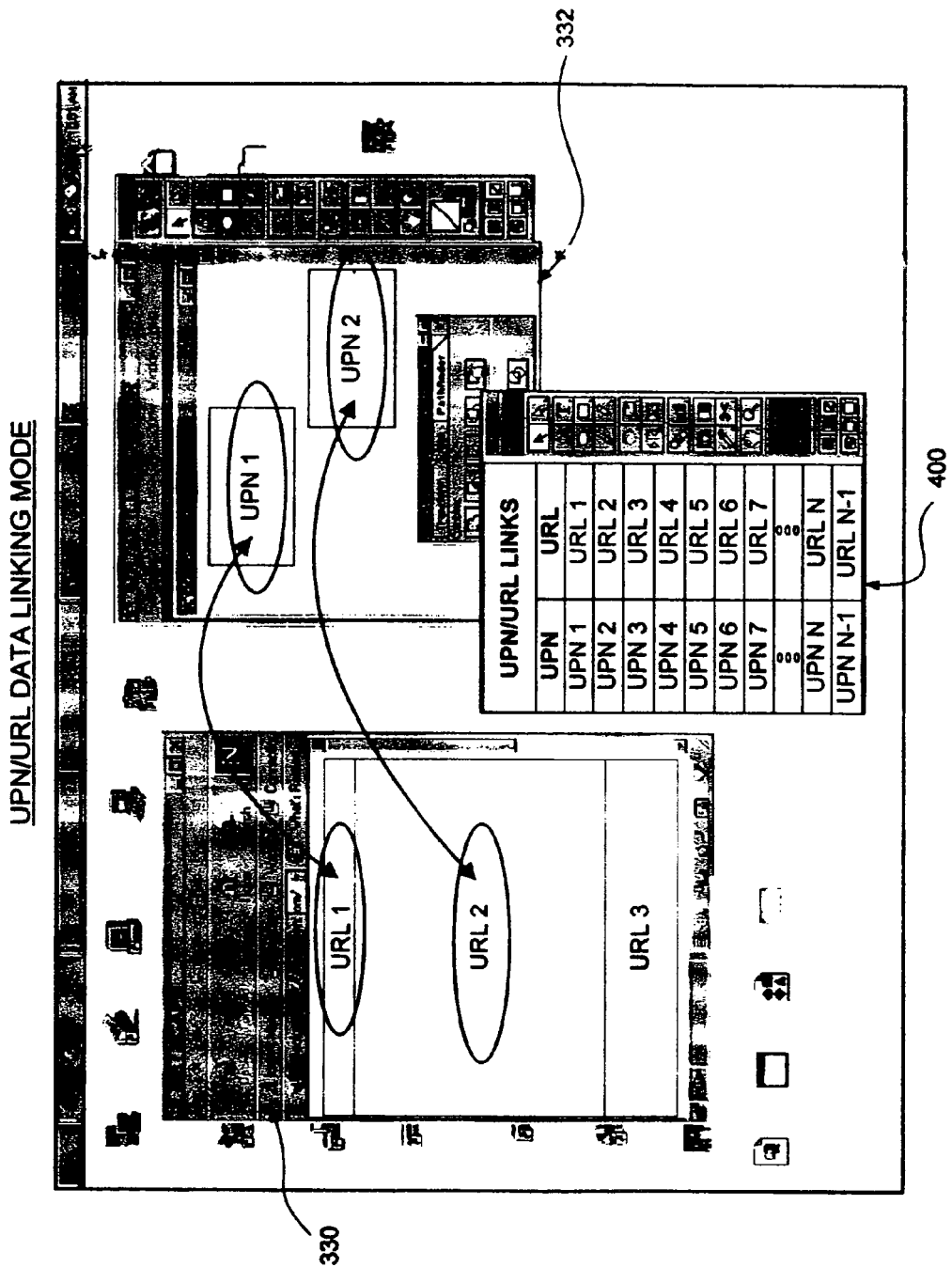

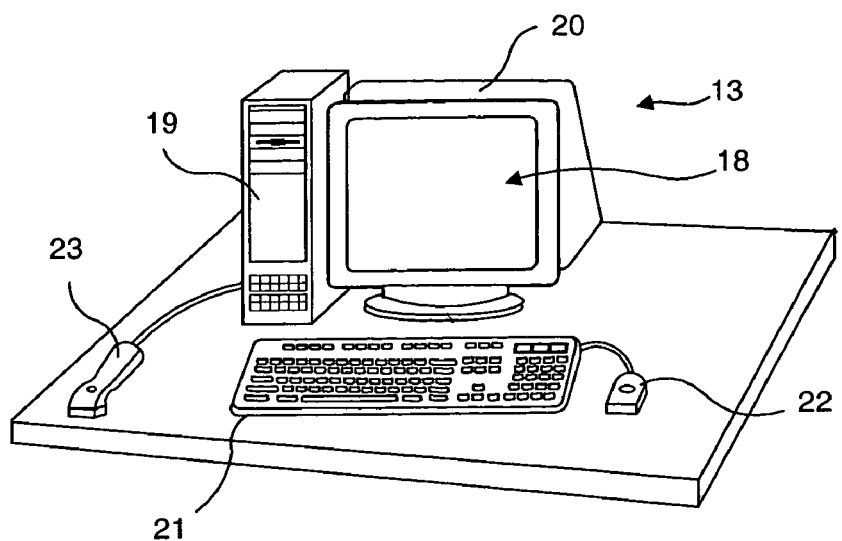
FIG. 3A1
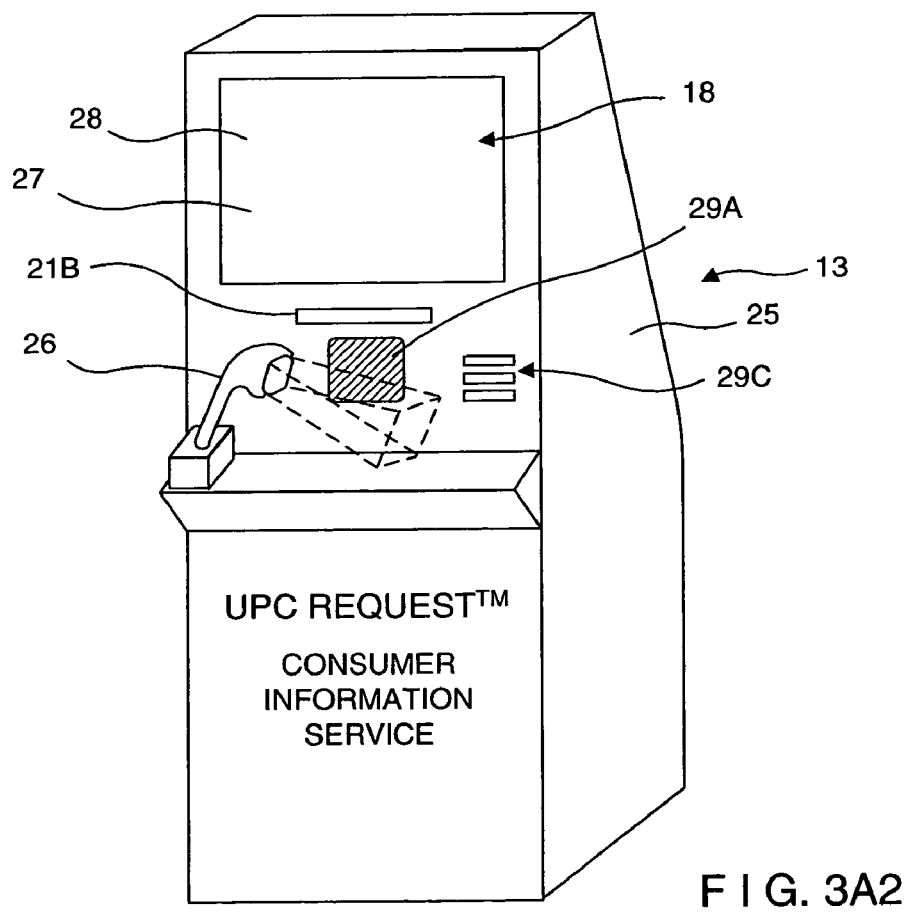
UPC REQUEST™
CONSUMER
INFORMATION
SERVICE
FIG. 3A2

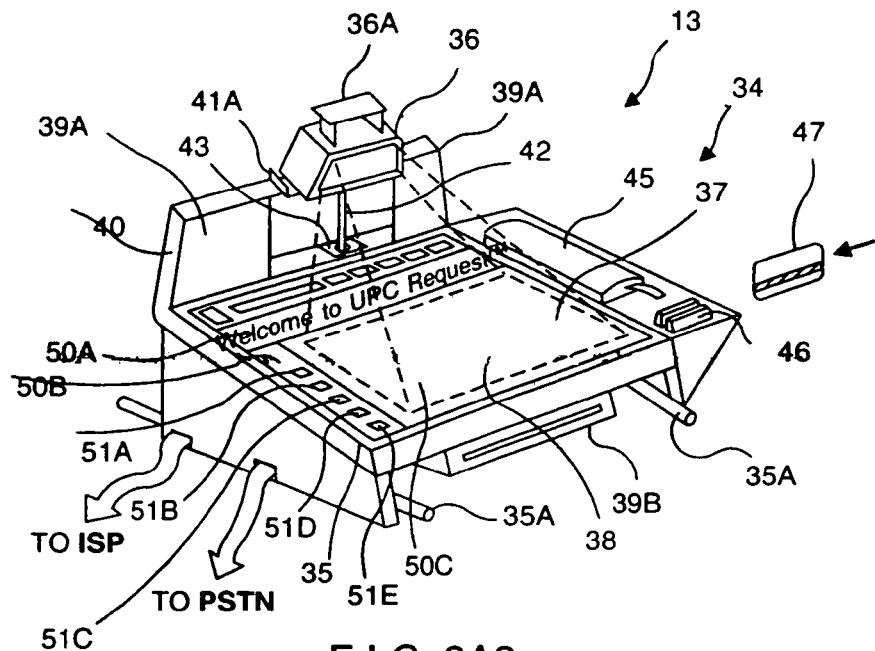
FIG. 3A3
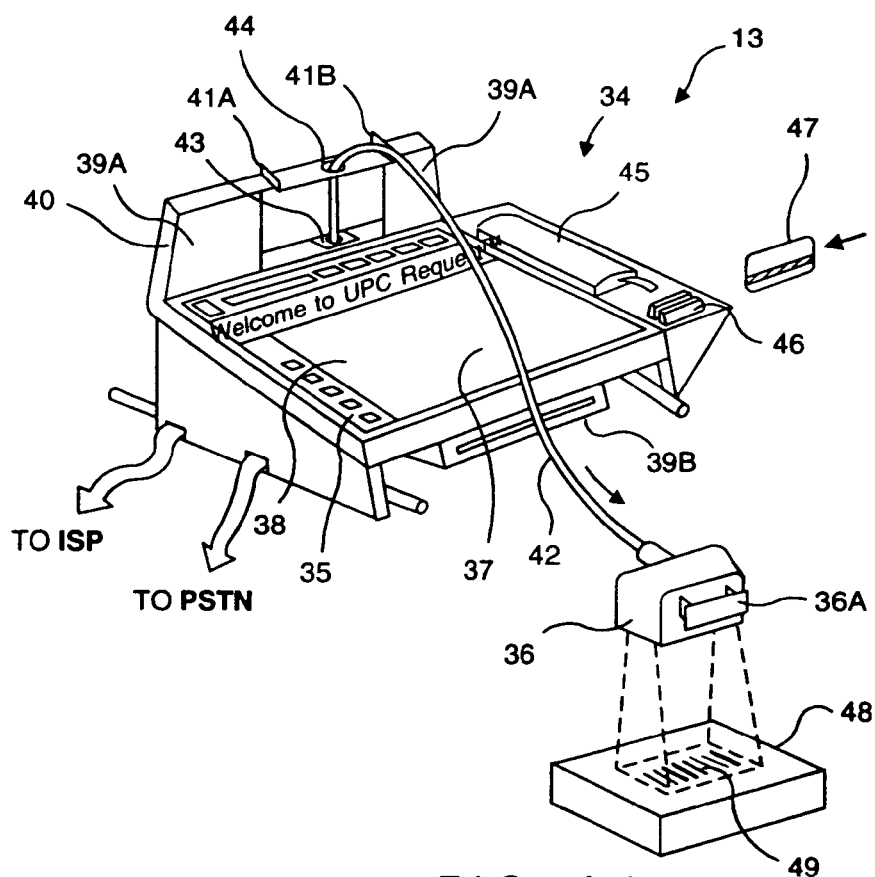
FIG. 3A3'

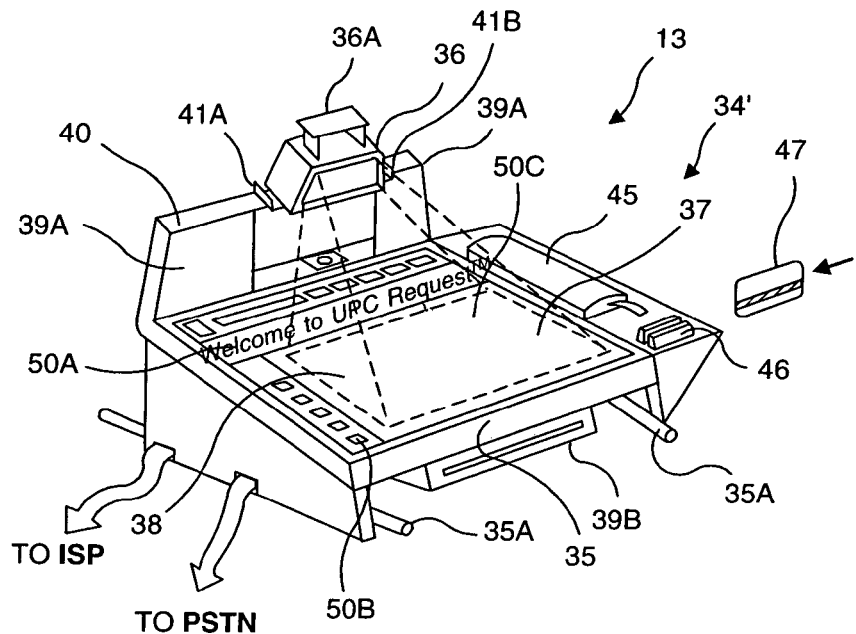
FIG. 3A4
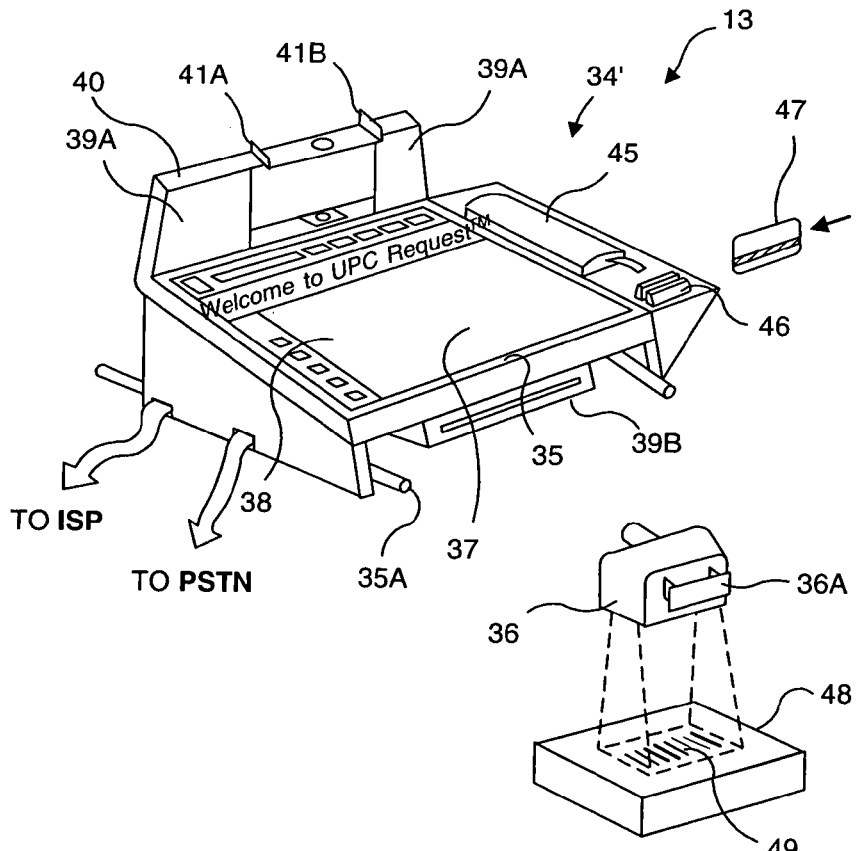
FIG. 3A4'

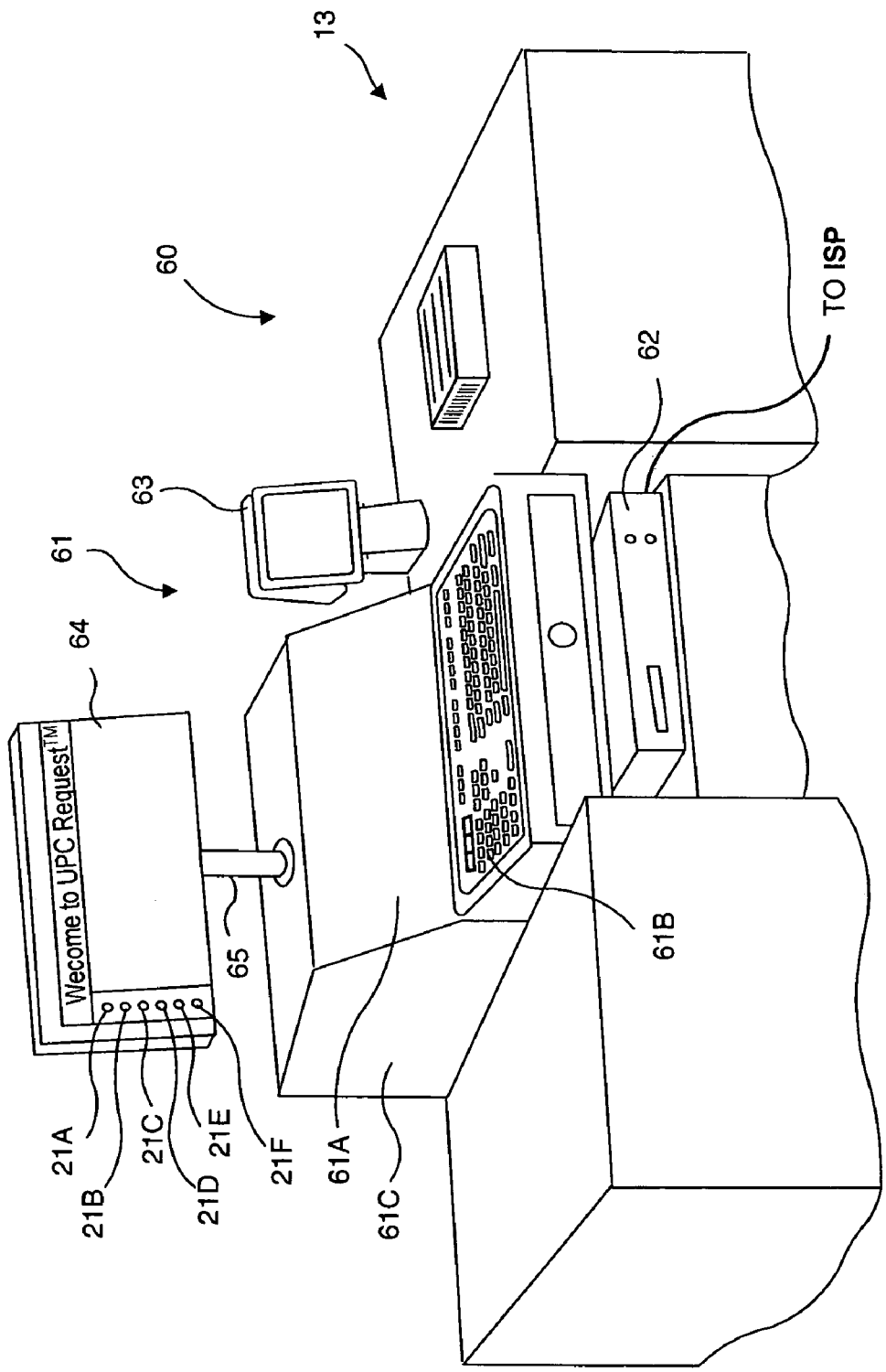
FIG. 3A5

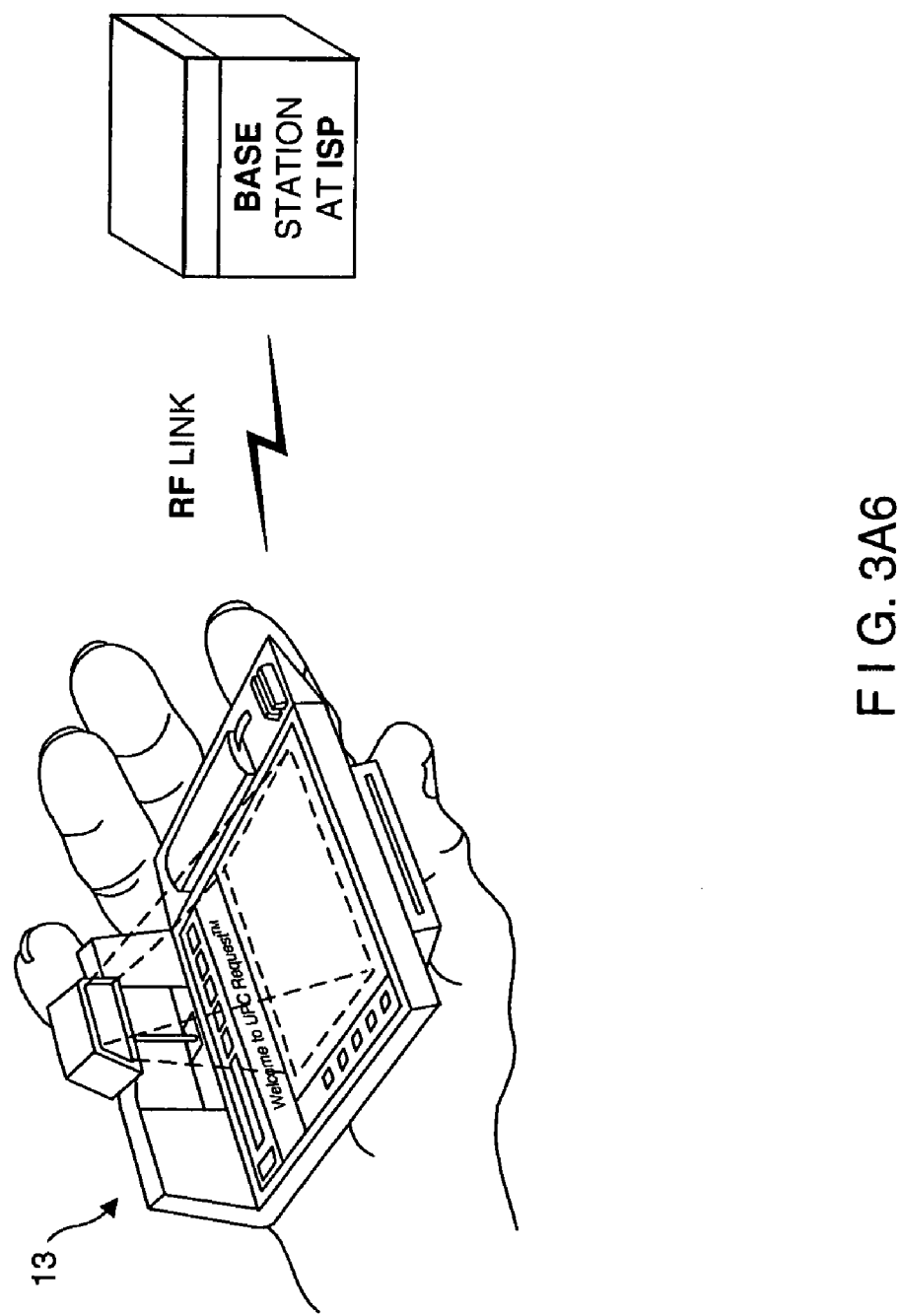
FIG. 3A6

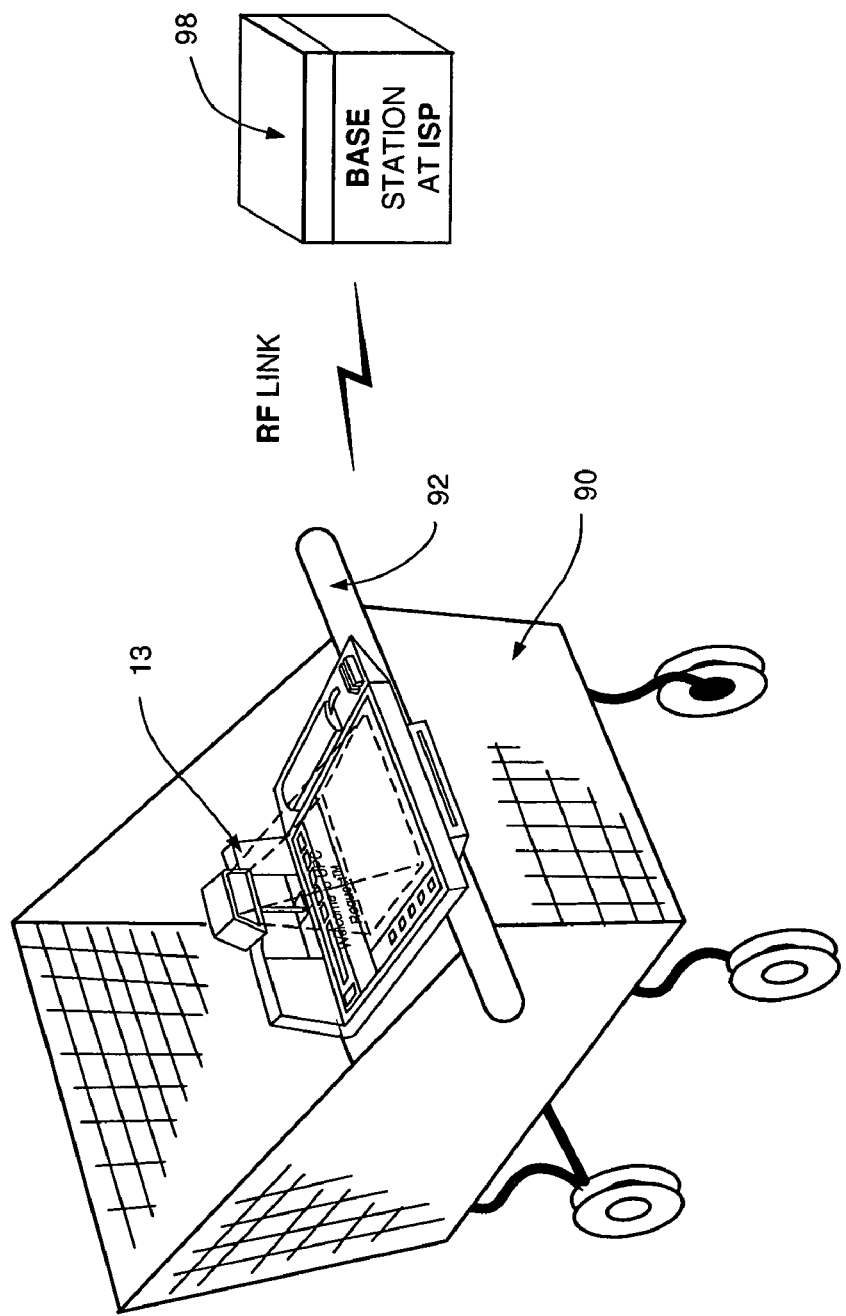
FIG. 3A7

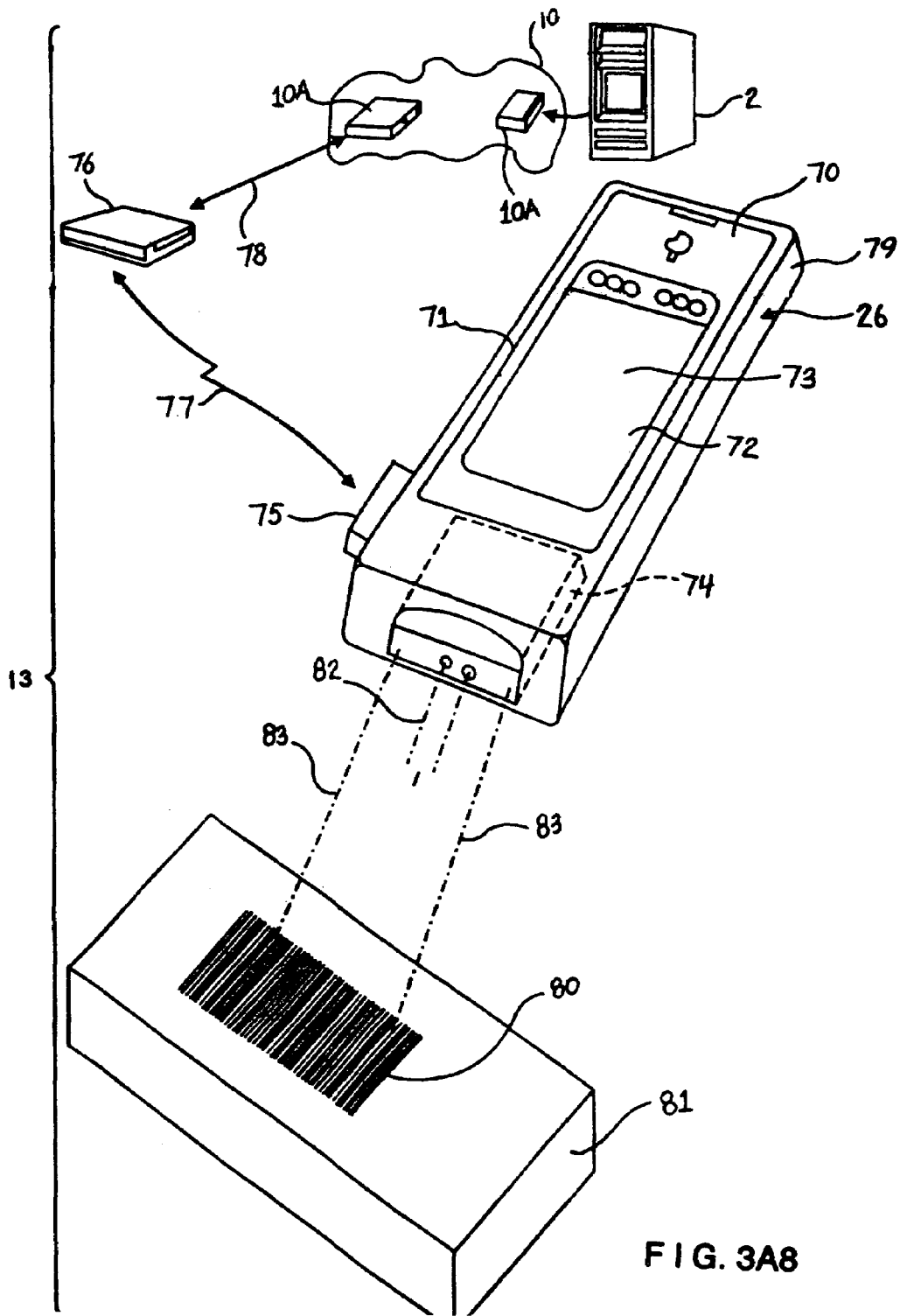
FIG. 3A8

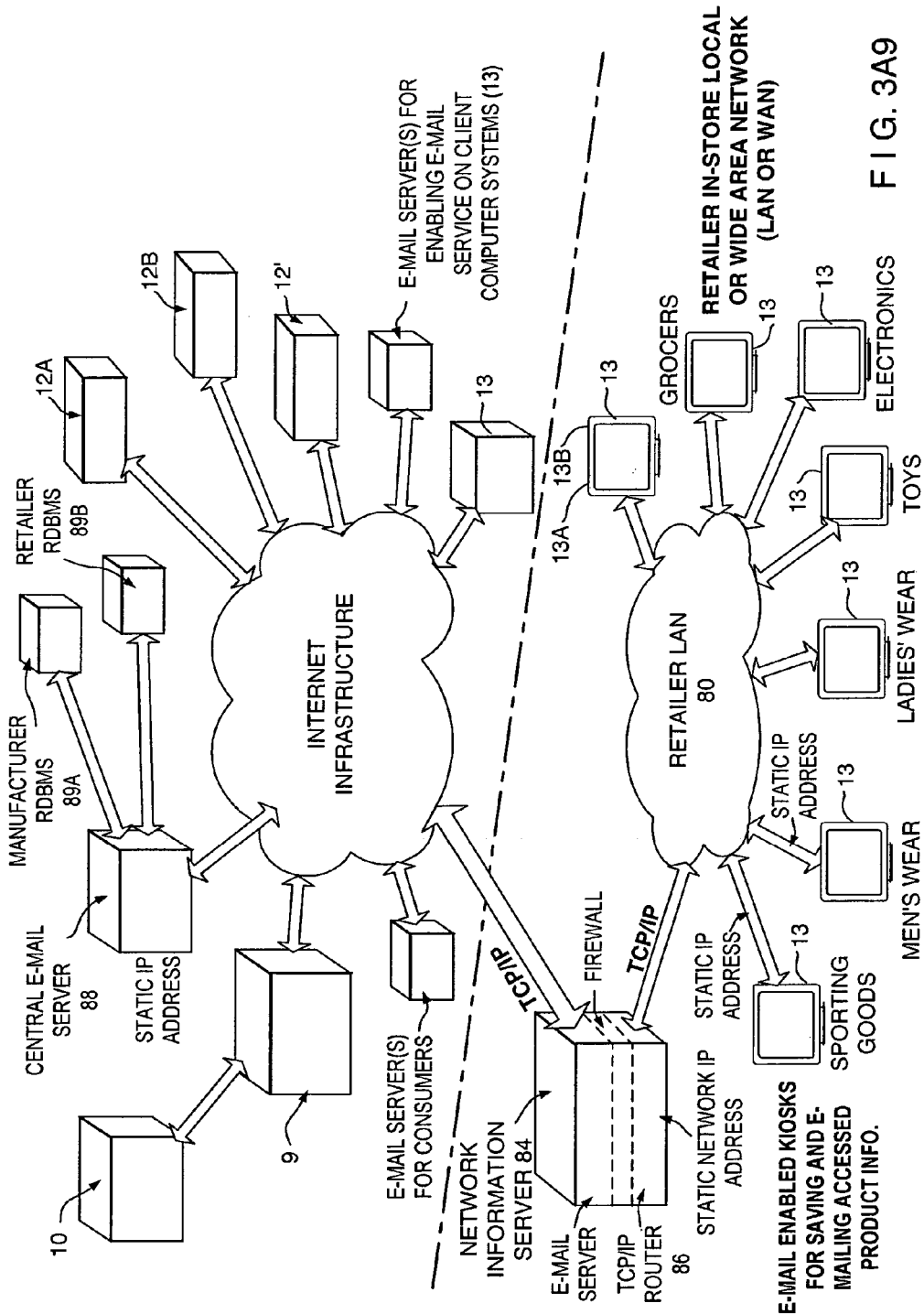
FIG. 3A9

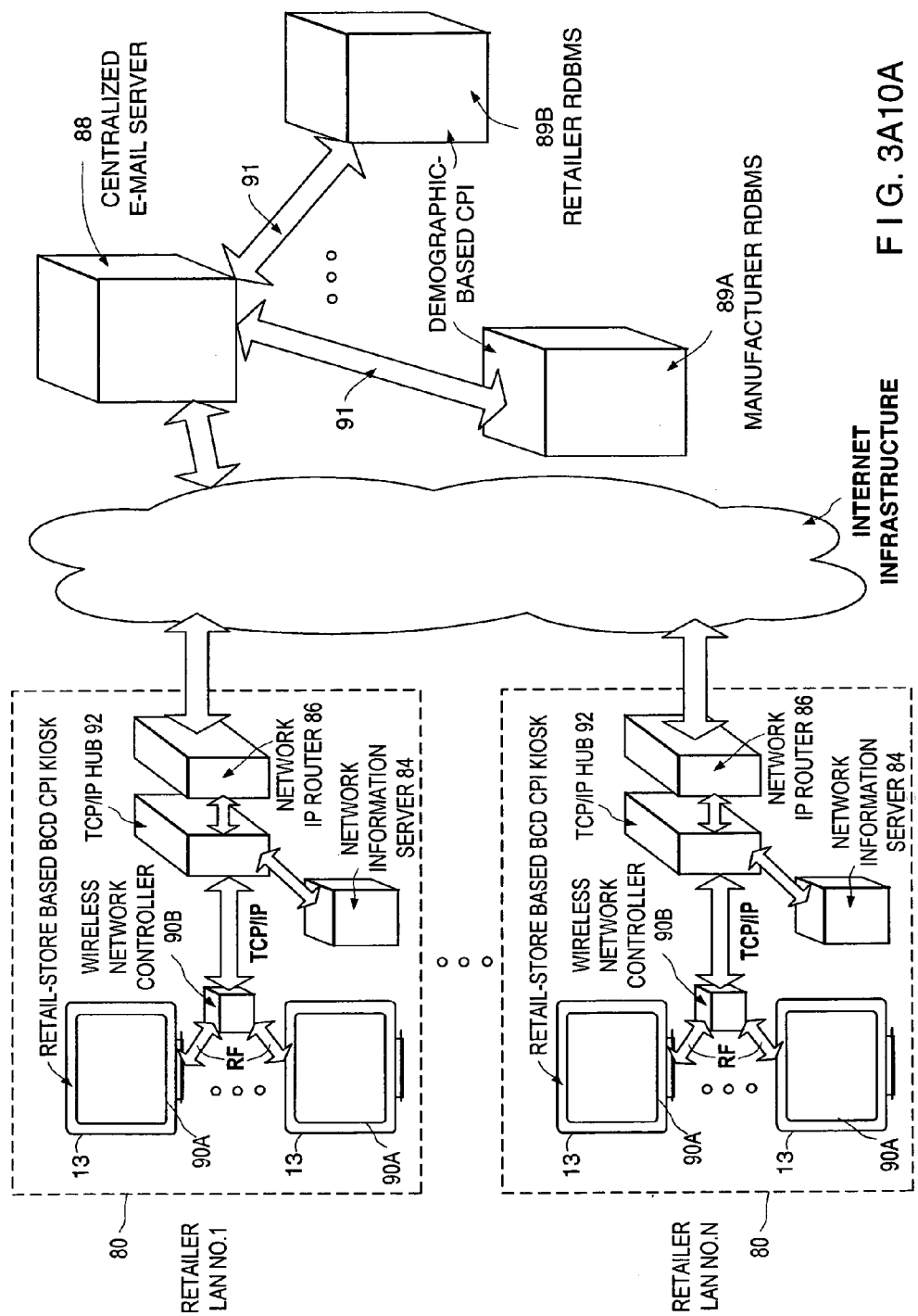
FIG. 3A10A

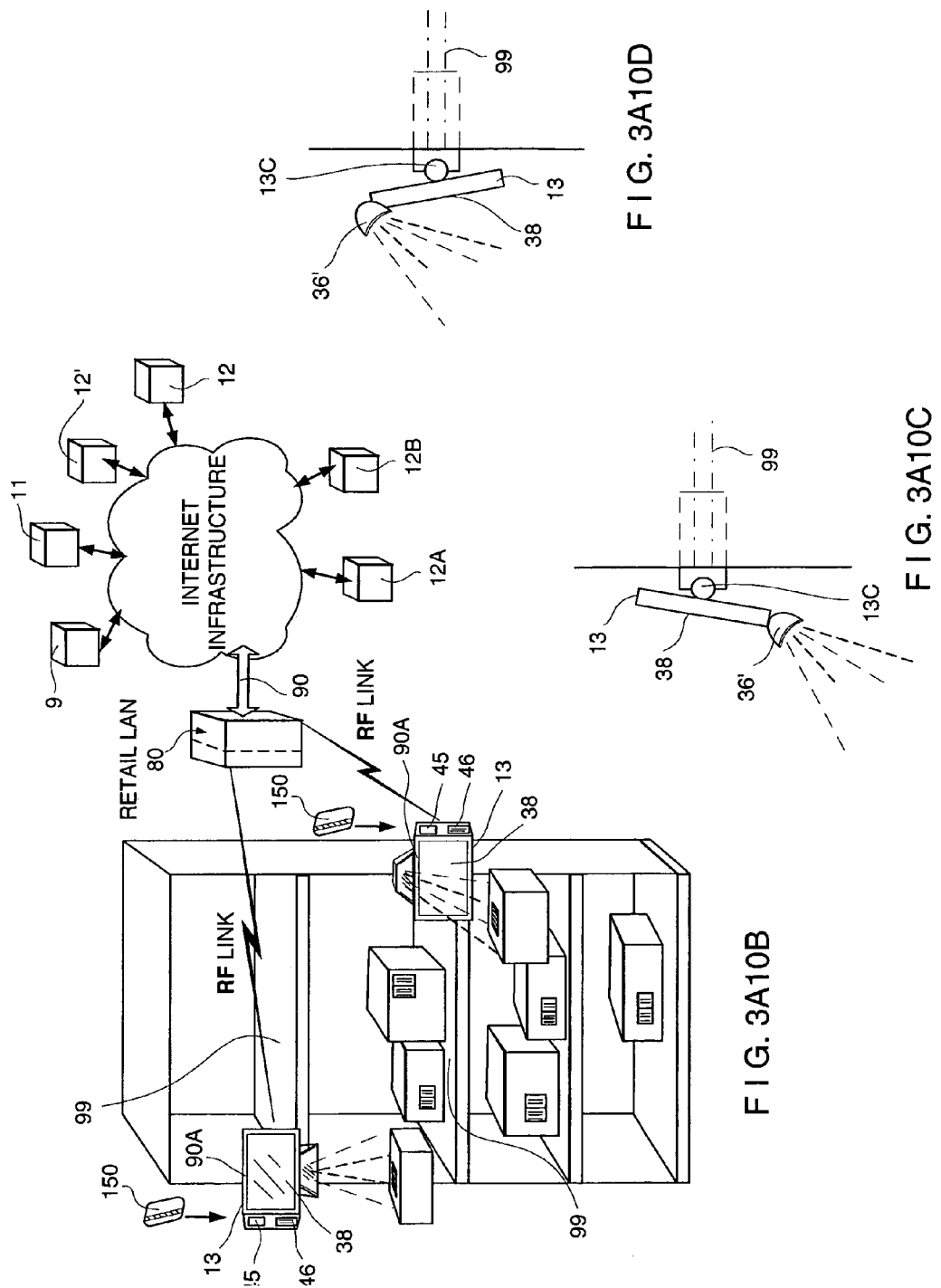

MASTER DATABASE TABLE
MAINTAINED BY RETAILER DATABASE MANAGEMENT SUBSYSTEM

| RETAILER NAME | RETAILER KIOSK E-MAIL ACCNT. NO. | RETAIL KIOSK NO. | UPN | URL | DATE | DESTINATION E-MAIL (HOME) | E-MAIL DELIVERY CONFIRMATION | CONSUMER NAME | CONSUMER ADDRESS |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| ... | ... | ... | ... | ... | ... | ... | ... | ... | ... |
| | | | | | | | | | |

FIG. 3A11

| MASTER DATABASE TABLE MAINTAINED BY MANUFACTURER DATABASE MANAGEMENT SUBSYSTEM | | | | | | | | |
|---|---|---|---|---|---|---|---|---|
| MANUFACTURER (MIN) | RETAIL KIOSK NO. | UPN | URL | DATE | DESTINATION E-MAIL ADDRESS | E-MAIL DELIVERY CRITERIA | CONSUMER NAME | CONSUMER ADDRESS |
| | | | | | | | | |
| | | | | | | | | |
| | | | | | | | | |
| | | | | | | | | |
| | | | | | | | | |
| | | | | | | | | |
| ... | ... | ... | ... | ... | ... | ... | ... | ... |
| | | | | | | | | |

FIG. 3A12

```
┌─────────────────────────────────────────────────┐
│  (1) LAUNCH A CONSUMER PRODUCT INFORMATION (CPI)
│  CAPTURE AND TRANSPORT APPLICATION SERVICE ON AN
│  INTERNET ENABLED BAR CODE DRIVEN (BCD) CPI KIOSK OF
│  THE PRESENT INVENTION CONFIGURED IN A RETAILER TCP/IP
│  LOCAL OR WIDE AREA NETWORK DEPLOYED WITHIN A RETAIL
│  SHOPPING ENVIRONMENT, AND (2) DISPLAY ON THE KIOSK
│  SCREEN A CPI-TRANSPORTING "ELECTRONIC-MAIL" ENVELOPE
│  HAVING A JAVA ENABLED GUI PROVIDED WITH
│  i) A FIRST SINGLE-CLICK BUTTON FOR CAPTURING AND
│  STORING AS AN HTML ENCODED DOCUMENT THEREIN, ANY CPI
│  RELATED DOCUMENT BEING DISPLAYED ON THE BCD CPI KIOSK
│  ii) A SECOND SINGLE-CLICK BUTTON FOR TRANSPORTING       ──A
│  COPIES OF THE ENVELOPE TO THE
│  E-MAIL ADDRESS OF CONSUMER
│  iii) A CONSUMER E-MAIL ADDRESS FIELD FOR ENTERING THE E-
│  MAIL ADDRESS OF THE CONSUMER/SHOPPER, TO WHICH A
│  COPY OF THE E-MAIL ENVELOPE CAN BE
│  AUTOMATICALLY SENT DURING TRANSPORT
│  iv) A RETAILER E-MAIL ADDRESS FIELD CONTAINING A
│  PRESENT E-MAIL ADDRESS OF THE RETAILER OPERATING THE
│  KIOSK, INDICATING THE RETAIL STORE LOCATION, AND
│  POSSIBLY THE RETAIL DEPARTMENT FROM WHICH THE CPI-
│  TRANSPORTING ENVELOPE WAS SENT ON THE TIME AND DATE
│  OF THE ELECTRONIC MESSAGE TRANSMISSION
└─────────────────────────────────────────────────┘
                            │
                            ▼
┌─────────────────────────────────────────────────┐
│  ENTER THE CONSUMER E-MAIL ADDRESS INTO THE CONSUMER
│  E-MAIL ADDRESS FIELD OF THE ENVELOPE (e.g. BY MANUALLY
│  TYPING THE E-MAIL ADDRESS, READING A BAR CODED
│  CONSUMER IDENTIFICATION CARD HAVING THE CONSUMER'S E-    ──B
│  MAIL ADDRESS AND OTHER INFORMATION ENCODED
│  THEREWITHIN, OR BY READING A MAGNETIC STRIPE TYPE
│  CONSUMER IDENTIFICATION CARD ENCODED WITH THE SAME
│  OR SIMILAR INFORMATION USING A MAGNETIC STRIPE READER
│  INTERFACED WITH THE BCD CPI KIOSK)
└─────────────────────────────────────────────────┘
                            │
                            ▼
                           (A)
```

FIG. 3A13A

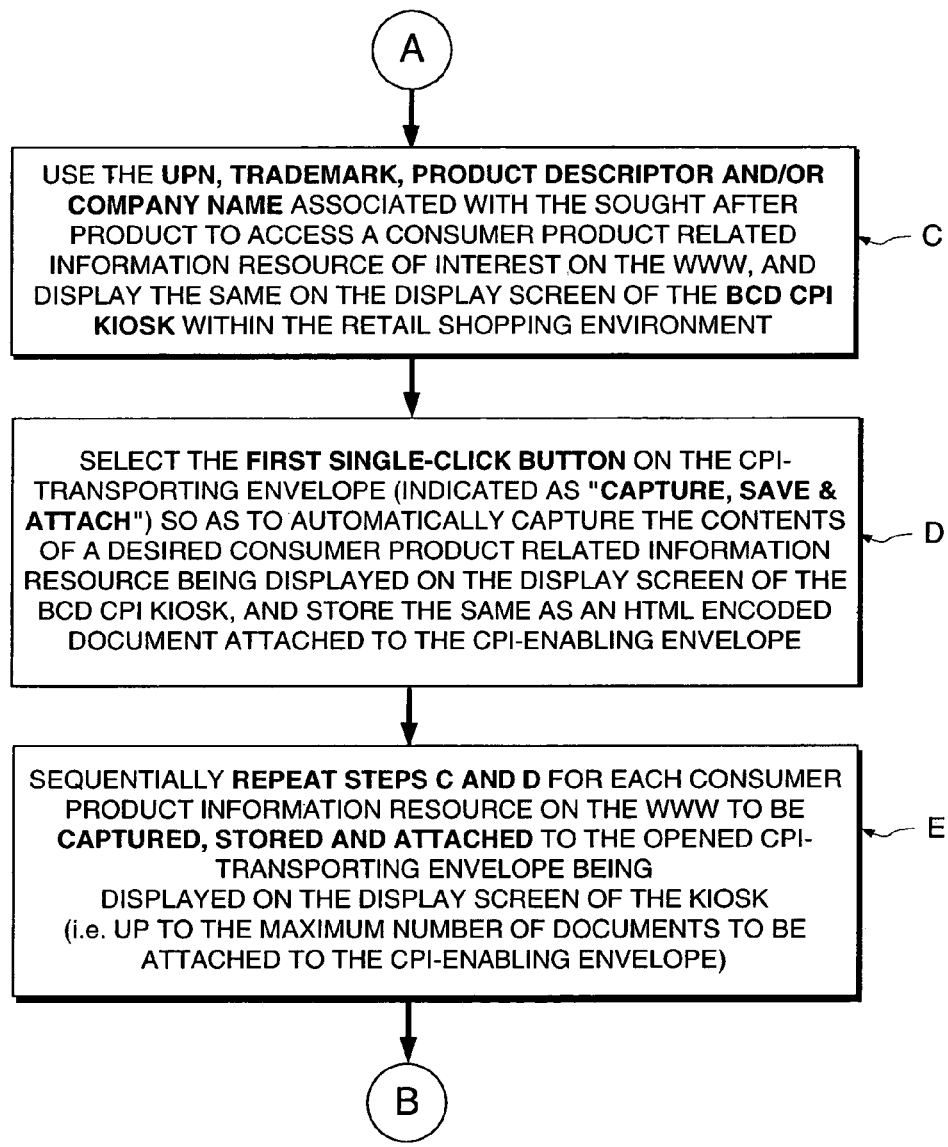
FIG. 3A13B

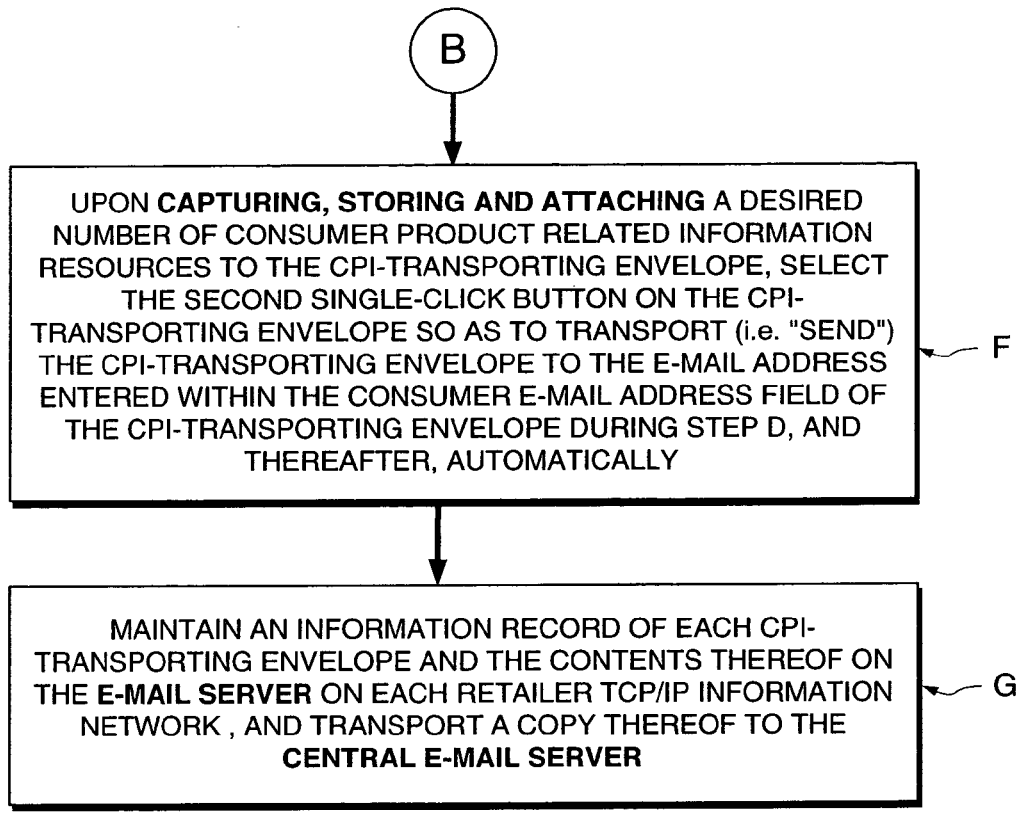
FIG. 3A13C

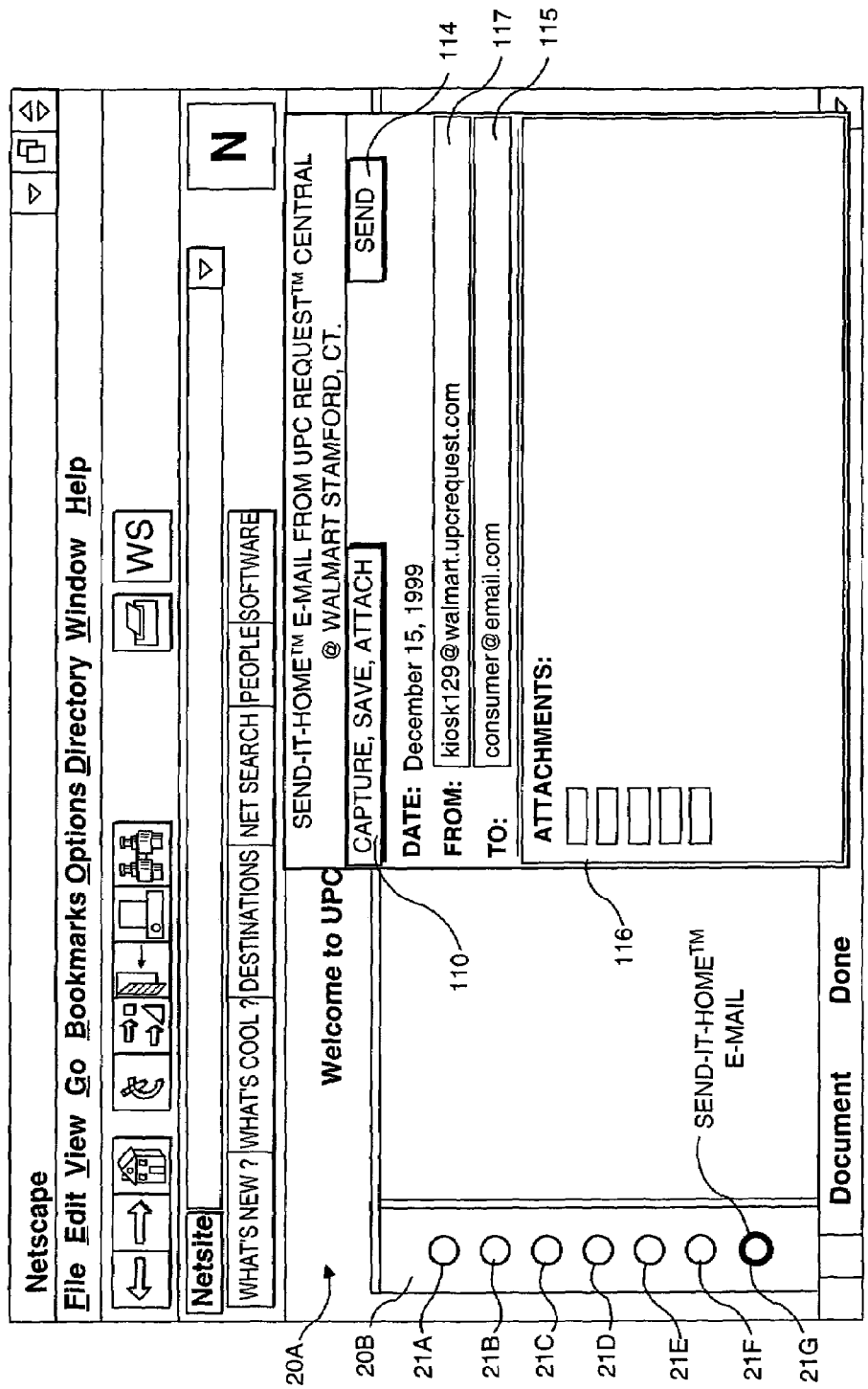
FIG. 3A14

(1) LAUNCH A CONSUMER PRODUCT INFORMATION (CPI) CAPTURE AND TRANSPORT APPLICATION SERVICE ON AN INTERNET ENABLED BAR CODE DRIVEN (BCD) CPI KIOSK OF THE PRESENT INVENTION CONFIGURED IN A RETAILER TCP/IP LOCAL OR WIDE AREA NETWORK DEPLOYED WITHIN A RETAIL SHOPPING ENVIRONMENT, AND (2) DISPLAY ON THE KIOSK SCREEN A CPI-TRANSPORTING "ELECTRONIC-MAIL" ENVELOPE HAVING A JAVA ENABLED GUI PROVIDED WITH
i) A FIRST SINGLE-CLICK BUTTON FOR CAPTURING AND STORING AS AN HTML ENCODED DOCUMENT THEREIN, ANY CPI RELATED DOCUMENT BEING DISPLAYED ON THE BCD CPI KIOSK
ii) A SECOND SINGLE-CLICK BUTTON FOR TRANSPORTING COPIES OF THE ENVELOPE TO THE E-MAIL ADDRESS OF CONSUMER
iii) A CONSUMER E-MAIL ADDRESS FIELD FOR ENTERING THE E-MAIL ADDRESS OF THE CONSUMER/SHOPPER, TO WHICH A COPY OF THE E-MAIL ENVELOPE CAN BE AUTOMATICALLY SENT DURING TRANSPORT IF ENABLED BY THE CONSUMER/SHOPPER
iv) A RETAILER E-MAIL ADDRESS FIELD CONTAINING A PRESENT E-MAIL ADDRESS OF THE RETAILER OPERATING THE KIOSK, INDICATING THE RETAIL STORE LOCATION, AND POSSIBLY THE RETAIL DEPARTMENT FROM WHICH THE CPI-TRANSPORTING ENVELOPE WAS SENT ON THE TIME AND DATE OF THE ELECTRONIC MESSAGE TRANSMISSION

— A

ENTER THE CONSUMER E-MAIL ADDRESS INTO THE CONSUMER E-MAIL ADDRESS FIELD OF THE ENVELOPE (e.g. BY MANUALLY TYPING THE E-MAIL ADDRESS, READING A BAR CODED CONSUMER IDENTIFICATION CARD HAVING THE CONSUMER'S E-MAIL ADDRESS AND OTHER INFORMATION ENCODED THEREWITHIN, OR BY READING A MAGNETIC STRIPE TYPE CONSUMER IDENTIFICATION CARD ENCODED WITH THE SAME OR SIMILAR INFORMATION USING A MAGNETIC STRIPE READER INTERFACED WITH THE BCD CPI KIOSK)

— B

FIG. 3A15A

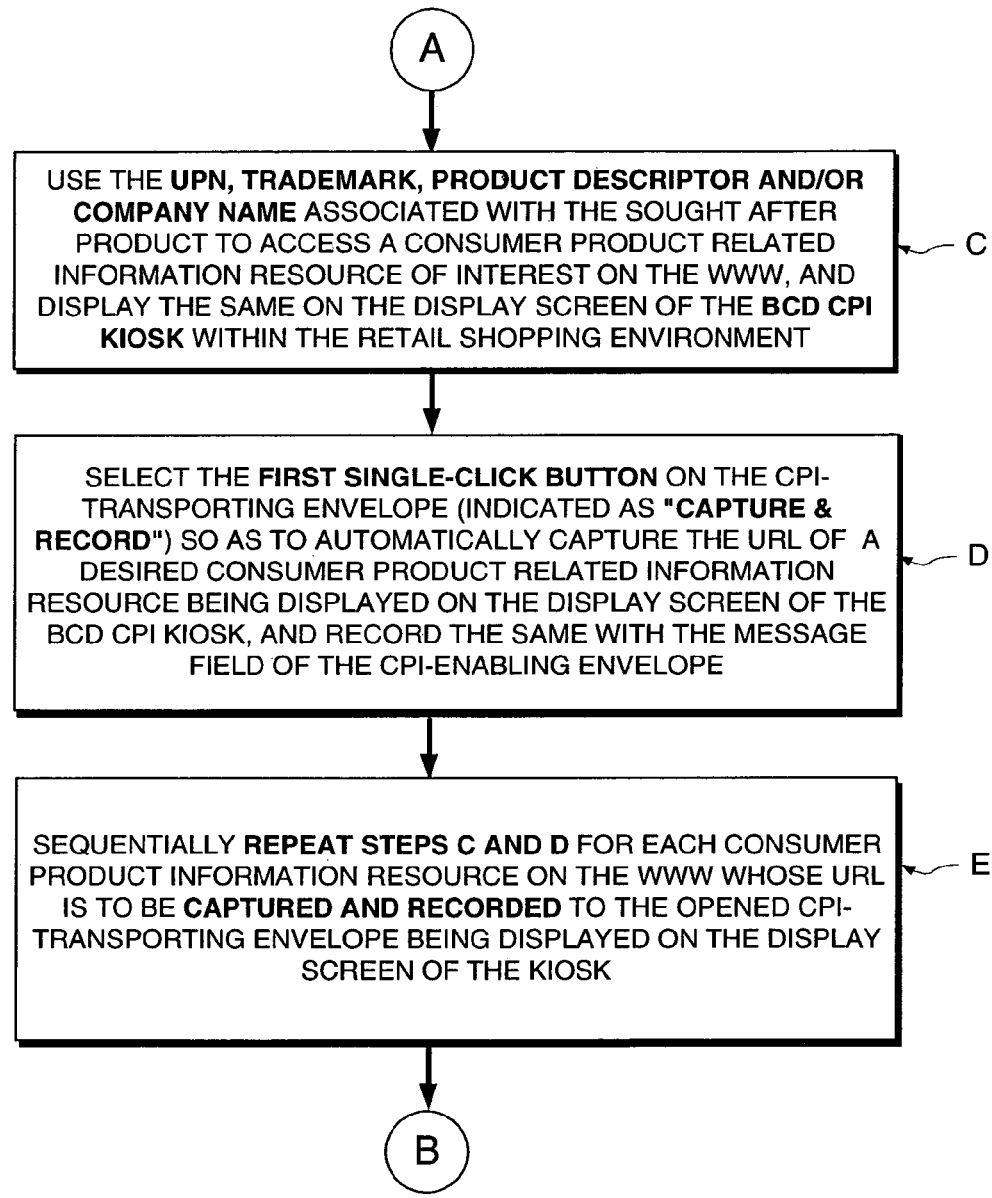
FIG. 3A15B

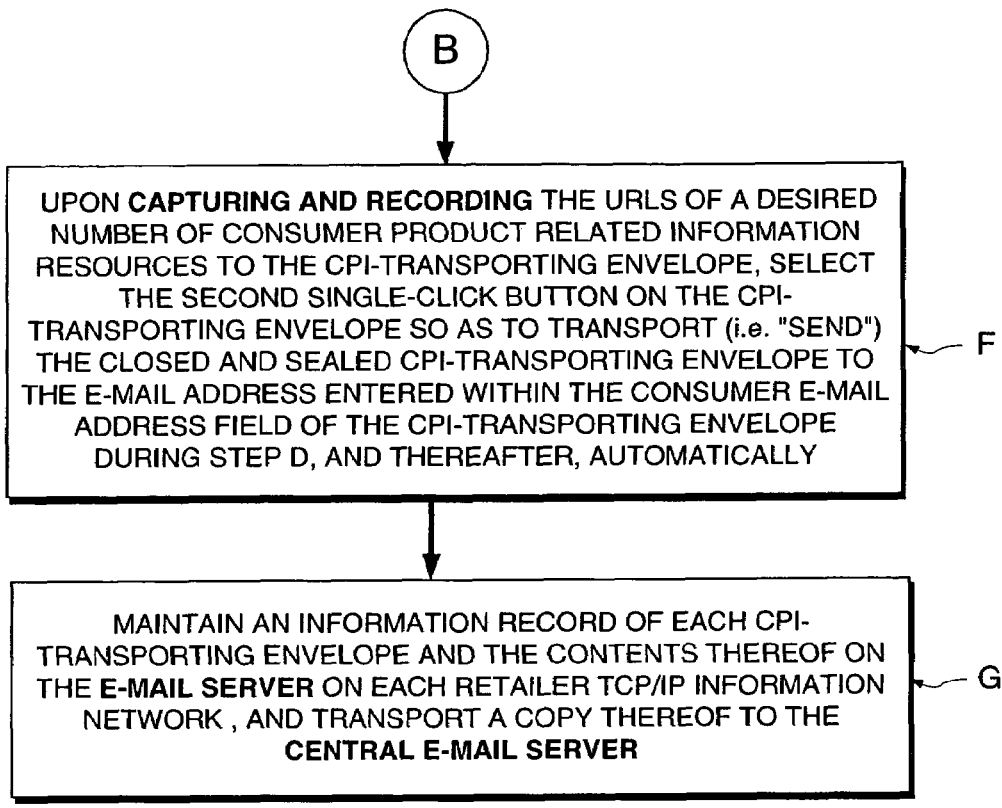
FIG. 3A15C

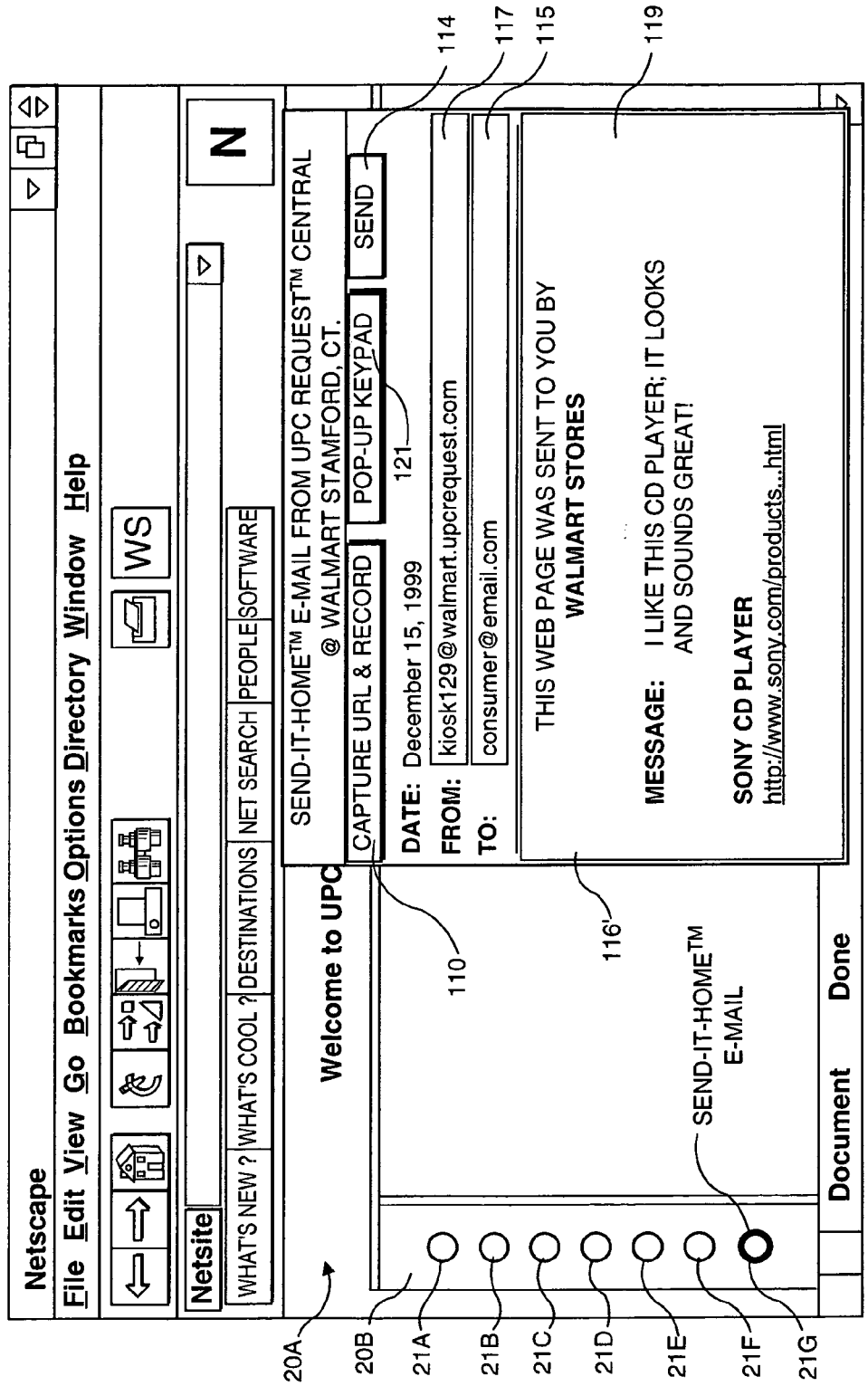
FIG. 3A16

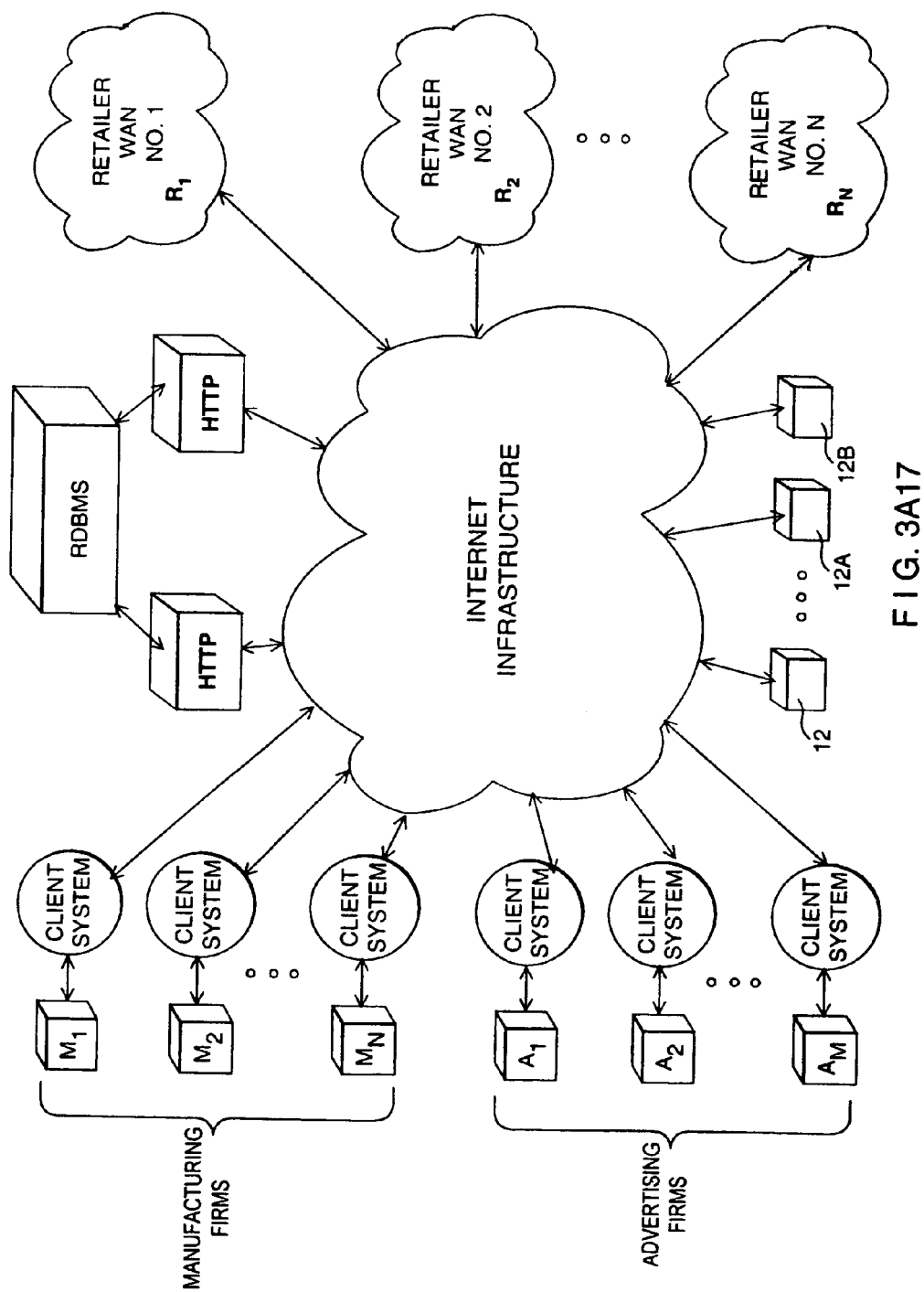
FIG. 3A17

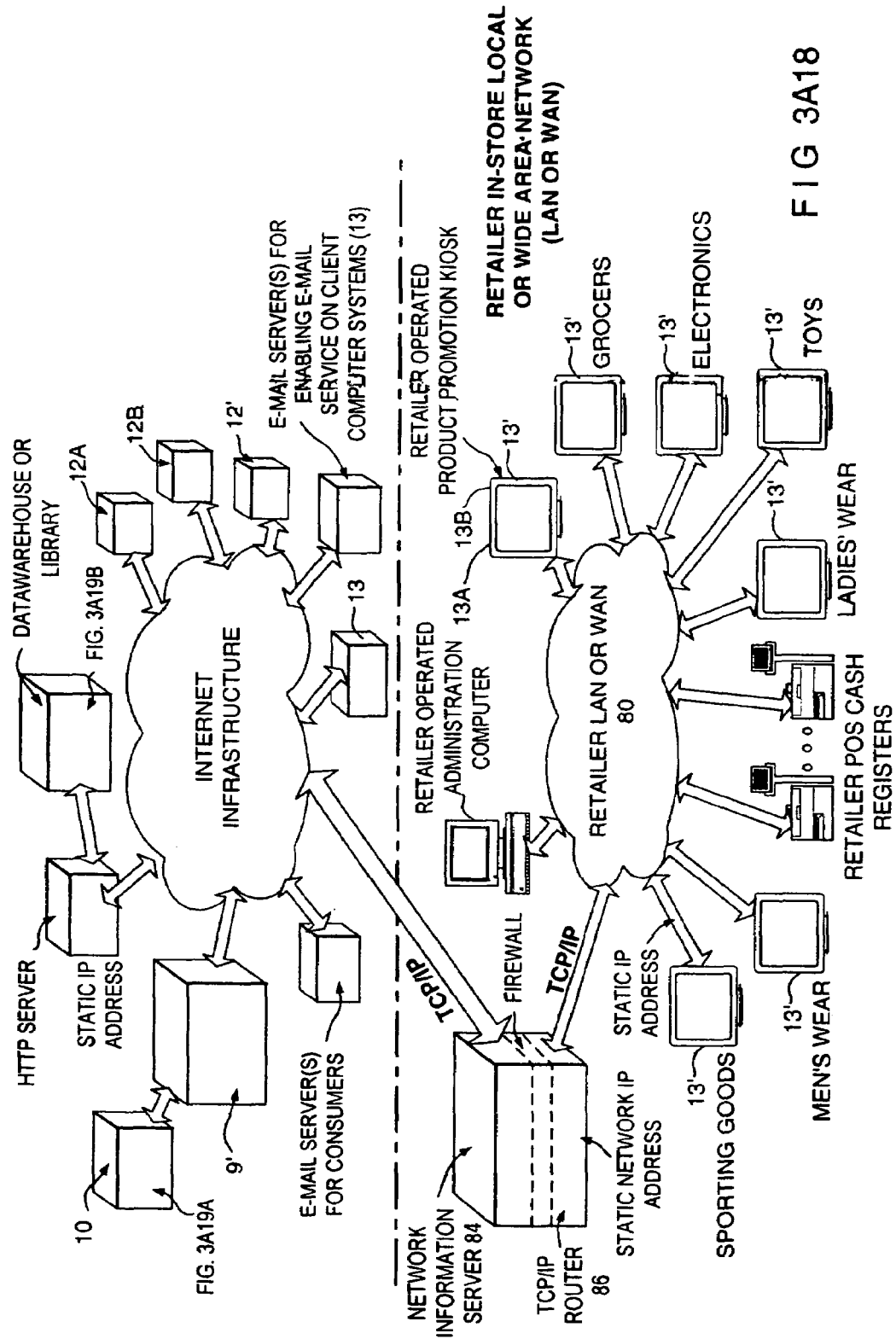

| UPN | RETAILER | URL NO. 1 | ... | URL NO. N | TRADEMARKS | PRODUCT DESCRIPTION | E-MAIL |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| ... | ... | ... | ... | ... | ... | ... | ... |
| | | | | | | | |

FIG. 3A19A

| UPN | RETAILER | IRF NO. 1 | IRF NO. N | TRADEMARKS | PRODUCT DESCRIPTION | E-MAIL |
|---|---|---|---|---|---|---|
| | | | | | | |
| | | | | | | |
| | | | | | | |
| | | | | | | |
| | | | | | | |
| | | | | | | |
| | | | | | | |
| | | | | | | |
| ... | ... | ... | ... | ... | ... | ... |
| | | | | | | |

FIG. 3A19B

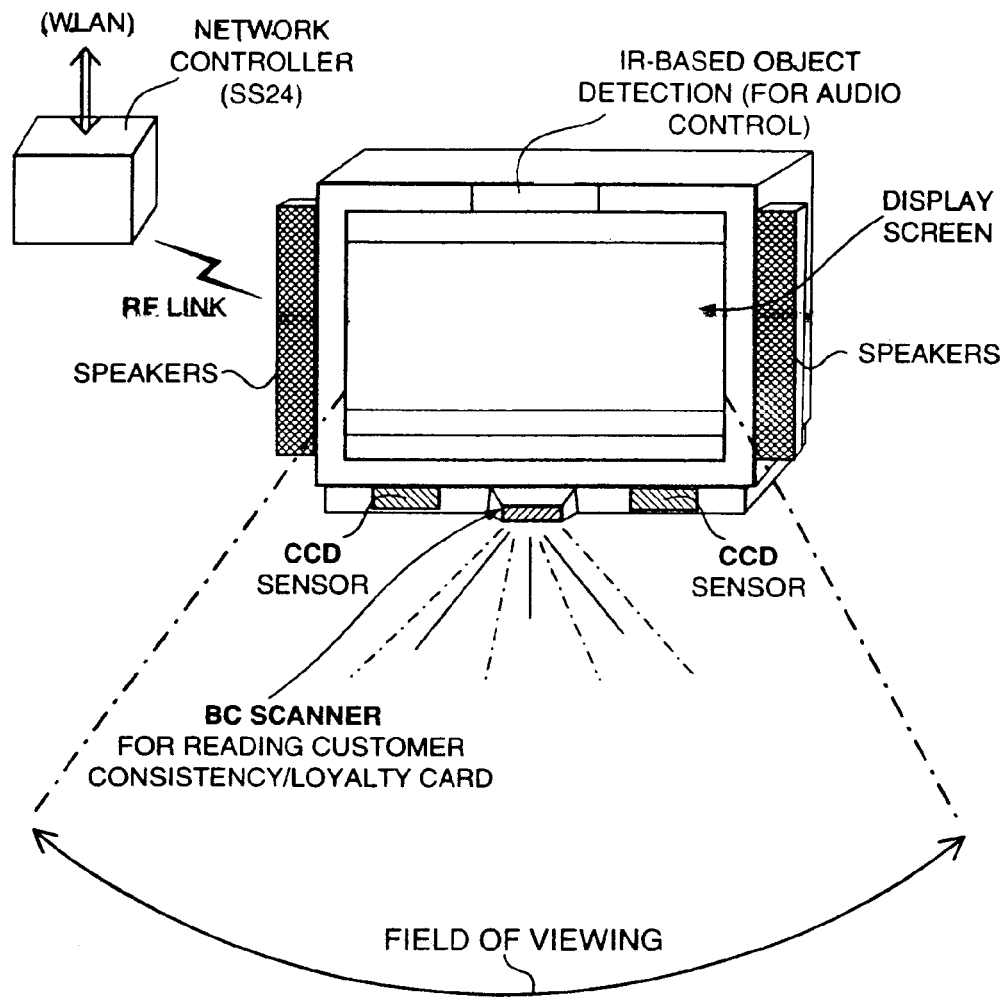
FIG. 3A19C

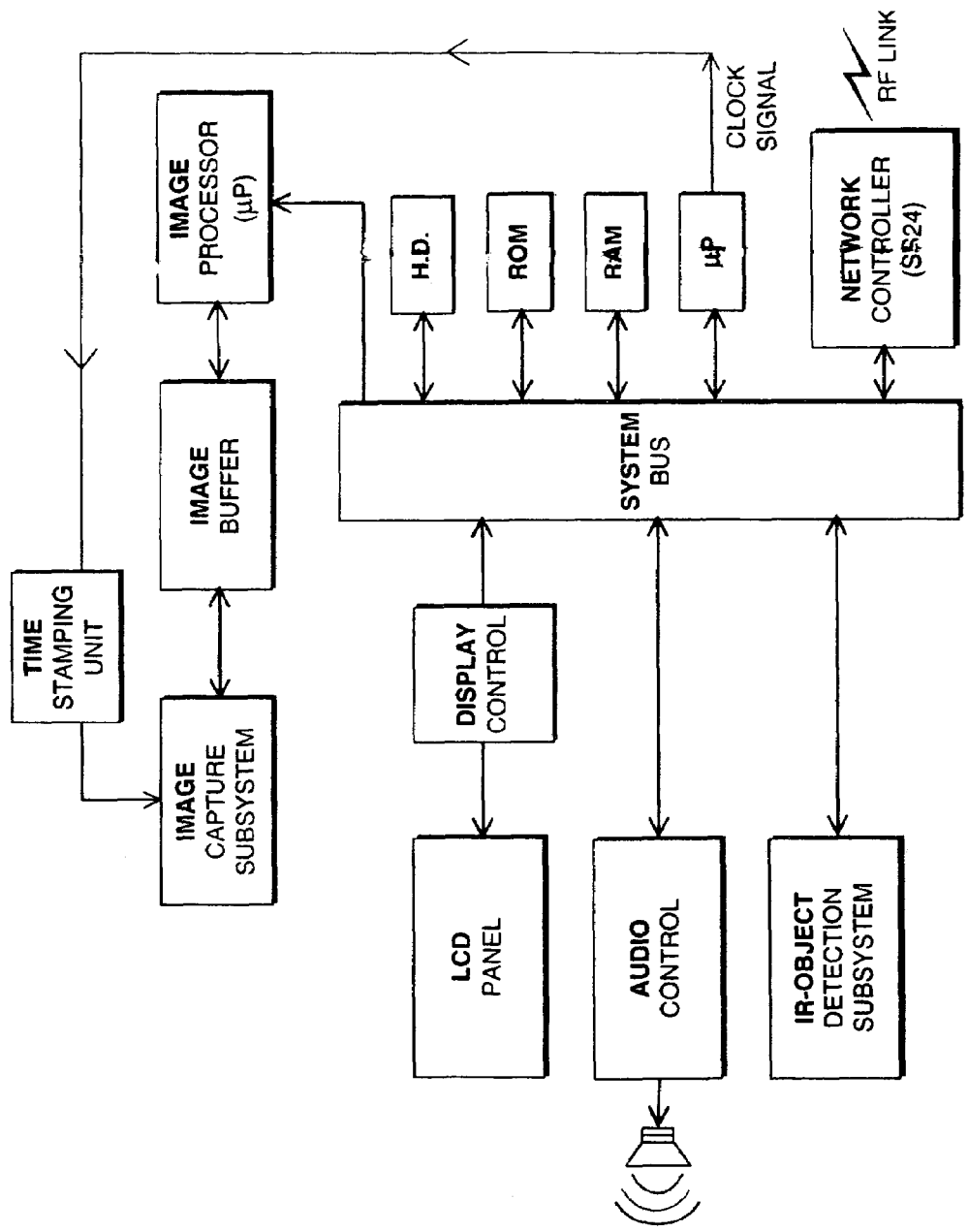
FIG. 3A19D

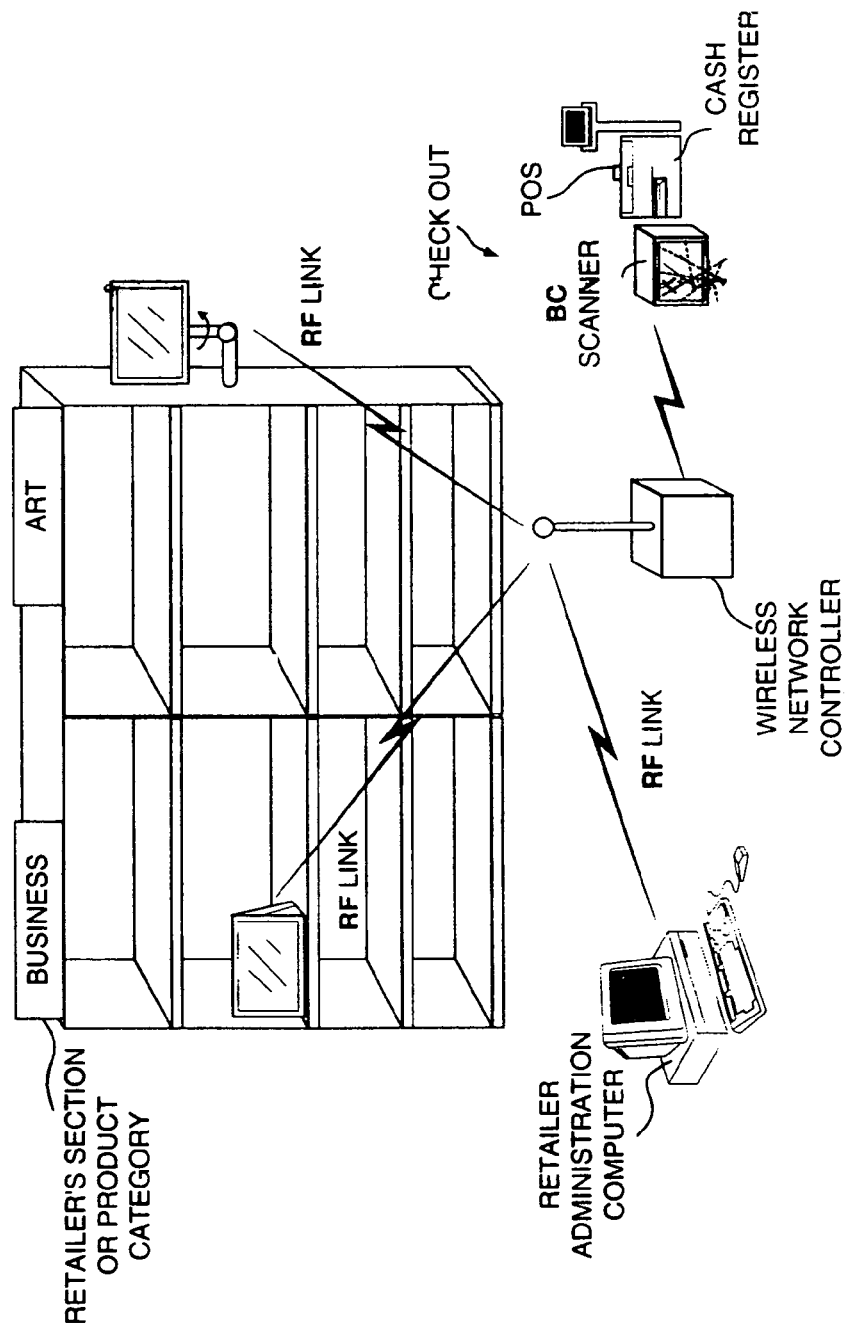
FIG. 3A20

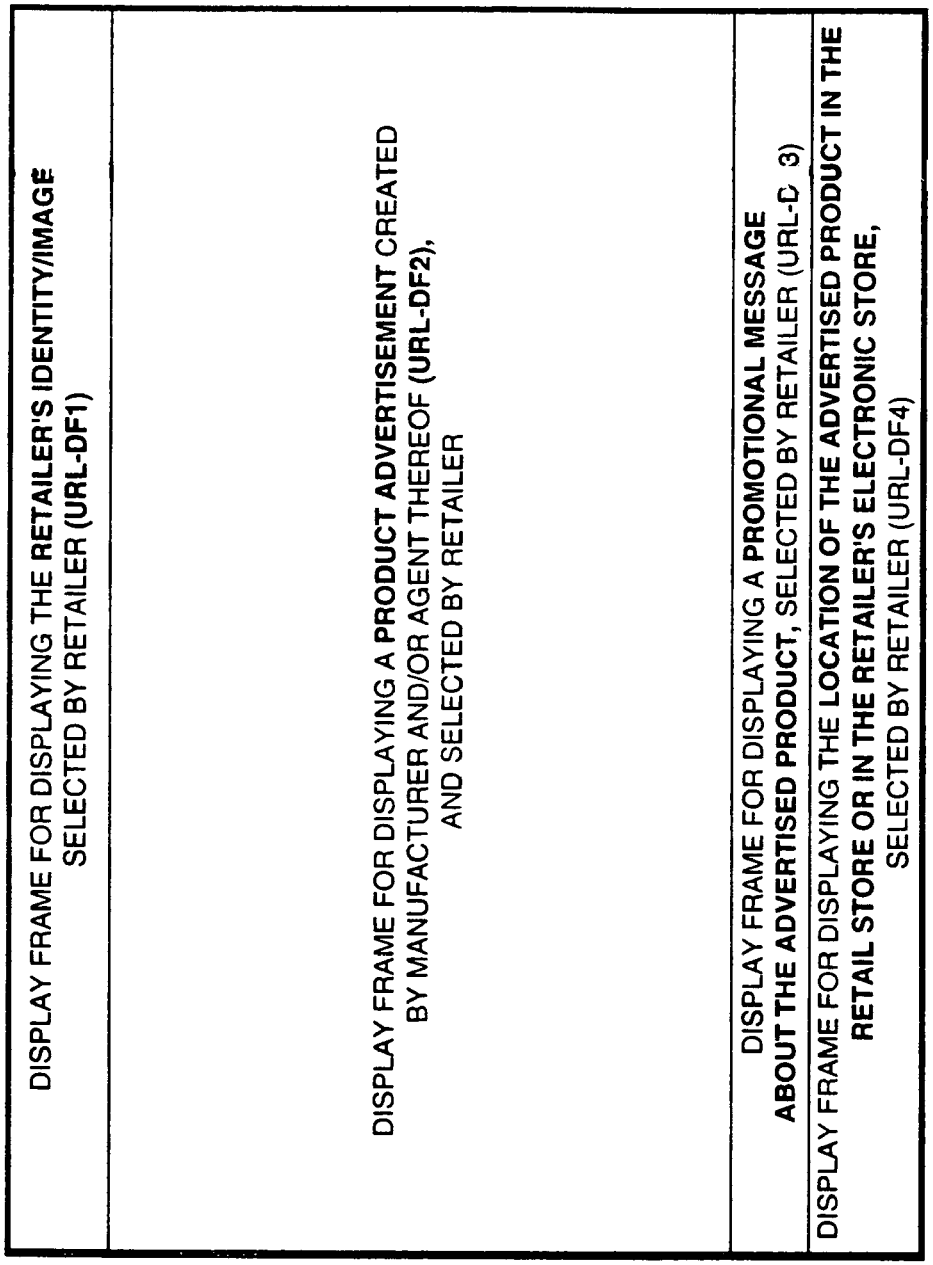
FIG. 3A21A

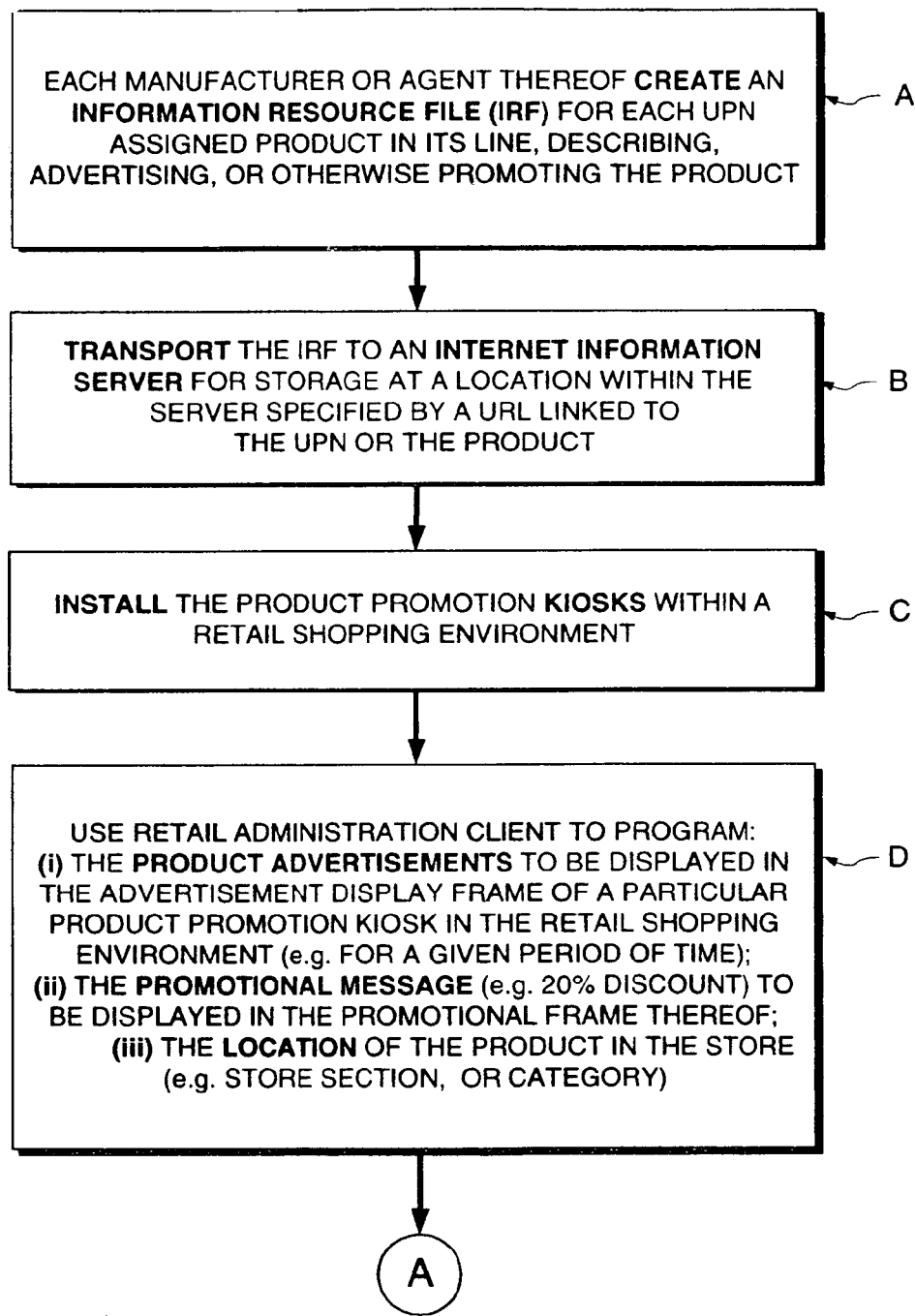
FIG. 3A22A

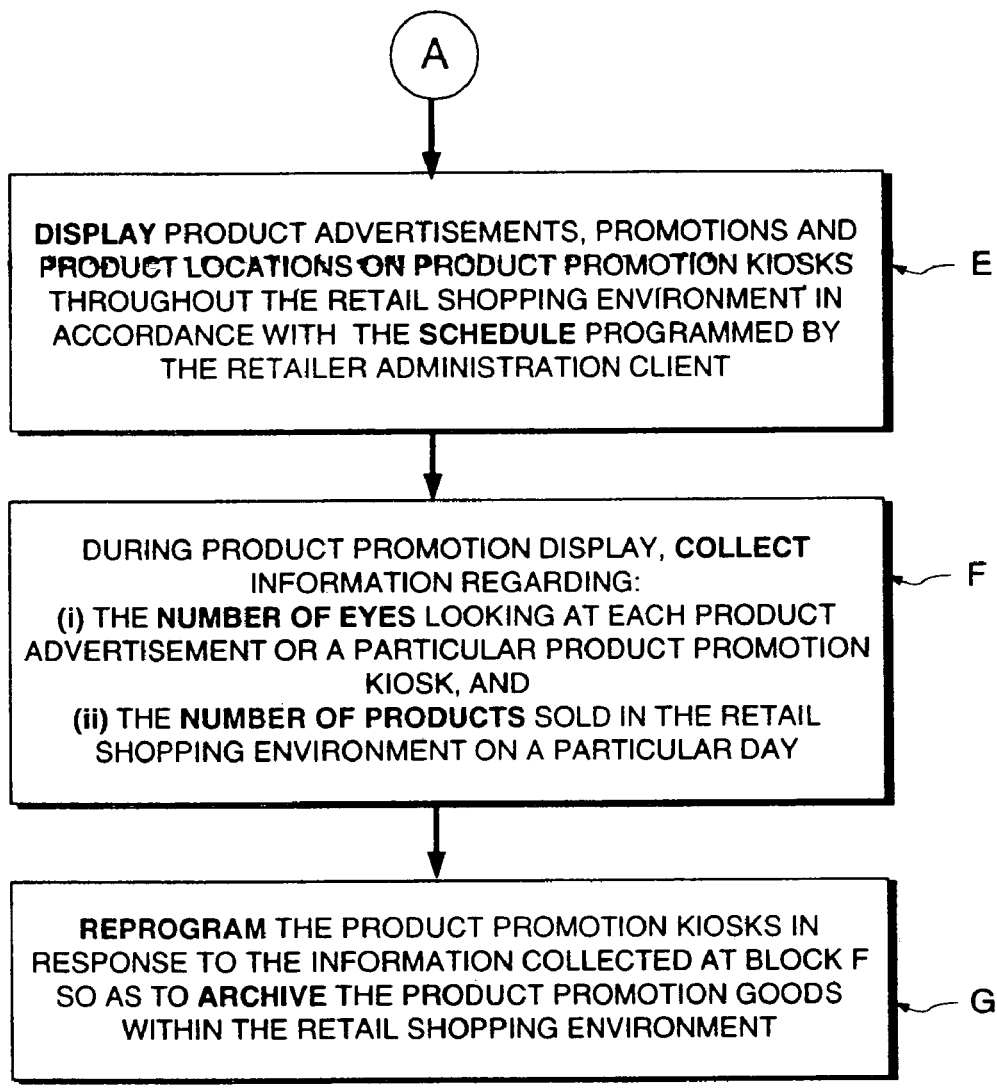
FIG. 3A22B

PRODUCT PROMOTION PROGRAMMING TABLE

| DATE: | | | | | | | |
|---|---|---|---|---|---|---|---|
| TIME (INTERVALS) | RETAILER KIOSK NO. | STATIC IP ADDRESS | URL-DF1 | URL-DF2 | URL-DF3 | URL-DF4 | |
| | | | | | | | |
| | | | | | | | |
| | | | | | | | |
| | | | | | | | |
| | | | | | | | |
| | | | | | | | |
| | | | | | | | |
| ... | ... | ... | ... | ... | ... | ... | |
| | | | | | | | |

FIG. 3A23

| UPN (PRODUCT) | TIME/DATE | EYE COUNTS | URL/AD | # OF UPN SOLD ON SAME DATE | # OF UPN SOLD ON 2ND DATE | # OF UPN SOLD ON 3RD DATE | # OF UPN SOLD ON 4TH DATE |
|---|---|---|---|---|---|---|---|
| | | | | | | | |
| | | | | | | | |
| | | | | | | | |
| | | | | | | | |
| | | | | | | | |
| | | | | | | | |

REPORT

FIG. 3A24

| IP / SN | REGISTRANT'S NAME AND ADDRESS | PRODUCT DESCRIPTION | UNIFORM RESOURCE LOCATOR (URL) | TRADE/ SERVICE MARKS | e-mail ADDRESS | CPIR APPLETS | STATUS |
|---|---|---|---|---|---|---|---|
| 7/18908/17674/0 | APPLE COMPUTER, INC. CUPERTINO, CA. | POWER MAC 7600/120 COMPUTER | http://www.power.com/pc | POWER MAC | | | |
| 0/373/100/6 | PROCTOR & GAMBLE | TOOTH PASTE | http://www.tooth.com/pc | CREST | | | |
| 3/12547/68404/0 | WARNER WELCOME | ACID REDUCER | http://www.zantac.com/pc | ZANTAC ZANTAC 75 | | | |
| 0/00005/17643/4 | KODAK, INC. | FILM PROCESSING | http://www.kodak.com/pc | KODAK | | | |
| ... | ... | ... | ... | ... | ... | ... | ... |
| 0/27242/51057/9 | SONY, INC. | PERSONAL COMPUTER | http://www.sony.com/pc | SONY | | | |

{ CONSUMER PRODUCT INFO. REQUEST, CPIR-ENABLING APPLET LIBRARY (spanning e-mail ADDRESS, CPIR APPLETS, STATUS) }

FIG. 4A1

| URL_i | PRODUCT SPECIFICATION INFORMATION FIELD | PRODUCT UPDATE INFORMATION FIELD | PRODUCT WARRANTY / SERVING INFORMATION FIELD | PRODUCT INCENTIVE INFORMATION FIELD | PRODUCT REVIEW INFORMATION FIELD | MISCELLA-NEOUS INFORMATION FIELD | PRODUCT ADVERTI-SEMENT INFORMATION FIELD |
|---|---|---|---|---|---|---|---|
| | | | | | | | |
| | | | | | | | |
| ... | ... | ... | ... | ... | ... | ... | ... |
| | | | | | | | |

FIG. 4A2

| IP/SN | REGISTRANT'S NAME AND ADDRESS | PRODUCT DESCRIPTION | TRADE/SERVICE MARKS | E-MAIL ADDRESS | STATUS |
|---|---|---|---|---|---|
| 7/05089/37460/7 | NETSCAPE COMMUNICATIONS CORP. | INTERNET NAVIGATOR | NETSCAPE, NAVIGATOR | | |
| 0/30000/01020/4 | QUAKER, INC. | OATMEAL | QUAKER | | |
| 0/496/390/1 | COLA COLA, INC. | COCA SODA | COCA - COLA, COKE | | |
| 0/7599/24245/2 | WARNER BROS. | PAT METHANY AUDIO CD | GEFFEN | | |
| ... | ... | ... | ... | ... | ... |
| | | | | | |

| Consumer Product |
|---|
| UPC Number |
| Company Name |
| Manufacturer ID Number |
| Manufacturer Product Number |
| Manufacturer Website URL |
| Product Description |
| Primary Trademark |
| Secondary Trademark |
| Package Type |
| UPC Symbol Type |
| Website Marking on Package |
| 800 Consumer Phone Number |

FIG. 4C2

| Info. Resources on WWW |
|---|
| UPC Number |
| Manufacturer ID Number |
| Manufacturer Product Number |
| Company Name |
| URL For Product Description |
| URL For Product Manual |
| URL For Warranty Service |
| URL For WWW Advertisement |
| URL For WWW Advertisement |
| URL For WWW Advertisement |
| URL For Product Wholesaler |
| URL For Product Wholesaler |
| URL For Product Wholesaler |
| URL For Product Retailer No.1 |
| URL For Product Retailer No.2 |
| URL For Product Retailer No.3 |
| URL For Direct Product Purchase |
| URL For Complementary Product |
| URL For Complementary Product |
| URL For Complementary Product |
| URL For Company Annual Report |
| URL For Company Stock Purchase |

FIG. 4C3

| RETAILER |
|---|
| Company Name |
| Street Address |
| City |
| State |
| Postal Code |
| Country |
| Manufacturer ID Number |
| Contact Person |
| Phone Number |
| E-Mail |
| Domain Name |
| Website Creation Date |
| Website Existence |
| Manufacturer Website URL |
| Manufacturer No. 1 |
| Manufacturer No. 2 |
| Manufacturer No. 3 |
| Manufacturer No. 4 |
| Manufacturer No. 5 |
| Manufacturer No. 6 |
| Manufacturer No. 7 |
| Manufacturer No. 8 |
| Manufacturer No. 9 |
| Manufacturer No. 10 |
| ⋮ |
| Manufacturer No. N |

FIG. 4D

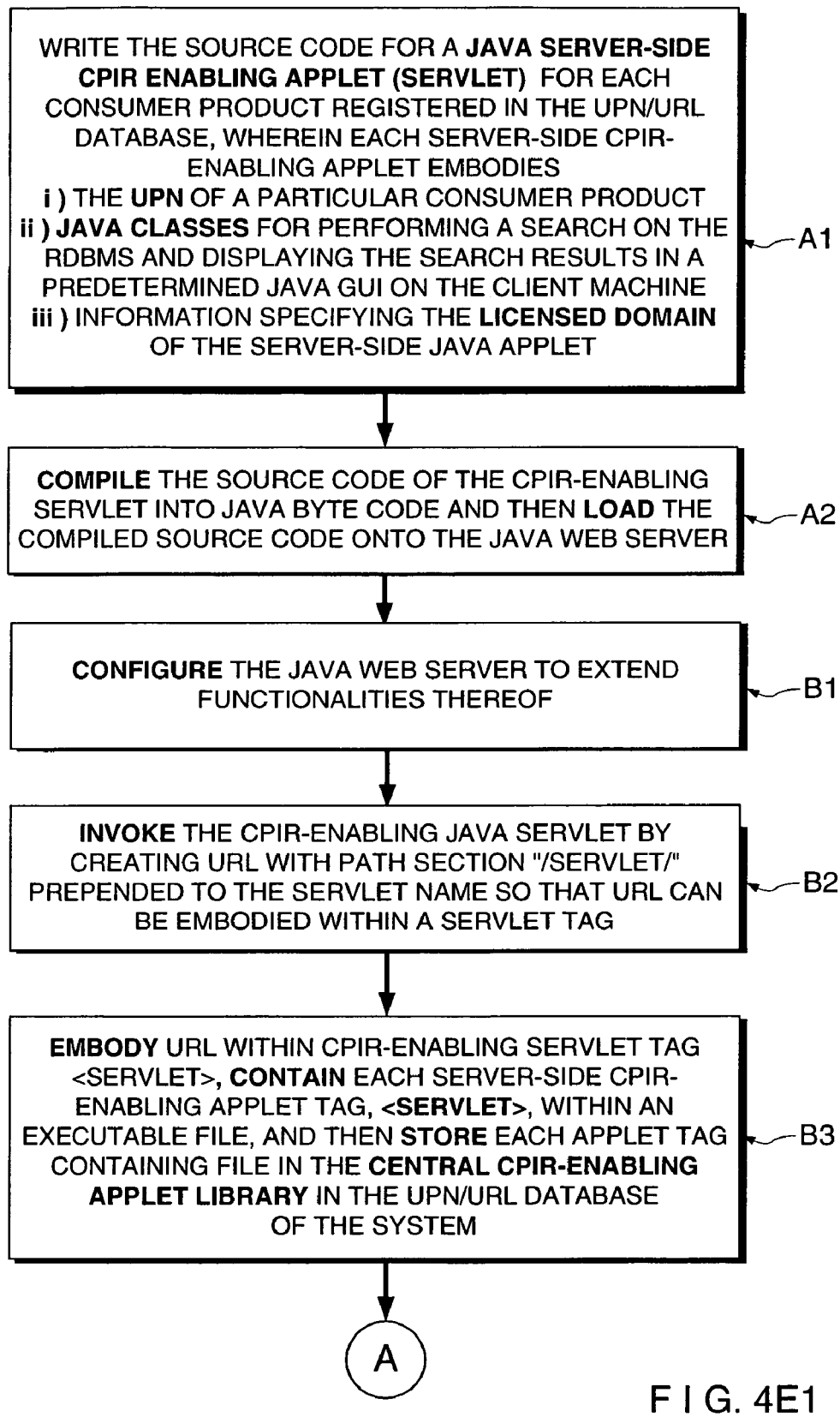
FIG. 4E1

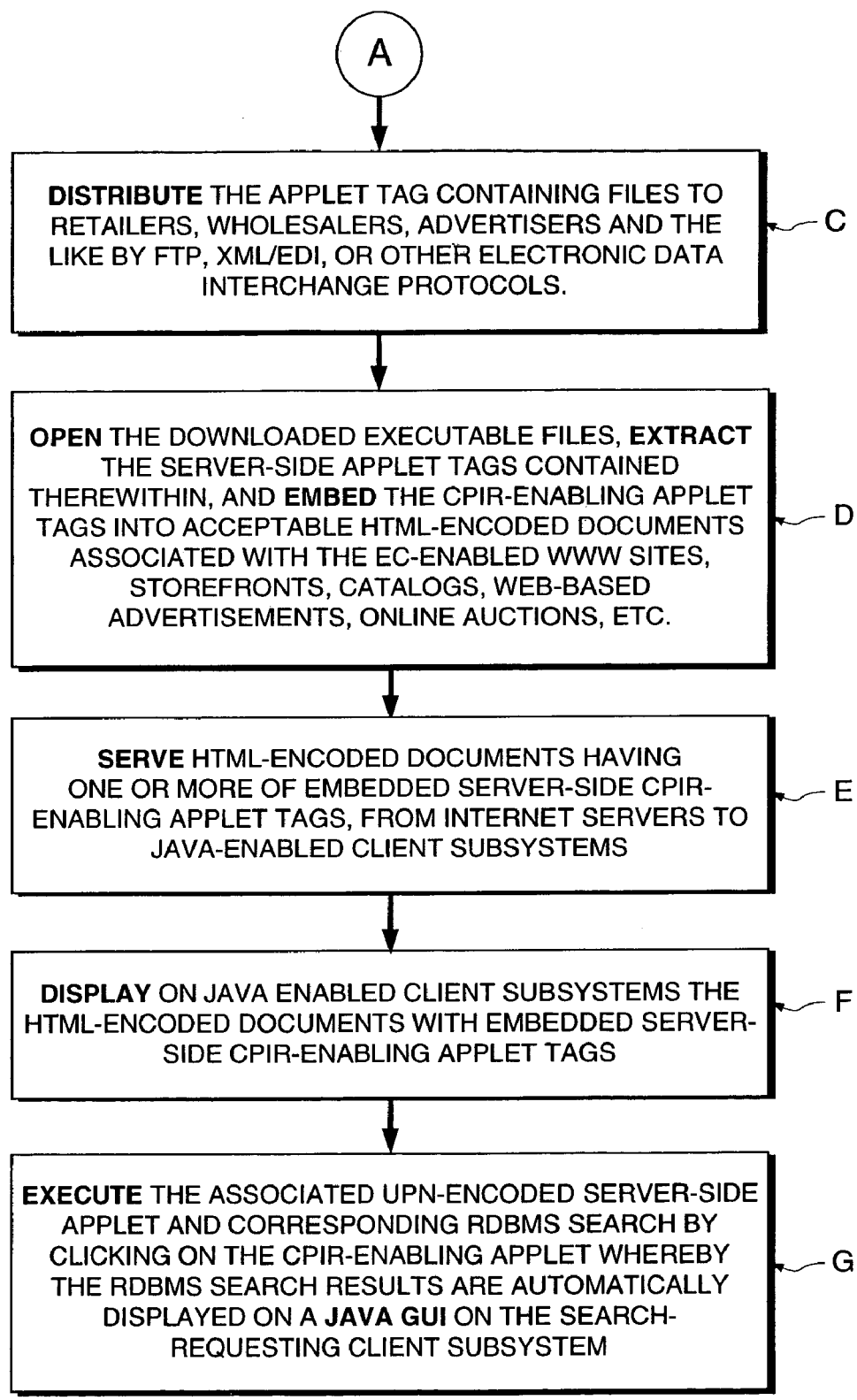
FIG. 4E2

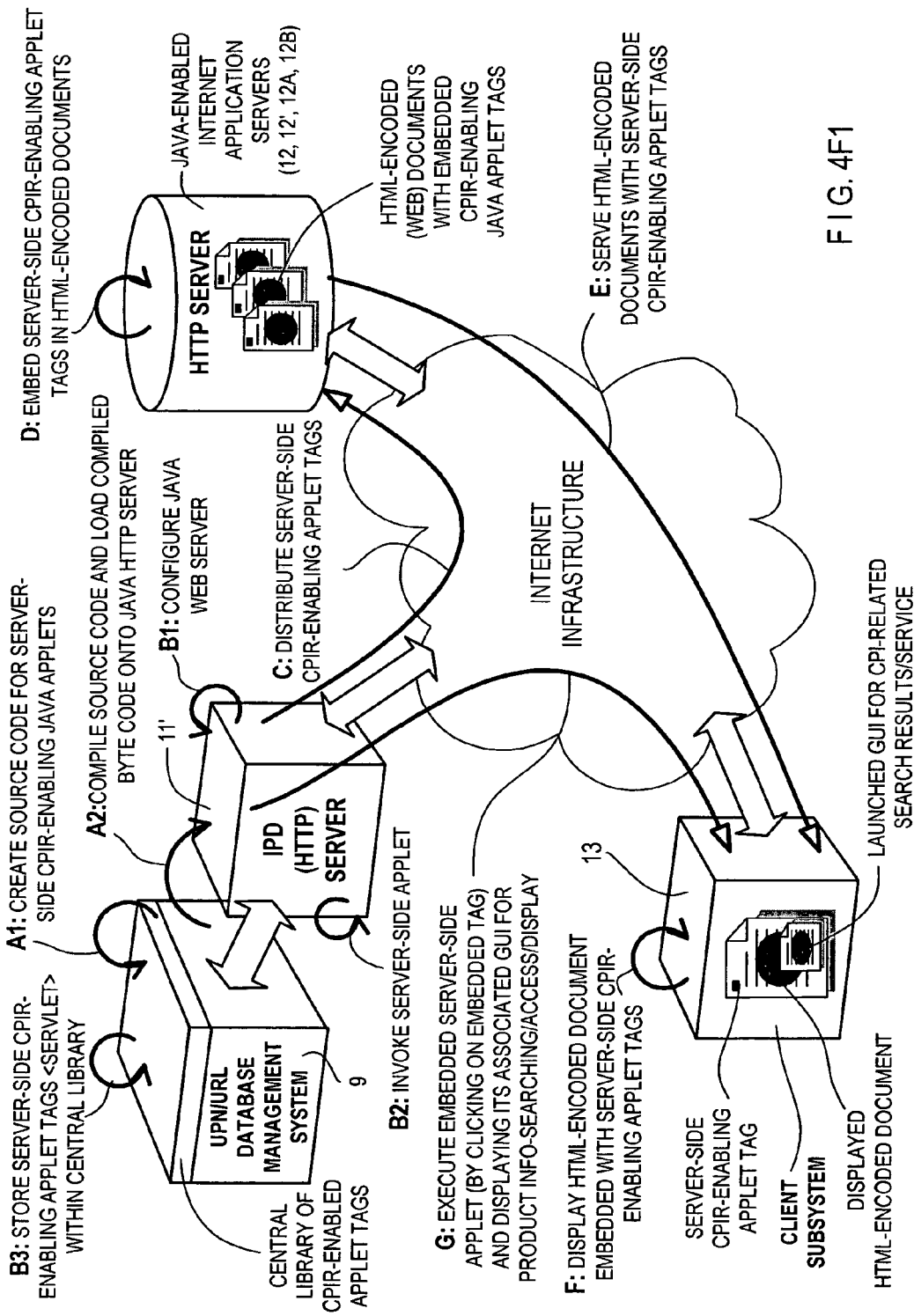
FIG. 4F1

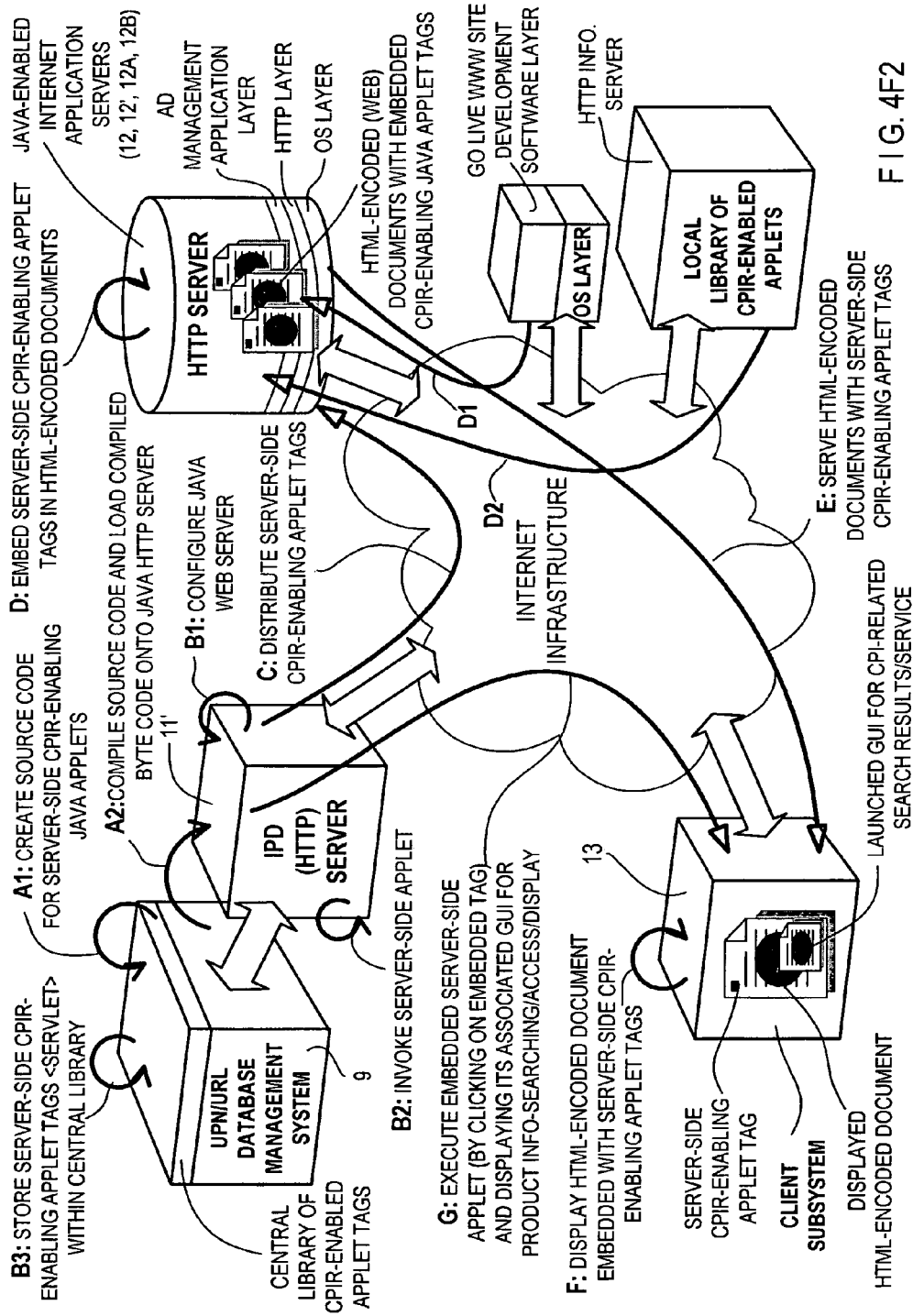
FIG. 4F2

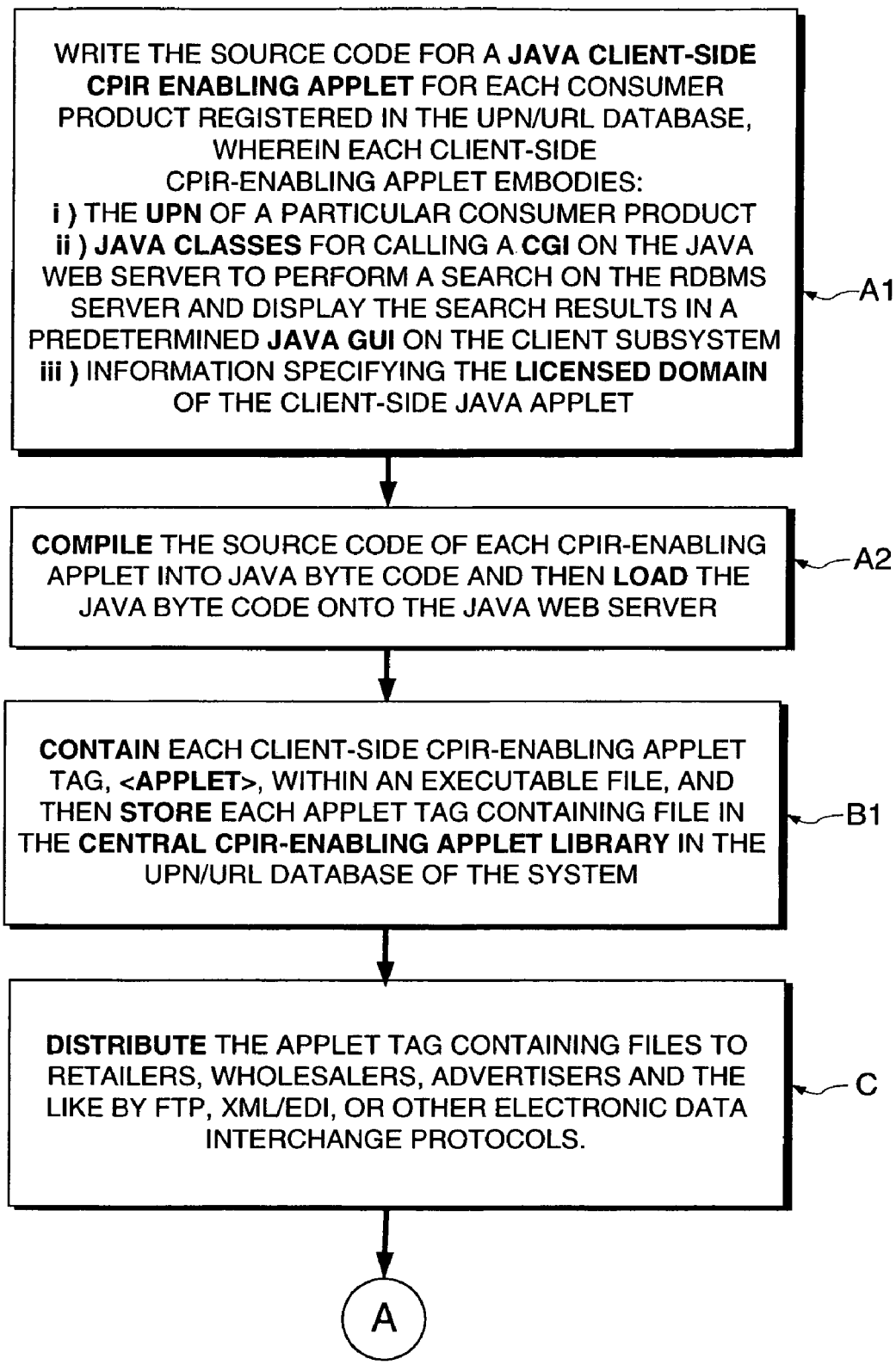
FIG. 4G1

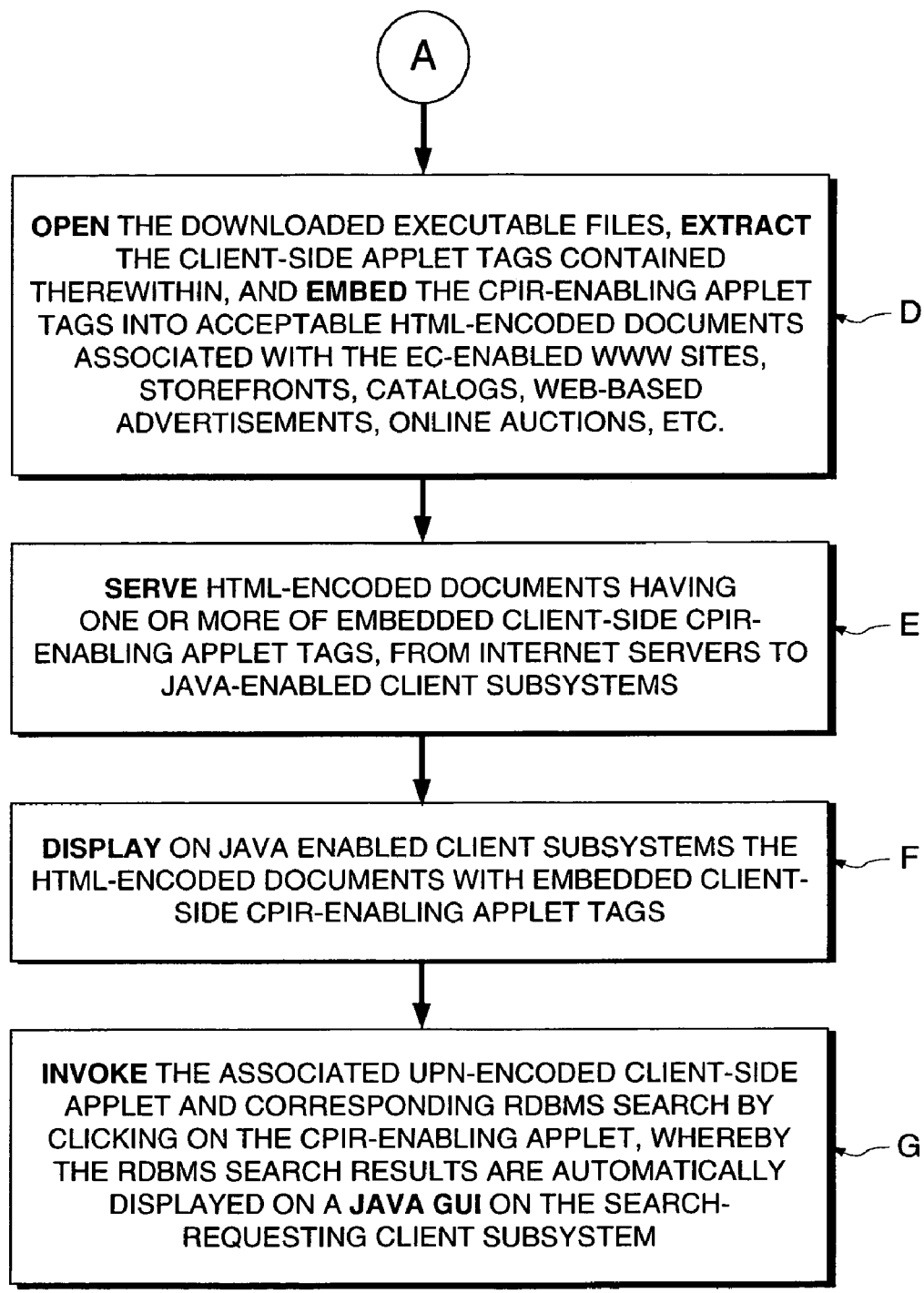
FIG. 4G2

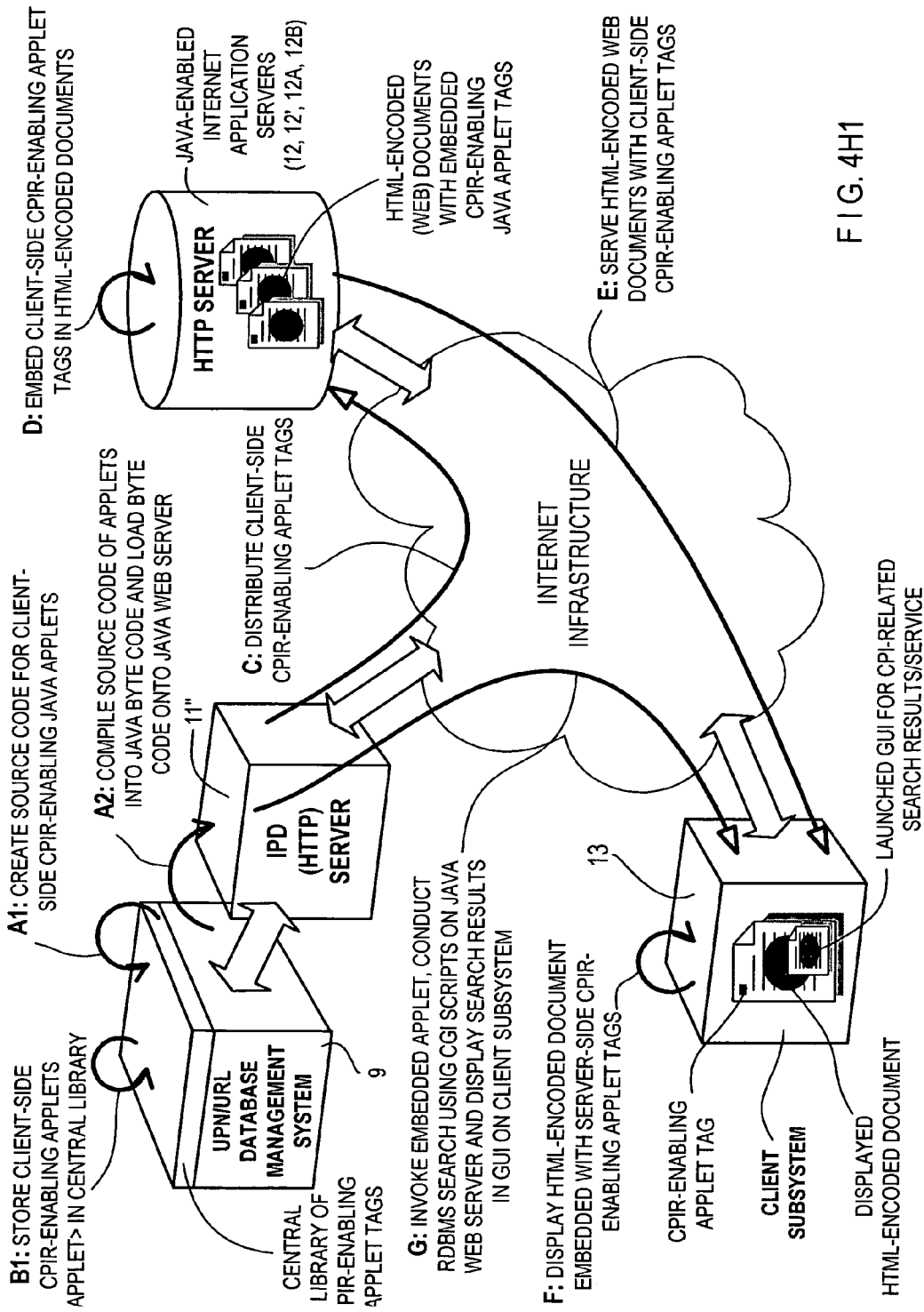
FIG. 4H1

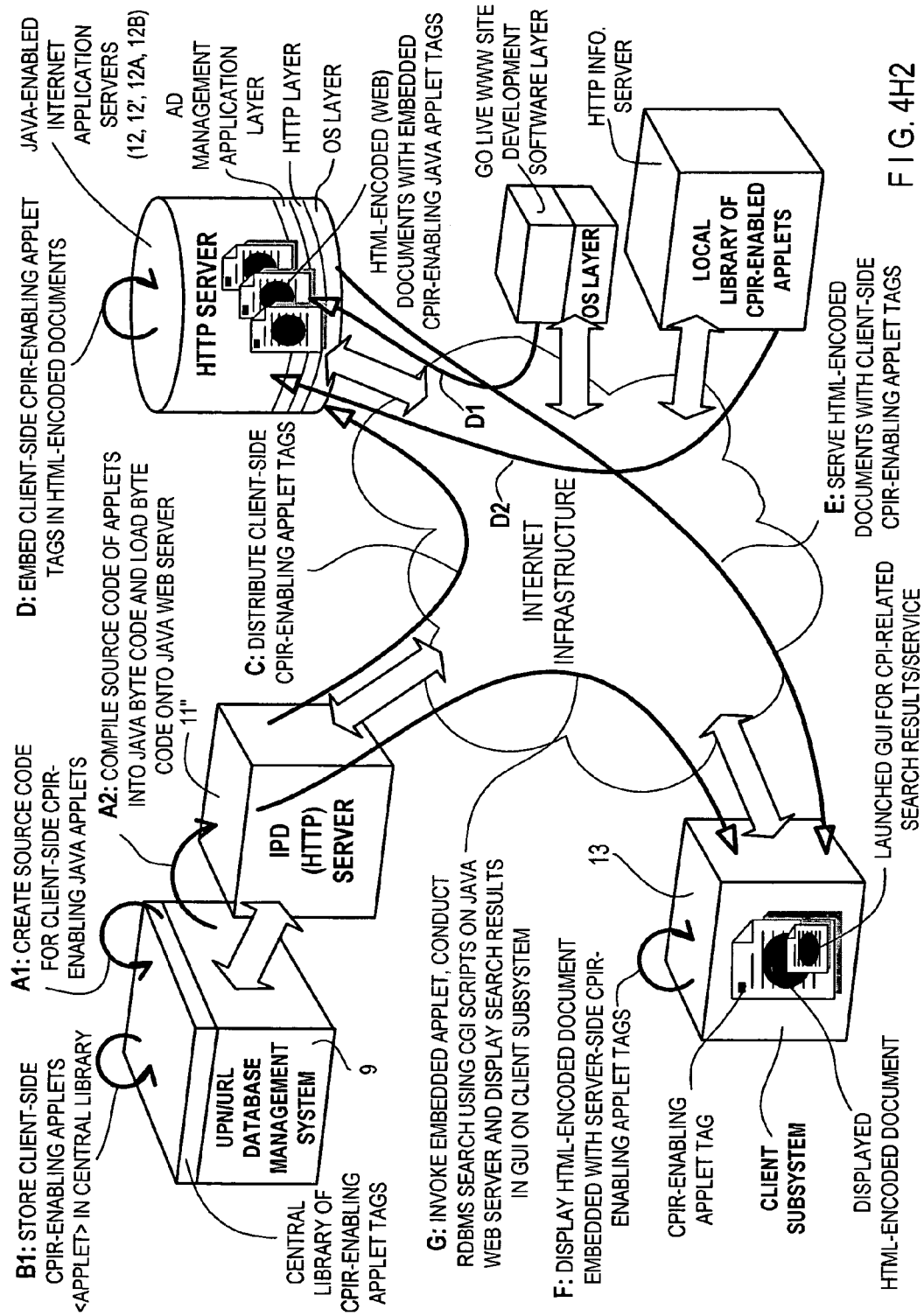

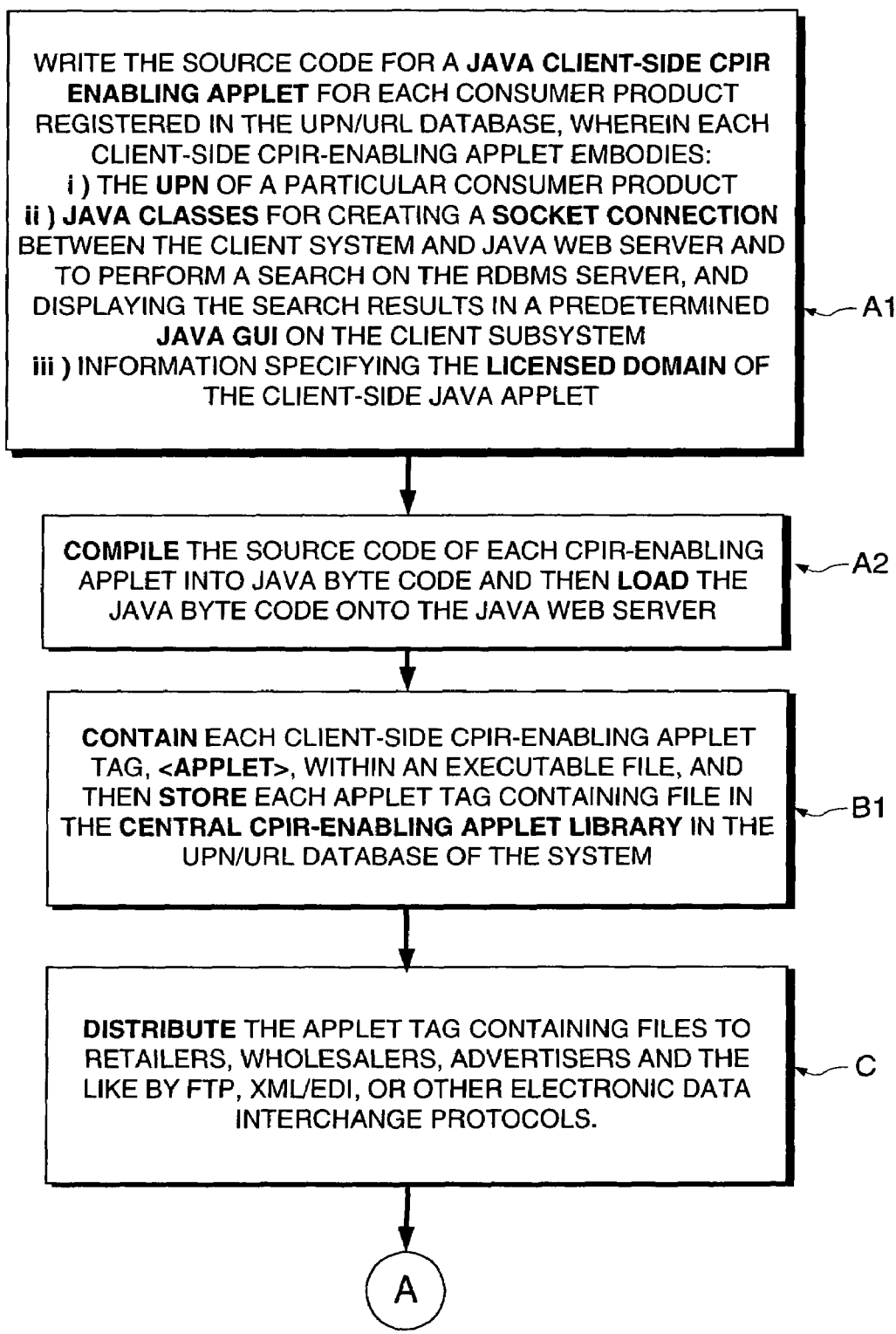
FIG. 4I1

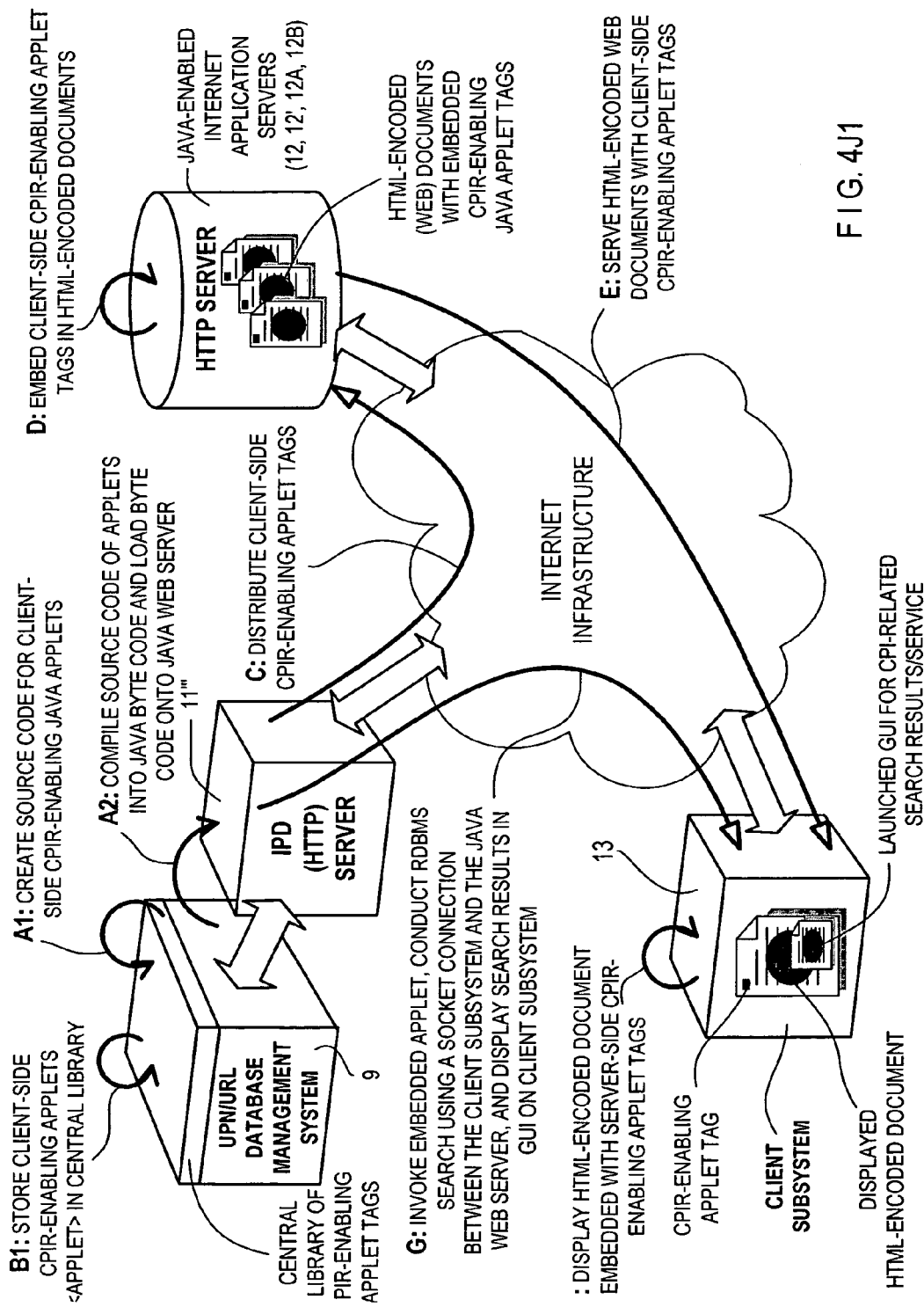
FIG. 4J1

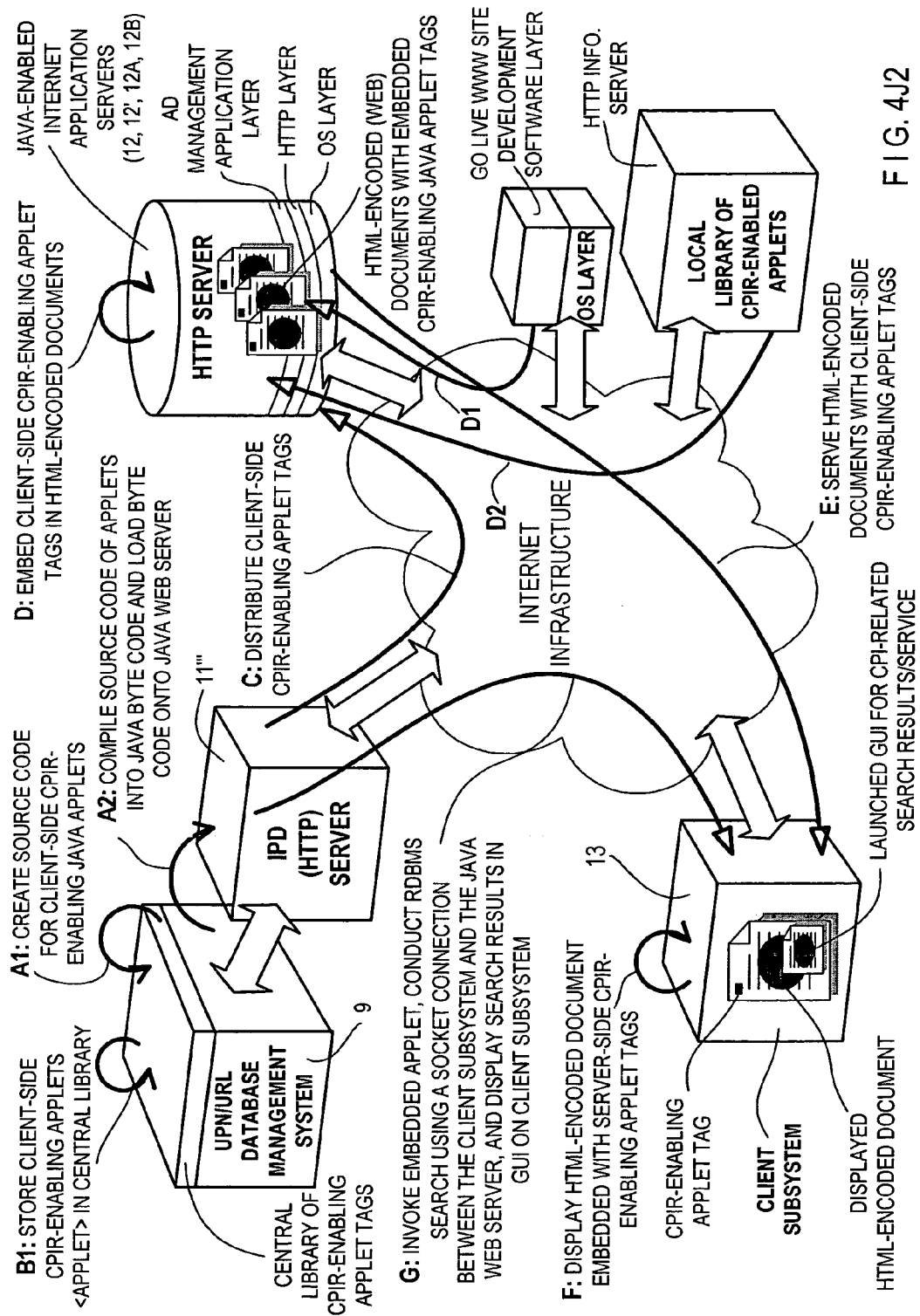
FIG. 4J2

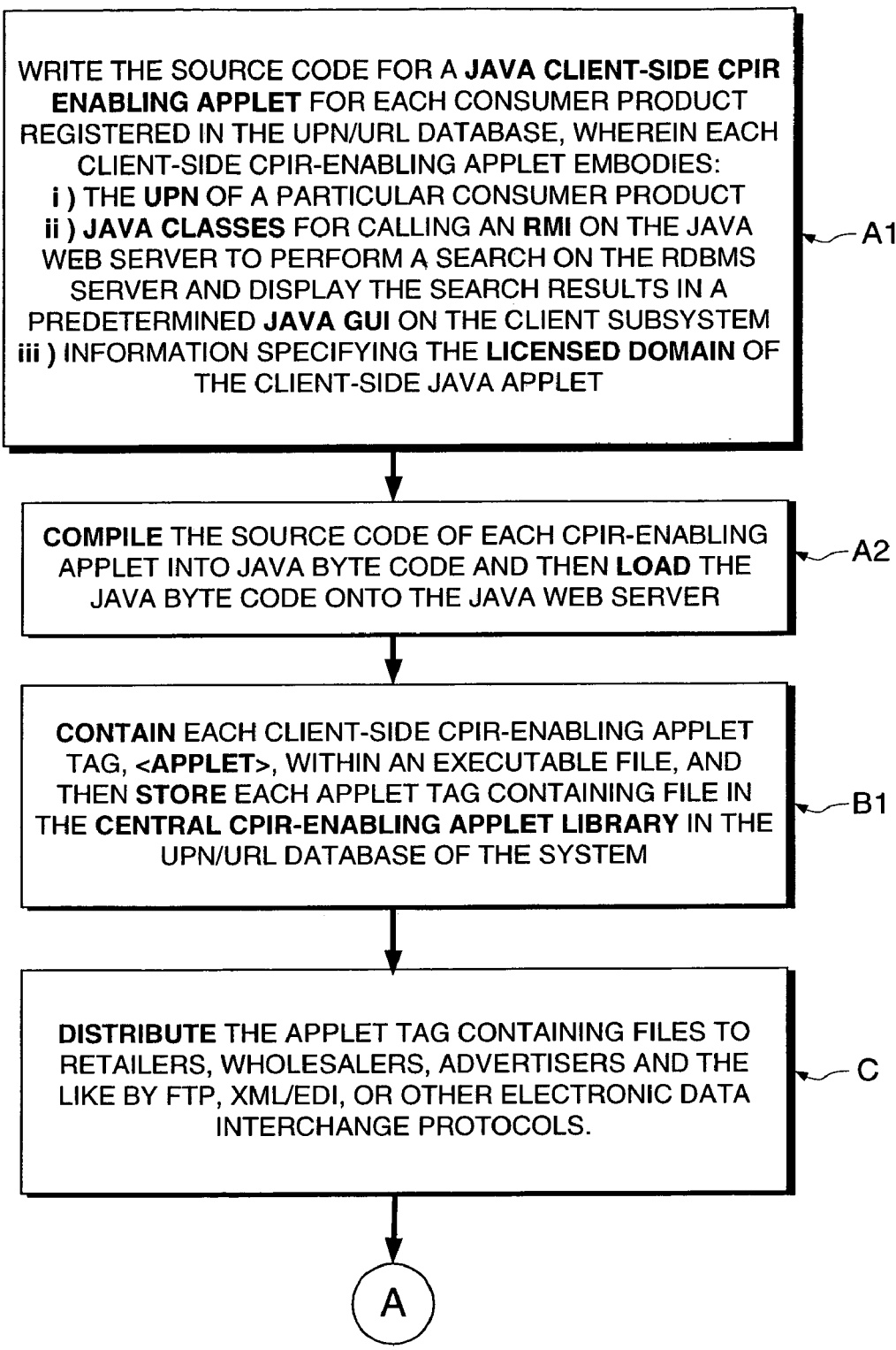
FIG. 4K1

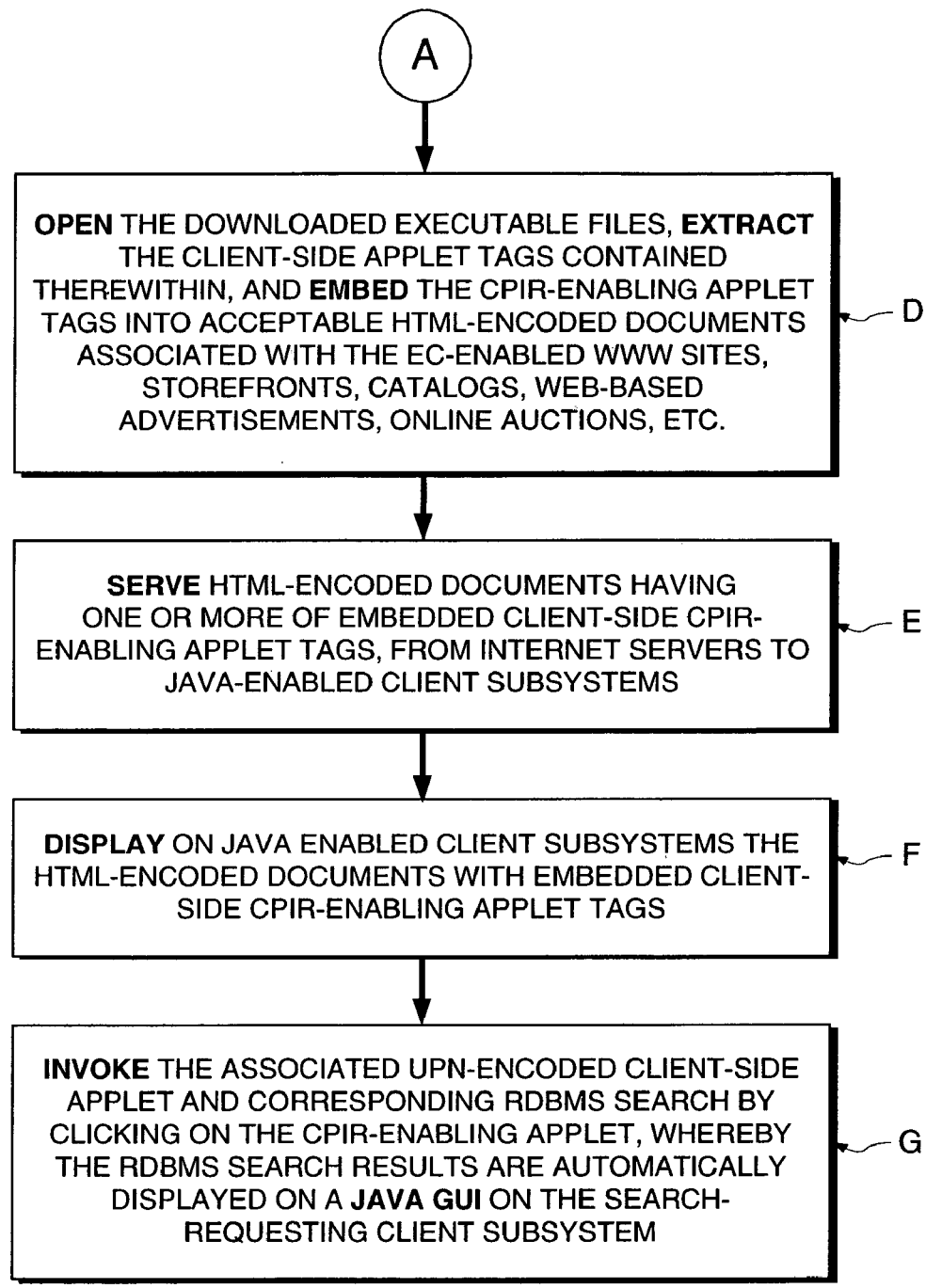
FIG. 4K2

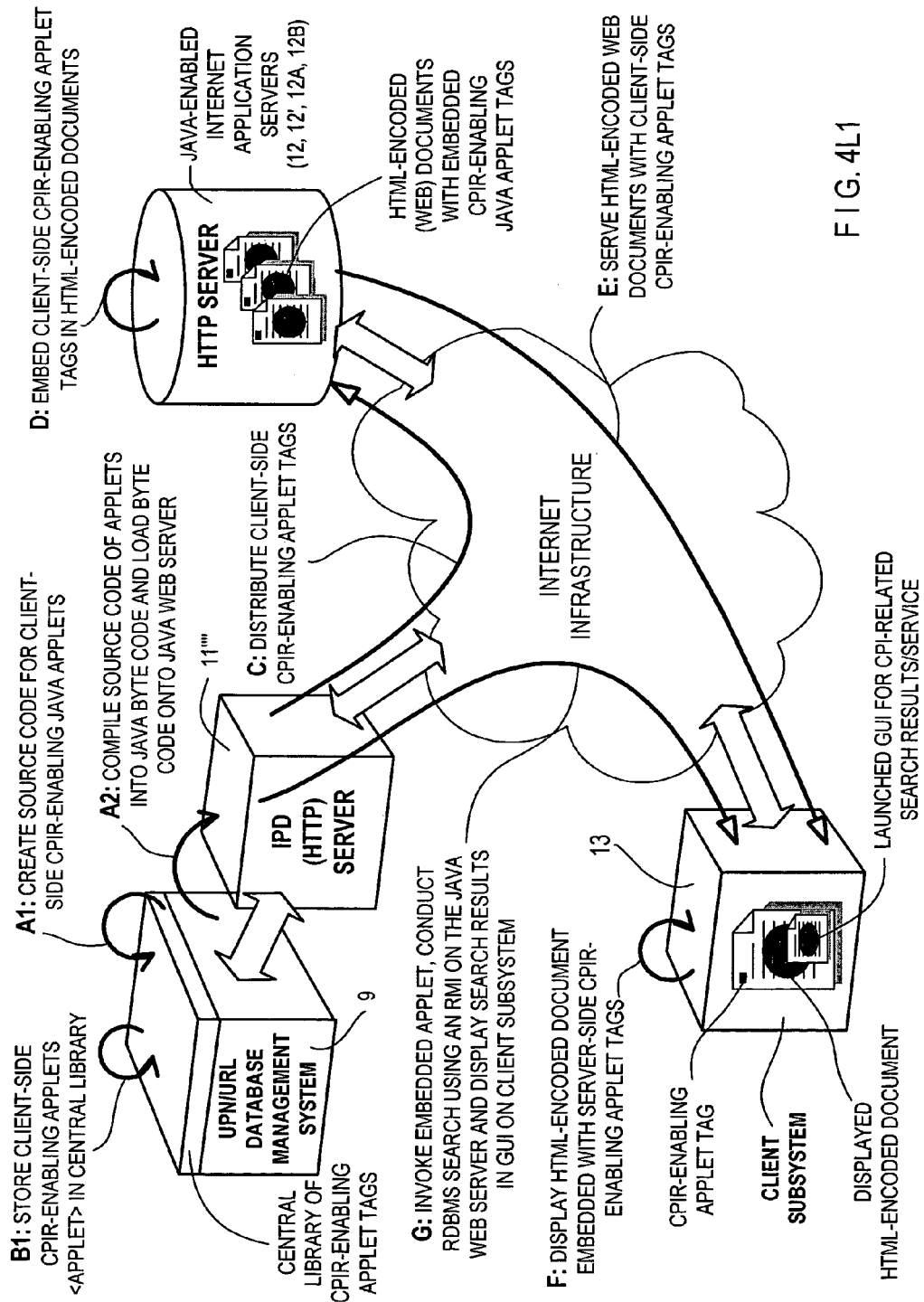
FIG. 4L1

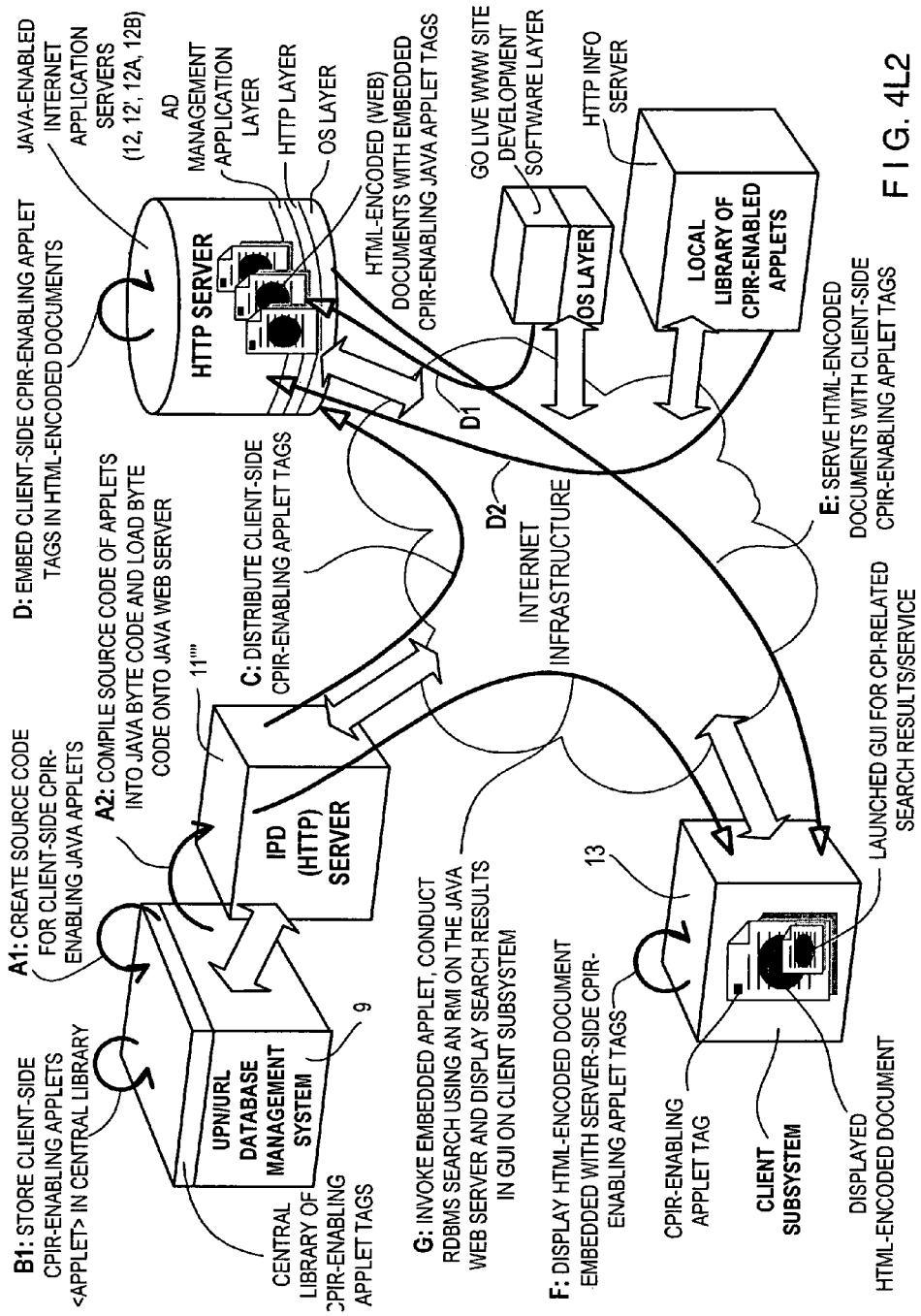
FIG. 4L2

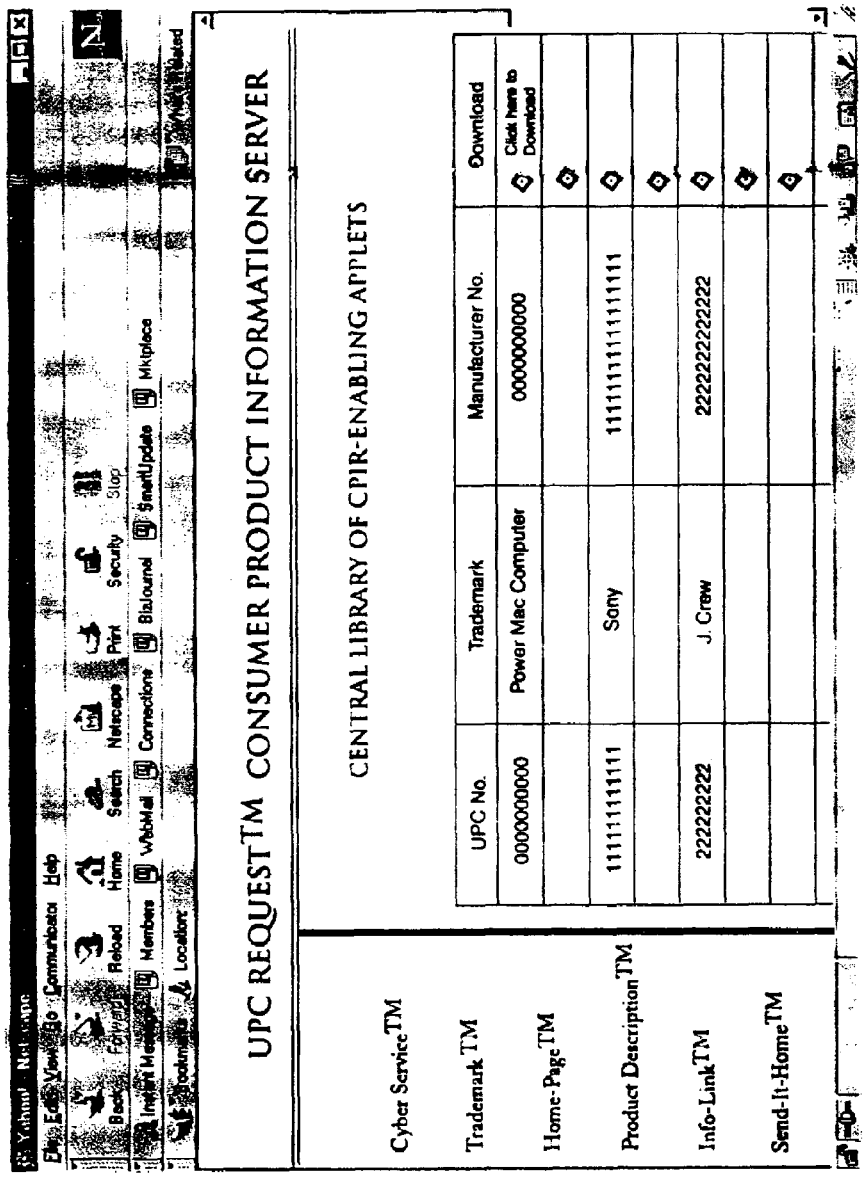
FIG. 4M1

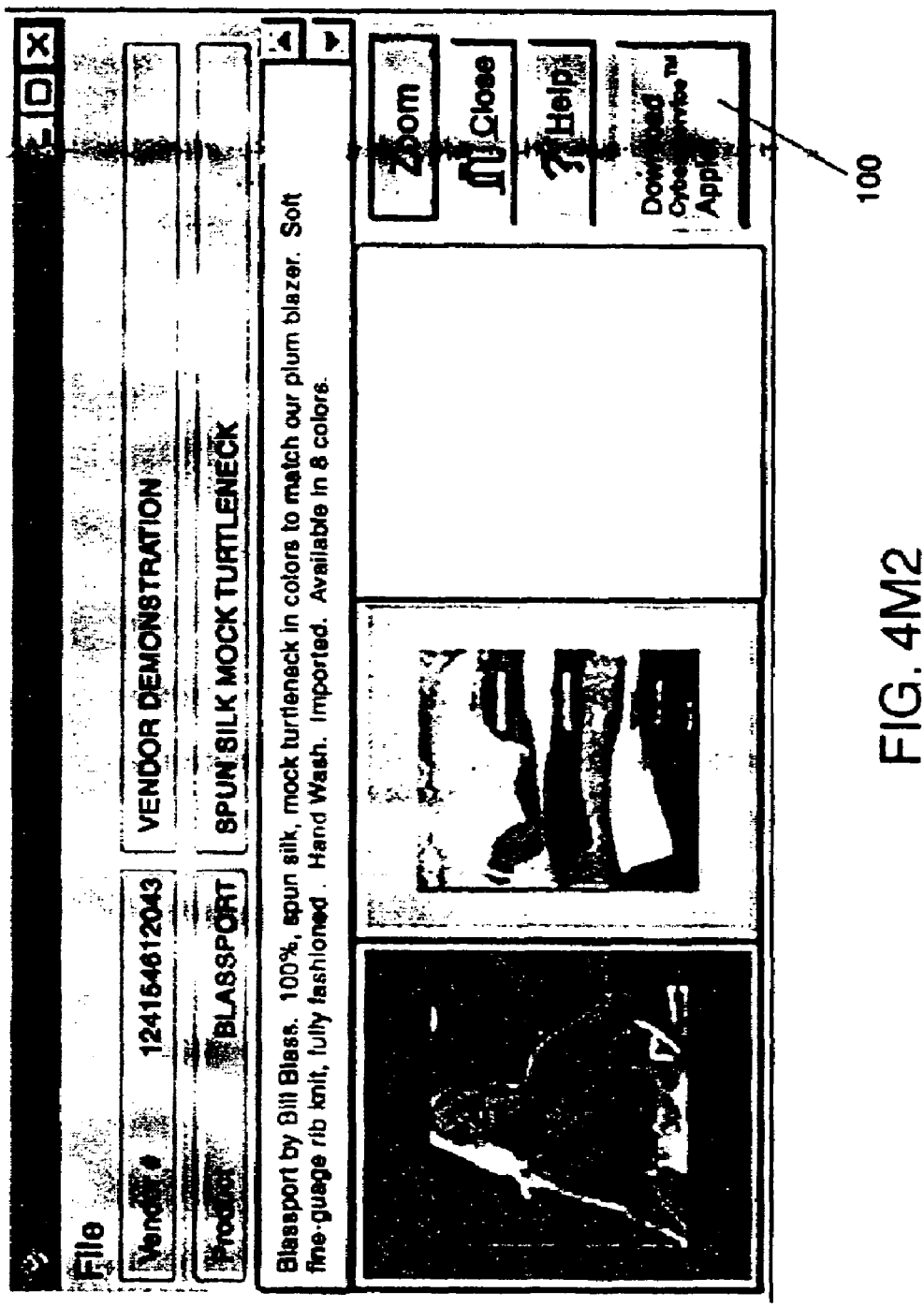
FIG. 4M2

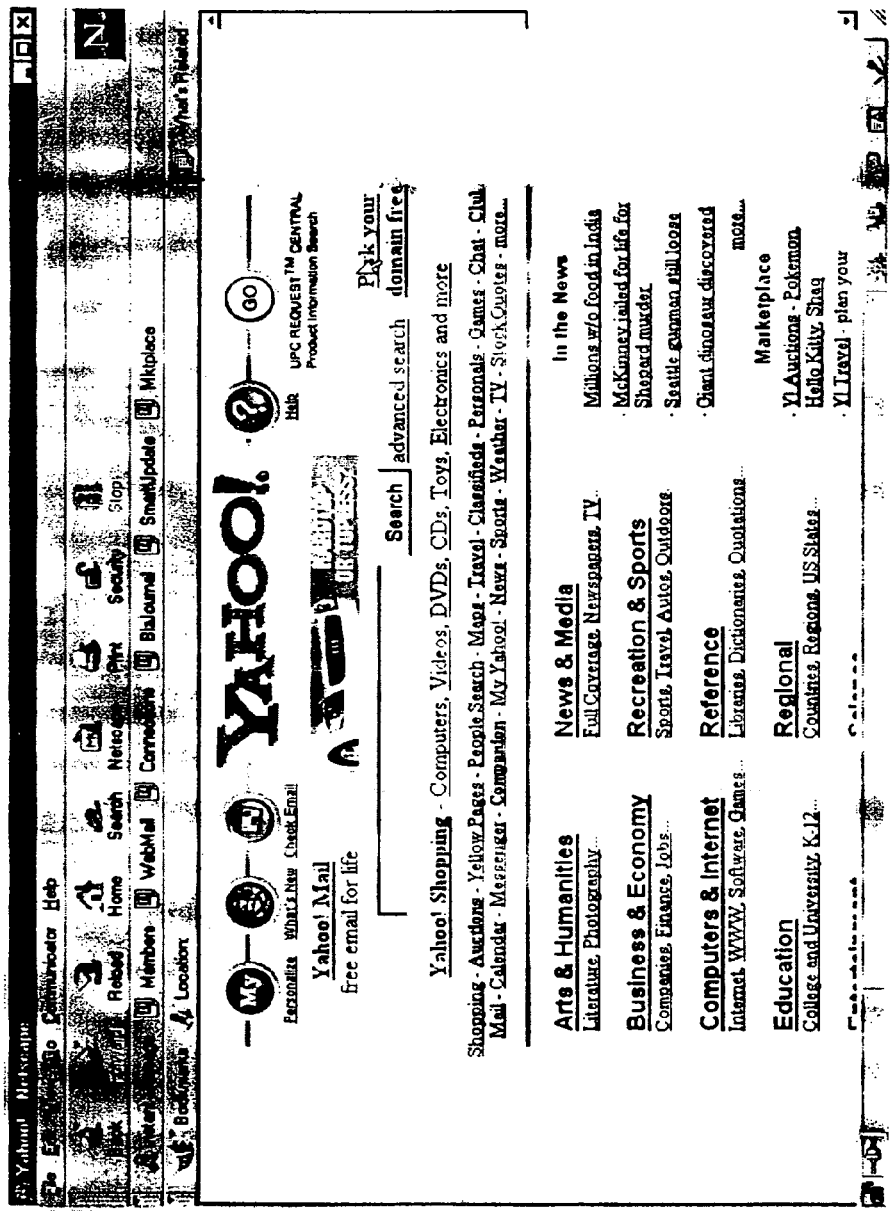
FIG. 4N1

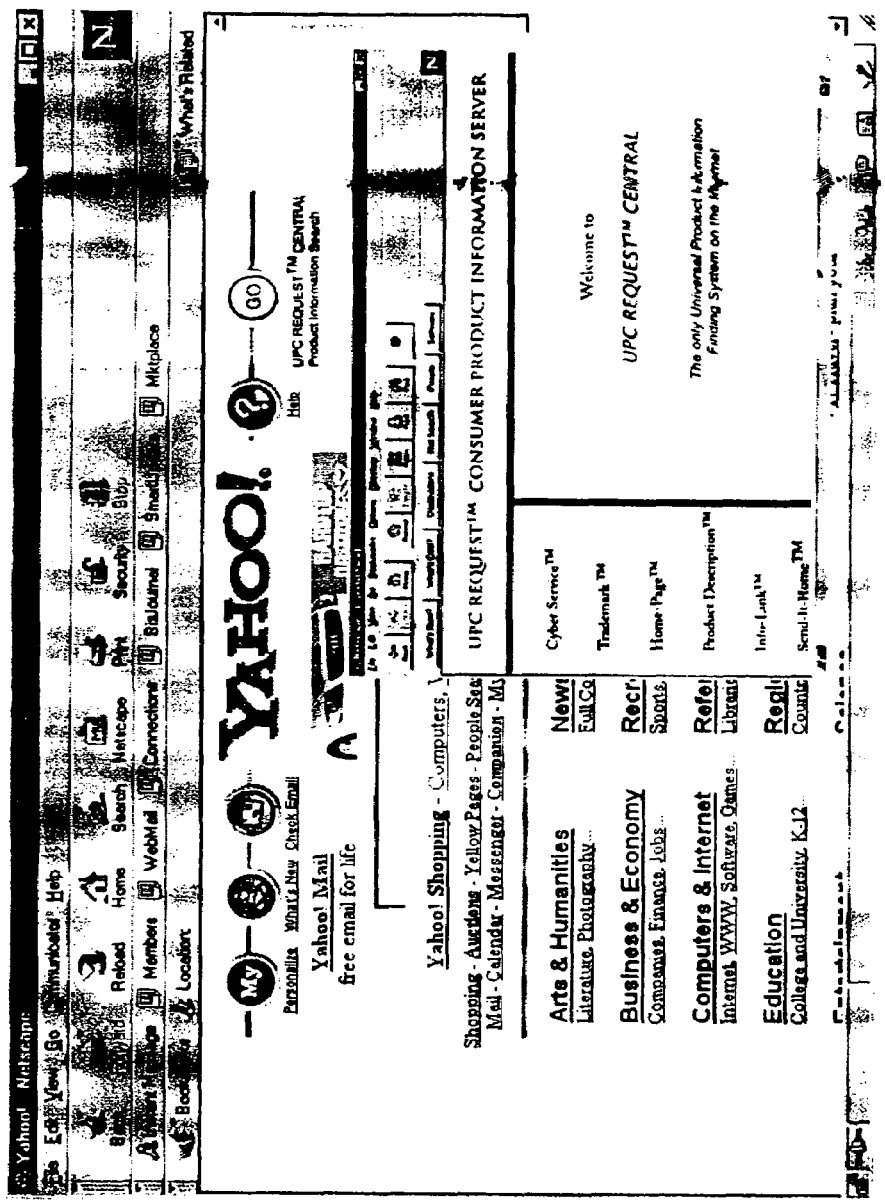
FIG. 4N2

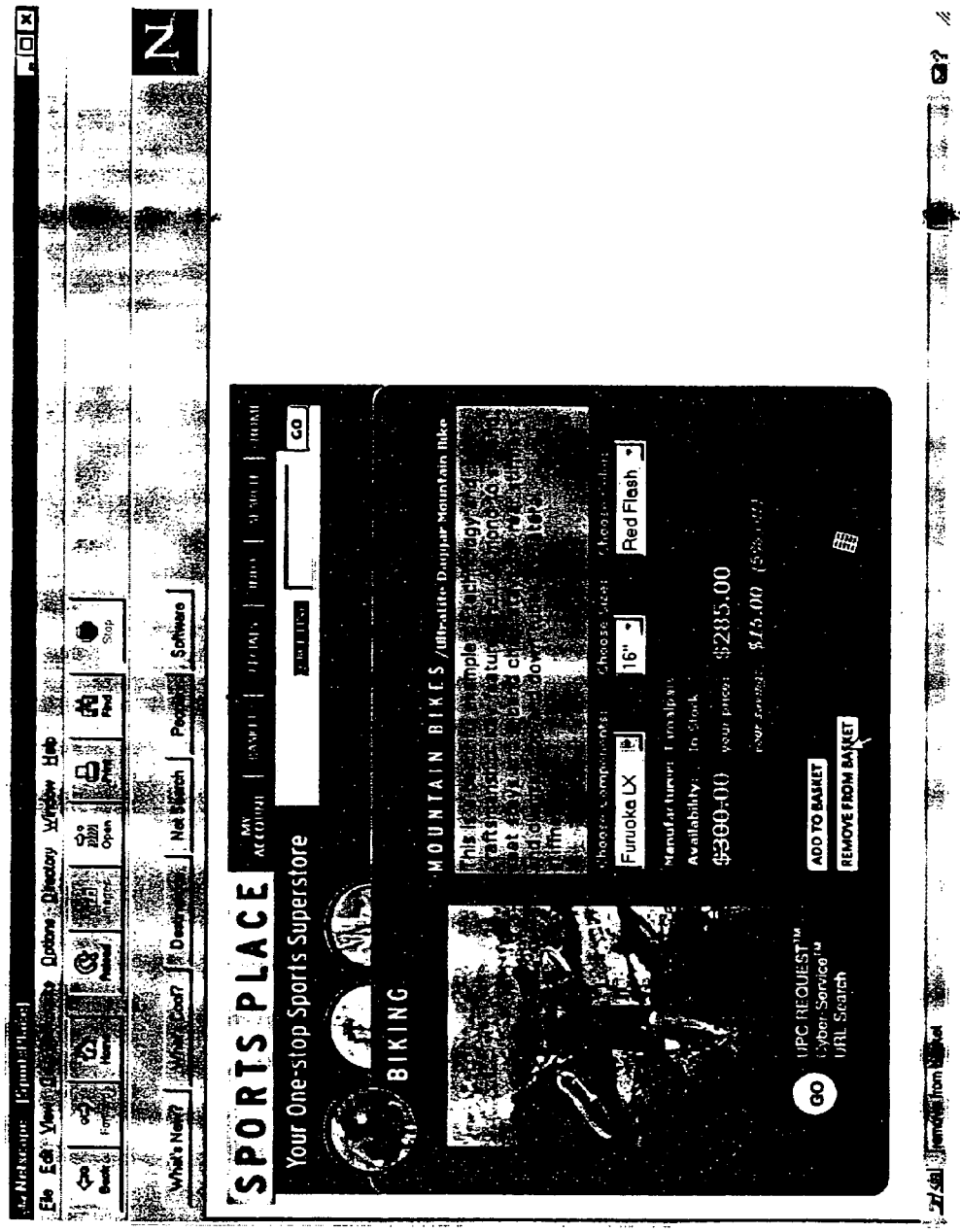
FIG. 4P1

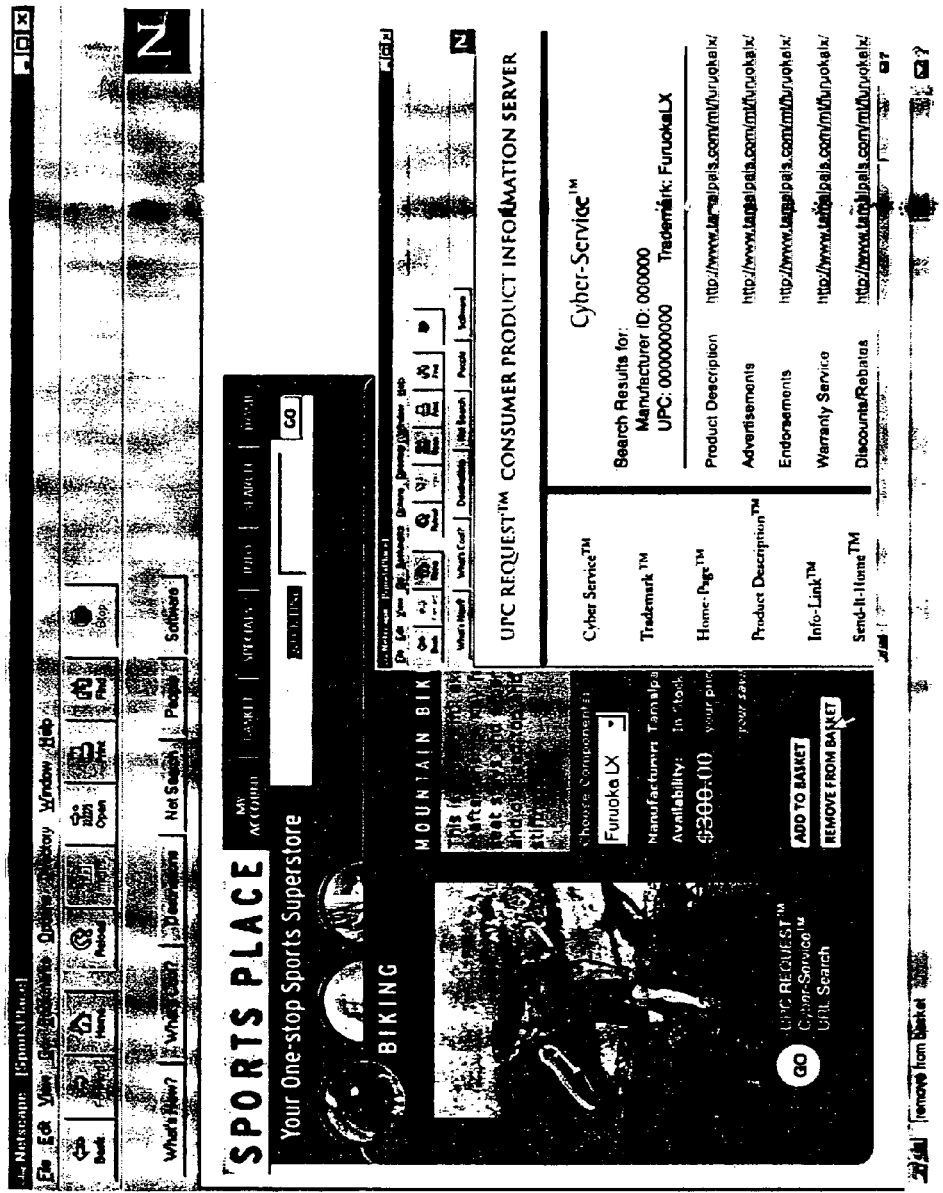
FIG. 4P2

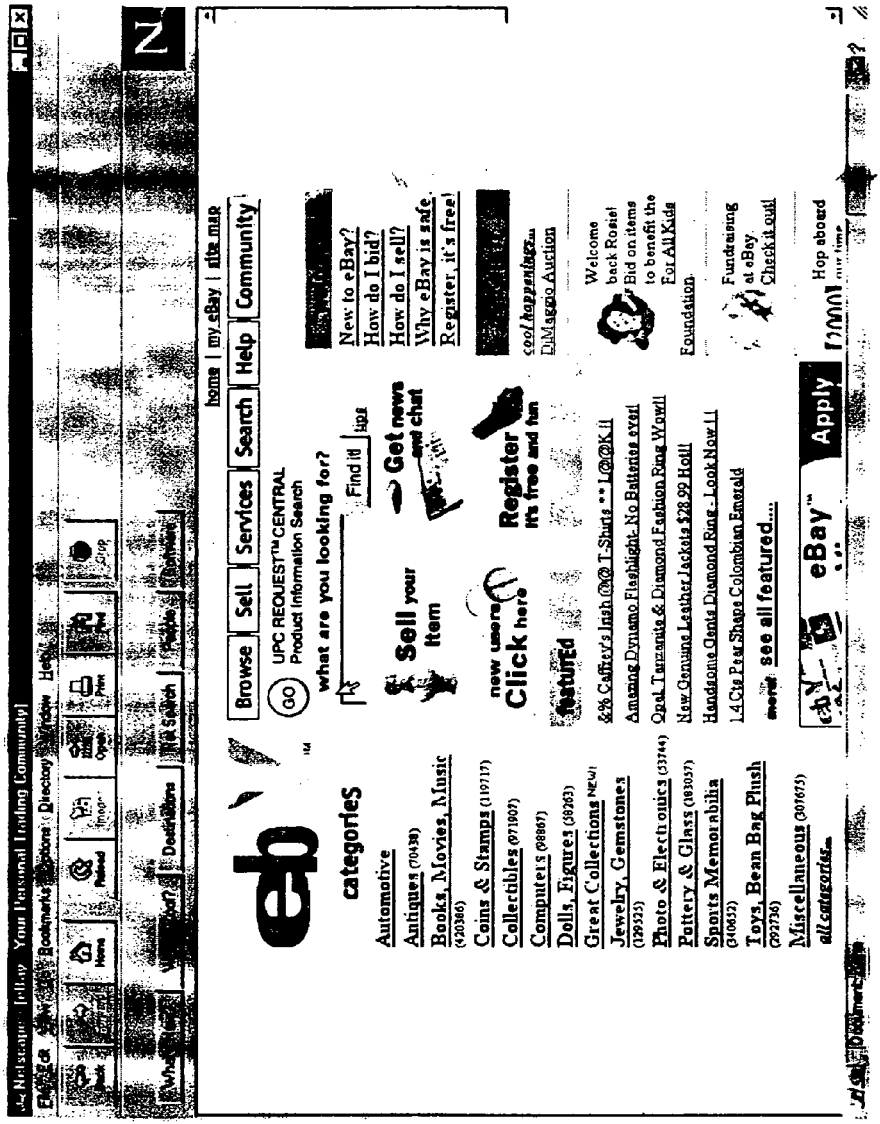
FIG. 4Q1

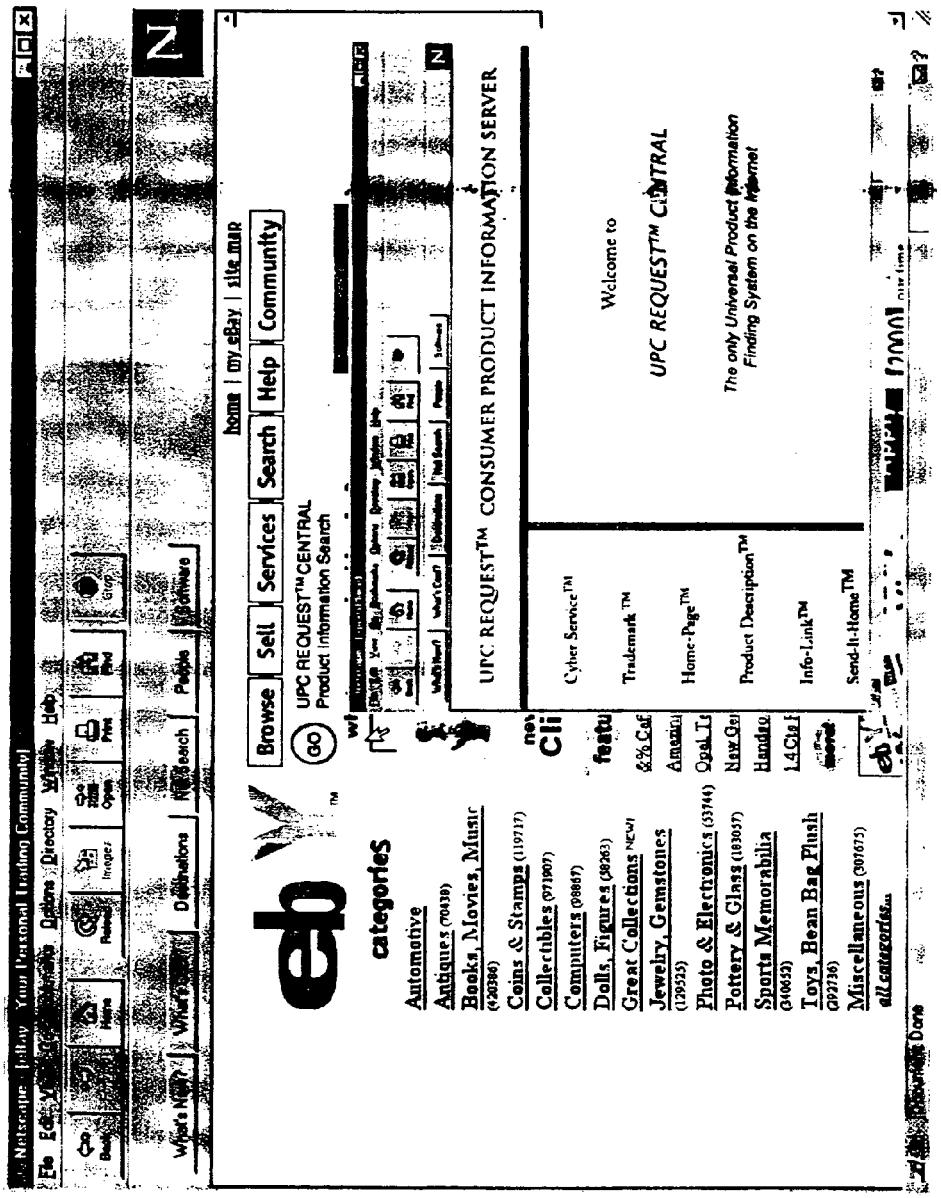
FIG. 4Q2

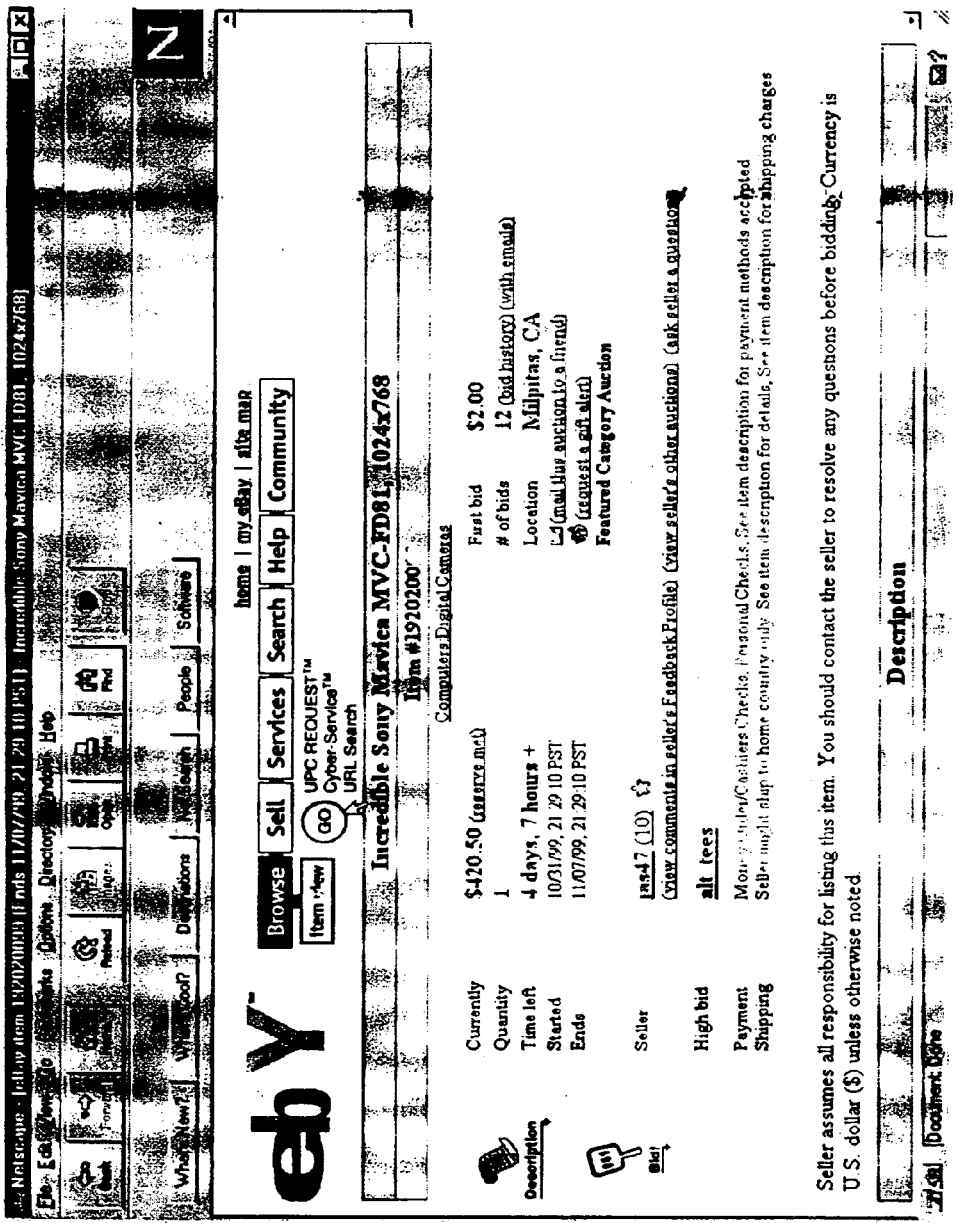
FIG. 4R1

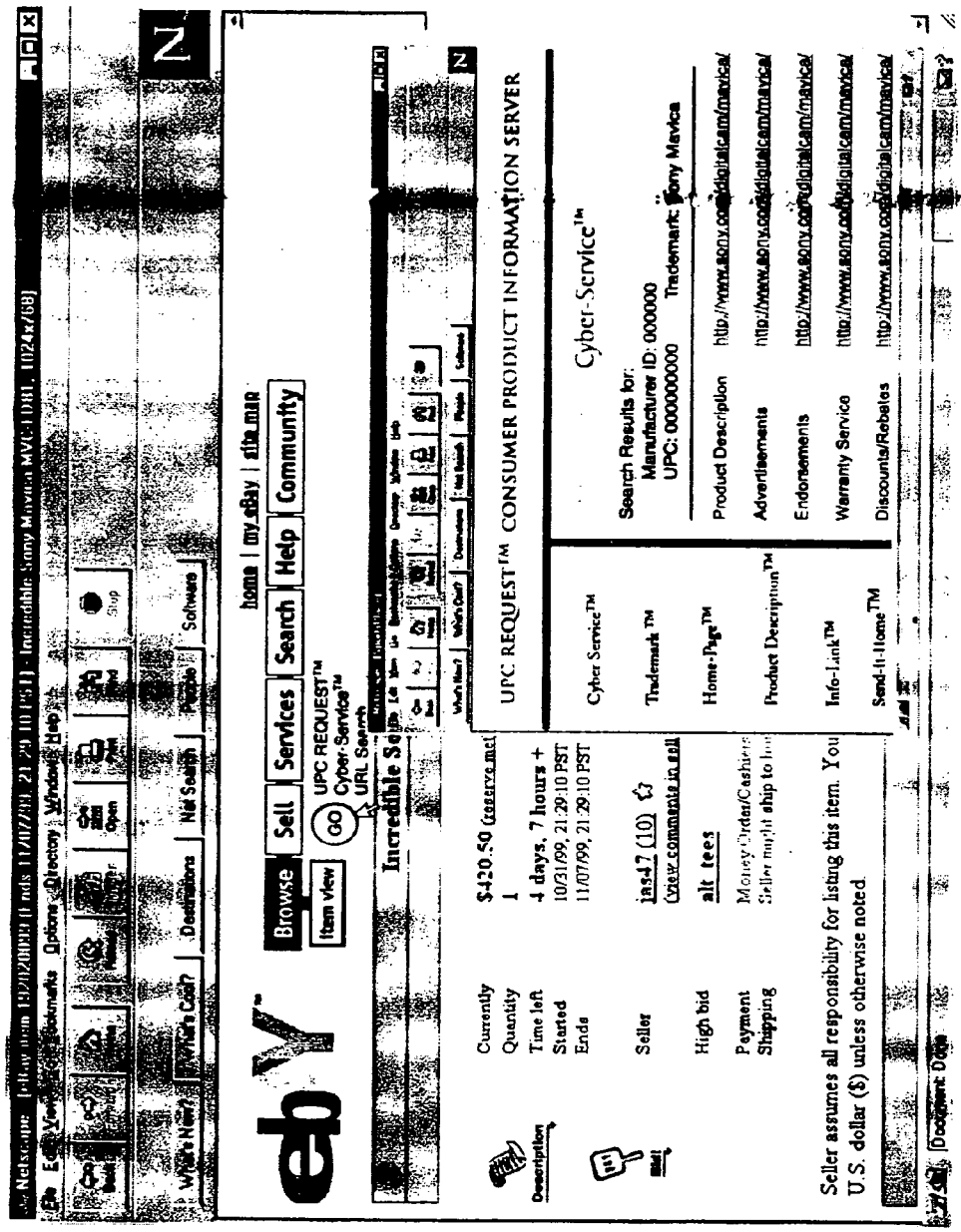
FIG. 4R2

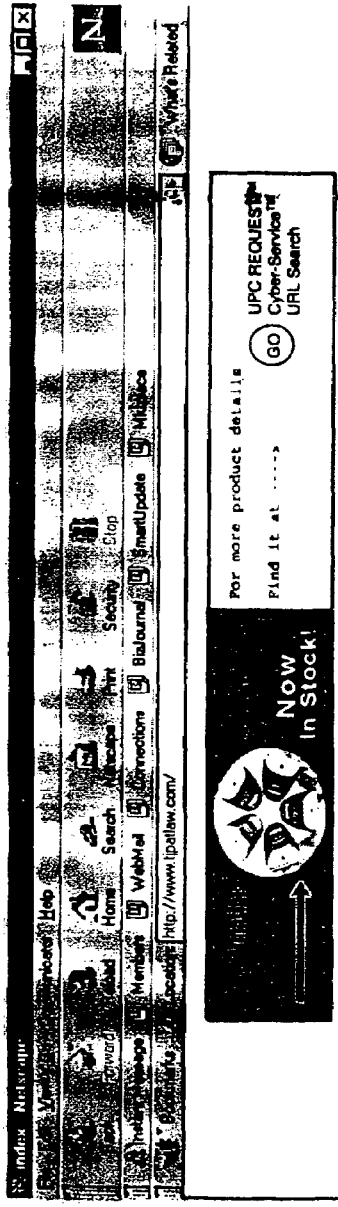
FIG. 4S1

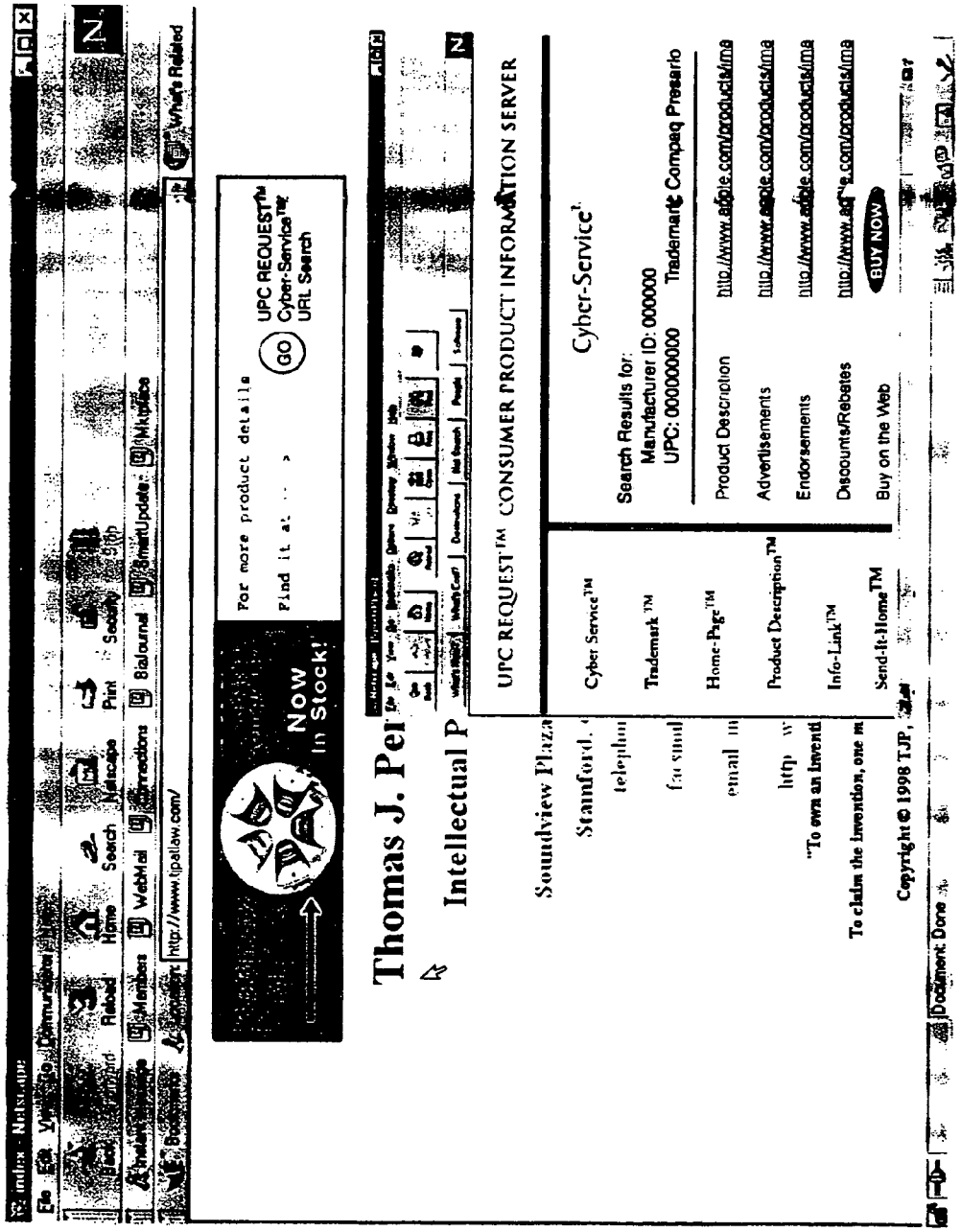
FIG. 4S2

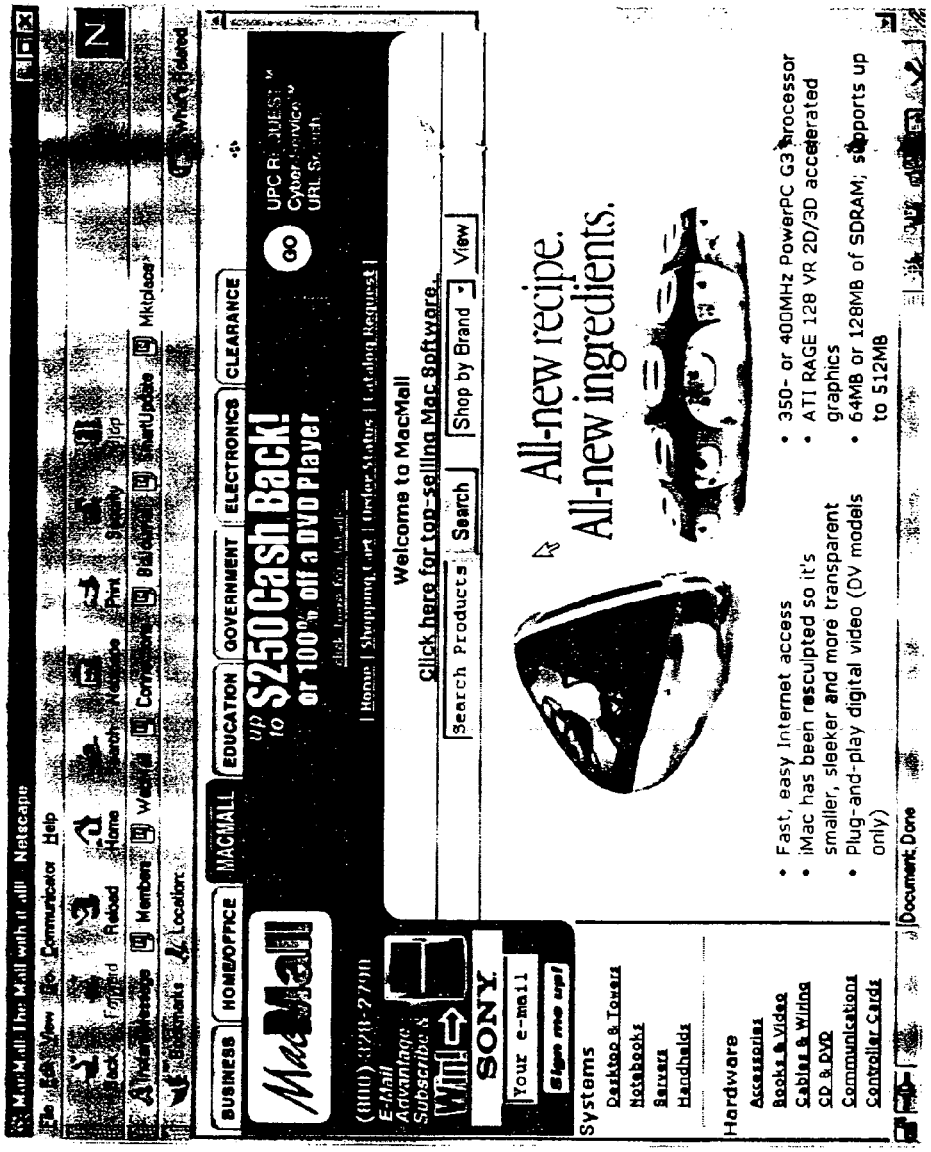
FIG. 4S3

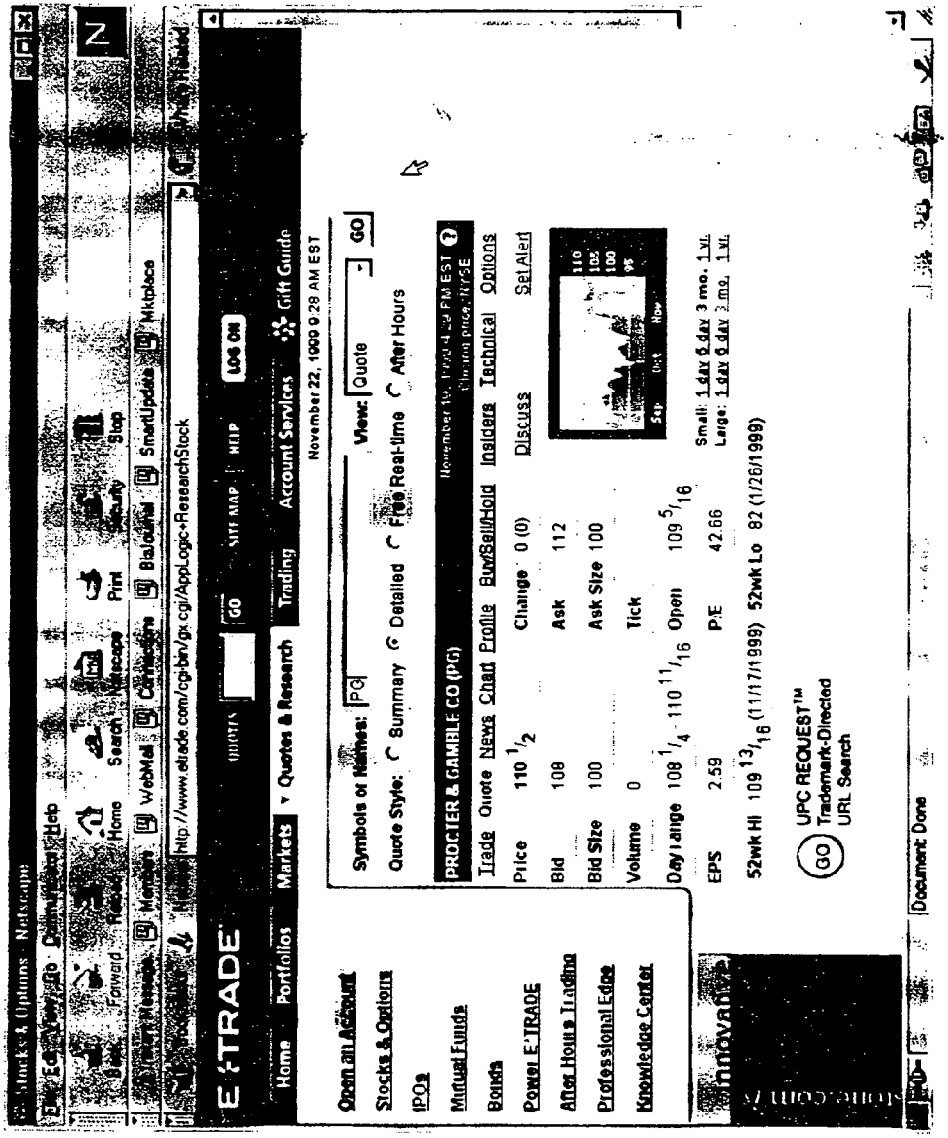
FIG. 4T1

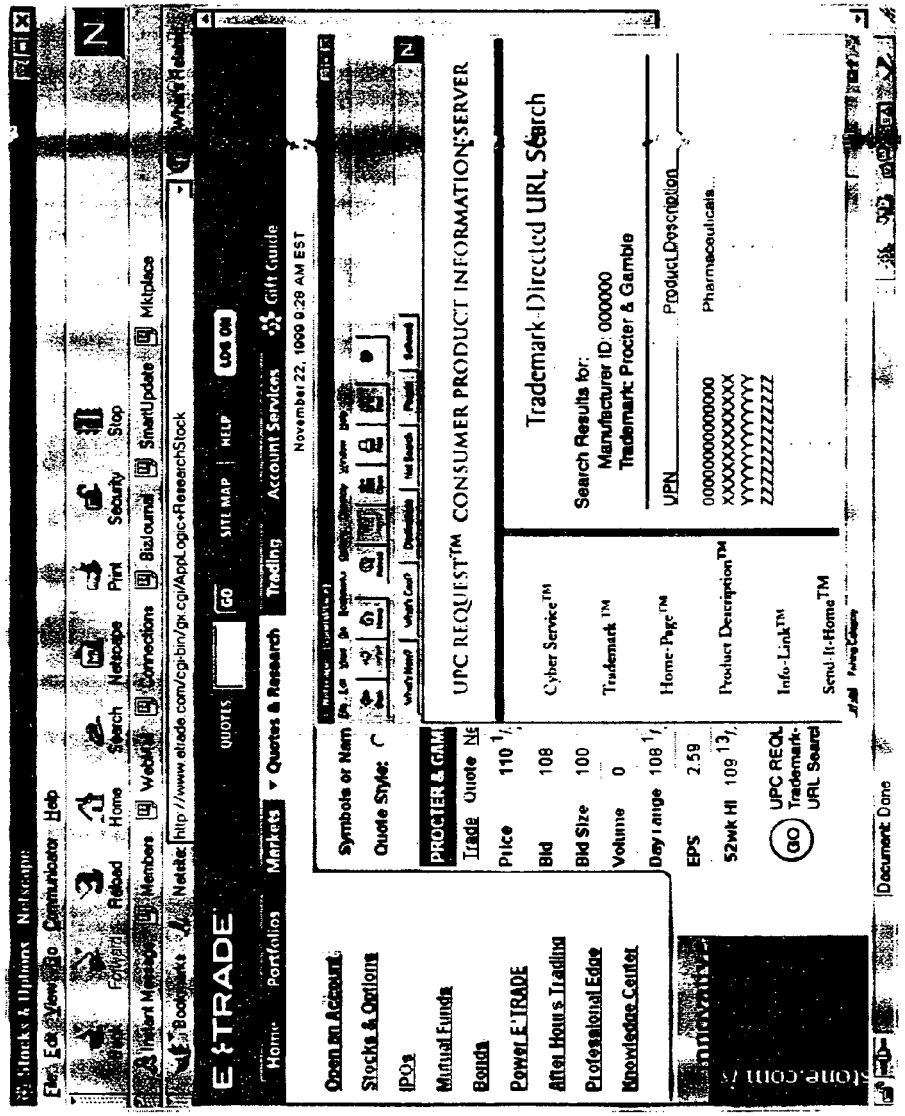
FIG. 4T2

MANUFACTURER / PRODUCT REGISTRATION MODE

MANUFACTURER WEBSITE SEARCH MODE

UPN - DIRECTED INFORMATION ACCESS MODE

TRADE - MARK DIRECTED SEARCH MODE

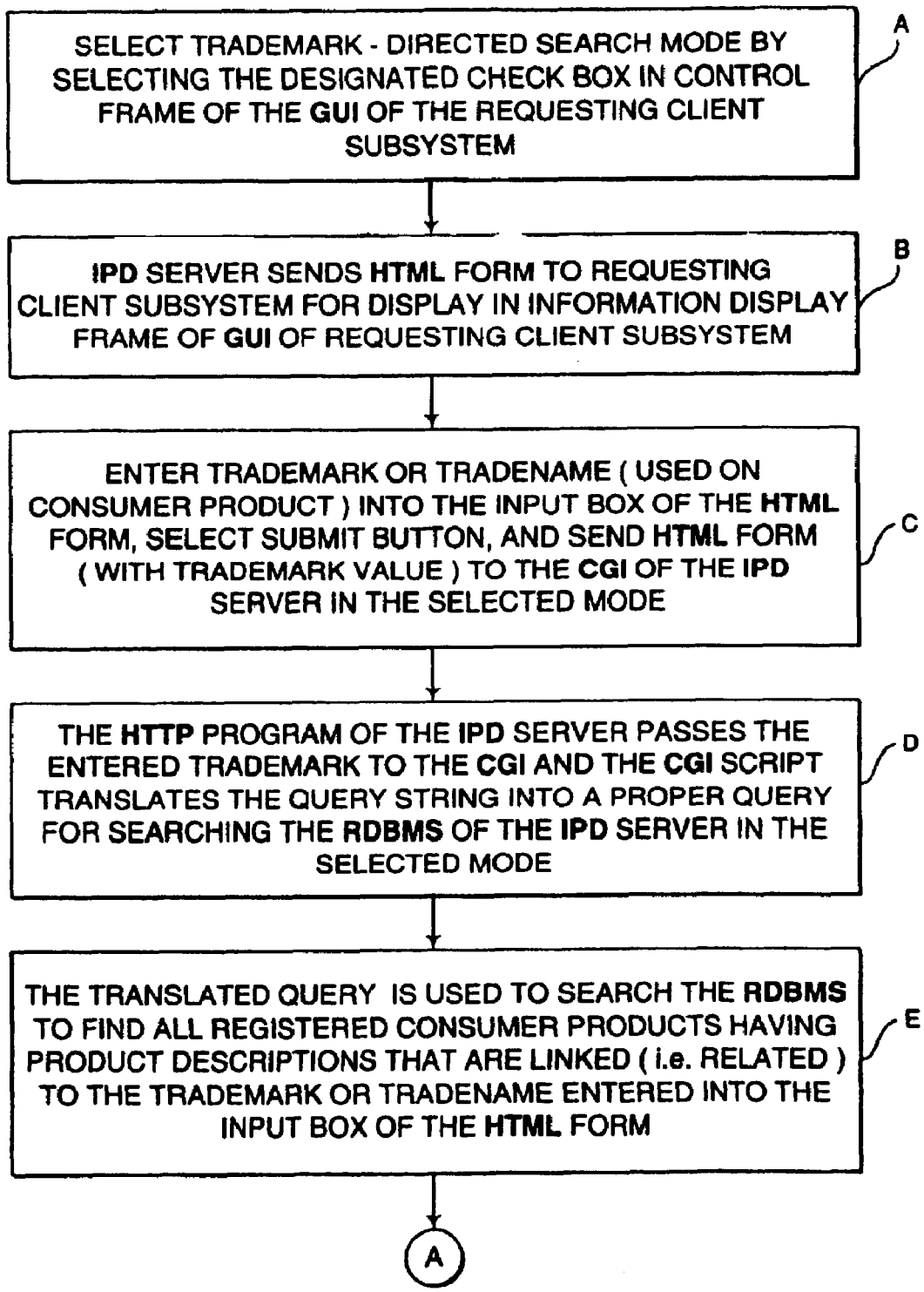
FIG. 6D1

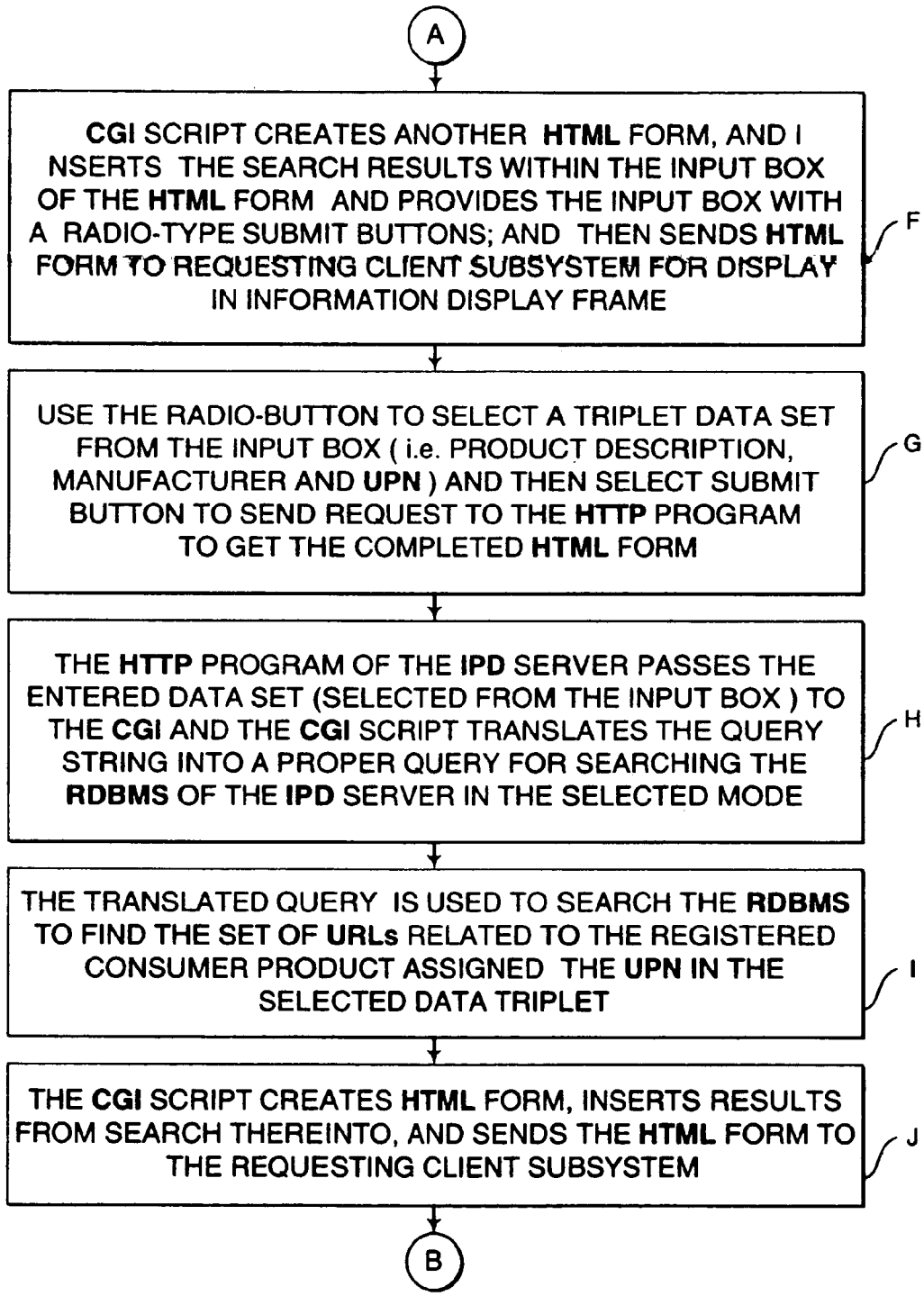
FIG. 6D2

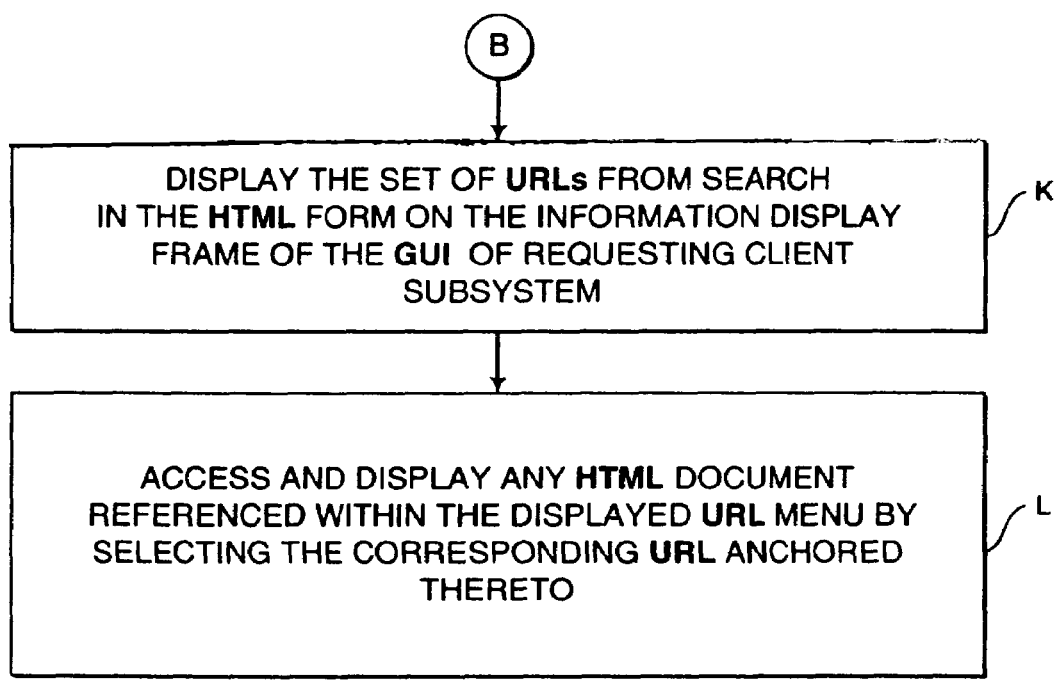
FIG. 6D3

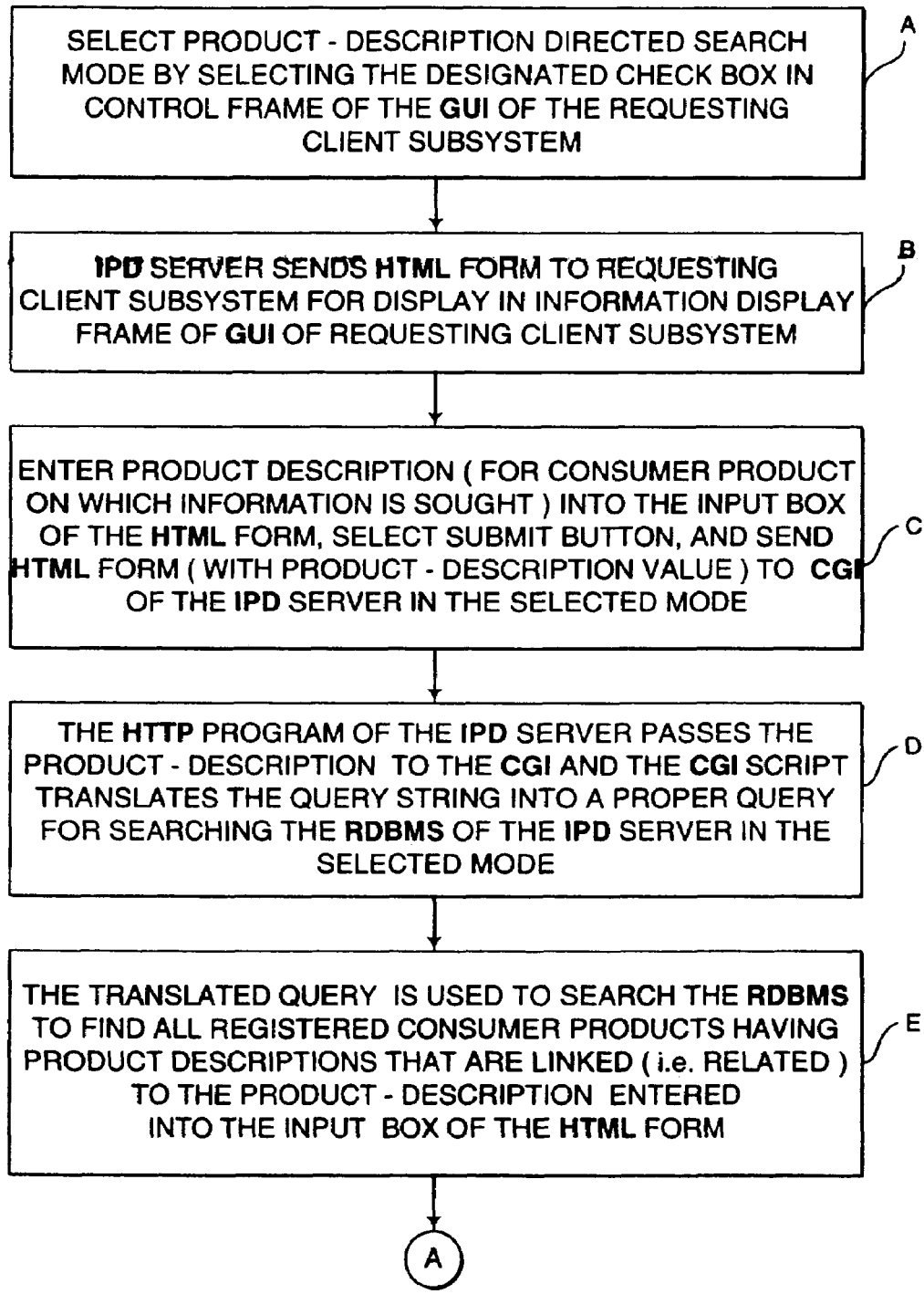
FIG. 6E1

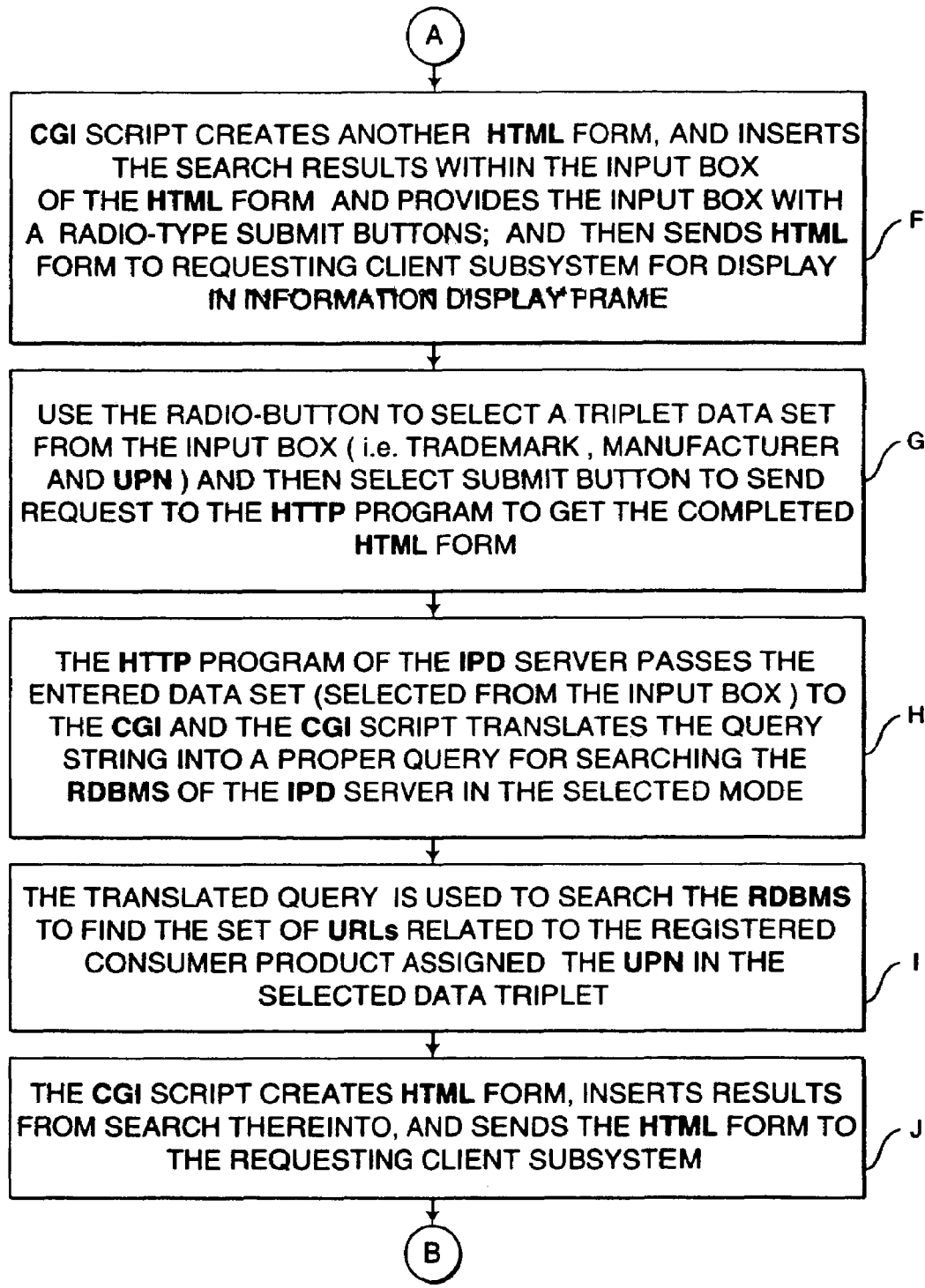
FIG. 6E2

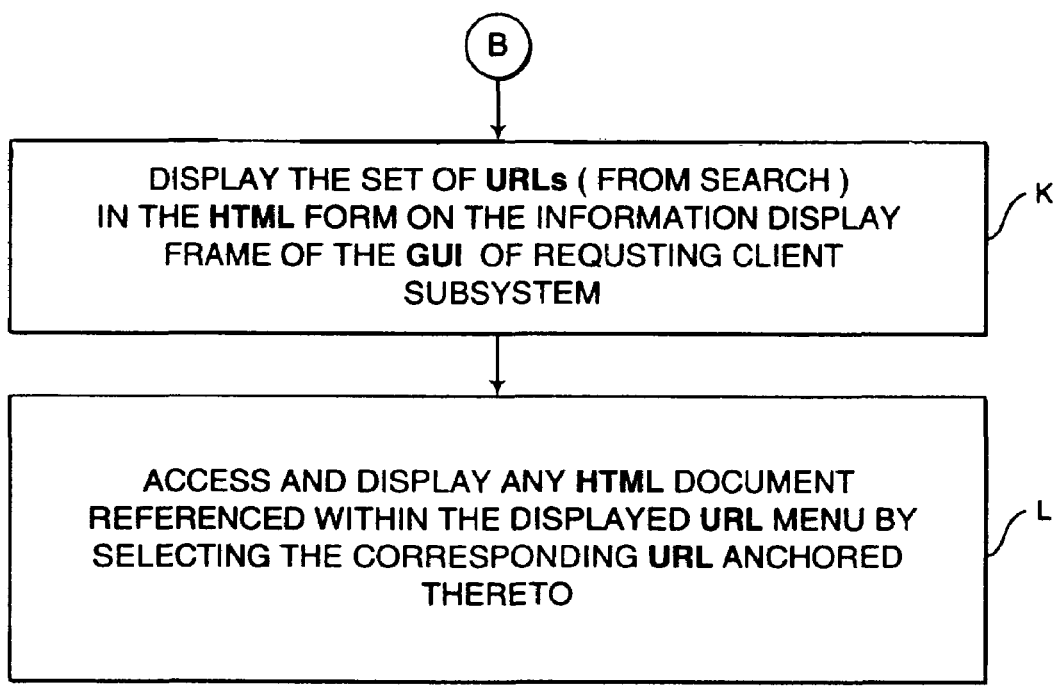
F I G. 6E3

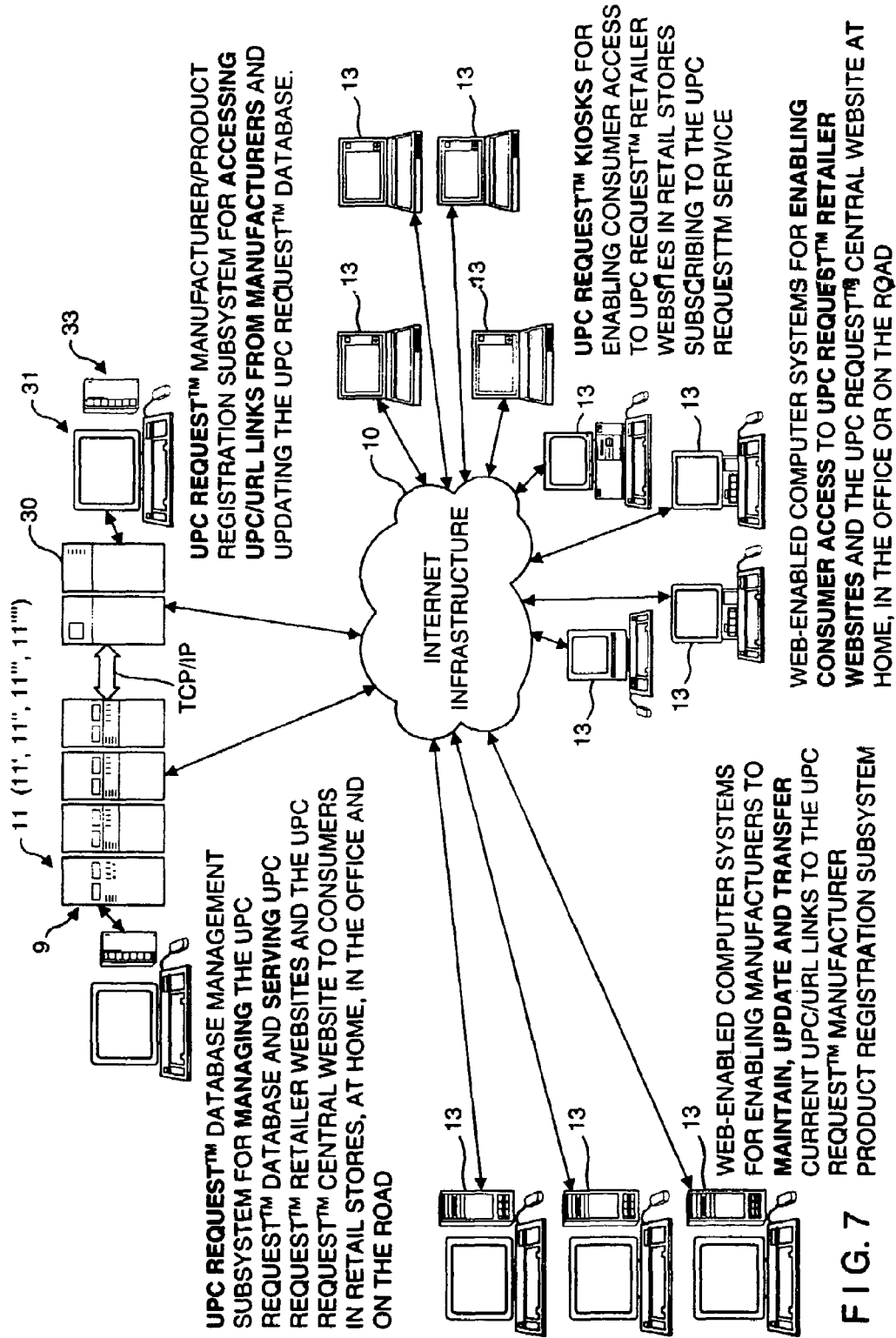

INTERNET-BASED SYSTEM FOR MANAGING AND DELIVERING CONSUMER PRODUCT BRAND INFORMATION TO CONSUMERS AT POINTS OF PRESENCE ALONG THE WORLD WIDE WEB (WWW)

RELATED CASES

This application is a Continuation of application Ser. No. 09/599,690 filed Jun. 22, 2000 now abandoned; which is a Continuation-in-Part of application Ser. No. 09/483,105 entitled "Internet-Based Method Of And System For Managing And Serving Consumer Product Advertisements To Consumers In Retail Stores" filed Jan. 14, 2000 now abandoned; application Ser. No. 09/465,859 filed Dec. 17, 1999 now abandoned; which is a Continuation-in-Part of application Ser. No. 09/447,121 filed Nov. 22, 1999 now U.S. Pat. No. 6,625,581; application Ser. No. 09/441,973 filed Nov. 17, 1999 now U.S. Pat. No. 6,961,712; which is a Continuation-in-Part of application Ser. No. 09/284,917 which was entered into the U.S. on Apr. 21, 1999 which is a National Stage Entry Application from International Application No. PCT/US97/19227 filed Oct. 27, 1997 now abandoned, published as WIPO Publication No. WO 98/19259 on May 7, 1998; as well as a Continuation-in-Part of the following U.S. Applications: Ser No. 08/736,798 filed Oct. 25, 1996,now U.S. Pat. No. 5,918,214 Ser No. 08/752,136 filed Nov. 19, 1996 now U.S. Pat No. 6,064,979; Ser. No. 08/826,120 filed Mar. 27, 1997 now abandoned; Ser. No. 08/854,877 filed May 12, 1997, now U.S. Pat. No. 5,950,173; Ser. No. 08/871,815 filed Jun. 9, 1997 now U.S. Pat. No. 7,143,055; and Ser. No. 08/936,375 filed Sep. 24, 1997 now abandoned, each said Application is commonly owned by IPF, Inc., and is incorporated herein by reference in its entirety as if fully set forth herein.

BACKGROUND OF INVENTION

1. Field of Invention

The present invention generally relates to a novel system and method for collecting consumer-product related information and transmitting and delivering the same along the consumer-product supply and demand chain using the International Information Infrastructure (e.g. the Internet), and more particularly to a novel system and method for delivering consumer product related information to consumers within retail environments using Internet-based information servers and sales agents.

2. Brief Description of the Prior Art

Dissemination of consumer-product information between manufacturers and their retail trading partners must be accurate and timely. The traditional methods of phone calls and faxes are time consuming and resource intensive. An electronic Universal Product Code (UPC) Catalog (i.e. database system), accessible 24 hours a day, is a solution. In 1988, Quick Response Services (QRS), Inc. Of Richmond, Calif., introduced the first independent product information database, using the retail industry standard UPC numbering system. Today the QRSolutions™ Catalog contains information on over 52 million products from over 1500 manufacturers. The QRSolutions Catalog is a Windows-based application providing a critical information flow link between the retailers and the manufacturers along the supply and demand chain.

After assigning a UPC number to each item, the manufacturer organizes and sends the data via an electronic data interchange (i.e. EDI) transmission, or a tape, to QRS, Inc. to be loaded into the UPC Catalog database. Changes to the data can be made on a daily basis. Retailers with access to a manufacturer's data can view and download the data once it has been added or updated. Automatic update capabilities ensure the most recent UPC data will be in the EDI mailbox of each retail customer quickly.

The effect of a centralized database such as QRS's UPC Catalog improves the flow of merchandise from the manufacturer to the retailer's selling floor and ultimately to the consumer. With the UPC Catalog, accurate, up-to-date product information is available when the retailer needs it, eliminating weeks from the order cycle time.

In addition to the electronic UPC-based product information subsystem (i.e. UPC Catalog) described above, a number of other information subsystems have been developed for the purpose of providing solutions to problems relating to electronic commerce (EC) merchandising and logistics within the global supply chain. Such ancillary information subsystems include, for example: Sales, Analysis and Forecasting Subsystems for producing and providing retailers with information about what products consumers are buying; Collaborative Replenishment Subsystems for determining what products retailers can buy in order to satisfy consumer demand at any given point of time; and Transportation and Logistics Information Subsystems for producing and providing retailers with information about when products purchased by them (at wholesale) will be delivered to their stores. Typically, such information subsystems are connected to various value added information networks in order to efficiently offer such information services to retailers on a global basis.

While the above-described information systems collectively cooperate to optimize the process of moving raw materials into finished products and into the hands of consumers, such information systems fail to address the information needs of the consumers of retail products who require and desire product-related information prior to, as well as after, the purchase of consumer-products. Moreover, prior art demand chain management systems operate in an open-loop mode with a "break" in information flow cycle, disabling the manufacturers from communicating with the consumers in an efficient manner to satisfy consumer needs.

Presently, an enormous amount of time, money and effort is being expended by companies in order to advertise and sell their products and services, and to provide product related information, product warranty service and the like after product purchase has taken place. Various types of media for decades have been used to realize such fundamental business functions.

In recent times, there has been a number of significant developments in connection with the global information network called the "Internet", which has greatly influenced many companies to create multi-media Internet Web-sites in order to advertise, sell and maintain their products and services. Examples of such developments include, for example: the World Wide Web (WWW) based on the Hypertext Markup Language (HTML) and the Hypertext Transmission Protocol (HTTP) by Tim Berners-Lee, et al. (See "World-Wide Web: The Information Universe" by Tim Berners-Lee, et al; easy to use Java GUI-based Internet navigation tools, such as the Netscape® browser from Netscape Communications, Inc., the Internet Explorer™ browser from MicroSoft Corporation and the Mosaic™ browser from Spyglass Corporation; and the Virtual Reality Modeling Language (VRML) by Mark Pecse. Such developments in recent times have made it very easy for businesses to create 2-D Hypermedia-based Home Pages and 3-D VR Worlds (i.e. 3-D Web-sites) for the purpose of projecting a desired "corporate image" and providing a backdrop for financial investment solicitation, as well as product advertising, sales and maintenance operations.

Presently, a person desiring to acquire information about any particular product has a number of available search options. In particular, he or she may attempt to directly contact the manufacturer, wholesaler or reseller by telephone, US mail, e-mail, or through the company's World Wide Web-site (WWW), if they have one. In the event one decides to acquire product information through the seller's WWW site, he or she must first determine the location of its WWW site (i.e. Internet address) which oftentimes can involve using Internet Search engines such as Yahoo®, AltaVista™, WebCrawler™, Lycos™, Excite™, or the like. This can be a very time consuming process and can sometimes lead to a dead end. Once the Internet address is obtained, one must then review the home page of the company's Web-site in order to find where information about a particular product resides on the Website, if it so exists. This search process can be both time consuming and expensive (in terms of Internet time) and may not turn up desired information on the product of interest.

In some instances, product brochures bear a preprinted Internet address designed to direct or point prospective customers to a particular Web-site where more detailed product information can be found. A recent example of this "preprinted Web Address" pointing technique is the 1996 product brochure published by the Sony Corporation for its Sony® PCV-70 Personal Computer, which refers prospective customers to the Sony Web Address "http://www.sony.com/pc". While this approach provides a direct way of finding product related information on the Internet, it is not without its shortcomings and drawbacks.

In particular, when a company improves, changes or modifies an existing Web-site which publishes product and/or service advertisements and related information, it is difficult (if not impossible) not to change the Internet locations (e.g. Web addresses) at which such product and/or service advertisements and related information appear. Whenever a company decides or is forced to change any of its advertising, marketing and/or public relations firms, there is a substantial likelihood that new Web-sites will be created and launched for particular products and services, and that the Web addresses of such new Web-sites will no longer correspond with the Web addresses on preprinted product brochures currently in circulation at the time. This can result in pointing a consumer to erroneous or vacant Web-sites, that present either old or otherwise outdated product and/or service information, possibly adversely influencing the consumer's purchasing decision.

Moreover, when a company launches a new Web-site as part of a new advertising and marketing campaign for a particular product, any preprinted advertising or marketing material relating to such products will not reflect the new Web-site addresses which the campaign is promoting. This fact about preprinted advertising media renders it difficult to unify new and old advertising media currently in circulation into an advertising and marketing campaign having a coherent theme. In short, the inherently static nature of the "preprinted Web address" pointing technique described above is wholly incapable of adjusting to the dynamic needs of advertising, marketing and public relations firms alike.

Recently, two different methods have been proposed for providing product information to consumers over the Internet.

U.S. Pat. No. 5,640,193 to Wellner discloses a system and method for accessing and displaying Web-based consumer product related information to consumers using an Internet-enabled computer system, whereby in response to reading a URL-encoded bar code symbol on or associated with a product, the information resource specified by the URL is automatically accessed and displayed on the Internet-enabled computer system. While this system and method enables access of consumer product information related information resources on the WWW by reading URL-encoded bar code symbols, it requires that custom URL-encoded bar code symbols be created and applied to each and every consumer product in the stream of commerce.

U.S. Pat. No. 5,978,773 to Hudetz, et al discloses a solution to the problem presented by the system and method of U.S. Pat. No. 5,640,193, by proposing the use of a UPC/URL database in order to translate UPC numbers read from consumer products by a bar code scanner, into the URLs of published information resources on the WWW relating to the UPC-labeled consumer product.

Like U.S. Pat. No. 5,978,773 to Hudetz, et al, WIPO Publication No. WO 98/03923 discloses the use of a UPC/URL database in order to translate UPC numbers read from consumer products by a bar code scanner, into the URLs of published information resources on the WWW relating to the UPC-labeled consumer product.

While U.S. Pat. No. 5,978,773 and WIPO Publication No. WO 98/03923 both provide an effective solution to the problem presented by U.S. Pat. No. 5,640,193, these prior art references completely fail to recognize or otherwise address the myriad of problems relating to UPC/URL-link collection, management, delivery, access and display along the retail supply and demand chain, which must be first solved in order to deliver a technically feasible, globally-extensive, UPC-driven consumer product information system for the benefit of consumers worldwide.

Thus, it is clear that there is great need in the art for an improved Internet-based method of and system for delivering product related information to the consumers along the entire retail supply and demand chain, while avoiding the shortcomings and drawbacks of prior art systems and methodologies.

DISCLOSURE OF THE INVENTION

Accordingly, a primary object of the present invention is to provide a novel method and apparatus for collecting product-related information and transmitting and delivering the same between the manufacturers and retailers of products to the consumers thereof in retail shopping environments as well as at home, work and on the road, while overcoming the shortcomings and drawbacks of prior art systems and methodologies.

Another object of the present invention is to provide such apparatus in the form of a novel consumer-product information collection, transmission and delivery system.

Another object of the present invention is to provide such a system with an Internet-based product information database subsystem which, for each commercially available consumer-product, stores a number of information elements including: the name of the manufacturer; the Universal Product Code (UPC) assigned to the product by the manufacturer; one or more URLs specifying the location of information resources (e.g. Web-pages) on the Internet relating to the UPC-labeled consumer-product; and the like.

Another object of the present invention is to provide such a system, in which the URLs stored in the Internet-based product information database are categorically arranged and displayed according to specific types of product information (e.g., product specifications and operation manuals; product wholesalers and retailers; product advertisements and promotions; product endorsements; product updates and reviews; product warranty/servicing; related or complementary products; product incentives including rebates, discounts and/or coupons; etc.) that relate to the kind of information required, desired or otherwise sought by consumers, wholesalers, retailers and/or trading partners; product prices at which the products are being offered for sale by a particular retailer; and the like.

Another object of the present invention is to provide such a system, wherein the information maintained within the Internet-based product information database management subsystem provides a manufacturer-defined consumer-product directory that can be used by various persons along the retail supply and demand chain.

Another object of the present invention is to provide such a system, wherein the manufacturers of consumer-products are linked to the retailers thereof in the middle of the supply and demand chain by allowing either trading partner access to consumer-product information from the Internet-based product information database virtually 24 hours a day, seven days a week.

Another object of the present invention is to provide such a system, wherein consumer-product manufacturers, their advertisers, distributors and retailers are linked to the consumers of such products at the end of the supply and demand chain, by allowing such parties access to consumer-product information from the Internet-based product information database subsystem virtually 24 hours a day, seven days a week.

Another object of the present invention is to provide such a system and method of using the same, which will accelerate the acceptance of electronic commerce on the Internet and the development of the electronic marketplace, which can be used by consumers and small and large businesses alike.

Another object of the present invention is to provide a novel system and method for finding and serving consumer-product related information on the Internet.

Another object of the present invention is to provide such a system and method, wherein virtually any type of product can be registered with the system by symbolically linking or relating (i) its preassigned Universal Product Number (e.g. UPC or EAN number) or at least the Manufacture Identification Number (MIN) portion thereof with (ii) the Uniform Resource Locators (URLs) of one or more information resources on the Internet (e.g. the home page of the manufacturer's Web-site) related to such products.

Another object of the present invention is to provide such a system and method wherein a Web-based document transport subsystem is provided for use by manufacturers as well as their advertisers and agents in registering the UPNs (e.g. UPC numbers) of their products and the URLs of the information resources related to such products.

Another object of the present invention is to provide such a system with a number of different modes of operation, namely: a Manufacturer/Product Registration Mode, wherein manufacturers can register their companies and consumer products (e.g. UPC numbers and URLs) with the system; an UPN-Directed Information Access Mode, wherein consumers can access and display information menus containing UPC numbers linked to URLs pointing Web pages containing consumer product related information by scanning the UPC label on the consumer product or by entering the UPC number thereof into a data-entry screen displayed by the system in this mode; a Manufacturer Website Search Mode, wherein the home page of a manufacturer's Web-site can be automatically accessed and displayed by scanning the UPC label on any consumer product of the manufacturer or by entering the UPC number thereof into a data-entry screen displayed by the system in this mode; a Trademark-Directed Search Mode enabling consumers to use trademarks and/or tradenames associated with consumer products to search for consumer-product related information registered within the system; and a Product-Description Directed Search Mode enabling consumers to use product descriptors associated with particular consumer products to search for consumer-product related information registered within the system.

Another object of the present invention is to provide such a system, wherein when the system is in its UPN-Directed Information Menu Access Mode, a predesignated information resource (e.g. advertisement, product information, etc.) pertaining to any commercial product registered with the system can be automatically accessed from the Internet and displayed from the Internet browser by simply entering the registered product's UPN into the Internet browser manually or by bar code symbol scanning.

Another object of the present invention is to provide such a system, wherein when the system is in its Trademark-Directed Search Mode, a predesignated information resource (e.g. advertisement, product information, etc.) pertaining to any commercial product registered with the system can be automatically accessed from the Internet and displayed from the Internet browser by simply entering the registered product's trademark(s) and/or associated company name into the Internet browser.

Another object of the present invention is to provide such a system, wherein when the system is in its Product-Description-Directed Search Mode, a predesignated information resource (e.g. advertisement, product information, etc.) pertaining to any commercial product registered with the system can be automatically accessed from the Internet and displayed from the Internet browser by simply entering the registered product's product description into the Internet browser.

Another object of the present invention is to provide such a system, wherein a predesignated information resource pertaining to any commercial product having been assigned a Universal Product Number (UPN) can be accessed from the Internet and displayed from the Internet browser by simply selecting it and then entering the UPN numeric string into an Input Box which pops up on an HTML form displayed by an Internet browser.

Another object of the present invention is to provide such a system in which a relational database, referred to as "an Internet Product Directory (IPD)," is realized on one or more data-synchronized IPD Servers for the purpose of registering product related information, namely: (i) information representative of commercial product descriptions, the trademarks used in connection therewith, the company names providing and/or promoting such products, the E-mail addresses of such companies, and the corresponding URLs on the Internet specifying current (i.e. up-to-date) Internet Web-site locations providing product-related information customized to such products.

Another object of the present invention is to provide such a product information finding and serving system, wherein the URLs symbolically linked to each registered product in the IPD Servers thereof are categorized as relating primarily to Product Advertisements, Product Specifications, Product Updates, Product Distributors, Product Warranty/Servicing, and/or Product Incentives (e.g. rebates, discounts and/or coupons), and that such URL categories are graphically displayed to the requester by way of easy-to-read display screens during URL selection and Web-site connection.

A further object of the present invention is to provide an Internet-based System wherein: (1) manufacturers and their agents are enabled to simply link (i.e. relate), manage and update within a centralized database, the UPC (and/or UPC/EAN) numbers on their products and the Uniform Resource Locators (URLs) of HTTP-encoded documents (i.e. Web pages) containing particular kinds of consumer product-related information published on the Internet by the manufacturers, their agents and/or third parties; and (2) consumers, in retail stores, at home, in the office and on the road, are enabled to simply access such consumer product-related information using such UPC (and/or UPC/EAN) numbers and/or by scanning UPC (or UPC/EAN) bar code symbols encoded with such product identification numbers.

Another object of the present invention is to provide a novel method of carrying out electronic-type commercial transactions involving the purchase of products which are advertised on the Internet at uniform resource locations (URLs) that are registered with the IPI system of the present invention.

Another object of the present invention is to provide a novel system and method of finding the UPN or USN associated with any particular registered product, respectively, by simply selecting a Java GUI button on the Internet browser display screen in order to enter a "Trademark-Directed Search Mode", whereby (i) a dialogue box is displayed on the display screen requesting any known trademarks associated with the product, and/or the name of the company that makes, sells or distributes the particular product, and (ii) the corresponding UPN (i.e. UPC number or EAN number) registered with the IPD Servers is displayed to the user for acceptance, whereupon the Internet Uniform Resource Locators (URLs) are automatically accessed from the IPD Servers and displayed on the display screen of the Internet browser for subsequent URL selection and Web-site connection.

Another object of the present invention is to provide such a system and method, wherein during the Trademark-Directed Search Mode, the UPN (e.g. UPC or EAN number) associated with any registered product can be found within the database of the IPD Server using any trademark(s) and/or the company name commonly associated with the product.

Another object of the present invention is to provide a novel system and method for serving consumer-product related information to Internet users in retail shopping environments (e.g. department stores, supermarkets, superstores, home-centers and the like) as well as at home, work or on the road.

Another object of the present invention is to provide a consumer product information access terminal located at a point-of-sale (POS) station, wherein the bar code symbol reader integrated with the POS station can be used to read the UPC numbers on consumer products being offered for sale in the store in order to access consumer product related information from hyper-linked Web-sites on the Internet, for display on an LCD screen located at the POS station and viewable from various positions by the sales clerk as well as consumer shoppers.

Another object of the present invention is to provide a system and method, wherein one or more computer-based kiosks are installed within retail shopping environments and each such kiosk has an automatic bar code symbol reader for reading the UPC numbers on consumer products being offered for sale in the store, and also an LCD touch-type display screen for displaying product-related information accessed from hyper-linked Web-sites on the Internet.

Another object of the present invention is to provide such a system and method, wherein one or more computer-based kiosks are installed within retail shopping environments and each such kiosk has an automatic bar code symbol reader for reading the UPC numbers on consumer products being offered for sale in the store, and also a LCD touch-type display screen for displaying product-related information accessed from hyper-linked Web-sites on the Internet.

Another object of the present invention is to provide such a consumer product information kiosk, wherein the laser scanning bar code symbol reader can be easily removed from its support stand to scan large consumer products that might be difficult to present within the scanning field while the bar code symbol reader is supported above the LCD display panel.

Another object of the present invention is to provide such a consumer product information kiosk, wherein the laser scanning bar code symbol reader has a cordless interface with the kiosk so that it may be moved about within a retail store in a portable manner to scan UPC labels and access consumer product related information.

Another object of the present invention is to provide a consumer product information kiosk for use with the system hereof, that is completely transportable within the store by hand, or may be mounted upon a shopping cart or other vehicle for the convenience of shoppers and the like.

Another object of the present invention is to provide "virtual" or "Cyber" sales and service agents within retail shopping environments by installing the computer-based kiosks of the present invention therein.

Another object of the present invention is to provide a Web-based information delivery system and method, wherein the computer-based kiosks employed throughout the hosting retailer's store are capable of displaying the price of products offered for sale in the store upon reading the UPC bar code symbol thereon.

Another object of the present invention is to provide a novel method of constructing a relational database for use within the product information finding and serving subsystem of the present invention.

Another method of the present invention is to provide such a method of database construction, wherein the relational database is initially "seeded" with: (i) the Manufacturer Base UPC Numbers based on the six digit UPC Manufacturer Identification Numbers (MIN) assigned to the manufacturers by the UCC and incorporated into the first six characters of each UPC number applied to the products thereof; and (ii) the URLs of the Web-site home pages of such manufacturers.

Another method of the present invention is to provide such a method of database construction, wherein the "seeded" relational database is then subsequently extended and refined with the participation of each registered manufacturer (and/or agents thereof) by adding to the "seeded" database (iii) the 12 digit UPC numbers assigned to each product sold thereby and the menu of URLs symbolically linked to each such corresponding product.

Another object of the present invention is to provide such a system and method, in which Web-site-based advertising campaigns can be changed, modified and/or transformed in virtually any way imaginable by simply restructuring the symbolic links between the products and/or services in the campaign using current (i.e. up-to-date) Web-site addresses at which Web-site advertisements and information sources related thereto are located on the Internet.

Another object of the present invention is to provide a novel system and method of automatically soliciting companies to register their products within the databases of such IPD Servers in order that product related information of a multimedia nature (e.g. Web-sites), once registered therewith, can be easily found on the Internet by anyone using the system and method of the present invention.

Another object of the present invention is to provide a novel system and method for finding and serving consumer-product related information on the Internet, accessible from the Websites of each manufacturer who has registered its UPN/URLs with the system's "central" IPD Database.

Another object of the present invention is to provide such a system and method, wherein as part of the consumer product registration process, the manufacturer (or retailer) maintains a limited-version of the UPN/URL database which contains a list of categorized URLs for each UPC-encoded product that it sells.

Another object of the present invention is to provide such a system and method, wherein the consumer product related information links contained within the limited-version of the UPN/URL Database of each registered manufacturer (or retailer) can be accessed from the manufacturer's (or retailer's) company Website and served to consumers requesting such information by way of UPC (or EAN) number entry.

Another object of the present invention is to provide such a system and method, wherein input HTML forms for searching the limited-version of the UPN/URL Database of each registered manufacturer (or retailer) can be accessed by selecting a predesignated Check Button on the Java GUI to a Website providing access thereto.

Another object of the present invention is to provide such a system and method, wherein the limited-version of the UPN/URL Database of each registered manufacturer (or retailer) is used to update a "central" or "master" UPN/URL Database which is continuously maintained and made accessible to consumers (i) through Web-based kiosks installed in licensed retail environments and (ii) through Internet-enabled client subsystems located at home, work and school.

Another object of the present invention is to provide such a system and method, wherein at the time of registering each manufacturer (or retailer) with the system, an Internet-based registration server automatically transmits a computer program to the manufacturer's (or retailer's) computer system for use in constructing and maintaining the limited-version UPN/URL Database related to the manufacturer's (retailer's) products.

Another object of the present invention is to provide such a system and method, wherein the limited-version UPN/URL Database of each registered manufacturer (or retailer) can be served from the manufacturer's (or retailer's) Internet information server using a Common Gateway Interface program (CGI).

Another object of the present invention is to provide such a system and method, wherein the limited-version UPN/URL database of each registered manufacturer (or retailer) is realized using a cross-platform compatible, relational database management system (RDBMS).

Another object of the present invention is to provide a novel method of and system for accessing consumer product related information at points within HTML-encoded documents, at which Universal Product Number (UPN) encoded Java Applets are embedded so as to produce, when executed, a consumer product information display enabling ("CPID-enabling") Java-based graphical user interfaces (GUIs) for the convenience of consumers shopping at electronic-commerce (EC) enabled stores, considering the placement of bids at on-line auction sites, or browsing product advertisements appearing on the World Wide Web.

Another object of the present invention is to provide an Internet-based consumer product information collection, managing and delivery system and method, wherein for each consumer product registered within the UPN/URL database of the system, there is created and stored, an interactive consumer product information request (CPIR) enabling Applet (e.g. based on Java™ component principles or MicroSoft's Active-X technology) which, when executed upon the initiation of the consumer through a mouse-clicking operation, automatically causes a preassigned CPID-enabling Java GUI to be displayed at the consumer's point of presence in Cyberspace, revealing the results of a consumer product information display conducted upon the product identified by the UPN encoded within the executed Applet.

Another object of the present invention is to provide such an Internet-based consumer product information collection, managing and delivery system and method, wherein (1) the UPN assigned to a particular consumer product by the manufacturer and (2) the URL of the Java script running on the IPD server of the system are encoded within the CPIR-enabling Applet so that, upon execution of the Applet, a consumer product information display (CPID) Java GUI is automatically produced for the consumer's convenience.

Another object of the present invention is to provide an Internet-based consumer product information collection, managing and delivery system and method, wherein the CPID-enabling Java GUI automatically displays a manufacturer-defined menu (i.e. list) of categorized URLs pointing to information resources on the Internet (e.g. WWW) relating to the consumer product identified by the UPN encoded within the CPIR-enabling Applet.

Another object of the present invention is to provide such an Internet-based consumer product information collection, managing and delivery system and method, wherein CPIR-enabling Applets are created by the system administrator, loaded within the UPN/URL database management subsystem thereof, distributed to retailers, wholesalers, manufacturers, advertisers and others for embedding within HTML-encoded documents associated with EC-enabled stores, catalogs, Internet-based product advertisements, on-line auction sites, and other locations on the WWW where accurate consumer product related information is desired or required without leaving the point of presence on the WWW at which the consumer resides.

Another object of the present invention is to provide such an Internet-based consumer product information collection, managing and delivery system and method, wherein CPIR-enabling Applets are created, distributed, embedded within a HTML-encoded document related to a particular consumer product, and subsequently executed by a consumer so as to access and display a manufacturer-defined menu (i.e. list) of categorized URLs pointing to product-related Web-documents.

Another object of the present invention is to provide such an Internet-based consumer product information collection, managing and delivery system and method, wherein the consumer initiating the execution of a particular CPIR-enabling Applet may be anyone desiring or requiring consumer product related information while interacting with the communication medium provided by the Internet and its supported technologies (e.g. WWW, EC, etc.). As such, the consumer may be a student shopping at an EC-enabled (business-to-consumer) retail store for textbooks, a retail purchasing agent shopping at an on-line (business-to-business) wholesale product catalog for product inventory, a dealer looking to purchase a new or used product listed at an on-line auction site, or anyone encountering an Internet-based advertisement while surfing the WWW.

Another object of the present invention is to provide such an Internet-based consumer product information collection, managing and delivery system and method, wherein a thumbnail picture, arbitrary graphical object, predesignated CPIR-indicating icon, or hypertext-type link associated with a particular consumer product can be embedded within the CPIR-enabling Applet associated therewith, so as to enable the consumer to produce a CPID-enabling Java GUI upon encountering the same in an HTML-encoded document on the WWW.

Another object of the present invention is to provide such an Internet-based consumer product information collection, managing and delivery system and method, wherein licensed users can download CPIR-enabling Applets from the CPIR-Enabling Applet Library to any client computer for eventual insertion within the HTML code of a particular Web-document to be published on the Internet in accordance with the licensing arrangement between the contracting parties. Such end-use applications might be in EC-enabled retail product catalogs, EC-enabled wholesale/trade catalogs, Internet-based product advertisements, on-line auction WWW sites, on-line stock trading WWW sites, and the like.

Another object of the present invention is to provide such an Internet-based consumer product information collection, managing and delivery system and method, wherein the CPID-enabling Java GUIs enabled by executed CPIR-enabling Applets can function as CPI-serving "cyber-kiosks" that can be installed at any location in Cyberspace for the convenience of consumers residing therewithin without disturbing their point of presence.

Another object of the present invention is to provide a novel method of and system for delivering consumer product advertisements and consumer product related information to consumers over the WWW involving the use of a single mouse-clicking operation by the consumer.

Another object of the present invention is to provide a novel method of and system for embedding CPIR-enabling Applets within HTML-encoded consumer product advertisements published over the WWW involving the use of a single mouse-clicking operation by the consumer.

Another object of the present invention is to provide a novel method of and system for delivering consumer product related information to consumers at on-line auction sites on the WWW involving the use of a single mouse-clicking operation by the consumer.

Another object of the present invention is to provide a novel method of and system for embedding CPIR-enabling Applets within HTML-encoded on-line auction pages published over the WWW.

Another object of the present invention is to provide a novel method of and system for embedding CPIR-enabling Applets within HTML-encoded securities performance charts published at on-line electronic securities trading sites on the WWW.

Another object of the present invention is to provide a new method of and system for purchasing a consumer product over the Internet (e.g. WWW) comprising the steps of: embedding a UPN-encoded CPIR-enabling Applet within the HTML-code of a consumer product advertisement, wherein the CPIR-enabling Applet when executed displays a categorized URL menu containing one or more URLs pointing to one or more EC-enabled stores or on-line catalogs on the WWW at which the consumer product identified by the encoded UPN can be purchased and delivered to a particular address in physical space.

Another object of the present invention is to provide a novel cyber-kiosk, launchable from predefined points of presence within an EC-enabled store, on-line product catalog or other type of WWW site, for enabling consumers (including retail purchasing agents) to quickly access and display at the predefined point of presence, an interactive menu of categorized URLs pointing to consumer product related information resources published on the WWW and symbolically linked to the UPNs of consumer products within a centralized UPN/URL database management subsystem, by manufacturers and/or their agents.

Another object of the present invention is to provide a novel EC-enabled product catalog having a library of CPIR-enabling Applets embeddable within graphical images of consumer products in HTML-encoded documents and enabling, when executed, a UPN-directed search within the UPN/URL database management subsystem and the display of an interactive menu of categorized URLs pointing to consumer product related information resources published on the WWW and symbolically linked to the UPNs of consumer products within a centralized UPN/URL database management subsystem, by manufacturers and/or their agents.

Another object of the present invention is to provide a novel Internet-based electronic commerce (EC) enabled shopping system comprising an Internet information server connected to the infrastructure of the Internet and supporting the hypertext transmission protocol (http), a Web-enabled client subsystem connected to the infrastructure of the Internet, an EC-enabled WWW site comprising a plurality of interlinked HTML-encoded documents arranged and rendered to provide an electronic store environment when served to a consumer operating the Web-enabled client subsystem, wherein the electronic store environment presents a plurality of products for purchase and sale by an EC-enabled payment method supported over the Internet.

Another object of the present invention is to provide such an Internet-based electronic commerce (EC) enabled shopping system, wherein a Java Applet tag, associated with each product, is embedded within at least one of the HTML-encoded documents displayed on the Web-enabled client subsystem, and each Java Applet tag is associated with a Java Applet encoded with the universal product number (UPN) assigned to one of the products, and, when the consumer selects one of the Java Applet tags, the associated Java Applet is automatically executed enabling a search to be conducted against a product information database hosted on an Internet database server connected to the Internet, from which the results of the UPN-specified search are automatically displayed in a GUI served to the Web-enabled client subsystem.

Another object of the present invention is to provide client-side and server CPIR-enabling Java Applets for enabling the consumer product information searches at virtually any consumer point of presence on the WWW by performing a single mouse-clicking operation.

Another object of the present invention is to provide a novel Internet-based system and method, wherein a plurality of publisher-operated client subsystems (i.e. manufacturer-operated client subsystems) are connected to a local or wide area TCP/IP-based network, for the purpose of enabling different departments within the publishing organization (e.g. advertising, world news, business, technology, sports, finance, education, arts and leisure, etc.) manage different types of UPN/URL links based on the type of information contained within the URL-specified information resource on the WWW.

Another object of the present invention is to provide a novel Internet-based system and method, wherein each publisher is provided with a computer-based publishing system, which enables the electronic layout of: (i) a Web-based publication (e.g. expressible in HTML or SGML code) having different content and advertising sections associated with each Web-page thereof and each such Web-page being located on the WWW at a particular URL; and (ii) a print-media based publication (e.g. expressible in a desired font) having different content sections and advertising sections associated with each printed-page thereof, wherein each such content section and advertising section is assigned a Universal Product Number (UPN) which is symbolically linked to a particular content or advertising section on the corresponding Web-page.

Another object of the present invention is to provide a novel Internet-based system and method, wherein the computer-based publishing subsystem is capable of automatically generating UPN/URL data link tables listing the URLs of each Web page symbolically linked to the UPN assigned to a corresponding printed media page, and that such UPN/URL data link tables are transportable to a UPN/URL database management subsystem using electronic data interchange techniques, thereby enabling consumers (e.g. readers) to link from print-media to corresponding Web-based media using the UPNs printed on documents and the like only moments after the Web and print publications have been approved for publishing and sent to a http server and printing press, respectively.

Another object of the present invention is to provide a novel Internet-based consumer product information system and method for use in retail shopping environments, wherein each Web-enabled bar code driven consumer product information kiosk deployed therewithin embodies e-mail messaging capabilities which enable consumers to automatically save and link CPI-related Web documents as individual attachments to a preformatted e-mail message that is transmitted from a retailer-operated e-mail server, to a remote e-mail address specified by the consumer within the retail shopping environment.

Another object of the present invention is to provide a novel Internet-based consumer product information system and method for use in retail shopping environments, wherein each Web-enabled bar code driven consumer product information kiosk deployed therewithin embodies e-mail messaging capabilities which enable consumers to automatically save and record the URLs of CPI-related Web documents within the message field of a preformatted e-mail message that is transmitted from a retailer-operated e-mail server, to a remote e-mail address specified by the consumer within the retail shopping environment.

Another object of the present invention is to provide such novel Internet-based consumer product information system and method for use in retail shopping environments, wherein the e-mail envelope is addressed with the consumer/shopper's home, office or like e-mail address by either reading an e-mail address encoded within a bar code (or magnetic-stripe) structure or manually entering the same within the addressee field, and the stuffed e-mail envelope is transported to its destination by manual selection of a "send" button within the displayed e-mail envelope.

Another object of the present invention is to provide such a novel Internet-based consumer product information system and method, wherein one or more central e-mail servers are used to collect copies of e-mail documents (and records thereof) transmitted from the Web/e-mail enabled kiosks within each retail shopping environment, for consumer and demographic information analysis, compilation, and storage within RDBMSs that are made accessible to retailers and manufacturers alike for use in product marketing, sales forecasting, customer intelligence, and like operations which enable more effective marketing of consumer products and services in both physical and electronic forms of commerce.

Another object of the present invention is to provide each manufacturer with a novel consumer product information catalog subsystem (RDBMS) for storing and managing media-rich consumer product information content relating to each and every UPN-indexed product that the manufacturer makes, sells and/or distributes to retailers along the retail supply and demand chain.

Another object of the present invention is to provide a novel consumer product information catalog subsystem (RDBMS) which is realizable as a standalone database application supported on one or more client machines operably connected to the LAN or WAN of the manufacturer's enterprise, and or as a network database information server connected to the LAN or WAN and being accessible to various consumer product information managers working within the manufacturer's enterprise, and using Web-enabled client machines to carry out consumer product information content management operations across the enterprise, most likely under the supervision of one or more consumer product brand-managers, responsible for branding of such consumer products.

Another object of the present invention is to provide a novel consumer product information catalog subsystem (RDBMS) for use within an Internet-based consumer product information management, distribution and serving system, wherein one or more computer programs (e.g. scripts) are provided in the RDBMS for the purpose of (i) analyzing the information fields of the RDBMS, (ii) to automatically generate a set of UPN/URL/Trademark/Product-Descriptor data links for each UPN-indexed product with the RDBMS, (iii) locally store each such set of UPN/URL/Trademark/Product-Descriptor data links within the RDBMS, and (iv) ultimately electronically data transport each such set of data links to a UPN/URL Database Management Subsystem employed within a consumer product information management, distribution and serving system realized over the Internet.

Another object of the present invention is to provide brand-managers with a novel set of consumer product information management tools that can easily be used within the manufacturer's enterprise in a way which provides the brandmanager with the choice of either storing the URLs of consumer product related information, and also the actual information file content thereof if such multi-media information content is within the control of the manufacturer's operations, or copyable into the RDBMS under its supervision control.

These and other objects of the present invention will become apparent hereinafter and in the claims to Invention

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, wherein:

FIGS. 2-1 and 2-2 show a schematic diagram of the consumer-product information collection, transmission and delivery system of the illustrative embodiment hereof shown embedded with the infrastructure of the global computer communications network known as the "Internet", and comprising a plurality of data-synchronized Internet Product Directory (IPD) Servers connected to the infrastructure of the Internet, a UPN/URL Database Management Subsystem (i.e. UPN/URL Database) connected to one or more of the IPD Servers and one or more globally-extensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of manufacturer-related electronic-commerce (EC) information servers for hosting EC-enabled stores or EC-enabled on-line catalogues of manufacturers, a plurality of retailer-related electronic-commerce (EC) information servers for hosting EC-enabled stores or EC-enabled on-line catalogues of retailers, a plurality of Internet Product-Information (IPI) Servers connected to the infrastructure of the Internet for serving consumer-product related information to consumers in retail stores and at home, a central e-mail RDBMS for receiving and storing copies of e-mail transmissions from retailer-store based kiosks to e-mail addresses of consumer accessing consumer product information therewith in retail shopping environments, a plurality of Client Subsystems connected to the infrastructure of the Internet and allowing manufacturers to transmit consumer-product related information to the Web-based Document Server for collection and retransmission to the IPD Servers, and a plurality of Client Subsystems connected to the infrastructure of the Internet and allowing consumers in retail stores and at home to request and receive consumer-product related information from the IPD Servers;

FIG. 2A' is a schematic diagram illustrating the flow of information along the consumer-product supply and demand chain, similar to that shown in FIG. 2A, except that as shown in FIG. 2A', each manufacturer transmits to the UPN/URL Database Management Subsystem (realized as a massive data warehouse) one or more information resource files (IRFs) which are symbolically linked to a particular UPN-encoded product, and that each IRF is then stored as a Web-based document on an Internet information server at predesignated URL, symbolically linked to the UPN, so that consumers can use the UPN to access a menu of URLs symbolically linked thereto for display of the corresponding Web-documents;

FIG. 2B1 is a block schematic diagram of the IPD Server of the first illustrative embodiment, showing its subsystem components, namely: a relational database management subsystem (RDBMS) server and a Java Web Server with Java servlet support, being accessed by a Java-enabled client machine seeking to access consumer product related information from the RDBMS server using server-side Java Applets whose HTML tags are embedded within HTML-encoded documents served to the client machine from any one of a number of potential http information servers on the Internet;

FIG. 2B2 is a block schematic diagram of the IPD Server of the second illustrative embodiment, showing its subsystem components, namely: a relational database management subsystem (RDBMS) server and a Java Web Server with CGI script support, being accessed by a Java-enabled client machine seeking to access consumer product related information from the RDBMS server using client-side Java Applets whose HTML tags are embedded within HTML-encoded documents served to the client machine from any one of a number of potential http information servers on the Internet;

FIG. 2B3 is a block schematic diagram of the IPD Server of the third illustrative embodiment, showing its subsystem components, namely: a relational database management subsystem (RDBMS) server and a Java Web Server being accessed by a Java-enabled client machine seeking to access consumer product related information from the RDBMS server using (i) a socket connection between the client machine and the Java Web server and (ii) client-side Java Applets whose HTML tags are embedded within HTML-encoded documents served to the client machine from any one of a number of potential http information servers on the Internet;

FIG. 2B4 is a block schematic diagram of the IPD Server of the fourth illustrative embodiment, showing its subsystem components, namely: a relational database management subsystem (RDBMS) server and a Java Web Server being accessed by a Java-enabled client machine seeking to access consumer product related information from the RDBMS server using (i) a Remote Method of Invocation (RMI) and (ii) client-side Java Applets whose HTML tags are embedded within HTML-encoded documents served to the client machine from any one of a number of potential http information servers on the Internet;

FIG. 2C1 is a schematic representation of the GUI of an exemplary computer operating system (OS), on which the UPN/URL data linking function of the present invention is schematically depicted showing a GUI-based window associated with a content-creating application (e.g. Netscape Navigator browsing program), a GUI-based window associated with a UPN/URL link management application (e.g., MicroSoft Access or SQL RDBMS program), and the UPN/URL data link GUI displaying the UPN/URL data links between Web documents and a set of UPN-encoded consumer products being managed within the UPN/URL link management application;

FIG. 2E1 is a schematic representation of the split-screen GUI associated with the computer-based publishing software program of the present invention operated in its composition/editorial mode, and having integrated UPN/URL data linking functionalities, showing the layout of a Web-based publication on the left-side of the GUI, and a print-media based publication on the right-side of the GUI;

FIG. 2E2 is a schematic representation of the split-screen GUI associated with the computer-based publishing software program of the present invention operated in its UPN/URL data linking mode, showing the layout of a Web-based publication on the left-side of the GUI, and a print-media based publication on the right-side of the GUI;

FIG. 2E3 is a schematic representation of an exemplary UPN/URL data link table generated during the UPN/URL data link generation mode of operation, and subsequently transported to the UPN/URL database management subsystem of the present invention;

FIG. 2E4 is a schematic representation of the GUI of an exemplary computer operating system (OS), on which the OS-based UPN/URL data linking function of the present invention is schematically depicted in its compositional/editorial mode, showing a GUI-based window associated with a first arbitrary content-creating application (e.g. Netscape Navigator browsing program), a GUI-based window associated with a second arbitrary content-creating application (e.g., Adobe® Illustrator graphics program), and the UPN/URL data linking GUI enabling the author to create UPN/URL data links between Web documents and UPN-encoded print-documents;

FIG. 2E5 is a schematic representation of the GUI of an exemplary computer operating system (OS), on which the OS-based UPN/URL data linking function of the present invention is schematically depicted in its UPN/URL Data Linking Mode, showing a GUI-based window associated with a first arbitrary content-creating application (e.g. Netscape Navigator browsing program), a GUI-based window associated with a second arbitrary content-creating application (e.g. Adobe® Illustrator graphics program), and the UPN/URL data linking GUI enabling the author to create UPN/URL data links between Web documents and UPN-encoded print-documents;

FIG. 3A1 is a graphical representation of a first illustrative embodiment of the client computer system of the present invention, designed for use in desktop environments at home, work and play;

FIG. 3A2 is a graphical representation of a second illustrative embodiment of the client computer system of the present invention realized in the form of a bar code driven multi-media kiosk, designed for use as a "virtual or Cyber sales agent" in retail shopping environments, such as department stores, supermarkets, superstores, retail outlets and the like;

FIG. 3A3 is a graphical representation of a third illustrative embodiment of the client computer system of the present invention realized in the form of a bar code driven multi-media kiosk, designed for use as a "Cyber sales agent" in retail shopping environments such as department stores, supermarkets, superstores, retail outlets and the like, and shown as having an integrated "cord-connected" type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention;

FIG. 3A3' is a graphical representation of the bar code driven multi-media kiosk shown in FIG. 3A3, wherein the laser scanning projection-type bar code symbol reader is removed from its support stand, by pulling its connector cable out of its cable take-up unit, and used to read a bar code symbol on a product located at a relatively short distance away from the kiosk;

FIG. 3A4 is a graphical representation of a fourth illustrative embodiment of the client computer system of the present invention realized in the form of a bar code driven multi-media kiosk, designed for use as a "Cyber sales agent" in retail shopping environments such as department stores, supermarkets, superstores, retail outlets and the like, and shown as having an integrated "cordless" type laser scanning bar code symbol reader disposed overhead its LCD touch-screen panel, a telephone handset for carrying out telephone calls, and a credit card transaction terminal for conducting consumer purchase transactions and other forms of electronic commerce while using the consumer product information finding system of the present invention;

FIG. 3A4' is a graphical representation of the bar code driven multi-media kiosk shown in FIG. 3A4, wherein the laser scanning projection-type bar code symbol reader is removed from its support stand and used to read a bar code symbol on a product located a relatively short distance away from the kiosk;

FIG. 3A5 is a graphical representation of a fifth illustrative embodiment of the client computer system of the present invention realized in the form of a consumer product information access terminal, designed for use as a "sales agent's tool" at a point-of-sale (POS) station in retail shopping environments, wherein the information access terminal has a bar code symbol reader integrated with the POS station for reading the UPC numbers on consumer products being offered for sale in the store, and also a LCD screen capable of being mounted in various viewing positions for displaying consumer product-related information accessed from a centralized database interconnected to the Internet;

FIG. 3A6 is a graphical representation of a sixth illustrative embodiment of the client computer system of the present invention realized in the form of a bar code driven multi-media kiosk, which is completely transportable within the store by the hand of a shopper for shopping convenience in retail environments such as department stores, supermarkets, superstores, retail outlets and the like;

FIG. 3A7 is a graphical representation of a seventh illustrative embodiment of the client computer system of the present invention realized in the form of a bar code driven multi-media kiosk, mounted upon a shopping cart or other vehicle for shopping convenience in retail environments such as department stores, supermarkets, superstores, retail outlets and the like;

FIG. 3A8 is a schematic representation of another embodiment of the transportable bar code driven product information access terminal of the present invention, realized using a Newton MessagePad 130 equipped with Nethopper http client software and a Motorola RF modem PCMCIA card, for wireless access to the Internet;

FIG. 3A9 is a schematic representation of the e-mail enabled consumer product information transport subsystem of the present invention, wherein each bar code driven kiosk located on a local or wide area network within a retail shopping environment is provided with e-mail based consumer product information transport mode of operation which enables a consumer, accessing consumer product information on the WWW within the shopping environment, to (i) capture, save and attach the same to an e-mail envelope which can be automatically addressable to the consumer's home or like e-mail address in response to the consumer presenting a bar coded (or mag-stripe encoded) customer loyalty/courtesy card to be automatically read at the kiosk, (ii) transport the envelope to the consumer's e-mail address, and (iii) transport a copy of each such e-mail transaction to a central e-mail database server for consumer market research and related operations;

FIG. 3A10A is a schematic representation of the illustrative embodiment of the e-mail enabled consumer product information transport subsystem of the present invention comprising a plurality of bar code driven kiosks connected to a retail store based local wide area network, and a retailer/local e-mail server for enabling e-mail based consumer product information transport services on each such kiosk;

FIG. 3A10B is a schematic representation of the IPI finding and serving subsystem of the present invention, wherein a plurality of web/e-mail enabled kiosks are mounted to the shelving system installed within a "brick of mortar" type retail shopping environment;

FIG. 3A10C is an elevated site view of the first web/e-mail enabled kiosk shown in FIG. 3A10B; wherein the kiosk is arranged so that the bar code symbol reading device integrated therewith projects a laser scanning field from below the touch-type LCD screen panel thereof;

FIG. 3A10D is an elevated side view of the second web/e-mail enabled kiosk shown in FIG. 3A10B, wherein the kiosk is arranged so that the bar code symbol reading device integrated therewith projects a laser scanning field from above the touch-type LCK screen panel thereof;

FIG. 3A11 is a schematic representation of an exemplary relational database structure maintained within the retailer RDBMS connected to the central e-mail server shown in FIGS. 3A9 and 3A10A;

FIG. 3A12 is a schematic representation of an exemplary relational database structure maintained within the manufacturer RDBMS connected to the central e-mail server shown in FIGS. 3A9 and 3A10A;

FIGS. 3A13A through 3A13C, taken together, show a high-level flow chart for the first illustrative embodiment of the consumer product information (CPI) transport method of the present invention, setting forth the steps carried out when a consumer accesses consumer information from a Web/e-mail enabled bar code driven kiosk within a retail shopping environment, and transports the same to the e-mail address of the consumer at home, work or on the road;

FIG. 3A14 is a schematic representation of an exemplary graphical user interface (GUI) displayed on the bar code driven consumer product information kiosk of the present invention when the CPI transport service of FIGS. 3A13A through 3A13C is being performed;

FIGS. 3A15A through 3A15C, taken together, show a high-level flow chart for the second illustrative embodiment of the CPI transport method of the present invention, setting forth the steps carried out when a consumer accesses consumer information from a Web/e-mail enabled bar code driven kiosk within a retail shopping environment, and transports the same to the e-mail address of the consumer at home, work or on the road;

FIG. 3A16 is a schematic representation of an exemplary graphical user interface (GUI) displayed on the bar code driven consumer product information kiosk of the present invention when the CPI transport service of FIGS. 3A15A through 3A15C is performed;

FIG. 3A17 is a schematic representation of the consumer product promotion/advertisement delivery subsystem of the present invention, which is integrated within the overall infrastructure of the high-level system depicted in FIGS. 2-1 and 2-2, and enables the management of Web-based consumer product advertisements created by manufacturers, agents thereof and also retailers alike, and delivery of the same to consumers within physical retail environments using wireless Web-based product promotion/advertising kiosks connected to a TCP/IP-based information network installed therewithin in order to deliver such product advertisements to retail shopping environments from various Internet information servers connected to the infrastructure of the Internet;

FIG. 3A18 is a schematic representation of the consumer product promotion/advertisement delivery subsystem of FIG. 3A17, wherein each retailer-operated Web-based product promotion kiosk on the information network simultaneously displays (i) a product advertisement, (ii) a promotion message related to the advertised product and (iii) the instructions on where to find the advertised product in the shopping environment in accordance with an preprogrammed product advertisement schedule managed by the retailer or agent thereof using a retailer-operated administration computer (i.e. client machine);

FIG. 3A19A is a schematic representation of a database of URLS associated with consumer product advertisements that are symbolically linked to UPNs of consumer products offered for sale in retail shopping environments and which are advertised on Web-based product promotion kiosks installed within the given retail shopping environment;

FIG. 3A19B is a schematic representation of a database of information resource files (IRFs) corresponding to consumer product advertisements that are symbolically linked to the UPNs of consumer products offered for sale in retail shopping environments and which are advertised on Web-based product promotion kiosks installed within the given retail shopping environment;

FIG. 3A19C is a schematic representation of one of the Web-based promotion kiosks installed within the retail shopping LAN of FIGS. 3A17 and 3A18, wherein integrated CCD sensors are provided for automatically capturing images of scenery with the field of view of the kiosk and processing the same to detect the presence of human eyes glazing at the display surface of the kiosk, and wherein each detected pair of eyes is symbolically linked with the UPN of the consumer product being promoted by the kiosk at the time of eye gaze detection, for subsequent comparison with data collected at retail-based POS stations during the purchase of UPN-labeled products within the retail store on the same date as the promotion of the UPN-labeled product on the product promotion kiosk;

FIG. 3A19D is a schematic block diagram of the Web-based product promotion kiosk schematically depicted in FIG. 3A19C, showing the various subsystem and subcomponents employed therewithin which collectively enable the various functionalities of the kiosk;

FIG. 3A20 is a schematic representation of an exemplary consumer product promotion/advertisement delivery subsystem of FIGS. 3A17 and 3A18, installed within an exemplary retail shopping network, wherein the retailer-operated administration computer system can be used by retailer management to schedule specific product advertisements and promotions throughout particular retail stores;

FIG. 3A21A is a schematic representation of an exemplary frame-work style browser GUI, displayed on each Web-based product promotion kiosk of FIG. 3A19C, and comprising (i) a display frame for displaying the retailer's identity/image, typically set by the retailer or agent thereof), (ii) a display frame for displaying an advertisement of a particular UPN-labeled product registered with the subsystem, typically set by the product manufacturer and/or agent thereof, (iii) a display frame for displaying a promotional message about the advertised product, typically set by the retailer, and (iv) a display frame for displaying the location of the advertised product in the physical retail store or within the retailer's EC-enabled store (e.g. made accessible within the retail store), and typically set by the retailer, as shown in FIG. 3A23;

FIGS. 3A22A and 3A22B, taken collectively, set forth a flow chart describing the steps involved in installing and configuring the consumer product promotion/advertisement delivery subsystem of FIGS. 3A17 and 3A18 for operation within an exemplary retail shopping environment;

FIG. 3A23 is a schematic representation of a Product Promotion Programming Table for an arrangement of product promotion kiosks within a particular retail store, set by a retail manager or administrator using a Web-based client computer located within a particular retail store or some remote location (e.g. retailer's corporate headquarter, branch sales office, etc.), so that particular Web-based product promotion kiosks within the subsystem will display particular advertisements and promotions in accordance with a schedule designed to maximize sales of particular products within a particular retail store;

FIG. 3A24 is a schematic representation of an exemplary product promotion performance report produced by the consumer product promotion/advertisement delivery subsystem of FIGS. 3A17 and 3A18 in order to inform retail management how many shoppers on a given day within a particular retail shopping environment gazed at a particular product advertisement/promotion and actually purchased the advertised product within the retail store, either at a physical POS station or consumer product information kiosk therewithin (as shown in FIGS. 3A2 through 3A8);

FIG. 4A1 is a schematic representation of the relational-type IPI Registrant Database maintained by each IPD Server configured into the system of the illustrative embodiment of the present invention, showing the information fields for storing (i) the information elements representative of the UPN (e.g. UPC data structure, EAN data structure, and/or National Drug Code (NDC) data structure), URLs, trademark(s) ($TM_i$), Company Name (CNi) and company address, Product Description ($PD_i$), E-Mail Address ($EMA_i$) thereof symbolically-linked (i.e. related) for a number of exemplary IPI Registrants listed (i.e. registered) with the IPI Registrant Database maintained by each IPD Server, image files for registered consumer products, and consumer product information request (CPIR) enabling Applets for access by retailers, wholesalers, advertisers, Web publishers, and the like, and insertion within the HTML code of Web documents on various types of Internet information servers hosting WWW sites, as well as EC-enabled WWW-sites, EC-enabled stores and/or on-line e-commerce product catalogues, so that when executed, these CPIR-enabling Applets automatically access a categorized URL menu containing URLs (identified in FIG. 4A2) specifying the location of manufacturer-linked information resources on the Internet pertaining to a particular UPN-labeled product;

FIG. 4A2 is a schematic representation of the information subfield structure of the URL Information Field of the IPI Database of FIG. 4A1, showing the Product Advertisement Information Field, the Product Specification (Description/Operation) Information Field, the Product Update Information Field, the Product Distributor/Reseller/Dealer Information Field, the Product Warranty/Servicing Information Field, the Product Incentive Information Field thereof, the Product Review Information Field, the Related Products Information Field, and Miscellaneous Information Fields detailed hereinafter;

FIG. 4B is a schematic representation of the relational-type Non-IPI Registrant Database maintained by each IPD Server that is configured into the IPI Finding and Serving Subsystem of the illustrative embodiment of the present invention, showing the information fields for storing (i) the information elements representative of the Company Name (CNi) and Company Address, Trademark(s) ($TM_i$) registered by the associated Company, E-Mail Address ($EMA_i$) thereof symbolically-linked for a number of exemplary Non-IPI registrants listed within the Non-IPI Registrant Database maintained by each IPD Server, and CPIR enabling Applets for access by retailers, wholesalers, advertisers, Web publishers, and the like, and insertion within the HTML code of Web documents on various types of Internet information servers hosting WWW sites, as well as EC-enabled WWW-sites, EC-enabled stores and/or on-line e-commerce product catalogues, for the purpose described above;

FIG. 4C1 is a schematic representation illustrating the information fields of the table entitled "Manufacturer" used in the RDBMS shown in FIGS. 4A1 and 4A2 hereof, FIG. 4C2 is a schematic representation illustrating the information fields of the table entitled "Consumer Product" used in the RDBMS shown in FIGS. 4A1 and 4A2 hereof;

FIG. 4C3 is a schematic representation illustrating the information fields of the table entitled "Information Resources on the WWW" used in the RDBMS shown in FIGS. 4A1 and 4A2 hereof, FIG. 4D is a schematic representation illustrating the information fields of the table entitled "Retailer" used in the RDBMS shown in FIGS. 4A1 and 4A2 hereof, FIGS. 4E1 and 4E2, taken together, provide a high-level flow chart describing the steps involved in the first illustrative method of creating, loading, distributing, embedding, displaying, and executing "server-side" consumer product information request (CPIR) enabling Applets when using the system architecture and servlet-based search and display mechanism schematically depicted in FIG. 2B1, enabling consumers to automatically search the RDBMS for consumer product information related to a particular UPN-specified product while visiting EC-enabled stores and other WWW sites without disturbing the point of presence of the consumer;

FIG. 4F1 is a schematic representation illustrating the method of FIGS. 4E1 and 4E2 being carried out using certain subcomponents of the system depicted in FIGS. 2-1, 2-2, and 2B1, in particular;

FIG. 4F2 is a schematic representation illustrating in greater detail the Applet-embedding step of the method of FIGS. 4E1 and 4E2, carried out using certain subcomponents of the system depicted in FIGS. 2-1 and 2-2;

FIGS. 4G1 and 4G2, taken together, provide a high-level flow chart describing the steps involved in the second illustrative method of creating, loading, distributing, embedding, displaying, and executing "client-side" consumer product information request (CPIR) enabling Applets when using the system architecture and Applet/CGI-based search and display mechanism schematically depicted in FIG. 2B2, enabling consumers to automatically search the RDBMS for consumer product information related to a particular UPN-specified product while visiting EC-enabled stores and other WWW sites without disturbing the point of presence of the consumer;

FIG. 4H1 is a schematic representation illustrating the method of FIGS. 4G1 and 4G2 being carried out using certain subcomponents of the system depicted in FIGS. 2-1, 2-2, and 2B2, in particular;

FIG. 4H2 is a schematic representation illustrating in greater detail the Applet-embedding step of the method of FIGS. 4G1 and 4G2, carried out using certain subcomponents of the system depicted in FIGS. 2-1 and 2-2;

FIGS. 4I1 and 4I2, taken together, provide a high-level flow chart describing the steps involved in the second illustrative method of creating, loading, distributing, embedding, displaying, and executing "client-side" consumer product information request (CPIR) enabling Applets when using the system architecture and Applet/socket-based search and display mechanism schematically depicted in FIG. 2B3, enabling consumers to automatically search the RDBMS for consumer product information related to a particular UPN-specified product while visiting EC-enabled stores and other WWW sites without disturbing the point of presence of the consumer;

FIG. 4J1 is a schematic representation illustrating the method of FIGS. 4I1 and 4I2 being carried out using certain subcomponents of the system depicted in FIGS. 2-1, 2-2, and 2B3, in particular;

FIG. 4J2 is a schematic representation illustrating in greater detail the Applet-embedding step of the method of FIGS. 4I1 and 4I2, carried out using certain subcomponents of the system depicted in FIGS. 2-1 and 2-2;

FIGS. 4K1 and 4K2, taken together, provide a high-level flow chart describing the steps involved in the fourth illustrative method of creating, loading, distributing, embedding, displaying, and executing "client-side" consumer product information request (CPIR) enabling Applets when using the system architecture and Applet/RMI-based search and display mechanism schematically depicted in FIG. 2B4, enabling consumers to automatically search the RDBMS for consumer product information related to a particular UPN-specified product while visiting EC-enabled stores and other WWW sites without disturbing the point of presence of the consumer;

FIG. 4L1 is a schematic representation illustrating the method of FIGS. 4K1 and 4K2 being carried out using certain subcomponents of the system depicted in FIGS. 2-1, 2-2, and 2B4, in particular;

FIG. 4L2 is a schematic representation illustrating in greater detail the Applet-embedding step of the method of FIGS. 4K1 and 4K2, carried out using certain subcomponents of the system depicted in FIGS. 2-1 and 2-2;

FIG. 4M1 is a graphical illustration of an Internet browser display screen that might be displayed on a client computer subsystem hereof while browsing the Library of CPIR-Enabling Java Applet (HTML tags) maintained within the UPN/URL RDBMS shown in FIGS. 2-1 through 2A, wherein the user (e.g. retail purchasing agent, product catalog manager, advertising agent, or whomever) is provided with the option of viewing and downloading, for each UPN-specified product in the system, an executable file containing the HTML tag for either a client-side or server-side type CPIR-enabling Java Applet associated therewith;

FIG. 4M2 is a graphical illustration of an Internet browser display screen that might be displayed on a client computer subsystem hereof while browsing a product-specific page of an on-line business-to-business consumer product catalog, wherein the user (e.g. retail purchasing agent, product catalog manager, advertising agent, or whomever) is provided with the option of viewing and downloading, for each UPN-specified product offered for sale in the on-line catalog, an executable file containing the HTML tag for either a client-side or server-side type CPIR-enabling Java Applet associated with the UPN-specified consumer product;

FIGS. 4N1 and 4N2 set forth graphical illustrations of Internet browser display screens that might be displayed on a client computer subsystem hereof while browsing a WWW information search engine or directory, such as Yahoo, Lycos, or Excite, looking for information on the WWW related to a particular consumer product, and launching a CPI search enabling GUI in accordance with the principles of the present invention by clicking on the (underlying) HTML tag of either client-side or server-side Applet embedded within the HTML code of the displayed WWW page associated with the search engine/directory;

FIGS. 4O1 and 4O2 set forth graphical illustrations of Internet browser display screens that might be displayed on a client computer subsystem hereof while shopping/browsing an EC-enabled storefront, looking for information on any consumer product which is carried within the retailer's EC-enabled store; and launching a CPI search enabling GUI in accordance with the principles of the present invention by clicking on the HTML tag of a client-side or server-side Applet embedded within the HTML code of the displayed E-store Web page;

FIGS. 4P1 and 4P2 set forth graphical illustrations of Internet browser display screens that might be displayed on a client computer subsystem hereof while shopping/browsing at a particular catalog page in an EC-enabled store, considering whether or not to make an on-line purchase of a particular consumer product displayed on the catalog page; and then initiating a UPN-directed CPI search according to the principles of the present invention by clicking on the HTML tag of a UPN-encoded client-side or server-side Applet embedded within the HTML code of the displayed catalog page;

FIGS. 4Q1 and 4Q2 set forth graphical illustrations of Internet browser display screens that might be displayed on a client computer subsystem hereof while visiting an on-line EC-enabled auction site (e.g. at http://www.ebay.com) when considering whether or not to place a bid on a particular consumer product displayed within the auction listings thereof, and then launching a CPI search enabling GUI in accordance with the principles of the present invention by clicking on the HTML tag of a URL-encoded client-side or server-side Applet embedded within the HTML code of the displayed on-line auction Web page;

FIGS. 4R1 and 4R2 set forth graphical illustrations of Internet browser display screens that might be displayed on a client computer subsystem hereof while shopping/browsing at a particular auction page in the EC-enabled auction site of FIGS. 4Q1 and 4Q2, considering whether or not to place at bid on a particular product up being auctioned, and then initiating a UPN-directed CPI search according to the principles of the present invention by clicking on the HTML tag of a UPN-encoded client-side or server-side Applet embedded within the HTML code of the displayed auction page;

FIGS. 4S1 and 4S2 set forth graphical illustrations of Internet browser display screens that might be displayed on a client computer subsystem hereof while browsing a WWW page of any business, organization or ongoing concern, seeing an Internet product or service advertisement of particular interest on the WWW page, and then initiating a UPN-directed CPI search according to the principles of the present invention by clicking on the HTML tag of a UPN-encoded client-side or server-side Applet embedded within the HTML code of the displayed WWW page;

FIG. 4S3 sets forth a graphical illustration of an Internet browser display screen that might be displayed on a client computer subsystem hereof in automatic response to a consumer selecting a URL displayed in the "Buy On The Web" URL category displayed on the Internet browser display screen of FIG. 4S2, thereby enabling the purchase of the advertised product or service at an EC-enabled store or product catalogue specified by the selected URL;

FIGS. 4T1 and 4T2 set forth graphical illustrations of Internet browser display screens that might be displayed on a client computer subsystem hereof while a consumer is reviewing the performance chart of a particular consumer product company displayed at a particular on-line electronic trading WWW site (e.g. http://www.etrade.com) considering whether or not to buy, keep or sell securities (e.g. stock or bonds) in this consumer product company, and eventually requests specific information about the company's products by initiating a trademark/company name-directed CPI search according to the principles of the present invention by clicking on the HTML tag of a trademark/company name-encoded CPIR-enabling Applet embedded within the HTML code of the displayed performance chart;

FIGS. 6D1 through 6D3, taken together, provide a high level flow chart illustrating the steps involved in carrying out the communication protocol shown in FIG. 5C when the IPI Finding and Serving Subsystem is in its Trademark-Directed Search Mode of operation;

FIG. 6E1 through 6E3, taken together, provide a high level flow chart illustrating the steps involved in carrying out the communication protocol shown in FIG. 5E when the IPI Finding and Serving Subsystem is in its Product-Description Directed Search Mode of operation;

FIG. 7 is a schematic representation of an exemplary embodiment of the IPI Finding and Delivery Subsystem of the present invention showing the various constituent subsystems thereof; and FIG. 8 is a schematic representation of a portfolio of Websites supported and managed by the UPN/URL database management subsystem with the assistance of the manufacturer/product registration subsystem and Web-enabled client subsystems operated by manufacturers and/or their agents in accordance with the information management principles of the present invention.

BEST MODES FOR CARRYING OUT THE INVENTION

Figure 1:
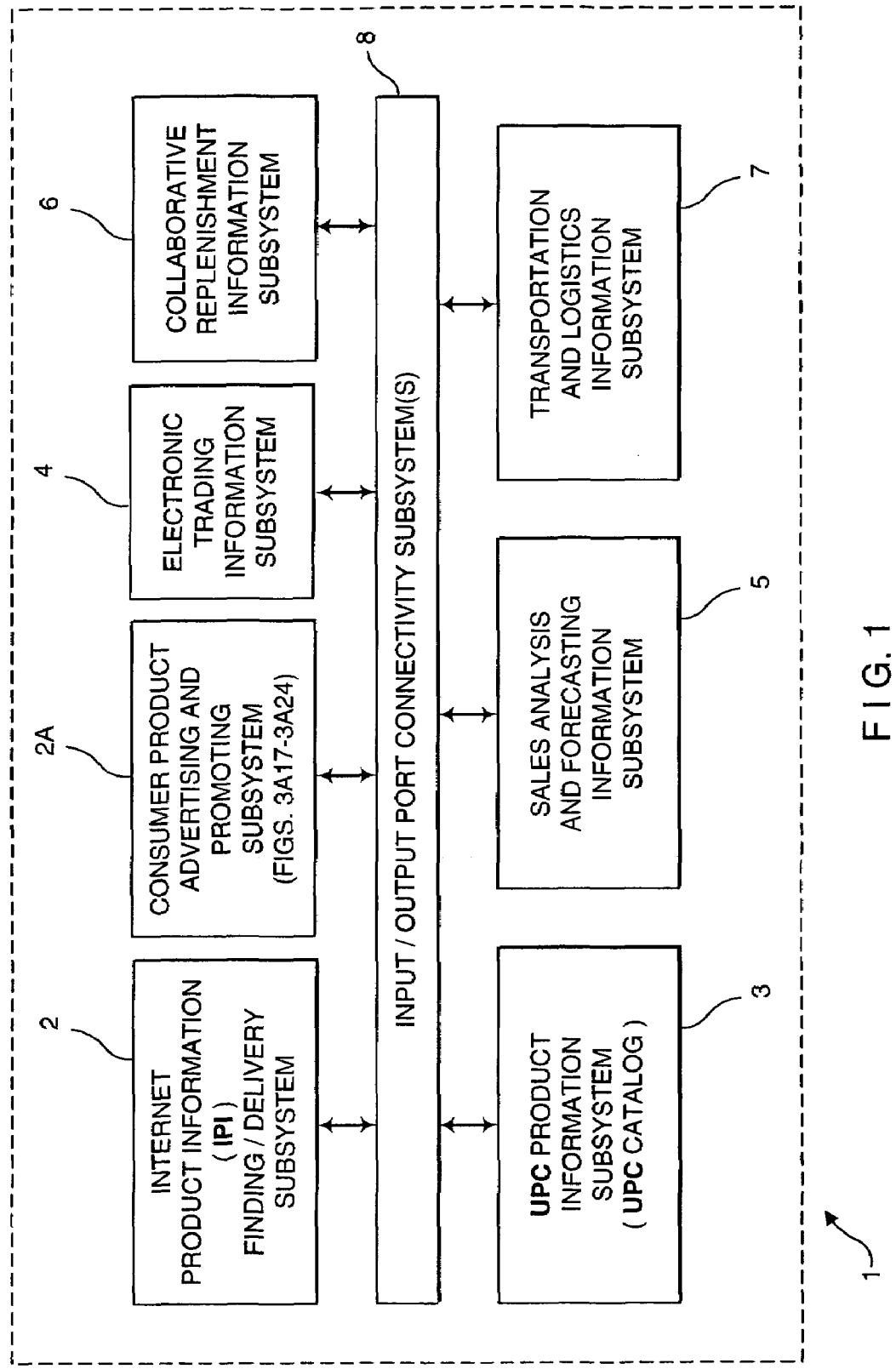
FIG. 1 is a schematic diagram illustrating the various information subsystems provided by the consumer-product information collection, transmission and delivery system of invention along the consumer-product demand chain, namely an Internet-based Product-Information (IPI) Finding and Serving Subsystem, a UPC-based Product-Information Subsystem ("UPC Catalog"), an Electronic Trading Information Subsystem, a Sales Analysis and Forecasting Information Subsystem, Collaborative Replenishment Information Subsystem, and a Transportation and Logistics Information Subsystem.

Referring to the accompanying Drawings, like structures and elements shown throughout the figures thereof shall be indicated with like reference numerals.

Overview of the System of the Present Invention

As illustrated in FIG. 1, the consumer-product information collection, transmission and delivery system of the present invention is generally indicated by reference numeral 1 and comprises an integration of information subsystems, namely: an IPI finding and serving subsystem 2 for allowing consumers to find product related information on the Internet (e.g. WWW) at particular Uniform Resource Locators (URLs), using UPC numbers and/or trademarks and tradenames symbolically-linked or related thereto; a Consumer Product Advertising and Promoting Subsystem 2A for advertising and promoting consumer products within physical retail shopping environments using Web-based product promotion kiosks, as shown in FIGS. 3A17 through 3A24; a UPC Product-Information Subsystem ("UPC Catalog") 3 for providing retailers with accurate up-to-date product information on numerous consumer-products offered for wholesale to retailers by manufacturers registering their products therewith; a Electronic Trading Information Subsystem 4 for providing trading partners (e.g. a manufacturer and a retailer) to sell and purchase consumer goods by sending and receiving documents (e.g. purchase orders, invoices, advance slip notices, etc.) to consummate purchase and sale transactions using either Value Added Network (VAN) based EDI transmission or Internet (e.g. HTTP, SMTP, etc.) based electronic document communications; a Sales Analysis and Forecasting Information Subsystem 5 for providing retailers with information about what products consumers are currently buying at retail stores or expect to be buying in the near future; Collaborative Replenishment Information Subsystem 6 for determining what products retailers can be buying in order to satisfy consumer demand at any given point in time; a Transportation and Logistics Information Subsystem 7 for providing retailers with information about when ordered products (purchased by retailers at wholesale) will be delivered to the retailer's stores; and Input/Output Port Connecting Subsystems 8 for interconnecting the input and output ports of the above-identified subsystems through the infrastructure of the Internet and various value-added EDI networks of global extent. Notably, unlike prior art supply chain management systems, the consumer-product information collection, transmission and delivery system of the present invention embraces the manufacturers, retailers, and consumers of UPC-encoded products, and not simply the manufacturers and retailers thereof. As will become apparent hereinafter, this important feature of the present invention allows manufacturers and retailers to deliver valuable product related information to the consumers of their products, thereby increasing consumer purchases, consumer satisfaction and consumer loyalty. Prior art supply chain management systems have no way or means of providing such information services to the consumers of UPC-encoded products along the consumer-product supply and demand chain.

Figures 1, 2:
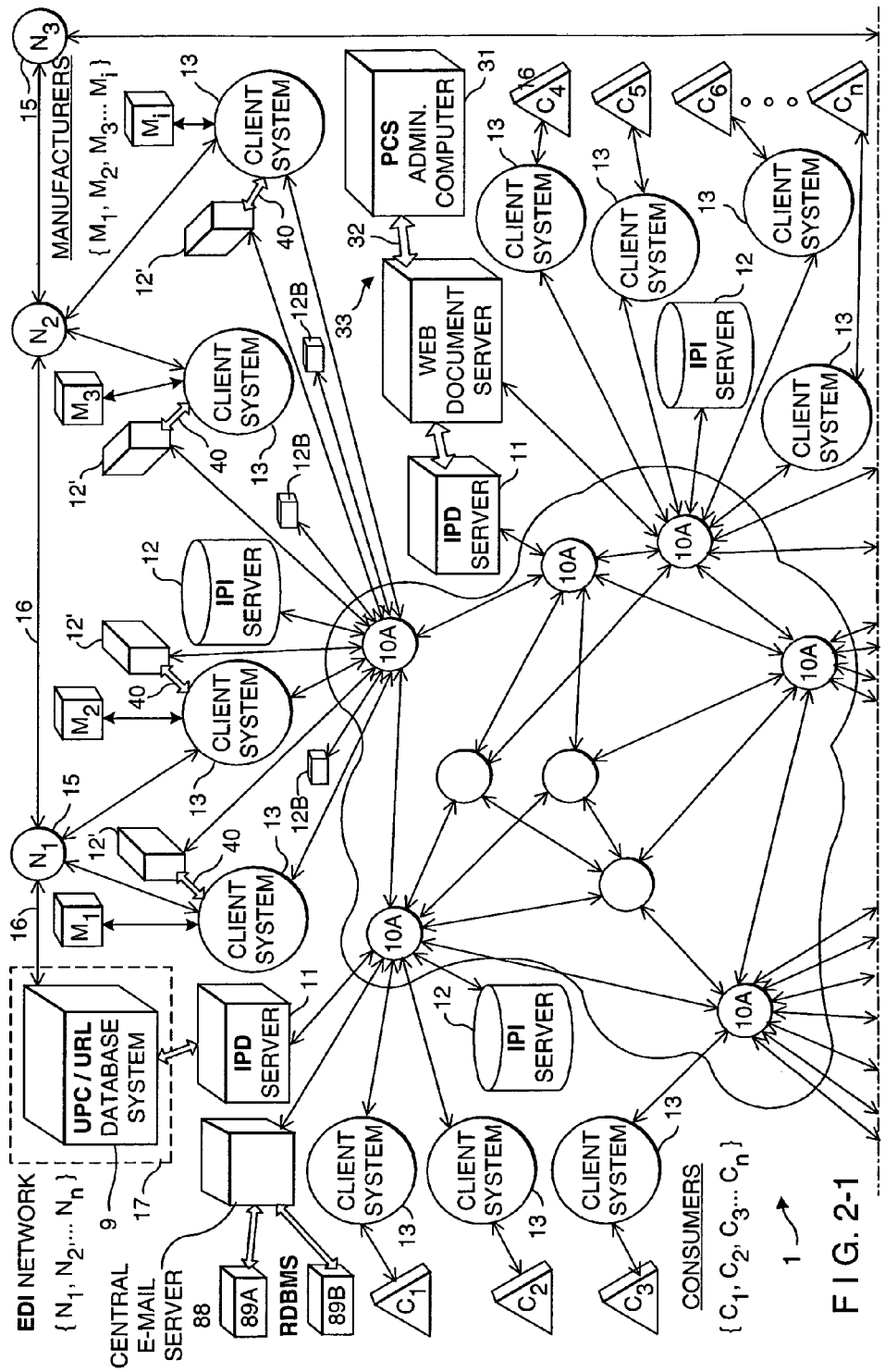
Figure 2:
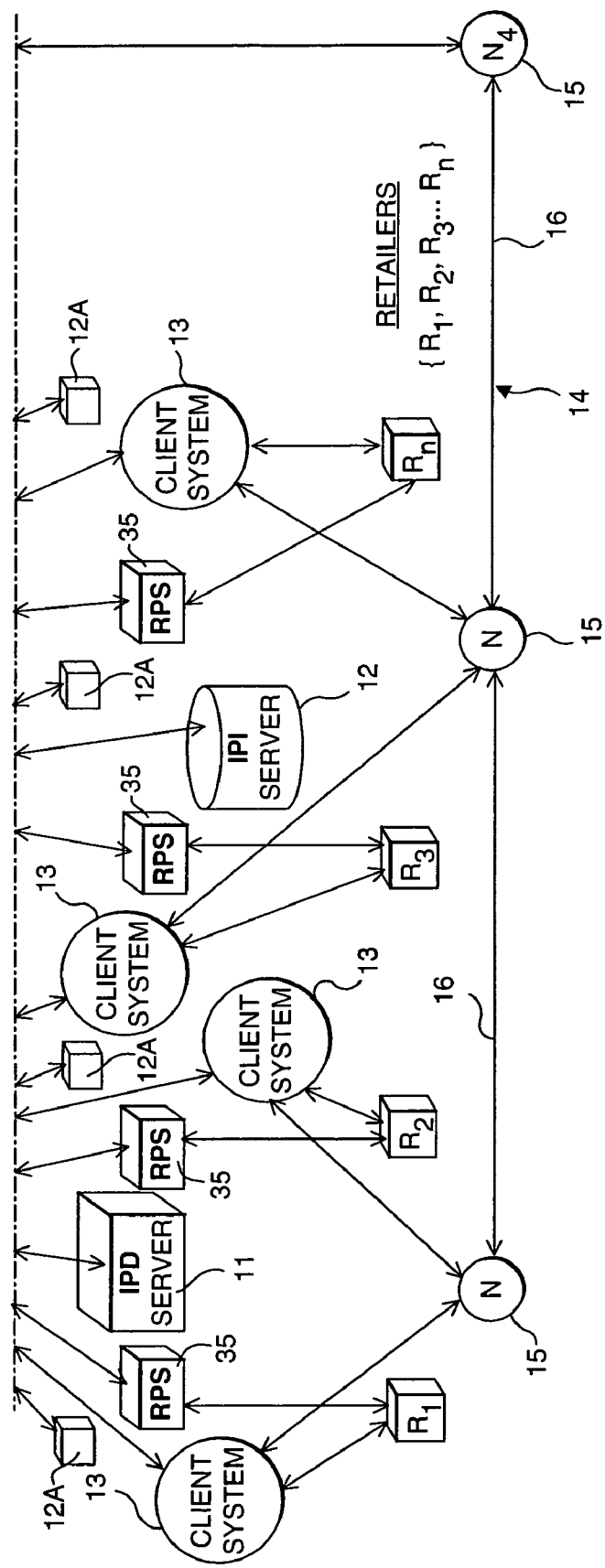
Figure 4C:
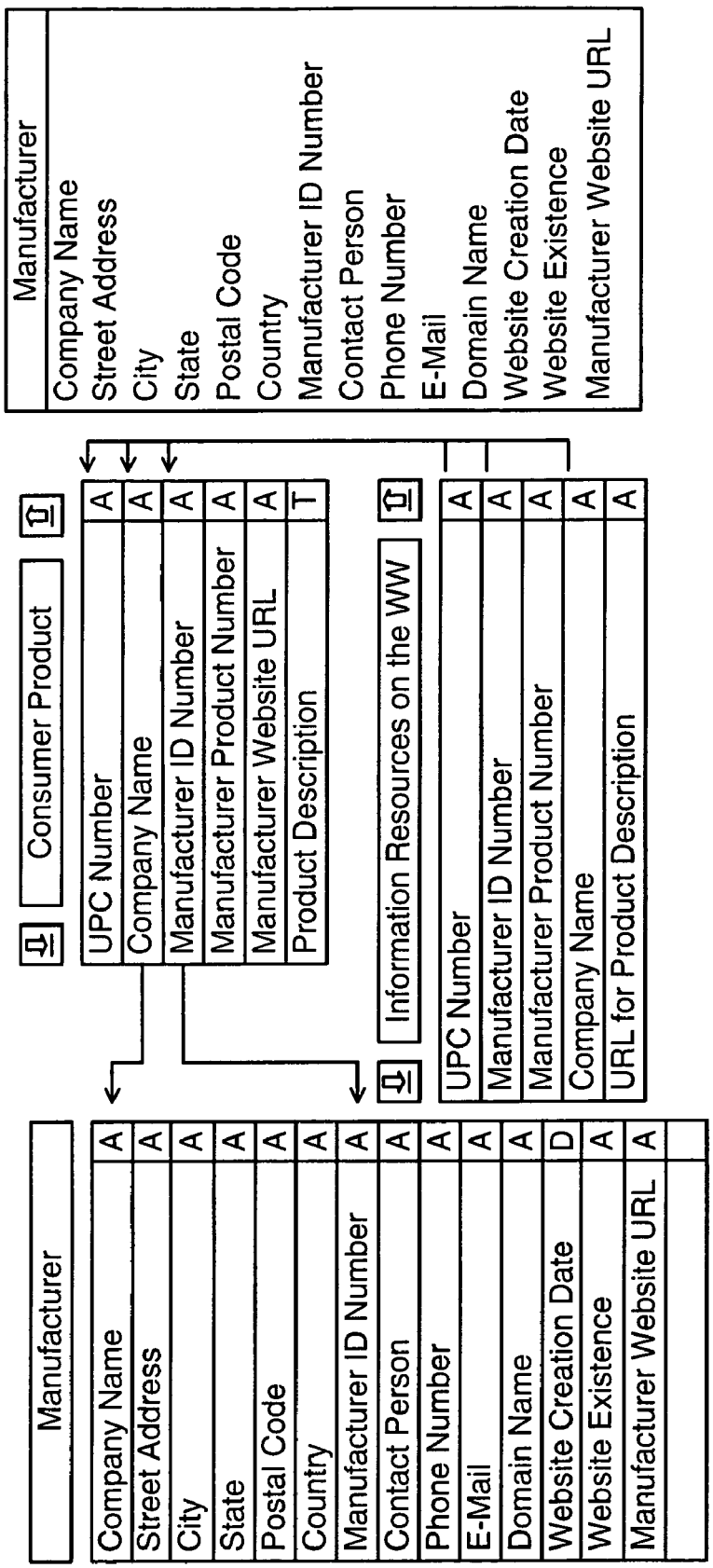
FIG. 4C is a schematic representation of the structure of a relational database management subsystem (RDBMS) used to carry out a best-mode embodiment of the IPI Registrant Database represented in FIGS. 4A1 and 4A2 hereof.
Figure 412:
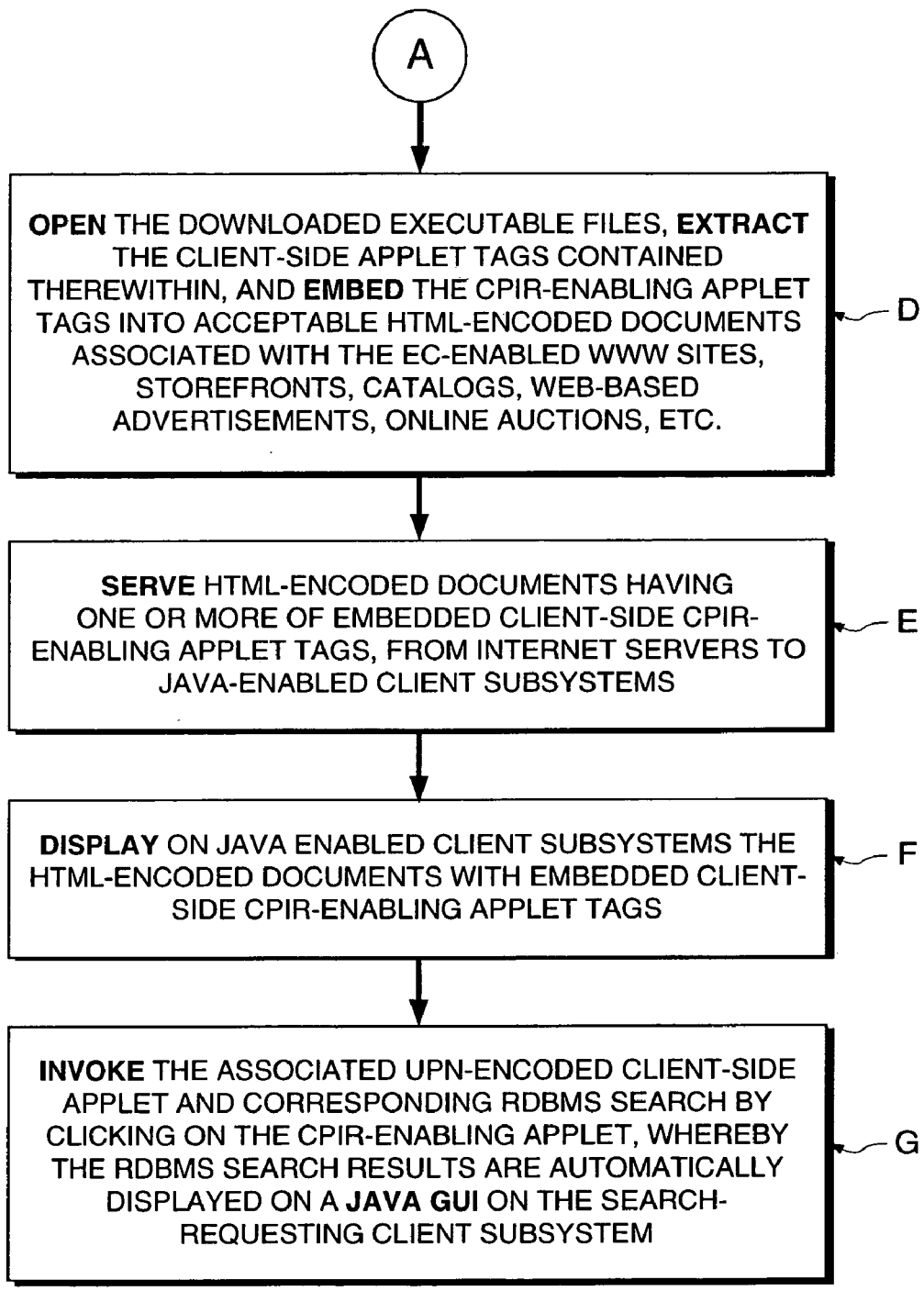
Figure 401:
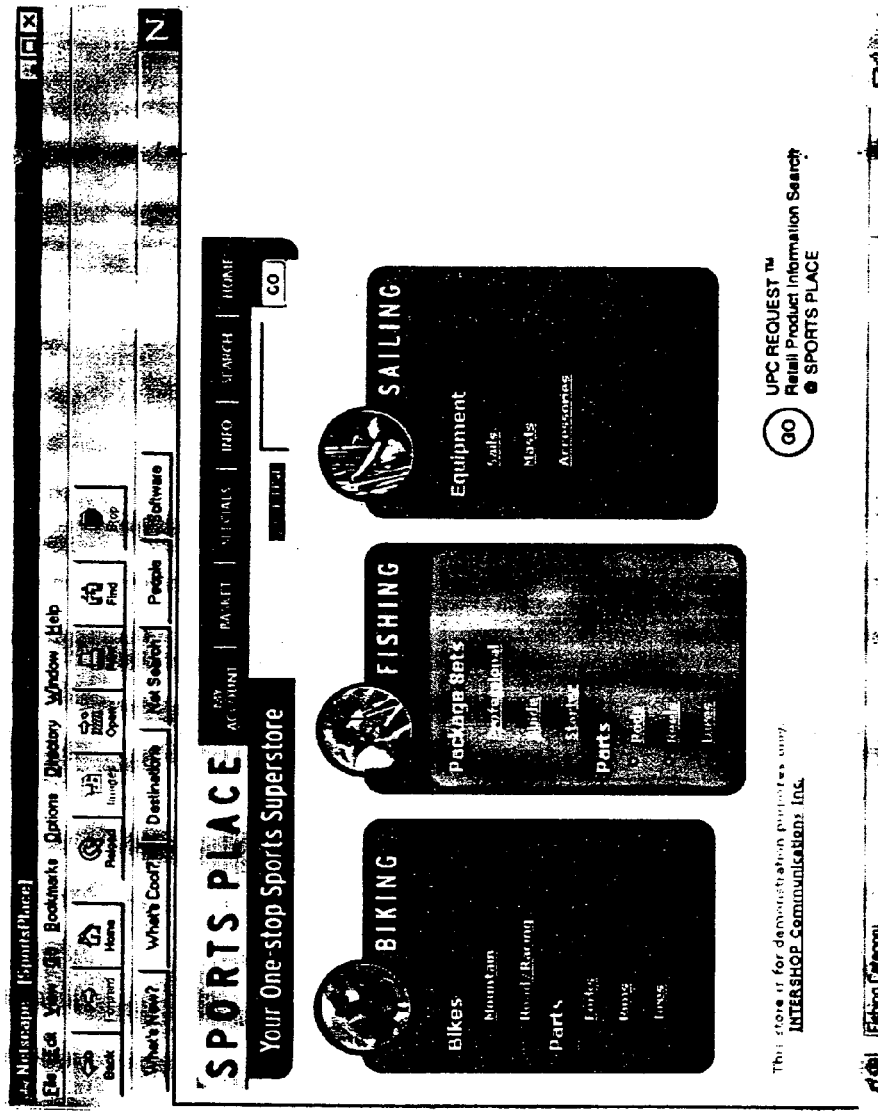
Figure 402:
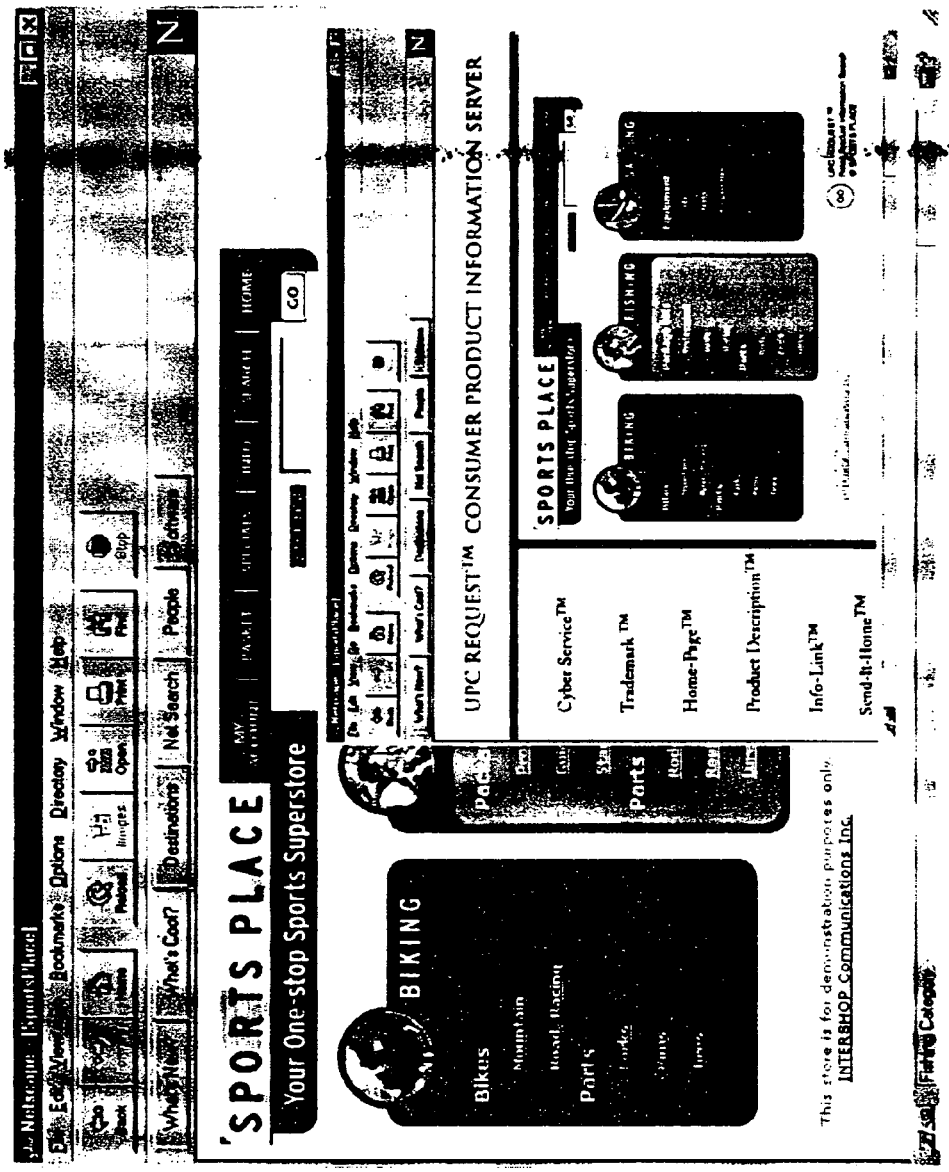

As shown in FIGS. 2-1 and 2-2, the consumer-product information collection, transmission and delivery system of FIG. 1 is realized as an arrangement of system components, namely: a central UPN/URL Database Management Subsystem 9 for storing and serving various types of consumer-product information to retailers, manufacturers and consumers alike (e.g., the name of the product's manufacturer; the Universal Product Code (UPC) or European Article Number (EAN) assigned to the product by the manufacturer; one or more URLs specifying the location of information resources on the Internet at which particular kinds of information relating to the consumer-product can be found; merchandise classification; style number; tradename; information specifying the size, color and other relevant characteristics of the consumer-product, where applicable; ordering criteria; availability and booking dates, etc.); a globally-based (packet-switched) digital telecommunications network (such as the Internet) 10 having an infrastructure including Internet Service Providers (ISPs), Network Service Providers (NSPs), routers, telecommunication lines, channels, etc., for supporting packet-switched type digital data telecommunications using the TCP/IP networking protocol well known in the art; one or more Internet Product Finding Directory (IPD) Servers, each indicated by reference numeral 11 and being connected to the Internet at strategically different locations via the Internet infrastructure 10 and data-synchronized with each other in order that each such Server maintains mirrored a relational-type database structure as represented in FIGS. 4A and 4B; a plurality of Internet Product-Information (IPI) Servers, each indicated by reference numeral 12 and being connected to the Internet via the Internet infrastructure; a plurality of retailer-related electronic-commerce (EC) information servers 12A, each operably connected to the infrastructure of the Internet, and enabling the hosting or one or more EC-enabled stores or EC-enabled on-line catalogues (i.e. EC-enabled WWW sites) owned, operated, managed and/or leased by one or more retailers along the retail supply and demand chain; a plurality of manufacturer-related electronic-commerce (EC) information servers 12B, each operably connected to the infrastructure of the Internet, and enabling the hosting or one or more EC-enabled stores or EC-enabled on-line catalogues (i.e. EC-enabled WWW sites) owned, operated, managed and/or leased by one or more manufacturers along the retail supply and demand chain; a plurality of User (or Client) Computers, each indicated by reference numeral 13, being connected to the Internet via the Internet infrastructure and available to consumers ($C_1$, $C_2$, $C_3$, ..., $C_i$); one or more data communication (i.e. EDI) networks 14, comprising data collection nodes 15 and communication links 16, operably connected to the centralized UPN/URL Database Management Subsystem 9, each Client Computer 13 available to a Manufacturer ($M_1, M_2, M_3, \ldots, M_j$) and Retailer ($R_1, R_2, R_3, \ldots, R_k$) within the retail supply and demand chain; a Web-based Document Server 30 connected to at least one of the IPD Servers 11 and the Internet infrastructure, for transferring documents and messages to remote Client Computer Systems during the registration of manufacturers and consumer products with the system hereof and periodically updating product-related information with the IPD Servers 11 in an automatic manner; and a Web-based Document Administration Computer 31 connected to the Web-based Document Server 30 by way of a TCP/IP connection 32, for administrating the registration of manufacturers and products with the system, initiating the transfer of consumer product related information (e.g. menu of URLs) between the remote Client Computer Systems and Web-Based Document Server 30, transferring such information to the IPD Servers 11, and maintaining local records of such information transfers and the like. As will become apparent hereinafter, Web-based Document Server 30 and Web-based Document Administration Computer 31 provide a subsystem for (i) managing the process of registering qualified manufacturers and their consumer products and related Web pages (e.g. UPC numbers and URLs), and (ii) updating the product-related information with the IPD Servers 11 in an automatic manner to ensure accurate links between UPNs and URLs within the UPN/URL Database Management Subsystem. The subsystem comprising the Web-based Document Server 30 and Web-based Document Administration Computer 31 shall be referred to as the Manufacturer/Product Registration Subsystem of the consumer product information finding and delivery subsystem 2 and indicated by reference numeral 33 throughout the figure drawings hereof.

Preferably, the centralized UPN/URL Database Management Subsystem 9 and at least one of the IPD Servers 11 are located at a secured information storage/processing center 17, along with a multiprocessor (or mainframe) computer system, information servers, routers, data communication lines, disk storage devices (e.g. RAIDs), tape drives and tape-library system, uninterrupted power supplies (UPS), and other peripheral technology to provide on-line, batch and back-up operations. However, the IPI Servers, the Client Computers and the other IPD Servers (if provided for database mirroring purposes), typically will be located throughout the world, as the distribution of manufacturers, retailers and consumers who are encouraged to use the system is scattered across the Planet.

In the illustrative embodiment, the Web-based Document Server 30 is a Windows NT Server running WebDox™ Server software from Premenos Corporation of Concord, Calif. The Windows NT Server can be realized using a suitable computer system having a Pentium® or higher CPU, 64 MB of RAM or higher, running (i) Microsoft Windows NT Server 4.0 or higher Operating System software from Microsoft Corporation, (ii) Microsoft Internet Information Server 2.0 or higher from Microsoft Corporation, and (iii) Microsoft SQL Server 6.5 or higher software from Microsoft Corporation. Also, the WebDox™ Server is provided with a dedicated Internet connection (i.e. ISDN or better) to the Internet infrastructure 10.

The EDI administration computer 31 is either a Windows 95 or Windows NT Computer system running WebDox Admin™ software from Premenos Corporation of Concord, Calif. The Windows 95 or Windows NT computer system 31 can be realized using a suitable computer system having an Intel 486 or higher CPU, 12 MB of RAM or higher, running Microsoft Windows 95 or Windows NT 4.0 or higher, and having a TCP/IP connection 31 to the WebDox™ Server 30.

In order to use the WebDox™ system, each remote Client Computer System 13 includes either a Windows 95 or Windows NT Computer system running WebDox Remote™ software from Premenos Corporation of Concord, Calif. The Windows 95 or Windows NT computer system 13 can be realized using a suitable computer system having an Intel 486 or higher CPU, 16 MB of RAM or higher, and a VGA monitor or better, and running (i) Microsoft Windows 95 or Windows NT 3.51 or higher Operating System (OS) software, and (ii) Microsoft Internet Explorer 3.0 or higher from Microsoft Corporation. Also, the WebDox Remote™ Server is provided with a dial-up Internet connection (i.e. 14,400 bps or better) to the Internet infrastructure. The function of the Web-based Document Server 30, Web-based Administration System 31 and remote client subsystems 13 running the Premenos® WebDox Remote™ software is to provide a Web-based Document Transport System for automatically transferring information (e.g. UPN/URLs) from manufacturers to the IPD Servers of the system in order to periodically update the same. While the illustrative embodiment of this Web-based Document Transport System has been described in terms of its implementation using the WebDox™ system from Premenos, it is understood that other commercially available electronic document transport systems (e.g. COMMERCE:FORMS™ Electronic Business Forms Package from Sterling Commerce, Inc., http://www.stercomm.com) can be used to carry out this subsystem. The operation of this Web-Based Document Transport System will be described in detail hereinafter with respect to the collection and delivery of consumer product-related information to the IPDs hereof.

The major subsystem components comprising the consumer-product information collection, transmission and delivery system of the present invention will be described in greater detail below.

In the illustrative embodiment of the present invention, the UPC Product-Information Subsystem 2 is realized using the UPN/URL Database Management Subsystem 9 and data communication networks 14 shown in FIGS. 2-1 and 2-2. Preferably, the product procurement services delivered by the UPN/URL Database Management Subsystem 9 are provided by modifying the prior art QRSolutions UPC Catalog currently implemented by QuickResponse Services, Inc., so that this subsystem includes the database structures (i.e. information fields and data elements) of the IPD Database Server 11 which are neither found in nor suggested by the prior art QRSolutions UPC Catalog. The structure and operation of the UPN/URL Database Management Subsystem and IPD Server of the present invention will be described in greater detail hereinafter. The information services supported by the UPC Product-Information Subsystem 3 include those provided by the prior art QRSolutions UPC Catalog, and also a number of additional information services that can be used to carry out Product Registration within the IPI Finding and Serving Subsystem of the present invention. These additional information services will be described in greater detail hereinafter with reference to FIG. 2A.

The Electronic Trading Information Subsystem 4 is realized using the UPN/URL Database Management Subsystem 9, Client Computer Systems 13 and data communication networks 14 of the technology platform shown in FIGS. 2-1 and 2-2. Preferably, the inventory procurement services delivered by the Electronic Trading Subsystem 4 are provided by the prior art QRSolutions Econnect and Electronic Data Interchange Services currently being implemented by QuickResponse Services, Inc.

Sale Analysis and Forecasting Information Subsystem 5 is realized using information storage/processing center 1, Client Computer Systems 13, and the data communication networks 14 of the enabling technology platform shown in FIGS. 2-1 and 2-2. Preferably, the product inventory management services delivered by the Sale Analysis and Forecasting Information Subsystem 5 are provided by the prior art QRSolutions Sale Analysis and Forecasting Information Services currently being implemented by QuickResponse Services, Inc.

The Collaborative Replenishment Information Subsystem 4 is realized using information storage/processing center 17, Client Computer Systems 13 and the data communication networks 114 of the enabling technology platform shown in FIGS. 2-1 and 2-2. Preferably, the product inventory management services delivered by the Collaborative Replenishment Information Subsystem 6 are provided by the prior art QRSolutions Replenishment Services currently being implemented by QuickResponse Services, Inc.

The Transportation and Logistics Information Subsystem 7 is realized using information storage/processing center 17, Client Computer Systems 13, and the data communication networks 14 of the enabling technology platform shown in FIGS. 2-1 and 2-2. Preferably, the product distribution management services delivered by the Transportation and Logistics Information Subsystem 7 are provided by the prior art QRSolutions EDI and Logistics Management Services currently being implemented by QuickResponse Services, Inc.

In the illustrative embodiment of the system of the present invention, each Client Computer Subsystem 13 has a conventional Java GUI-based web browser program (e.g. Netscape, Internet Explorer, Mosaic, etc.) with a plug-in type module, such as CyberFinder™ navigational software by Aladdin Systems, Inc., of Watsonville, Calif., that provides an on-screen graphical icon for a "IPI Web-site Find" function. An exemplary display screen 18 produced by such a Java GUI-based web browser program is set forth in FIG. 3B. Alternatively, the URL of the home page of the IPI Web-site can be recorded as a browser "bookmark" for easy recall and access through a conventional Java GUI-based Internet browser. Once at the home page of the IPI Web-site, an Internet user can find product-related information on the Internet in essentially the same way as when using the web browser program of FIG. 3B. As shown, the on-screen radio button 19 functions as an "IPI Web-site Find" Button (or Consumer Product Information Button) for instantly connecting the client subsystem to a particular IPI Web-site (i.e. hosted on each mirrored IPD Server) and especially adapted for carrying out the IPI finding and serving method of the present invention. As will be described in greater detail hereinafter, examples of "IPI Web-sites" can include, but are not limited to: (1) one or more mirrored UPC Request Central Web-sites from which consumer product information from all manufacturers is available for access to consumers from predetermined Internet domains; and (2) an UPC Request Retail Web-site, for each retailer, wherein consumer product information associated with only manufacturers of products offered by the retailer is available for access to consumers from predetermined Internet domains within physical retail "brick and mortar" stores and "electronic commerce enabled stores.

Figure 3B:
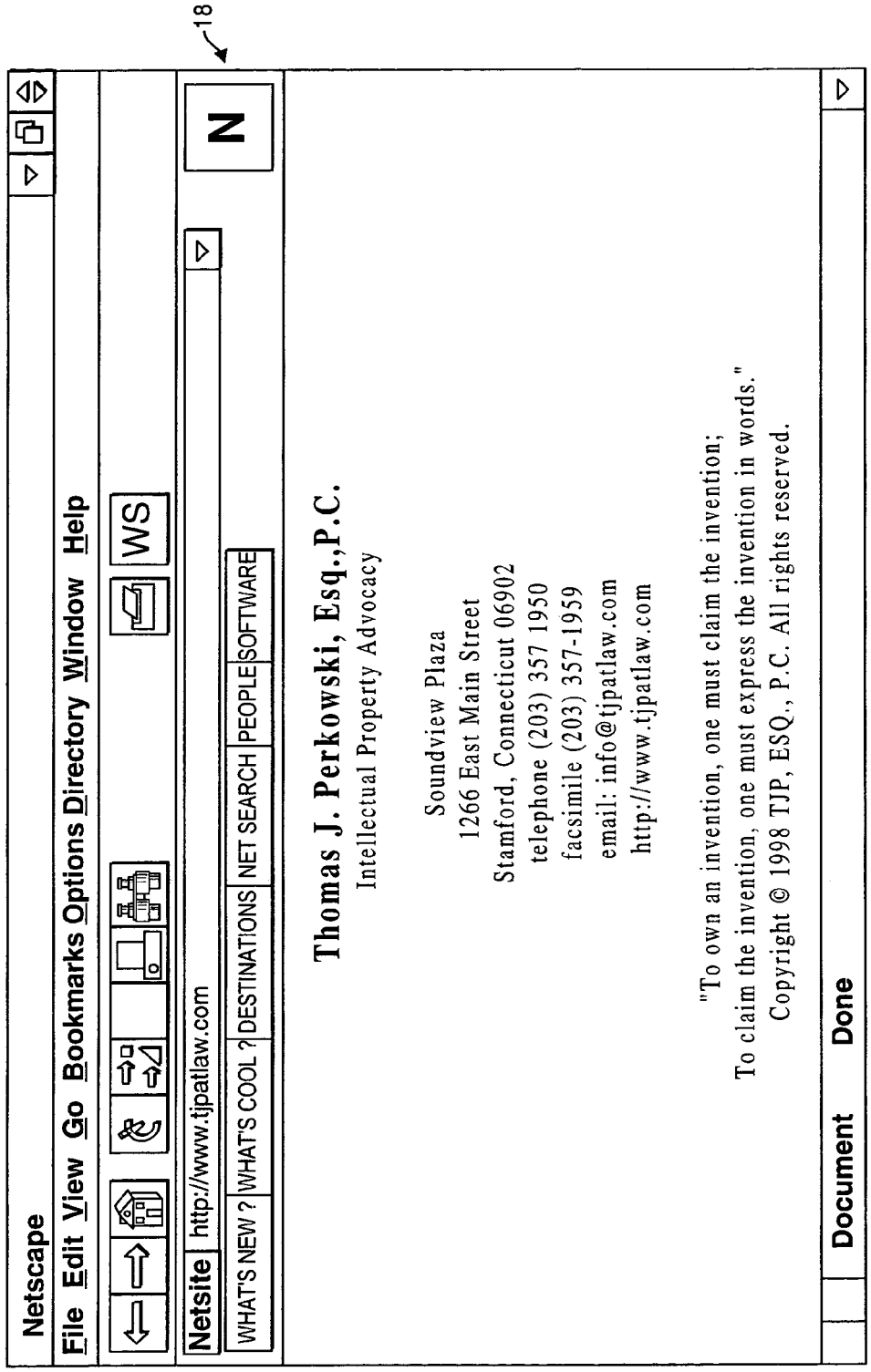
FIG. 3B is a schematic representation of an exemplary display screen produced by a (graphical user interface) Java GUI-based web browser program running on a client subsystem and providing an on-screen IPD Web-site Find Button (e.g. UPC REQUEST™ Central Website Find Button) for instantly connecting to the IPD Web-site (e.g. UPC REQUEST™ Central Website) and carrying out the consumer product information finding and serving method of the present invention.
Figure 3C:
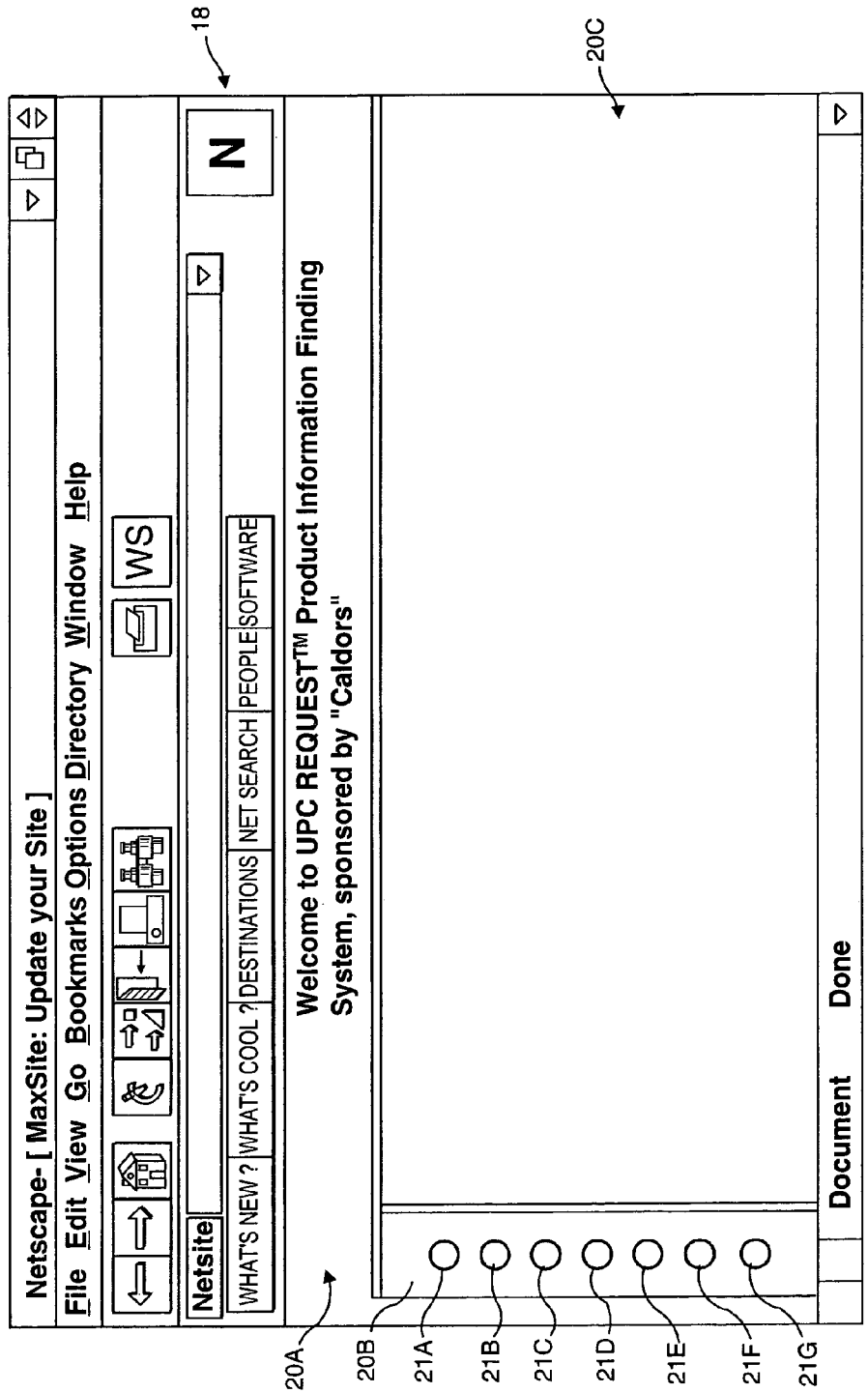
FIG. 3C is a schematic representation of an exemplary display screen produced by a Java GUI-based Internet browser or communication program running on a client subsystem and displaying a Netscape-style browser "display framework", served from the IPD Web-site (e.g. UPC REQUEST™ Central Website), and supporting or providing a sponsor frame for sponsor advertisement, a control frame with Check-Box type buttons for activating any mode of the IPI finding and serving subsystem, and an information frame for displaying HTML documents (instructions, forms, and the like) in accordance with the principles of the present invention.

In general, each IPI Web-site can be sponsored by a retail store subscribing to the consumer product information service hereof, or by one or manufacturers and/or service providers. The URL for the home page of any particular IPI Web-site can be selected with marketing considerations in mind, for example, "http://www.ipf.com" or "http://www.upcrequest.com" similar in form with the URLs of other information search-engines and directories currently available on the Internet. Upon selecting the IPI Web-site Find Button 19 (e.g. by a clicking of the mouse thereon shown in FIGS. 3B and 3C), the user is automatically connected to the home-page of the IPI Web-site (hosted on each mirrored IPD Server) which, as shown in FIGS. 3B and 3C, supports a Netscape-style "framework", within which web pages accessed through the IPI web-site are displayed. An excellent tutorial on "framing" entitled "The Netscape Frames Tutorial™ (2nd edition)" by Charlton D. Rose set forth at the URL: "http://www.newbie.net/frames/", last visited by Applicant on Mar. 26, 1997.

In general, the HTML-encoded documents served from the IPD Servers 11 hereof to the client subsystems 13 hereof will preferably have a three-field Netscape-style display framework which provides a unique and effective way of satisfactorily addressing the needs of consumers, hosting retailers, manufacturers and the IPI provider(s)/publishers alike. In practice, the Netscape-style browser "framework" can simultaneously accommodate the needs of the consumers using the particular Client Subsystems of the present invention, as well as the needs of the retailers who typically will host client subsystems hereof either (1) physically within their stores, and/or (2) electronically on their WWW sites using Web browser framing techniques as well.

As shown in FIG. 3C, the first (top-most) display field, the sponsor frame 20A, can be used to display to the consumer, a Web page (e.g. HTML-encoded document) containing a message that the IPI Finding and Serving Subsystem is being delivered to the consumer by the IPI Provider under, for example, the sponsorship of either: (1) the hosting retailer; (2) one or more advertisers posting advertising "banners" in the display frame 20A; or (3) the consumer himself/herself by paying a subscription fee or the like. Understandably, the method of sponsorship employed will vary from embodiment to embodiment of the present invention. An exemplary message for this display screen might read, for example, as follows:

"Welcome to the UPC Request™ Consumer Product-Information Finding and Serving System sponsored by THE HOME DEPOT for your shopping convenience and pleasure."

The height of the sponsor frame 20A need only be a small fraction of the consumer's display screen (e.g. ¾ inches) to convey this message to the consumers during use of the IPI Finding and Serving Subsystem of the present invention within the retailer's real (or virtual/electronic) shopping environment.

As shown in FIG. 3C, the second (left-most) display field, the control frame 20B, is used to display an HTML-encoded document containing a Java GUI-based "control panel" 21 for the consumer product information finding and serving subsystem of the present invention. In the illustrative embodiment, this control panel 21 includes six Check Box type buttons, namely: a first Check Box type button 21A which, when selected, automatically activates the Manufacturer/Product Registration Mode of the subsystem; a second Check Box type button 21B which, when selected, automatically activates the Manufacturer Website Search Mode of the subsystem; a third Check Box type button 21C which, when selected, automatically activates the UPN-Directed Information Access Mode of the subsystem; a fourth Check Box type button 21D which, when selected, automatically activates the Trademark-Directed Search Mode; a fifth Check Box type button 21E which, when selected, automatically activates the Product-Description Directed Search Mode of operation of the subsystem; and a sixth Check Box type button 21F which, when selected, automatically activates the UPC-Encoded-Applet-Download/Distribution Mode of operation of the subsystem. Each of these Check Box type buttons is hot-linked to a particular HTML-encoded document residing on the IPD Server(s) 11 of the subsystem hereof.

While the IPI Web-site of the illustrative embodiment has a framework characterized by three-display fields, namely, the sponsor frame 20A, the control frame 20B, and the information display frame 20C, it is understood, however, that there may be more or fewer display frames than that shown in FIG. 3C. Each frame will act as a separate display screen where variables such as web-pages, scrolling, page colors, etc., are independently controllable.

As will become apparent hereinafter, one of the primary functions of the client subsystems 13 hereof is to provide UPN-driven consumer product information (CPI) GUIs within both "physical "brick and mortar" retail stores" and "E-commerce" enabled retail stores and product catalogues. Hereinafter, UPN-driven CPI GUIs provided within physical retail shopping environments will be referred to as "physical" or "physically-based" UPN-driven CPI kiosks, whereas UPN-driven CPI GUIs provided within E-commerce enabled retail shopping environments will be referred to as "cyber" UPN-driven CPI kiosks, despite the fact that these devices may provide the substantially the same type of consumer product information services to consumers, retailers and manufacturers along the retail supply and demand chain.

Physically-based UPN-driven CPI consumer product information kiosks will have great utility in physical retail shopping environments. However, such subsystems will be of little value to consumers browsing the Internet and shopping at EC-enabled WWW sites, unless they are located in "brick and mortar" type retail stores wherein consumers are provided with the option of shopping and conducting e-commerce transactions therein for all or selected items of merchandise offered for sale by the retailer. Moreover, when shopping in any particular retailer's EC-oriented store, however realized, it is also understood that great efforts must be undertaken to ensure that the shopper does not leave the EC-oriented store prior to making a purchase at the checkout page of the EC-oriented WWW site. Requiring, prompting or otherwise encouraging a shopper to link over to the IPD WWW site hereof (e.g. hosted on the IPD information server) for desired consumer product related information oftentimes presents a great risk that the shopper will not return to the EC-oriented store, at which he or she was once visiting, but rather will visit another EC-oriented store to make the product purchase.

The above limitations of physically-based consumer product information kiosks and the risks associated with consumer behavior while shopping on the Internet are overcome by the UPN-based cyber kiosks of the present invention. The primary function of UPN-based cyber CPI kiosks is to provide consumers with a simple and effective way of and means for producing UPN-driven CPI graphical user interfaces (GUIs) at the consumer's point of presence (POP) which may exist, for example, when: (i) shopping at EC-enabled stores, product catalogs and other types of EC-oriented WWW sites; (ii) reviewing and responding to Internet-based product advertisements (including Web-based discount coupons and the like) published at selected sections of Web-documents served from diverse types of WWW sites hosted on the millions of Internet information servers connected to the infrastructure of the Internet; and/or (iii) encountering a Web-document addressing a particular consumer product under review, analysis or other form of observation where accurate consumer product related information is desired or required by the consumer, whomever they might be. The details of producing UPN-enabled CPI GUIs in both physical and cyber retail environments will be described hereinafter.

As shown in FIG. 1, each synchronized IPD Server 11 is interfaced with an ISP 10A in a conventional manner. The actual number of IPD Servers 11 used in any particular application will depend on various factors including, for example, user demand, Internet traffic conditions, network router capacity and performance, etc. Each such IPD Server 11 is assigned a static IP address and a common domain name on the Internet according to the Domain Name System (DNS) well known in the art. Data synchronization among such databases can be achieved using conventional data synchronization techniques well known in the art. In addition, a backup and mirroring program can be used to maintain data security. Preferably, the synchronized IPD Servers are maintained by a team of network managers under the supervision of one or more webmasters.

As shown in FIGS. 2B1 through 2B4, using presently known technology available for use on the WWW, there are at least four different ways of configuring IPD Server 11 and back-end UPN/URL Database Management Subsystem 9 of the illustrative embodiment. These four different subsystem architectures are schematically depicted in FIGS. 2B1 through 2B4.

In the system architectures shown in FIGS. 2B2 through 2B4, client-side Applets ("Applets"), having their <APPLET> HTML tags embedded within HTML documents (e.g. using the HTML 3.2 Specification), are executed with Java-enabled browsers on the client-side of the information network. In the system architecture set forth in FIG. 2B1, server-side Applets ("Servlets"), having their <SERVLET> HTML tags embedded within HTML documents (e.g. the HTML 3.2 Specification), are executed within Java-enabled Web servers on the server-side of the information network. Collectively, client-side Applets and server-side Applets shall be referred to as "Applets", wherein the major distinction between these two types is based on where the Applet is executed on the network (i.e. client-side or server side).

In each of these four system architectures, the IPD Server 11 performs a number of basic functions, for example: (1) serving HTML-encoded documents associated with IPD Web-sites (e.g. UPC Request Central WWW site, UPC Request Retail WWW sites, etc.) to client subsystems 13 on the Internet so as to enable the six primary modes of operation of the consumer product information finding and delivery subsystem hereof including, but not limited to, access to consumer product related information stored within the IPI and Non-IPI Registrant Databases on the UPN/URL Database Management Subsystem 9; as well as (2) serving Libraries of executable files containing "UPN-enabled Java Applet tags" for client-side Applets as well as server-side Applets a/k/a "Servlets", so as to enable retailers, manufacturers, advertisers, et al to download the executable "Applet tag containing" file to client subsystems.

According the first system architecture shown in FIG. 2B1, the UPN/URL Database management Subsystem 9 is realized by a SQL-based RDBMS server 9, whereas the IPD server 11 is realized by a Java Web Server 11', provided with Java servlet support, and operably connected to the RDBMS server 9 by way of high-speed digital transmission link known in the art. During system operation, the Java Web Server 11' serves to a Java-enabled client subsystem 13, an HTML-encoded document containing a servlet HTML tag <SERVLET> which, upon selection by a single mouse-clicking operation by the consumer, sends an http request to the Java Web Server 11', invoking a prespecified UPN-encoded servlet stored therewithin, causing the CPIR-enabling servlet to execute on the server-side of the network. This causes the servlet to call and run certain predefined Java methods which carry out a UPN-specified CPI search on the RDBMS server 9 and return the search results to the client subsystem 13 for display within a predetermined GUI generated therewithin. Using this system architecture, each UPN-encoded servlet executed within the Java Web Server 11' will contain information relating to (1) the UPN-specified consumer product on which product information is to be searched for within the RDBMS server 9, (2) licensing information relating to whom the CPIR-enabling servlet has been licensed (although this architecture does not enable easy enforcement of the granted license as the servlet is executed on the server side of the network.

According to the second system architecture shown in FIG. 2B2, the UPN/URL Database management subsystem 9 is realized by a SQL-based RDBMS server 9, whereas the IPD server 11 is realized by a Java Web Server 11", providing Java Applet support and being operably connected to the RDBMS Server 9 by a high-speed digital data transmission link known in the art. During system operation, the Java Web Server 11" serves to the Java-enabled client subsystem 13, an HTML-encoded document containing a "UPN-encoded" Applet HTML tag <APPLET> which, upon selection by a single mouse-clicking operation by the consumer, causes the CPIR-enabling Applet to execute on the client-side of the network, sending an http request to the Java Web Server 11", invoking a prespecified Common Gateway Interface (CGI) stored within the Java Web Server 11". This causes the Applet to call and CGI to run certain predefined methods for carrying out a UPN-specified CPI search on the RDBMS server 9 and returning the search results to the client subsystem 13 for display within a predetermined GUI prespecified within the Applet. Using this system architecture, each UPN-encoded Applet executed within the Java browser of the client machine 13 will contain information relating to (1) the UPN-specified consumer product on which product information is to be searched for within the RDBMS serverm9, (2) licensing information relating to whom the client-side Applet has been licensed and by whom the Applet may be served within the terms of the licensing program, etc.

According to the third system architecture shown in FIG. 2B3, the UPN/URL Database Management Subsystem 9 is realized by a SQL-based RDBMS server 9, whereas the IPD server 11 is realized by a Java Web Server 11''', providing client-side Applet support, and being operably connected to the RDBMS server 9 by way of a high-speed digital data transmission link known in the art. During system operation, the Java Web Server 11''' serves to the Java-enabled client subsystem 13, an HTML-encoded document containing a UPN-encoded Applet HTML tag <APPLET> which, upon selection by a single-mouse clicking operation by the consumer, causes the Applet to execute on the client-side of the network, creating a "socket-type" connection at lower (TCP/IP) communication layers between the client subsystem 13 and Java Web Server 11''', enabling the Java Web Server 11''' to run certain predefined Java methods for carrying out a UPN-specified CPI search on the RDBMS server 9, and returning the search results to the client subsystem 13 for display within a GUI prespecified within the Applet. Using this system architecture, each UPN-encoded Applet executed within the Java client subsystem 13 will be created to contain information relating to (i) the UPN-specified consumer product on which product information is to be searched for within the RDBMS server 9, (ii) licensing information relating to whom the client-side Applet has been licensed and by whom the Applet may be served within the terms of the licensing program, etc.

According to the fourth system architecture shown in FIG. 2B4, the UPN/URL Database Management Subsystem 9 is realized by a SQL-based RDBMS server 9, whereas the IPD Server 11 is realized by a Java Web Server 11'''', supporting client-side Applet execution and being operably connected to a high-speed digital data communication link well known in the art. During system operation the Java Web Server 11'''' serves to the Java-enabled client subsystem 13, an HTML-encoded document containing a Applet HTML tag <APPLET> which, upon selection by a single mouse-clicking operation by the consumer, causes the CPIR-enabling Applet to execute within the Java-enabled client 13 on the client-side of the network, calling a Remote Invocation Method to carry out a prespecified CPI search on the RDBMS server 9 and returning the search results to the client subsystem 13 for display within a predetermined GUI prespecified by the Applet. Using this system architecture, each UPN-encoded Applet executing within the Java enabled client 13 will contain information relating to (1) the UPN-specified consumer product on which product information is to be searched for within the RDBMS server, (2) licensing information relating to whom the server-side Applet has been licensed and by whom the Applet may be served within the terms of the licensing program, etc.

In the first illustrative embodiment shown in FIG. 2B1, Java (enabled) Web Server 11' can be realized by, for example, the Origin 200 Server or the $O_2$ Desktop Workstation from Silicon Graphics, Inc, a high-end SUN information server from Sun Microsystems, Inc., or any other suitable computing machine, running: (1) JDBC Interface software for providing a uniform access to a wide range of relational databases on RDBMS server 9 (if necessary in a particular application of the system hereof) and providing a common base on which higher level tools and interfaces can be built; and (2) a servlet-enabled Web (http) server software program such as, the Java Web Server (JWS) 1.0 or later from JavaSoft, division of Sun Microsystems, Inc., or the JigSaw Web Server from the World Wide Web Consortium, each proving native Java support, or alternatively, the Fastrak™ Web (http) server from Netscape Communications, Inc., the Internet Information Server (IIS) from the MicroSoft Corporation, the Apache HTTP Server from The Apache Software Foundation, or any other http server capable of transporting HTML-encoded documents, in conjunction with the Java Servlet Developer's Kit from JavaSoft, or the Servlet Express Tool from IBM Research Labs in Haifa, Israel, for managing servlets on Web servers lacking native Java support. In order to develop servlets, the Java Web Server 11' should also be equipped with the following software tools: the Sun Java Developers Kit 1.1.x from Sun Microsystems, Inc.; and the Java Servlets Development Kit (JDSK) from Sun Microsystems, Inc., or a Java Development Environment that supports JDK 1.1.x, such as VisualAge for Java by IBM, MicroSoft's Visual J++, or the like. Optionally, the Java Web Server 11' may also include Web-site development software (e.g. based on the HTML 3.2 or 4.0 Specification) for creating and maintaining the IPI Web-sites of the present invention, although such tools will be typically run on client subsystem 13 for practical reasons.

In the illustrative embodiments of FIGS. 2B2 through 2B4, Java Web Servers 11" through 11'''' can be realized by, for example, the Origin 200 Server or the $O_2$ Desktop Workstation from Silicon Graphics, Inc, a high-end SUN information server from Sun Microsystems, Inc., or any other suitable computing machine, running: (1) JDBC Interface software for providing a uniform access to a wide range of relational databases on RDBMS server 9 (if necessary in a particular application of the system hereof) and providing a common base on which higher level tools and interfaces can be built; (2) a Web (http) server such as the Java Web Server (JWS) from JavaSoft, the JigSaw Web Server from the World Wide Web Consortium, the Internet Information Server (IIS) from the MicroSoft Corporation, the Apache HTTP Server from the Apache Software Foundation, or other Java-enabled Web server capable of transporting HTML encoded documents; (3) the Sun Java Developers Kit, from Sun Microsystems, Inc., for developing client-side Applets; and (4) optionally, Web-site development software (e.g. based on the HTML 3.2 or 4.0 Specification) for creating and maintaining the IPI Web-sites hereof, although such tools will typically run on client subsystems 13 for practical reasons. Notably, when using the Microsoft IIS, one can use a Java Development Environment that supports JDK 1.1.x, such as VisualAge for Java by IBM, MicroSoft's Visual J++, and the like. Also, Java Web Server 11" must provide support for running CGI scripts written in Java, PERL or other suitable scripting language known in the art.

In the illustrative embodiments shown in FIGS. 2B1 through 2B4, each SQL-based RDBMS Server 9 can be realized by, for example, the Origin 200 Server from Silicon Graphics, Inc., the O₂ Desktop Workstation from Silicon Graphics, Inc., a ULTRA™ information server from Sun Microsystems, Inc., or any other suitable computing machine, running a RDBMS software program such as ORACLE 8.0 from Oracle Corporation, Sybase SQL from Sybase, Inc., Access 98 from Microsoft, or other database development program based on a database programming language such as the SQL Language, the Sybase language, or any other suitable database language enabling database programming and connectivity over the Internet.

In principle, there can be millions of IPI Servers 12 within the system hereof, each enabled to serve Web-based documents containing consumer product related information. Notably, each such IPI Server 12 can be realized by, for example, the Origin 200 Server from Silicon Graphics, Inc, the O₂ Desktop Workstation from Silicon Graphics, Inc., the ULTRA™ information server from Sun Microsystems, Inc., or any other computing machine (e.g. desktop, palmtop, laptop, etc.) running an operating system (e.g. UNIX, LINUX, Macintosh, MS Windows, NT, etc.) capable of performing the functions of an Internet (http) information server in a client-server distributed object computing environment. As shown in FIGS. 2-1 and 2-2, each IPI Server 12 is interfaced with an ISP 10A in a conventional manner. Each such IPI Server 12 is assigned a static IP address and a unique domain name on the Internet. Each IPI Server 12 is also provided with (i) Web-site development software for creating HTML-encoded multi-media pages for Web-site development, (ii) a dynamic web-site auction hosting software solution, such as, AuctionNow 4.2 from OpenSite, Inc.; and (iii) Web-site server software for supporting HTTP and serving HTML, XML and other document formats used to construct hypermedia-type Web-sites containing product related information of a multi-media nature. Such Web-sites can be expressed in HTML, XML, SGML and/or VRML or any other suitable language which allows for Web-site construction and Web-site connectivity. Web-site management software can be used to maintain correct hyper-links for any particular Web-site. Preferably, the IPI Servers 12 are maintained by a team of network managers under supervision of one or more webmasters.

Each retailer-related electronic-commerce (EC) information server 12A indicated in FIGS. 2-1 and 2-2 is operably connected to the infrastructure of the Internet. In general, each retailer-related information server 12A can be realized by, for example, the Origin 200 Server or O2 Desktop Workstation from Silicon Graphics, Inc., a high-end information server from Sun Microsystems, Inc., or any other computing machine that can perform the function of a Server in a web-based, client-server type computer system architecture of the illustrative embodiment. As shown in FIGS. 2-1 and 2-2, each retailer-related EC-enabled information server 12A is interfaced with an ISP 10A in a conventional manner, and is assigned a static IP address and a unique domain name on the Internet. Each retailer-related EC-enabled information server 12A is also provided with: (i) Java-enabled WWW (http) server software, such as Netscape Communications FastTrak Information Server software, for supporting http, ftp, XML/ICE and other Internet protocols, and serving HTML and XML formatted documents (i.e. pages) associated with Web-sites containing product related information of a multi-media nature; (ii) an advanced EC-enabled product merchandising software solution, such as the Host and Merchant (or Enfinity) Intershop 4 E-Commerce Server Solution from Intershop Communications, Inc., of San Francisco, Calif., and/or catalogMANAGER® and catalogMAKER® software programs from RealEDI, Inc. of Sherman Oaks, Calif., for building, managing and operating all aspects of e-commerce WWW sites, whether implementing on-line merchandising solutions for retailers and manufacturers, creating business-to-business and business-to-consumer product catalogs; (iii) an Internet Advertisement Management Software Solution, such as OPEN ADSTREAM™ Internet AD management software solution by REAL-MEDIA, Inc. of New York, N.Y.), for managing all aspects of Internet advertising on Internet information servers; (iv) a dynamic web-site auction hosting software solution, such as, AuctionNow 4.2 from OpenSite, Inc.; and optionally (v) Web-site development software for enabling the creation of HTML-encoded multi-media pages and the like for the EC-enabled Web-site development. Such EC-enabled Web-sites can be expressed in HTML, XML and/or VRML or any other suitable language which allows for Web-site construction and Web-site connectivity. Web-site management software can be used to maintain correct hyper-links for any particular Web-site. Preferably, each EC-enabled retailer-related server 12A is maintained by a team of network managers under supervision of one or more webmasters. The primary function of each retailer-related EC information server 12A is to enable the hosting of one or more EC-enabled stores or EC-enabled on-line catalogues (i.e. WWW sites) owned, operated, managed and/or leased by one or more retailers, (and optionally wholesalers and manufacturers as well) along the retail supply and demand chain. The use of the Intershop 4 Hosting and Merchant E-commerce software solution enables sellers to design and build dynamic environments for buyers and sellers by enabling sellers (i.e. vendors) to: (1) create a unique look and feel for their e-commerce sites using a Web browser; (2) fully customize their e-commerce sites to maximize the buyers experience, using an import/export function for easily importing existing product databases and site design directly into the Intershop; (3) build detailed profiles of buyers and present them with products that match these profiles, creating a personalized shopping experience; and (4) offer complementary products for sale based on current selections, thereby raising the overall value of each e-commerce transaction carried out. Also, the back-office portion of the Intershop 4 E-commerce Solution is intuitively organized to make it easy for sellers to manage their on-line business through a Web browser.

Each manufacturer-related electronic-commerce (EC) information server 12B indicated in FIGS. 2-1 and 2-2 is operably connected to the infrastructure of the Internet. In general, each manufacturer-related EC information server 12B can be realized by, for example, the Origin 200 Server from Silicon Graphics, Inc., the O2 Desktop Workstation from Silicon Graphics, Inc., the ULTRA™ information server from Sun Microsystems, Inc., or any other computing machine that can perform the function of a http server in a client-server distributed object computing environment. As shown in FIGS. 2-1 and 2-2, each manufacturer-related EC-enabled information server 12B is interfaced with an ISP 10A in a conventional manner, and is assigned a static IP address and a unique domain name on the Internet. Each manufacturer-related EC-enabled information server 12B is also provided with: (i) Java-enabled WWW (http) server software, such as Netscape Communications FastTrak Information Server software, for supporting http, ftp, and other Internet protocols, and serving HTML and XML formatted documents (i.e. pages) associated with Web-sites containing product related information of a multi-media nature; (ii) an advanced EC-enabled product merchandising software solution, such as the Host and Merchant Intershop 4 E-Commerce Server Solution from Intershop Communications, Inc., of San Francisco, Calif., and/or catalogMANAGER® and catalogMAKER® software programs from RealEDI, Inc. of Sherman Oaks, Calif., for building, managing and operating all aspects of e-commerce WWW sites, whether implementing on-line merchandising solutions for retailers and manufacturers, or creating business-to-business and business-to-consumer product catalogs; (iii) an Internet Advertisement Management Software Solution, such as OPEN ADSTREAM™ Internet AD management software solution by REAL-MEDIA, Inc. of New York, N.Y.), for managing all aspects of Internet advertising on Internet information servers; (iv) a dynamic web-site auction hosting software solution, such as, AuctionNow 4.2 from OpenSite, Inc.; and optionally (v) Web-site development software for enabling the creation of HTML-encoded multi-media pages and the like for the EC-enabled Web-site development. Such EC-enabled Web-sites can be expressed in HTML, XML, SGML and/or VRML or any other suitable language which allows for Web-site construction and Web-site connectivity. Web-site management software can be used to maintain correct hyper-links for any particular Web-site. Preferably, each EC-enabled manufacturer-related server 12B is maintained by a team of network managers under supervision of one or more webmasters. The primary function of each manufacturer-related EC information server 12B is to enable the hosting or one or more EC-enabled stores or EC-enabled on-line catalogues (i.e. WWW sites) owned, operated, managed and/or leased by one or more manufacturers, (and optionally wholesalers and retailers as well) along the retail supply and demand chain.

Each Client Computer Subsystem (hereinafter "client subsystem") 13 can be realized by any computing system employing operating system (OS) software (e.g. Macintosh, Windows 95, Windows NT, Unix, etc.) which supports a Java-enabled Internet browser program (e.g. Netscape's Navigator, MicroSoft's Explorer, NCSC's Mosaic, etc.). The operating system should also include: (1) Internet networking software that supports the TCP/IP networking protocol (required by HTTP, FTP and the like) and provides a JAVA GUI-based Web browser interface; and, in the case of client computer machines 13 that are used by manufacturers and retailers in their "back office" operations, (2) Electronic Data Interchange (EDI) networking software that supports all versions of EDI between two or more client subsystems over the VAN-based or Web-based EDI networks illustrated in FIGS. 2-1 and 2-2. Alternatively, client subsystems may also be realized by any of the following systems: (i) a Newton MessagePad 130 (running the Newton 2.0 Operating System and NetHopper™ Internet Software and equipped with a Motorola RF PCMCIA modem card); (ii) a Pippin™ computer system from Apple Computer, Inc.; (iii) a PalmPilot VII wireless Internet-enabled palmtop computing device by 3COM, Inc.; (iv) a network computer (NC) that supports the Java™ programming language and Java applets expressed therewith; (v) a Sony® WebTV Internet Terminal (supported by the WebTV Service provided by WebTV Network, Inc.); or the like. As shown in FIG. 1, each Client Computer is interfaced with an ISP 10A in a conventional manner. Each such client subsystem may be assigned a static IP address and a unique domain name on the Internet, or one may be dynamically assigned thereto by way of its ISP depending on its connectivity, and set of assigned functions within the consumer product information network of the present invention. Optionally, any client subsystem may include Web-site (http) server software serving Web documents of various formats (HTML, XML, SGML or the like) from one or more hypermedia-type Web-sites in a manner well known in the art.

Typically, each client subsystem 13 will be maintained by either present or future manufacturers, retailers and/or consumers of products, about which information can be found on the Internet. As shown in FIG. 3A1, any client subsystem of the present invention may be realized as a desktop computer workstation comprising: a processor and memory 19; a visual display monitor 20; a keyboard 21; a JAVA GUI mouse 22; and a bar code symbol reader 23 for reading UPC, UPC/EAN and other types of bar code symbols printed on consumer products, brochures, documents, and the like.

As shown in FIG. 3A2, any Client Computer 13 may also be realized in the form of a Web-based (wired or wireless) multi-media kiosk, designed for use as a "Cyber sales agent" within retail shopping environments. As shown in FIG. 3A2, the Web-based kiosk of the present invention may comprise: a floor, wall or ceiling supported housing 25; an omnidirectional laser bar code symbol reader (e.g. Metrologic MS 6720 Laser Scanner) 26 for reading UPC (and other types of) symbols printed on products, brochures, documents and the like; an active-matrix LCD-type visual display screen 27 for viewing product related information automatically displayed thereon in response to the entry of the UPC numbers scanned into the UPC Number Entry Window 21D below the IPI Finder button 21A of Control Strip 20B displayed on the client subsystem, as shown in FIG. 3C; a touch-screen type keyboard and pointing device 28 for clicking on anchored links on Web pages, entering information into client subsystem during its use; audio-speakers 29A for supporting multimedia Web-sites that may be visited when using the client subsystem; a color or black/white printer for printer 29B for printing out Web pages under consumer command during an information finding session using the system; and also, one or more floppy-disc (or otherwise removable) drive units 29C, accessible to the consumer for recording promotional and trial versions of information-based consumer products (e.g. video and audio recordings, computer software products, and the like) on removable information storage media (e.g. 1.44 MB floppy discs, 100 MB Zip® floppy discs, 1 GB Jazz® floppy discs, etc.) supplied by either the retailer or consumer. Optionally, the kiosk can be provided with a stereoscopic micropolarizing LCD panel from VRex, Inc. of Elmsford, N.Y. so that micropolarized spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A3, any Client Computer 13 within the system hereof may be realized in the form of the Web-based multi-media kiosk 34, also designed for use as a "virtual sales agent" within retail shopping environments. As shown, the Web-based kiosk 34 comprises: an ultra-compact housing 35 capable of being supported upon a pair of support rods (35A), a vertical support surface (e.g. wall), a horizontal support surface (e.g. countertop), or supported from a ceiling or pedestal; an omnidirectional laser bar code symbol reader (e.g. Metrologic MS 6720 Laser Scanner) 36, modified with handle 36A, for reading UPC (and other types of) symbols printed on products, brochures, documents and the like; an active-matrix LCD-type visual display screen 37 for viewing product related information automatically displayed thereon in response to the entry of the UPC numbers scanned into the UPC Number Entry Window 21D displayed on the client subsystem; a touch-screen type keyboard and pointing device 38 for clicking on anchored links on Web pages, entering information into client subsystem during its use; audio-speakers 39A for supporting multimedia Web-site that may be visited when using the client subsystem; a color or black/white printer for printer 39B for printing out Web pages under consumer command during an information finding session using the system; a scanner support stand 40 with Java GUIde flanges 41A and 41B, for Java GUIdably receiving and supporting the scanner 36 as shown in FIG. 3A3; a recoilable scanner cable 42, dispensed from cable cartridge 43 and Java GUIded through hole 44 in a scanner support bridge 40; a telephone handset 45 and associated communication apparatus for making telephone calls over a public telecommunications switching network (PSTN) independent of the operation of the Web-browser of the kiosk; and a mag-stripe card reader 46 and associated credit transaction terminal for automatically dialing up consumer credit and like databases over the PSTN (or Internet) upon scanning mag-stripe card 47 through reader 46. Optionally, the kiosk may also include one or more floppy-disc (or otherwise removable) drive units (not shown) accessible to the consumer for recording promotional and trial versions of information-based consumer products (e.g. video an audio recordings, computer software products, and the like) on removable information storage media (e.g. 1.44 MB floppy discs, 100 MB Zip® floppy discs, 1 GB Jazz® floppy discs, etc.) supplied by either the retailer or a consumer. Also, the kiosk can be provided with a stereoscopic micropolarizing LCD panel from VRex, Inc. of Elmsford, N.Y. so that micropolarized spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

As shown in FIG. 3A3, the bar code symbol reader is supported within its support stand/bridge 40. In this configuration, the laser scanning field of the reader is projected downwardly upon the surface of the LCD touch screen display panel. By virtue of the angle of tilt of the display panel 37 relative to the ground surface of the retail store, and the projection angle of the laser scanning field relative to the display panel surface, the consumer will be able to easy read the bar code symbol on most consumer products by simply presenting the bar code symbol to the scanning window. In the event that the product is too large to lift from the floor to the scanning window, the consumer can simply remove the bar code symbol reader 36 from its support stand 40, as shown in FIG. 3A3', by pulling cord 42 out of its take-up compartment 43 so that the reader is positioned to read the bar code symbol 49 on the retail consumer product 48. When symbol scanning is completed, the bar code symbol reader is lifted back into its stand support position, between support Java GUIdes 41A and 41B, while the cord 42 is automatically recoiled back into storage compartment 43, as shown in FIG. 3A3. While the consumer uses the kiosk to scan UPC (or UPC/EAN) symbols on products, to find, access and display consumer product-related information on the display panel 37, he or she may choose or need to use telephone 45 to speak with a manufacturer's representative and engage in electronic commerce, and/or use the magstripe card reader 46 to read magstripe cards (e.g. credit cards) to pay for consumer purchases made over the Internet using the kiosk of the present invention.

As shown in FIG. 3A4, the Web-enabled kiosk of FIG. 3A3 is modified to include a bar code symbol reader having a "cordless-type" scanner interface, thereby eliminating the need for the communication/scanner cable 42 shown in FIG. 3A3. RF-based wireless interfaces, as disclosed in US Letters Patents and Published International Patent Applications, incorporated herein by reference, can be used to realize this cordless-type scanner interface arranged between the bar code symbol reader 36 and the Web-enabled access terminal integrated within the information kiosk. In all other respects, the kiosk shown in FIGS. 3A4 and 3A4' is similar to the kiosk shown in FIGS. 3A3 and 3A3' and described above.

In FIG. 3A5, a fifth illustrative embodiment of the client computer system hereof is realized in the form of a consumer product information access terminal integrated within a point-of-sale (POS) station in retail shopping environments. While this embodiment of the client computer system hereof is particularly adapted for use by sales clerks at POS stations, as well as by store employees behind retail information/service counters, it may also be used by consumers and shoppers alike provided the necessary accommodations are made as described hereinbelow.

As shown in FIG. 3A5, a client subsystem 13 hereof is realized as consumer product information access terminal 60 comprising: a POS station 61 having a cash register computer 61A and keyboard 61B, and a price/UPC Database 61C containing price and UPC number information tables; a Web-enabled computer terminal 62 connecting the POS station 61 to the Internet infrastructure 10 through an ISP 10A; a bar code symbol reader 63 connected to the POS station 61; a 15' diagonal active-matrix LCD panel 64, operably connected to the output of the Web-enabled computer system 62 and the output of the cash register computer 61A, and having a swivel-base 65 that allows the LCD panel to be oriented in various viewing positions for displaying consumer product-related information accessed from the IPI Registrant Database shown in FIGS. 4A1 and 4A2, as well as price information accessed from the price/UPC database 61C. The advantage of this client computer subsystem is that it enables a retail sales clerk to check out customer purchases in a conventional manner, and conveniently access the IPI Finding and Serving Subsystem when check-out business is relatively slow, to answer any questions that consumers may have regarding a particular product in the retail store. This system will be ideal in retail environments having a high level of customer service and large retail service staff. In such instances, the IPI Finding and Serving Subsystem hereof empowers retail sales clerks, at the POS counters as well as customer service counters, by enabling them to quickly access any item of product related information linked to products in their stores by manufacturers and their agents.

As taught in the Objects and Summary of the Present Invention set forth hereinabove, the client computer system of the present invention 13 may also be realized in the form of a transportable bar code driven multi-media kiosk which is completely transportable within the store by hand for the convenience of consumers in retail shopping environments as shown in FIG. 3A6. As taught hereinabove, the retail shopping environment may be a department store, supermarket, superstore, retail outlet or the like. Notably, the transportable bar code driven multi-media kiosk shown in FIG. 3A6 is similar to the bar code driven multi-media kiosk shown in FIG. 3A3, except that the kiosk shown in FIG. 3A6 is scaled down in size and reduced in weight to enable the device to be completely transportable within the store by the hand of the shopper, as taught hereinabove. As shown in FIG. 3A6, the communication connection between the transportable kiosk hereof and the infrastructure of the Internet 10A can be realized using wireless digital communication technology (e.g. RF-based communication subsystems, using DFSK or spread-spectrum modulation techniques) well known in the art in order to provide (i) transportability within retail shopping environments for the convenience of shoppers, as well as (ii) Internet access to the IPI Web-site of the present invention (i.e. hosted on mirrored IPD Servers 11).

As taught in the Objects and Summary of the Present Invention set forth hereinabove, the client computer system of the present invention 13 may also be realized in the form of a bar code driven multi-media kiosk mounted upon a conventional shopping cart, or other transportation vehicle, so as to be completely transportable within retail shopping environments for the convenience of consumers, as shown in FIG. 3A7. As taught hereinabove, the retail shopping environment may be a department store, supermarket, superstore, retail outlet or the like. Notably, the bar code driven shopping cart kiosk shown in FIG. 3A7 is similar to the bar code driven multi-media kiosk shown in FIG. 3A3, except that the kiosk shown in FIG. 3A7 is mounted upon a conventional shopping cart to be completely transportable within the store, as taught hereinabove. As shown in FIG. 3A7, each shopping cart supported kiosk hereof comprises a cart structure 90 having a basket portion, a push-type handle bar portion 92, a set of wheels and a kiosk device 13 mounted to the handle bar portion. In this illustrative embodiment, the client computer subsystem embodied within the kiosk includes a 2-way RF communication link with its I/O port and a network hub associated with an IP network mounted within the retail shopping environment of concern. A wireless spread-spectrum communication subsystem including base station 98 and network adapter cards, such as the Symbol Spectrum24 wireless LAN (WLAN) by Symbol Technologies, Inc. can be used to realize the 2-Way RF communication link in a manner known in the communications network art. Such a wireless LAN provides (i) transportability with retail shopping environments for convenience of shoppers, as well as (ii) Internet access to the IPI Web-sites of the present invention (i.e. hosted on mirrored IPD Servers 11). By strategically placing the access points within the retail environment, the Symbol Spectrum 24 wireless LAN makes it possible to create a wireless bridge between a wired (IP-based) LAN within the retail environment (operably connected to the Internet by an ISP) and any number of shopping cart supported kiosks, as well as fixed mounted kiosks, and transportable Internet access terminals lent to consumers for use within the retail shopping environment.

In alternative embodiments, any Client Computer 13 can be realized as a network computer (NC), a Web-TV™ type Internet Terminal, a Newton MessagePad® PDA, or any other device providing Internet access to the IPI Web-site (i.e. mirrored IPD Servers) of the present invention. Notably, the same functionalities provided within the Web-based kiosk described above can be embodied with such alternative embodiments of client computer system.

Figure 8:
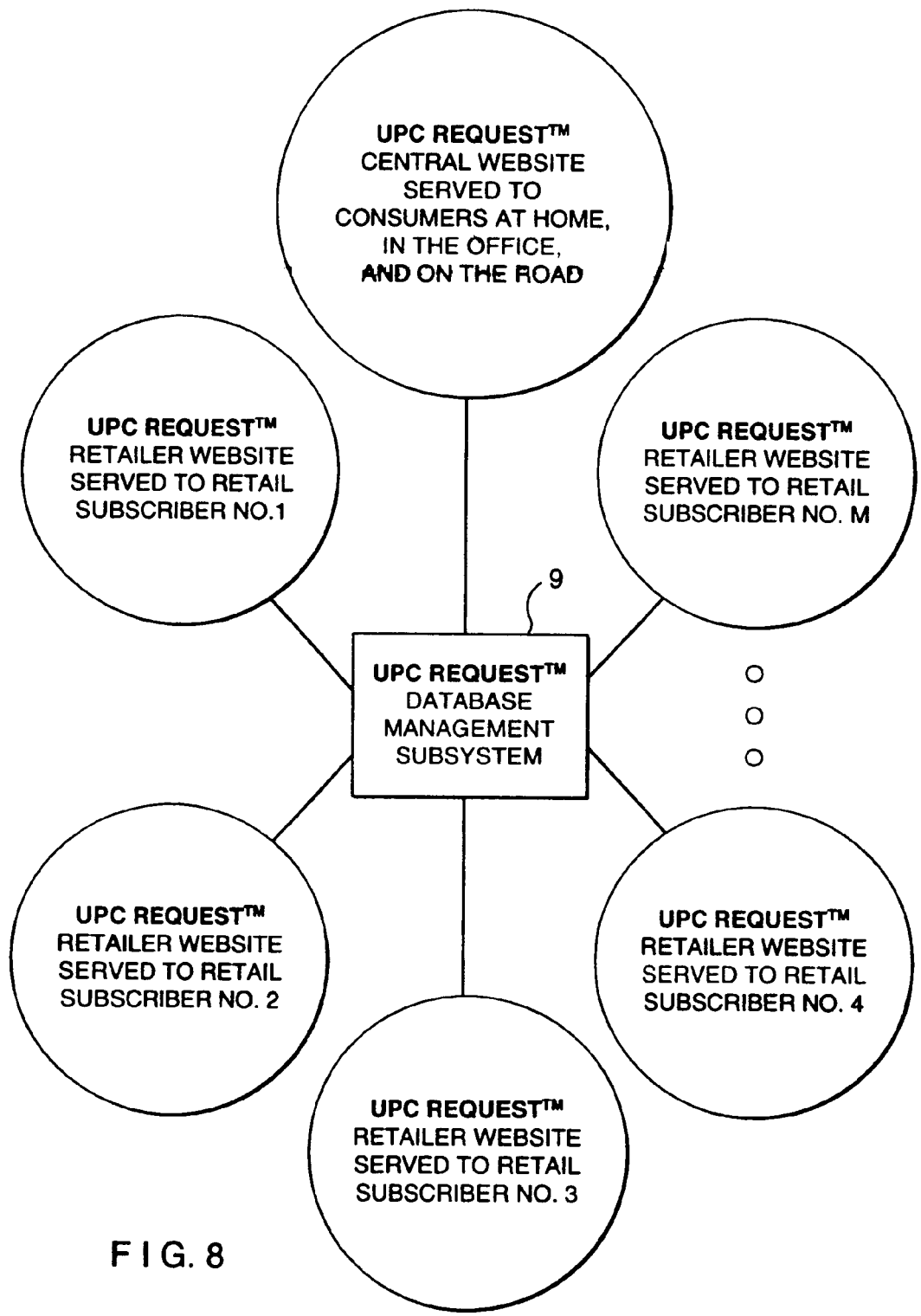

For example, as shown in FIG. 3A8, the client computer subsystem 13 can be realized as a transportable hand-held computer, such as the Newton® Model 130 Messagepad 70 from Apple Computer, Inc. of Cupertino, Calif., provided with NetHopper™ brand Internet Access (http-client) Software which supports the TCP/IP networking protocol within the Newton MessagePad operating system, as well as the client-side of http, as taught in U.S. Pat. No. 5,905,251 incorporated herein by reference. Notably, the NetHopper™ brand Internet Access (http-client) Software 71 provides the Newton Model 130 Messagepad with an integrated JAVA GUI-based web browser program for WWW access in a manner know in the Internet access art. As shown in FIG. 3A8, the Newton Messagepad has a display panel 72, touch-screen type keypad 73, and programmed laser scanning bar code symbol reader 74 (e.g., Metrologic ScanQuestg Laser Scanning Module Model No. IS4120), integrated within the hand-held device as described in U.S. Pat. No. 5,905,251. The function of bar code symbol scanner 74 is to read UPC or UPC/EAN symbols on consumer products and to produce symbol character data representative of the numbers encoded within such standardized bar code structures. The Newton Messagepad Model 130, denoted by reference numeral 70, is also equipped with a Motorola PCMCIA-based modem card 75 having a RF transceiver for establishing a wireless digital communication link with either a cellular base station or one or more satellite-base stations 76 connected to the Internet by way of an ISP or NSP 10A in a manner well known in the global information networking art. As such, a first wireless digital communication link 77 is established between the Newton Messagepad 130 and cellular (or satellite) base stations 76, and a second digital communications link 78 is established between the base station 76 and the ISP or NSP associated with the infrastructure of the Internet. Accordingly, this embodiment of the client computer subsystem of the present invention is completely mobile (i.e. transportable and provide the consumer access to the Internet and all of its information resources on the WWW and elsewhere, provided that the device maintains its wireless digital communication link with base station 76, distributed through the globe, making access to the IPD servers hereof possible at home, in the office, within retail stores, as well as on the road wherever that may be.

As shown in FIG. 3A8, the Newton MessagePad, ScanQuest® Laser Scanning Module 74 and auxiliary battery supply (not shown) are completely housed within a rubberized shock-proof housing 79, in order to provide a hand-supportable unitary device 70 of rugged construction. This hand-held Internet-enabled wireless information access terminal can be used virtually anywhere, provided wireless Internet access is enabled by digital IP communication network service providers (NSPs) in operation about the planet. Operation of Internet access terminal 70 is quite simple from the user's point of view. Upon reading a bar code symbol 80 on a consumer product 81, the object detection field 82 of the device automatically detects the consumer product, and in response thereto, a laser beam 83 is automatically projected and swept across the UPC symbol 80 thereon. While it is generally preferred that the automatic laser scanning engine 74 be interfaced with I/O communications port of the Newton MessagePad. device 70, it is understood that, in some instances, it may be desired to connect a pen or wand-type scanning device to the serial port thereof to provide bar code symbol reading capabilities thereto. Optionally, bar code decoding software can be run on the Message Pad device, or as firmware contained within the scanning engine 74 in a manner known in the art.

Notably, it is understood that there will be many different types of wireless mobile Internet-enabled access terminals that may be used to realize the client computer subsystems of the present invention. For example, recently 3COM, Inc. introduced into its commercial product line the PalmPilot VII Wireless Hand-Held Internet Access Terminal, which is similar in many respects to the Newton Messagepad Model 130 equipped with the Motorola PCMCIA-based modem card 75, and Nethopper™ Software, described above. Also, Symbol Technologies, Inc. of Holtsville, N.Y. has introduced the Symbol SPT 1500, SPT 1700, SPT 1740 and PPT 2700 hand-held wireless bar code scanning Internet access terminals which have virtually the same functionalities embodied within the wireless hand-held Internet access terminal shown in FIG. 3A8, and originally disclosed in U.S. Pat. No. 5,905, 251, supra.

The Web-enabled client subsystems 13 of the present invention described hereinabove may be used to access consumer product-related information, as well as to carry out electronic-commerce related transactions, at home, at work, in the office, on the road, as well as in physical retail shopping environments.

For example, when visiting particular EC-oriented (i.e. electronic-commerce enabled) Web-sites, a consumer may scan UPC (and/or UPC/EAN) numbers on products within his or her home (e.g. in the pantry) using any one of the client computer subsystems hereof equipped with a bar code symbol Reader in order to remotely purchase such consumer products using credit or debit type financing, and direct shipment of purchased products to the consumer's home or elsewhere by a particular delivery service. Such EC-enabled WWW sites, commonly referred to as electronic-commerce (EC) stores or storefronts, as well as on-line electronic commerce catalogues, can be operated by manufacturers, wholesalers and/or retailers of consumer products, as indicated in FIGS. 2-1 and 2-2. As shown therein, retailer operated, managed and/or owned EC stores (i.e. EC-enabled WWW sites) are hosted on retailer operated/owned EC information servers (MECIS) 12B, whereas manufacturer operated, managed and/or owned EC stores (i.e. EC-enabled WWW sites) are hosted on manufacturer operated/owned EC information servers (MECIS) 12B operably connected to the infrastructure of the Internet.

The consumer product information delivery system of the present invention shall enable an infinite array of applications with regard to electronic commerce and home shopping, now made possible by the present invention.

The Retail Store Based Consumer Product Information Transport Subsystem of the Present Invention As shown in FIG. 3A9, each a retail shopping environment participating in the system of the present invention is provided with a TCP/IP local area network 80 comprising: a plurality of bar code driven kiosks 13 as shown in FIGS. 3A2 through 3A8, having (i) a Web browser program 13A (e.g. Netscape Communicator 4.5 for Windows 98 with a customized GUI) for enabling consumers to access and display information resources on the Internet (e.g. WWW), and (ii) an e-mail client program 133 (e.g. POP3 mail client software) 82 for supporting e-mail based CPI transport operations with remotely-situated e-mail-enabled client subsystems 13 connected to the Internet, in accordance with the principles of the present invention; a network information server 84 running (i) e-mail messaging software 84A for maintaining e-mail accounts and service for each bar code driven kiosk on the retail store based LAN 80, (ii) http server software 84B for serving locally-stored Web document (e.g. advertisements, product prices, specials, notices, etc.) to consumers on the kiosks, as well as (iii) firewall software 84C for maintaining network security; a TCP/IP router 86 connected between the network information server 84 the infrastructure of the Internet (i.e. ISP or NSP), for connecting the retail store based LAN and its connected kiosks to the Internet. Notably, the TCP/IP router 86 is assigned a static IP address that determines the IP address for the retail store based LAN 80. Also, each kiosk can be assigned a static IP address on the retail store based LAN, or a dynamically allocated IP address using the well know Dynamic Host Computer Protocol (DHCP), enabling both Web and e-mail services on each kiosk.

In general, the network information server 84 can be realized by, for example, the Origin 200 Server or O2 Desktop Workstation from Silicon Graphics, Inc., a high-end information server from Sun Microsystems, Inc., or any other computing machine that can perform the function of a server in a web-based, client-server type computer system architecture of the illustrative embodiment. Exemplary electronic messaging (i.e. e-mail) software solutions for the network information server 84 include, but are not limited to: N-Plex® Global Internet Messaging Server solution from Isocor, Inc. of Santa Monica, Calif.; the Message Direct Server from Messaging Direct, Inc.; Mail Spinner, from Nascent; Netscape Messaging Server, from Netscape Communications, Inc.; or Sendmail Pro, from Sendmail Inc. computer system architecture of the illustrative embodiment. Exemplary http server software solutions for the network information server 84 include, but are not limited to: the Java Web Server (JWS) 1.0 or later from JavaSoft, division of Sun Microsystems, Inc.; the JigSaw Web Server from the World Wide Web Consortium; the Fastrak™ Web (http) server from Netscape Communications, Inc.; the Internet Information Server (IIS) from the MicroSoft Corporation; the Apache HTTP Server from The Apache Software Foundation; or any other http server capable of transporting HTML-encoded documents.

Alternatively, each network information server 84 can be realized using the Whistle INTERJET II network information server solution from IBM as a turn-key solution for the network information server 84 on the retail store LAN 80. Details on the Whistle INTERJET II server can be found, incorporated herein by reference. This implementation can support up to hundred (100) bar code driven kiosks on a retail store LAN of the present invention, and in some applications, it may be desirable to modify the e-mail software provided thereon in order to achieve the business objectives of any particular application. It is understood, however, that in many application, in which advertisements, prices and specials, notices and the like are to be displayed on the kiosks during idle moments (i.e. when consumers are not scanning bar coded products for consumer product related information access and display), there will be a need to use a more robust electronic messaging and http server solutions on the retailer's network information server 84.

As shown in FIG. 3A10A, a preferred way of implementing the retailer based information network of in FIG. 3A9 would be to install a wireless LAN within each "brick & mortar" retail shopping environment, thereby enabling TCP/IP network connectivity between each Web/e-mail enabled kiosk 13 and the infrastructure of the Internet. As shown in FIG. 3A10A, each Web/e-mail enabled kiosk 13 is seamlessly connected to the TCP/IP network of the retailer LAN 80 using high data rate wireless LAN, such as the Spectrum24™ High Rate Wireless LAN (WLAN) from Symbol Technologies, Inc., of Holtsville, N.Y. Notably, the Spectrum24 High Rate WLAN is designed to the proposed IEEE 802.11 open airwaves standards including the Ethernet backbone, TCP/IP protocols, SNMP network management, PCMCIA adapter card form factors and interfaces, and NDIS and compliant drivers. According to this wireless solution, each Web/e-mail enabled kiosk 13 is equipped with either a Spectrum24™ wireless LAN PC card, radio card, or ISA card 90A to enable a wireless TCP/IP connection to the retail based LAN within the store environment. A Spectrum24 network controller 90B, with integrated RF antenna elements, is installed within the retail shopping environment, preferably in a central location which facilitates excellent RF signal transmission/reception between the network controller 90B and the LAN PC card 90A in each of the Web/e-mail enabled kiosks 13 mounted within the retail shopping environment on, for example, a product self 2000 shown in FIGS. 3A10B through 3A10C. As shown in FIG. 3A10A, the network controller 90B and network information server 84 are connected to a TCP/IP hub 92 configured within the LAN according to a suitable connectivity, well known in the art. In turn, the TCP/IP hub 92 is connected to the infrastructure of the Internet (i.e. ISP) using a modem and a communication link in a manner known in the art. In turn, the TCP/IP hub 92 is connected to the TCP/TP routers 86, which is connected to the Internet infrastructure Notably, using the Spectrum24 network controller 90, the system administrator can enable administration and configuration of the Web/e-mail enabled kiosks, RF traffic control, node management, and diagnostics. Notably, the 2 Mbps or 11 Mbps version of the Spectrum24 High Rate WLAN can support Voice-over-IP applications in instances where telephonic hand-sets are provided at the kiosk, as shown in FIG. 3A3 through 3A7.

As shown in FIG. 3A9, the central e-mail server 88 is assigned a static IP address and connected to the infrastructure of the Internet using a modem in a manner known in the art. The retailer RDBMS 81 and a manufacturer RDBMS 83 are connected to the backend of the central e-mail server 88 by way of a high-speed TCP/IP network 91. Preferably, RDBMS 89A and 89B support protocols such as XML/ICE to enable electronic data interchange with client machines operated by retailers and manufacturers alike. The information server supporting the central e-mail server 88 may also support a http server and a suitable database interface to enable retailer and manufacturers alike to access the RDBMS 89A and RDBMS 89B over the Internet using XML, EDI, ftp or other information interchange protocol.

FIGS. 3A10B through 3A10C illustrate an exemplary product shelving system in a retail shopping environment, wherein a plurality of a web/e-mail enabled bar code driven CPI kiosks 12 are mounted onto shelf structures 99 by way of a kiosk mounting bracket 13C that can be removably attached to a shelf structure 99 (using a special tool) as well as disattached therefrom for reinstallation within the parts of the retail store as circumstances require. As shown, each web/e-mail enabled kiosk 13 is equipped with a wireless LAN PC card 90A in order to establish a wireless connection with retailer LAN 90 via the wireless LAN controller 90B. As shown in FIGS. 3A10B, the kiosk 13 depicted therein is a modified version of the kiosk shown in FIGS. 3A3 and 3A4, wherein the bar code reading device 36' is pivotally mounted on the kiosk housing and orientated for optimal product label scanning.

In order to better understand the functions of the centralized e-mail server 88 and its back-end RDBM 89A and 89B illustrated in FIGS. 3A9 and 3A10, it will be helpful to provide a brief overview of the CPI transport services enabled by the e-mail based information transport subsystem described above.

During operation of the IPI Finding and Serving Subsystem hereof within a retail shopping environment, the consumer having accessed and displayed a consumer product related Web document on a bar code driven consumer product information kiosk as shown, for example, in FIGS. 3A2 through 3A8, may also desire to retain a copy thereof for future reference and use. In such instances, it would desirable to provide the bar code driven information kiosk 13 with a thermal or like printer so that consumers can printout accessed product related information within the retail shopping environment and take the same home for future review and evaluation. However, from the retailer's point of view, providing each such CPI kiosk with a printer may be too costly to maintain in typical retail environments. Thus, there is a great need for an improved method of and system for making consumer copies of consumer product information that has been accessed and displayed on bar code driven consumer product information kiosks within retail shopping environments.

In accordance with the principles of the present invention, the problem of providing consumers with copies of accessed consumer product information within retail shopping environments is addressed by enabling the consumer at the retail-based kiosk to: (1) display an e-mail envelope (ready for stuffing, addressing and sending) the display frame 20C of the Web browser program thereof, by manually selecting control button 21G provided along the control frame 20B, shown in FIG. 3A14A; (2) capturing, saving, and attaching any accessed/displayed consumer product document to the displayed e-mail envelope by manual (or voiced-directed) selection of the "capture, save and attach" button 110 within the displayed e-mail envelope of FIG. 3A14, or capturing and recording the URL of the CPI-related document being displayed by manual (or voice-directed) selection of the "capture and record" button 112 within the displayed e-mail envelope of FIG. 3A16; (3) addressing the e-mail envelope with the consumer/shopper's home, office or like e-mail address by either reading an e-mail address encoded within a bar code (or magnetic-stripe) structure or manually entering the same within the addressee field; and (4) sending the stuffed e-mail envelope by manual selection of the "send" button 114 within the displayed e-mail envelope. The enabling infrastructure for this e-mail enabled consumer product information transport subsystem will be described hereinbelow.

Notably, the e-mail envelope displayed on each information kiosk hereof, as shown in FIGS. 3A14 and 3A16, need not indicate that a copy of a particular e-mail message is being sent to the centralized e-mail server 88 upon selecting the "send" button, although circumstances may dictate that notice be given to customers using this e-mail CPI-related transport service within retail shopping environments. In the case where the "cc" field visually indicated to the consumer, it may be desirable to enable the consumer to delete preset recipients in the addressee fields thereof so that, upon transmission, no copies of transmitted e-mail envelope will be sent to third parties (e.g. retailers and/or manufacturers), thereby providing the customer with a greater sense of confidentiality and privacy with respect to its product inquires when using this e-mail CPI-related transport service.

Having provided an overview of the functions of the e-mail CPI-related transport service of the present invention, it is appropriate at this juncture to briefly describe the primary functions to be performed by central e-mail server 88 and RDBMs 89A and 89B shown in FIG. 3A9.

In the context of the e-mail CPI-related transport service of the present invention, the primary function of the central e-mail server 88 shown in FIGS. 3A9 and 3A10 is to receive a "carbon copy" (Cc) of each e-mail envelope sent from a retailer kiosk within the system of the present invention, to the e-mail address of the shopper (or friend thereof) accessible at home, in the office, at school, or on the road. In alternative embodiments of the present invention, the central e-mail server 88 can be realized as a mirrored array of e-mail servers connected to different points of the Internet about the planet, whose main purpose is to collect copies of e-mail CPI transmissions sent to the e-mail addresses of consumers/shoppers from Web/e-mail enabled kiosks 13 within retail shopping environments. Such information is important to retailers and manufacturers as it reflects the consumer product related interests of consumers shopping at particular "brick & mortar" retail stores, located at particular geographic regions on the Earth. Potentially, each such region will have a different market significance to particular retailers and/or manufacturers.

Once such CPI-related information has been collected by the central e-mail server(s) 88 the retailer RDBMS 81 periodically downloads a copy of the e-mail CPI transmission records maintained within the central e-mail server subsystem 88. Thereafter, such records are processed and reorganized in a form that is readily useful to retailers who offer particular UPN-labeled products for sale. An exemplary database structure for the retailer RDBMS 89A is set forth in FIG. 3A11. Preferably, the retailer RDBMS 89A will contain information on which Web documents (specified at a particular URL) were accessed at a particular retailer kiosk (having a geographic specification) and transported to a particular e-mail address of a consumer considering the purchase of the UPN-labeled product linked to the URL. Notably, the retailer RDBMS 89A of the illustrative embodiment can be realized as an Octane® Workstation or O$_2$ Desktop Workstation from SGI of Mountain View, Calif., a high-end SUN information server from Sun Microsystems, Inc., or any other high-end computing platform running RDBMS solution software such as, for example, Oracle8i (Release 2) RDBMS software from Oracle Corp. of Redwood Shores, Calif., and data mining and analysis software such as, for example, Mineset 3.0 Visual data mining software from SGI. Using such data mining and analysis tools, various types of reports can be generated for individual retailers indicating trends in consumer shopping behavior, as well as the address and identity of prospective customers. Preferably, only retailers registered with the system will be provided access to information maintained within the retailer RDBMS 89A that relate to Web documents accessed and reviewed by the retailer's kiosks, prior to or after making a consumer product search and/or purchase within a particular retail shopping environment.

Similarly, the function of the manufacturer RDBMS 83 is to periodically download a copy of the e-mail CPI transmission records maintained within the central e-mail server subsystem 88, and to thereafter process and reorganize the same so as to be put into a form that will be readily useful to manufacturers who make or have made particular UPN-labeled products for sale and publish particular CPI-related Web documents on the WWW and link the same to particular UPN-labeled products. An exemplary database structure for the manufacturer RDBMS is set forth in FIG. 3A12. Preferably, the manufacturer RDBMS 89B will contain information on which Web documents (specified at a particular URL) were accessed at a particular retailer kiosk (having a geographic specification) and transported to a particular e-mail address of a consumer considering the purchase of the UPN-labeled product linked to the URL. Notably, the manufacturer RDBMS 89B of the illustrative embodiment can be realized as an Octane® Workstation or O$_2$ Desktop Workstation from SGI of Mountain View, Calif., a high-end SUN information server from Sun Microsystems, Inc., or any other high-end computing platform running RDBMS solution software such as, for example, Oracle8i (Release 2) RDBMS software from Oracle Corp. of Redwood Shores, Calif., and data mining and analysis software such as, for example, Mineset 3.0 Visual data mining software from SGI. Using such data mining and analysis tools, various types of reports can be generated for individual manufacturers indicating trends in consumer shopping behavior, as well as e-mail leads on prospective customers. Preferably, only manufacturers registered with the system will be provided access to information maintained within the manufacturer RDBMS 89B that relate to Web documents accessed and reviewed by shoppers or the retailer's kiosks, prior to or after making a particular product search and/or purchase within a particular retail shopping environment.

The Consumer Product Advertising and Promoting Subsystem of the Present Invention For Use in retail Shopping Environments The structure and function of the consumer product advertising and promoting delivery subsystem of the present invention, indicated by reference numeral 2A in the system diagram of FIG. 1, will now be described in greater detail with reference to FIGS. 3A 17 through 3A24.

In general, the function of subsystem 2A is to enable the management of Web-based consumer product advertisements, promotions, and product location instructions created by manufacturers, their agents, and retailers, and delivering the same to consumers within physical retail environments using wireless Web-based product promotion/advertising kiosks installed therewithin. As shown in FIG. 3A17, subsystem 2A comprises: a plurality of manufacturer-operated client machines for (i) managing UPN/URL data links and using EDI techniques to transmit the same to a centralized Web-based RDBMS (structured as shown in FIG. 3A19A) for subsequent delivery to Web-based product promotion kiosks installed within a retailer WAN, as shown in FIGS. 3A18 through 3A21C, or (ii) managing UPN-indexed information resource files (IRFs) of a multi-media nature, and using EDI techniques to transmit the same to a centralized Web-based RDBMS (structured as shown in FIG. 3A19B) for subsequent delivery to the Web-based product promotion kiosks; a plurality of advertiser-operated client machines for (i) managing UPN/URL data links and using EDI techniques to transmit the same to a centralized Web-based RDBMS (structured as shown in FIG. 3A19A) for subsequent delivery to Web-based product promotion kiosks installed within a retailer WAN, as shown in FIGS. 3A18 through 3A21C, or (ii) managing UPN-indexed information resource files (IRFs) of a multi-media nature, and using EDI techniques to transmit the same to a centralized Web-based RDBMS (structured as shown in FIG. 3A19B) for subsequent delivery to the Web-based product promotion kiosks; and a plurality of in-store retailer local area networks (LANs) or wide area networks (WANs), as shown in the FIG. 3A18, for delivering product advertising and promotional information to consumers via Web-based product promotion kiosks of the type shown in FIGS. 3A19C and 3A19D, arranged, for example, in retail stores as shown in FIG. 3A20 and display such information using browser GUIs as shown, for example, in FIG. 3A21A. Notably, Web-based information resource files (IRF) associated with the UPN/URL links in the Web-based RDBMS of FIG. 3A17, can be served from servers 12, 12', 12 and 12A, as in the case of the IPI finding subsystem of FIGS. 2-1 and 2-2, or stored within a terra-sized data warehouse (i.e. RDBMS) accessible to consumers through http servers in a manner known in the art.

In FIG. 3A18, an illustrative embodiment of the consumer product promotion/advertisement delivery subsystem of FIG. 3A17 is shown in greater detail. Preferably, each retailer-operated Web-based product promotion kiosk in the information network of FIG. 3A18 uses a multi-frame display framework as shown in FIG. 3A21A, to simultaneously display the following elements of information to consumers within the store: (i) a display frame for displaying the retailer's identity or image (e.g. "Welcome to WalMart® Stores"), created by the manufacturer and selected by the retailer through a Web-enabled client machine (e.g. retailer-operated administration client machine shown in FIGS. 3A18 and 3A20) and indexed by the exemplary URL denoted as URL-DF1; (ii) a display frame for displaying a product advertisement, created by the manufacturer and/or its agent, but selected by the retailer through a Web-enabled client machine (e.g. retailer-operated administration client machine shown in FIGS. 3A18 and 3A20), and indexed by the exemplary URL denoted by URL-DF2; (iii) a display frame for displaying a promotional message about the advertised product, selected by the retailer through a Web-enabled client machine (e.g. retailer-operated administration client machine shown in FIGS. 3A18 and 3A20), and indexed by the exemplary URL denoted by URL-DF3; and (iv) a display frame for displaying information indicating where the advertised product is located within the store (e.g. by store category, aisle, store section, etc.). Notably, each such set of information to be displayed from a particular product promotion kiosk in particular retail store is programmed by the retailer using a Web-enabled client. During the programming operations, the retail manager will view a Product Promotion Programming Table, as shown in FIG. 3A23, which is maintained within Web (http) server 9' or http server connected to the data warehouse shown in FIG. 3A18. The computing platform supporting each such http server can also run the OPEN ADSTREAM™ (OAS) 5.0 Internet Advertisement Management Solution software from Real Media, Inc., of New York, N.Y. Using the OAS 5.0 advertisement management solution, and the Product Promotion Programming Table, each retail store manager (or other designated person within the organization), can determine which product advertisements and promotions (i.e. HTML code, image files, and any other rich media content associated therewith) will be displayed within the designated display frames (DF1, DF2, DF3 and DF4) a particular product promotion kiosk, at which times of the day, on which dates, etc. in accordance with a product promotion program being carried out by the retailer. While the manufacturers, their agents and advertising agents will be enlisted to create product advertisements (i.e. digital content) for the consumer product advertising and promoting subsystem 2A of the present invention, the retailers are provided with total control over what products within their store will be advertised and promoted, when and where within their enterprises.

As shown in FIGS. 3A19C and 3A19D, each Web-based promotion kiosk in the retail shopping LAN or WANs of FIGS. 3A17 and 3A18, comprises a Web-enabled computing platform which may have many if not all of the subcomponents and functionalities of the consumer product information kiosks shown in FIG. 3A3, and described in great detail hereinabove (e.g. including touch-screen LCD panel, automatic laser scanning bar code reader), and therefore, may function as such if and when retail conditions require. However, Web-based the product promotion kiosk of FIGS. 3A19C and 3A19D also includes a number of important intelligence functionalities which makes it particular well suited for product advertising and promotion within retail stores, as shown in FIG. 3A20.

In particular, as shown in FIG. 3A19D, the product promotion kiosk comprises a pair of 2-D CCD sensors and associated light collection optics, integrated within its ultra-thin flat-panel housing, for automatically capturing images of scenery (e.g. human subjects) with its field of view (FOV) of the kiosk, as shown in FIG. 3A19C, and an image processor for processing the same to detect the presence of human eyes glazing at the display surface of the kiosk. Such images are captured using image capture subsystem, of which the 2-D CCD sensors comprise a subcomponent. The individual fields of view of each CCD sensor can be combined to provide a resultant FOV for the kiosk. Each digital image is time-stamped and transferred to an image buffer for preprocessing in a manner well known in the art. Details on digital image preprocessing algorithms can be provided in the textbook "HANDBOOK OF IMAGE PROCESSING OPERATORS" (1996) by R. Kletpe and P. Zamperoni, incorporated herein by reference.

As shown in FIG. 3A19D, a high-speed digital image processor is provided for processing each preprocessed image of the captured scenery, so as to detect one or more pairs of eyes within the captured image, indicative that human eyes were gazing at the product advertisement and promotion being displayed at the time-stamped instant of the captured image. Conventional eye-tracking algorithm software known in the art can be used or otherwise adapted to perform this image processing function.

Each time a pair of eyes is detected, data indicative thereof (including the time stamp) can be stored within long-term memory (e.g. written to a hard disc storage embodied within the kiosk), whereas each frame of buffered image data, once analyzed, can be discarded (i.e. dumped). Such image frame data can be captured at a rate of 5 or more (pairs of) frames per second to collect accurate information about the number of eyes gazing at the displayed advertisements, within the field of view of the kiosk, which is spatially coincident with the view angle of the touch-screen LCD panel employed within the kiosks. At the same time, information about which UPN-indexed product advertisements are being displayed on the GUI of the kiosk, at time-stamped instances of operation, can also be written to the hard drive of the kiosk, and eventually be compared against the eye-tracking data recorded thereon to determine the number of eyes which gazed at each product advertisement/promotion displayed on each product promotion kiosk, within a particular store, on a given date, as indicated by the exemplary report shown in FIG. 3A24. Periodically, this information can be transferred to a retailer-operated server on the LAN or WAN for comparison with sales information collected at retailer-operated POS stations. As indicated in the report of FIG. 3A24, the server can be analysis the collected retail information and determine how many units of a particular UPN-labeled product were sold in the retail store, within which product advertisements/promotions for the product were displayed on product promotion kiosks within the retail store environment. Such reports will help determine the efficacy of a product advertising/promotion program run over the network of product promotion kiosks in the store, and how the program should be modified to increase sales. All sorts of value information can be collected by the intelligent Web-based product promotion kiosks of the present invention, including shopper traffic through a retail store, patterns of shopper pooling during particular pats of the day, all carried out in a non-intrusive manner without violating the privacy concerns of the retailer's customers.

The Database Structure of the IPD Server

In the illustrative embodiment of the present invention, each data-synchronized IPD Server 11 of the preferred embodiment maintains at least two different relational-type databases, namely: a IPI Registrant Database for storing information about manufacturers whose products are registered with the system; and a Non-IPI Registrant Database for storing information about manufacturers whose products are not registered with the system. A schematic representation of the IPI Registrant Database is shown in FIG. 4A1, whereas a schematic representation of the Non-IPI Registrant Database is shown in FIG. 4B.

As shown in FIG. 4A1, the relational-type IPI Registrant Database maintained by each IPD Server comprises a plurality of labeled information fields for each product "registered" therewith, namely: an IPN Information Field for storing information (e.g. numeric or alphanumeric string) representative of the Universal Product Number (e.g. twelve-digit UPC Version A number, eight-digit UPC Version E number, thirteen-digit UPC/EAN number, or twelve-digit UPC Version A number plus five-digit Add-On Code Segment number frequently used in the publishing industry) assigned to the consumer product; a Company Name Information Field for storing information (e.g. numeric or alphanumeric string) representative of the name of the company making, selling or distributing the corresponding product; a URL Information Field(s) for storing information (e.g. numeric or alphanumeric string) representative of the Universal Resource Locator (URL) or Universal Resource Locators (URLs) at which information resource(s) of the multimedia type can be found on the Internet relating to the corresponding consumer product; a Trademark Information Field for storing information (e.g. text and/or alphanumeric strings) representative of each trademark (or Domain Name) used in connection with the promotion, sale, distribution and/or use of the corresponding product, and preferably registered with the United States Patent and Trademark Office (USPTO) or other governmental or quasi-governmental agency (e.g. INTERNIC or Network Solutions, Inc.); a Product Description Information Field for storing information (e.g. text strings) descriptive of the corresponding product; an E-mail Address Information Field for storing information (e.g. numeric or alphanumeric string) representative of the e-mail address of the corresponding company (e.g. manufacturer) on the Internet; a CPIR-Enabling Applet Information Field for storing information representative of consumer product information request (CPIR) enabling Applets accessible by retailers, wholesalers, advertisers, Web publishers and the like by downloading operations to be described in detail hereinafter, and eventually inserted within the HTML code of Web documents on various types of Internet information servers used to host WWW sites of all sorts, so that, when executed, these CPIR-enabling Applets automatically access from the master UPN/URL Database Management Subsystem 9 hereof, a categorized menu of URLs specifying the location of information resources on the Internet pertaining to a particular UPN-labeled product and symbolically linked thereto by its manufacturer or authorized agent; image file storage field for storing color images of consumer products registered with the system; and a Status Information Field for storing information (e.g. numeric or alphanumeric string) representative of whether the company (e.g. manufacturer) associated registered product has paid their monthly, quarterly or annual registration fees associated with registration within the IPD Servers of the information finding and serving subsystem hereof. Notably, each information item contained with the information field shown along the same horizontal line of FIG. 4A1 is related or linked.

In general, the URL stored in the URL Information Field specifies the address of an information resource on the Internet (e.g. Web), and thus may point to any one of the following types of information resources: a HTML document or file on the World Wide Web (expressed in the HyperText Markup Language); a single record in a database; the front-end of an Internet program such as Gopher; or the results of a query made using another program. In accordance with convention, the syntactic structure of each URL generally comprises: a Protocol Specifier, such as "http", "ftp", "gopher", "news", or "mail to", and specifies the type of resource that the URL is pointing (i.e. connecting) to; a Host Indicator, represented by double slashes "//" if the URL is requesting information from a Web Server; Server Name comprising an Internet Domain Name (e.g. "www."), the address of the Web Server (e.g. "ibm."), and a designator (e.g. "com", "edu", "int", "mil", "net", "org", etc.) identifying who owns the server or where it is located; a Path Name, such as "Products/Computers/", indicating a path to the destination information file on the identified Server; and a Resource Name (including file extension, e.g. ".html"), such as "aptiva.html", identifying the actual named information file that contains actual information resource specified by the URL.

As used herein as well as in the claims to Invention, the term "registered" and the variants thereof shall be understood to mean listed or having an entry within a database. Such listing or entry can be achieved in a variety of ways including, but not limited to: (i) by specific request of the associated company or business; or (ii) by the system administrator without a request and/or authorization of the corresponding company or business linked to the product.

Notably, each information item contained within the information field shown along the same horizontal line of FIG. 4A1 is symbolically related or linked. Different products of the same registrant or related registrant may also be linked together so that a user looking for information about a particular product is automatically provided with URLs which are assigned to related products of the registrant which may satisfy the goals or objectives of a particular advertising and/or marketing campaign or product promotion program of the registrant company. As it may be desired to relate particular products at particular points in time, the relationships therebetween can be dynamically changed within the IPI Registrant Database by a straightforward database updating operation carried out by a system administrator (or manager) who, in theory, can be located virtually anywhere throughout the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve-digit numeric string (for UPC Version A) or eight-digit numeric string (for UPC Version E) will be a preferred UPN (in many applications) for purposes of carrying out the principles of the present invention. This twelve (12) digit human-readable number, printed on the bottom of each UPC label (and encoded within the bars and spaces of the UPC label itself), comprises: (i) a six digit manufacturer number assigned to the manufacturer by the Uniform Code Council, Inc. (UCC) of Dayton, Ohio, and consisting of a one digit "number system" number and a five digit manufacturer code; (ii) a five digit "product" number assigned to the product by the manufacturer; and (iii) a one digit modulo check digit (mathematically calculated) and added to each UPC number to check that the code has been read correctly by the bar code symbol reader.

In order to provide the requester greater control over what information is actually displayed on its client subsystem, the URL Information Field of the IPI Database shown in FIG. 4A1 contains a number of information subfields. As shown in FIG. 4A2, these information subfields comprise: a Product Advertisement Information Field for storing information representative of URLs pointing to information on the Internet relating to advertising and/or promotion of the product; a Product Specification (i.e. Description) Information Field for storing information representative of URLs pointing to information on the Internet relating to specifications on the product; a Product Update Information Field for storing information representative of URLs pointing to information on the Internet relating to product updates, recalls, notices, etc; a Product Distributor (e.g. Wholesaler and/or Reseller) Information Field for storing information representative of URLs pointing to information on the Internet relating to distribution, sale and/or ordering of the product; a Product Warranty/Servicing Information Field for storing information representative of URLs pointing to information on the Internet relating to warranty, extended warranty offerings, servicing and maintenance of the product; a Product Incentive Information Field (e.g. rebates, discounts and/or coupons) for storing information representative of URLs pointing to information on the Internet relating to rebates, discounts and sales on the product; a Product Review Information Field for storing information representative of URLs pointing to information on the Internet relating to reviews, analysis, testing, inspection and/or comparison of the product; and Miscellaneous Information Field(s) for storing information representative of URLs pointing to information on the Internet relating to miscellaneous aspects of the product (e.g., direct product sales on the WWW, product installation/set-up and operating manuals, company reports (10 Ks, annual reports, etc.), and the like. Each URL symbolically linked to a UPC-labeled product registered in the Registered IPI Database is categorized within one or more of these URL categories.

The list of URLs recordable in the IPI Registrant Database for each registered UPC-labeled product is virtually unlimited. Below are just a few examples of how the IPI Finding and Serving Subsystem hereof can be used as a virtual sales agent that provides value-added services to consumers, retailers and the like.

For each CD sound recording, the URL list may contain a URL that points to a promotional QuickTime® video recording or MP3-formatted sound recording published on the WWW for reviewing and evaluation by the consumer. The promotional song can be by a commissioned or endorsing artist, as is typically done in conventional advertising programs. The same can be done for video recordings on tape and digital video discs (DVDs). The URL may also provide the consumer with a down-loadable trial version of the product for a limited time period.

For each computer software product, the URL list may contain a URL that points to a multi-media clip on the WWW that provides a demonstration of the solutions that the software product provides, as well as the functions and development tools that it enables. It may also provide the consumer with a down-loadable version of the software product for a time-limited trial period.

For electronic consumer products, the URL list may contain a URL that points to a multi-media clip on the WWW that provides an audio-visual demonstration of the product in various user environments. Also, the URL list can contain a URL that points to a Web-based Specification Sheet that can be printed out in a retail environment, at home, work or on the road.

For groceries and like articles, the URL list may contain a URL that points to a multi-media clip on the WWW that provides a QuickTime® video recording or the like of the product, illustrating various cooking recipes and uses for the product. Also, the URL list can contain a URL that points to a Web-based Discount Coupon that can printed out in the store, at home or work.

For toys, the URL list may contain a URL that points to a multi-media clip on the WWW that provides an audio-visual demonstration of the toy along with promotional endorsements by the various characters used in its advertising campaign.

For clothing, garments, or accessories (e.g. wearing apparel), the URL list may contain a URL that points to a multi-media clip on the WWW that provides a QuickTime® video recording or the like of the clothing, garments, and/or accessories being modeled by stunning fashion models. Ideally, such video recordings, linked to particular articles of wearing apparel by their UPC number, can be used to extend and augment the advertising campaign being carried out in other forms of media (e.g. television, radio, print, billboards, etc.).

Preferably, the manufacturer, its marketing personnel and advertising agents will actively participate in the creation of the product related information resources, as well as the placement of their URLs into the above-defined (or like) URL categories maintained within the Database of the IPI Finding and Serving Subsystem hereof. Also, using the Manufacturer/Product Registration Subsystem hereof, manufacturers and/or their agents can easily link their UPNs (e.g. UPC and/or EANs) with such URLs and manage the same in a dynamic manner to ensure that product related information on the Internet is accurately linked to the UPNs of the manufacturer's products. Through such active participation, the business objectives of any particular manufacturer or retailer can be promoted by way of the IPI Finding and Serving Subsystem of the present invention. In this way, the information requesting consumer is provided with only the kinds of product-related information which he or she seeks.

As shown in FIG. 4B, the Non-IPI Registrant Database maintained by each IPD Server comprises a plurality of labeled information fields for each product that is not currently registered with the IPD Server, namely: an IPSN (i.e. IPN) information Field for storing information (e.g. numeric or alphanumeric string) representative of the Universal Product Number (e.g. a UPC number from a UPC numbering system, or an EAN numbering system) assigned to the non-registered product; a Company Name Information Field for storing information (e.g. numeric or alphanumeric string)

representative of the name of the company making, selling or distributing the corresponding non-registered product; a Trademark Information Field for storing information (e.g. text and/or alphanumeric strings) representative of each trademark used in connection the promotion, sale, distribution and/or use of the corresponding product, and preferably registered with the USPTO or other governmental agency; a Product Description Information Field for storing information (e.g. text strings) descriptive of the corresponding product; and an E-mail Address Information Field for storing information (e.g. numeric or alphanumeric string) representative of the e-mail address of the corresponding company (e.g. manufacturer) on the Internet; a Status Information Field for storing information (e.g. numeric or alphanumeric string) representative of whether the company associated non-registered product has been solicited by the IPD Server, and on what dates registration solicitation has occurred. Notably, each information item contained with the information field shown along the same horizontal line of FIG. 4A1 is related or linked. The information required to construct the Non-IPI Registrant Database shown in FIG. 4B can be readily obtained from a number of commercially or publicly available information sources (e.g., the Universal Code Council, Inc., Dayton, Ohio; QRS, Inc. Of Richmond. Calif.; General Electric Information Services (GEIS) of Delaware, Maryland; etc.).

Constructing the IPI Registrant Database Within the IPI Finding and Serving Subsystem Hereof The utility of the product finding functionalities of the IPI Finding and Serving Subsystem hereof depends in large part on the number of consumer-products registered with the IPI and Non-IPI Registrant Databases supported within the UPN/URL Database Management Subsystem 9 hereof, as illustrated in FIGS. 2B1, 2B2, 2B3 and 2B4. In principle, numerous techniques may be employed separately or in combination with each other in order to construct the IPI and Non-IPI Registrant Databases of the present invention. Six such techniques will be detailed below.

According to a first database construction technique, the administrator of the IPI Registrant Database would transmit Product Registration Requests (PRRs) in the form of electronic documents to each and every the manufacturer having been issued, for example, a six digit UPC Manufacturer Identification Number (MIN) by the UCC, Inc. Such electronic documents can be transmitted using conventional MIME protocols such as, for example, STMP. The Product Registration Request document would seek to ascertain from the manufacturers the various information items (including the menu of URLs) identified in the IPI Registrant Database of FIG. 4A1. In response to the Product Registration Request, each solicited manufacturer would send back to the administrator of the IPI Registrant Database (for each of its consumer products) its UPC number and a menu of categorized URLs indicating the location of the information resources identified in the Product Registration Request document. This information can then be used to readily construct the IPI Registrant Database of the illustrative embodiment.

According to a second database construction technique, a global advertising campaign would launched (over various media) in order to solicit the various information elements identified in the IPI Registrant Database of FIG. 4A1 and thus register the products of the manufacturers selling UPC-labeled products. Preferably, such information would be collected by way of an electronic data transfer subsystem(s) set-up to cooperate with the system of the present invention in order to facilitate database construction operations.

According to a third database construction technique, the IPI system itself would continuously solicit consumer product registrations over time in order to collect information from companies responding favorably to the solicitations. While such solicitation efforts can involve the issuance of product registration requests using various types of media, it is preferred that the information collection operations are carried out using electronic data transfer techniques (e.g. ftp, EDI or XML/ICE) described hereinabove.

According to a fourth database construction technique, a number of commercial on-line Internet search engines, such as AltaVista™, Yahoo™, WebCrawler™, Lycos™, Excite™, as well as powerful off-line parallel-processing search engines, would be enlisted to analyze (i.e. mine) information on the WWW in order to collect and link the information elements specified in the IPI Registrant Database of FIG. 4A1.

Once an "initial" IPI Registrant Database has been constructed using any one or more of the four database construction techniques described hereinabove, manufacturers registered therewith can be periodically contacted using Web-based electronic document (i.e. message) transfer techniques in order to request updating and confirmation of the UPN/URL listings contained within the database of the IPI subsystem of the present invention.

According to a fifth database and preferred construction technique of the present invention, the Registrant IPI Database of the system would be initially "seeded" with several items of information obtained and related without the assistance of manufacturers of UPC-labeled products. Such information items include: (1) the six digit UPC Manufacturer Identification Numbers encoded in the UPC symbols (and numbers) applied to the products of such UCC-registered manufacturers; and (2) the URLs of the Web home pages of such manufacturers.

The first step of this database construction method involves obtaining the six digit Manufacturer Identification Numbers (MINs) uniquely issued to manufacturers by the Uniform Code Council, Inc. of Dayton, Ohio. Such MINs can be obtained from various commercial sources including GE Information Services, QRS, Inc. formerly Quick Response Services, Inc.), as well as the UCC. At present, about 180,000 Manufacturers Identification Numbers have been issued to manufacturers by the UCC. A string of six zeros (i.e. 000000) may be added to each one of these 180,000 or so six digit Manufacturer Identification Numbers in order to produce 180,000 or so 12 digit numbers (i.e. hereinafter referred to as "Manufacturer's Reference Numbers) for the 180,000 or so manufacturers listed in the IPI Registrant Database under construction. As each such Manufacturer Reference Number has the same length as a UPC number of its manufacturer, this number can be conveniently thought of as the "Manufacturer Reference UPC Number" which can be stored in the UPN Information Field of the Database along with the corresponding manufacturers name being stored in the Company Name Information Field.

The second step of the method involves finding the URL of the Web home page of each of the 180,000 or so manufacturers who, to date, have been assigned a Manufacturers Identification Code and are listed in the Database. Such URL information can be found using a number of available techniques: (i) using a commercially available search engine to search the WWW in order to find the URL of the home page of each manufacturer's Web-site, if it has one, using the name and address thereof obtained during the first step above; or (ii) using a commercially available (INTERNIC-enabled) Domain Name search service that uses the names and addresses of the manufacturers (obtained during the first step above) in order to determine whether a particular manufacturer has a registered domain name on the Internet, and if so, is the domain name being actively used in a URL that points to the home page of the manufacturer's Web-site. Once obtained, such URLs are then added to the IPI Database, along with the e-mail and/or other address of the manufacturer symbolically linked thereto (if available).

Having constructed the "seeded" Database, it can then be used to connect the client subsystem of users to the home page of Web-sites of manufacturers of particular products. Initially, when an Internet user provides the UPC number of a particular product as input to the Input Box of the HTML form displayed in the information display frame of the client subsystem (e.g. when operated in its Manufacturer Website Search Mode), then the IPD Server need only compare the first six digits of the entered UPC number against the first six-digits of the Manufacturer Reference UPC Numbers (i.e. Manufacture Identification Numbers) listed in the "seeded" Database. The corresponding (home-page) URL of the matching manufacturer is returned to the client subsystem Ca for display. In instances of an initially seeded Database, in which only the "Manufacturer Reference UPC Numbers" are listed therein, the requesting client subsystems are provided with the URLs of the home pages of the symbolically linked manufacturers. Then as manufacturers begin to register their consumer products with the system (e.g. in response to mass e-mailings, advertisements and/or marketing and promotional efforts, etc.), the IPD Database will return a menu of "hot-linked" URLs, for each registered product, pointing to various types of product-related information resources on the Internet (described above) that can be easily accessed by simply clicking thereon in a conventional manner. Over time, Manufacturer Reference UPC Numbers and the URLs of the "home pages" of such manufacturers will become replaced by the UPC numbers of registered products and the menu of URLs on the WWW symbolically linked thereto by the manufacturers, thereby allowing consumers and users of the system to precisely pinpoint consumer product-related information on the WWW which has been specified by the manufacturer, its marketing department and/or advertising agency. With manufacturer's and advertiser's participation and feedback, the initially seeded RDBMS described hereinabove will quickly grow into a robust RDBMS richly filled with the various information items described in FIGS. 4A1 and 4A2, including the symbolically linked UPCs and URLs that point to very specific consumer product related information resources (i.e. files) stored within IPI Servers of the system located across the global expanse of the Internet.

According to a sixth database construction technique of the present invention, the Registrant IPI Database of the system would be constructed by allowing each manufacturer to construct a limited or restricted version of the master UPN/URL Database (i.e. Registrant IPI Database) of the system, wherein only UPC-encoded products of the registered manufacturer and Web-based information items related thereto are entered into the database. As will be described in greater detail herebelow in connection with the third method of Product Registration in the subsystem hereof, the creation of such limited-version UPN/URL databases can be carried out by providing each registered manufacturer with a computer program that allows its administrators to construct and manage a limited UPN/URL database in a "turn-key" manner. Also, from its Website, the manufacturer can serve the limited UPN/URL database over the Internet to consumers. As part of the registration process, each registered manufacturer transmits its limited UPN/URL database to Web-server 30 which then integrates all such databases in order to update the master UPN/URL database (IPI Registrant Database) of the system.

Methods of Constructing UPN-Encoded Server-Side and Client Side Applets and Distributing The HTML Tags Associated Therewith to Remote Client Subsystems for Embedding Within HTML-Encoded Documents to be Published Over the Internet in Connection With UPN-Labeled Consumer Products In general, for each system architecture shown in FIGS. 2B1 through 2B4, there will be a different Applet-driven method used to access consumer product related information (e.g. UPN/URL links, trademark/URL links, etc.) from the RDBMS server 9 and display the search results within a Java-based GUI at the point of presence of the consumer using a Java-enabled client machine 13. In order to practice these different methods, in various e-commerce related applications which will be described in greater detail hereinafter, it will be helpful to construct either server-side or client-side UPN-encoded CPIR-enabling Applets, distribute the HTML tags associated therewith to remote client subsystems, and thereafter embed these CPIR-enabling Applet tags within HTML-encoded documents for publishing over the Internet. Such CPIR-enabling Applet construction, distribution and embedding methods will now be described in detail hereinbelow.

The First Applet-Driven Method of Accessing and Displaying Categorized UPN/URL Link Menus from the UPN/URL Database Management Subsystem the Present Invention After providing a brief overview on the system architecture of FIG. 2B1 and the nature of the server-side CPIR-enabling Applets deployed therewithin, The steps associated with Applet-driven CPI-acquisition method of the first illustrative embodiment will be described in detail with reference to FIGS. 4E 1, 4E2, 4F1 and 4F2.

In general, the method of FIGS. 4E1 and 4E2 involves using a server-side CPIR-enabling Applet to automatically conduct a UPN-directed search on the UPN/URL Database Management Subsystem 9 hereof (i.e. RDBMS server 9) in response to a single mouse-clicking operation by the consumer on the HTML tag associated with the server-side Applet. In the illustrative embodiment, the CPIR-enabling servlet of the present invention is a program written in the Java™ programming language and has an HTML tag (indicated by <SERVLET>) which is designed to be included in an HTML page, much in the same way an image can be included therewithin (according to the HTML 3.2 Specification).

CPIR-enabling servlets of the present invention are designed to work within a request/response processing model, as shown in FIG. 2B1. In this request/response model, a client subsystem 13 sends a request message to the Java Web Server 11' and the Server 11' responds by sending back a reply message. In the illustrative embodiment, requests come in the form of http, although is understood that the use of other protocols such as ftp, EDI or a custom protocol, may be possible in particular embodiments. The request and the corresponding response reflect the state of the client and the server at the time of the request.

When using a Java-enabled browser to view a Web page containing a server-side CPIR-enabling Applet tag <SERVLET>, the servlet's compiled class code is automatically accessed from the Java Web Server 11' and executed on the server-side of the network connection illustrated in FIG. 2B1. Thus, as shown in FIG. 2B1, the Java Web Server 11' must provide a Java Virtual Machine (JVM) for running/executing Java servlets on the server-side of the network in much the same way that a client browser must provide a JVM for running Java Applets on the client side thereof. Additionally, the Java Web browser 11' must also support the Java Servlet API, developed by JavaSoft, and define how and when the servlet communicates with the Java Web Server. Essentially, the Servlet API is a well-defined set of function calls (i.e. set of Java classes) to get information to and from the Java Web Server. The servlet needs to be able to access server-defined variables, issue redirects, send error messages and the like. Sun's Java Web Server supports the Servlet API and, of course, includes their JVM.

As shown in FIG. 2B1, the Java Web Server 11' includes a number of software components including the Java Servlet API which comprises several Java interfaces and fully defines the link between the hosting server (e.g. Java Web Server) and the servlets located at the middle tier. The Servlet API is defined as an extension to the standard JDK. This means that there is an explicit definition of servlet interfaces, but it is not part of the Java Development Kit (JDK) 1.1 or the Java 2 platform. Instead, the servlet classes are delivered with the Java Servlet Development Kit (JSDK) version 2.0 from Sun (http://java.sun.com/products/servlet/). This JSDK version is intended for use with both JDK 1.1 and the Java 2 platform. There are a few significant differences between JSDK 2.0 and JSDK 1.0.

JDK extensions are packaged under javax—the root of the Java extension library tree. The Java Servlet API contains the following packages: Package javax.servlet; and Package javax.servlet.http dedicated to supporting HTTP protocol and HTML generation. The Servlet API provides a tight link between a server and servlets, allowing servlets to add new protocol support to a server. Essentially, any protocol (e.g. SMTP, POP, FTP, etc.) that follows a request/response computing model can be implemented by a servlet.

General servlet support is provided by the package "javax.servlet" which comprises the following components:

(1) Servlet: An interface that defines communication between a web server and a servlet. This interface defines the init( ), service( ), and destroy( ) methods (and a few others).
(2) ServletConfig: An interface that describes the configuration parameters for a servlet. This is passed to the servlet when the web server calls its init( ) method. Note that the servlet should save the reference to the ServletConfig object, and define a getServletConfig( ) method to return it when asked. This interface defines how to get the initialization parameters for the and the context under which the servlet is running.
(3) ServletContext: An interface that describes how a servlet can get information about the server in which it is running. It can be retrieved via the getServletContext( ) method of the ServletConfig object.
(4) ServletRequest: An interface that describes how to get information about a client request.
(5) ServletResponse: An interface that describes how to pass information back to the client.
(6) GenericServlet: A base servlet implementation. It takes care of saving the ServletConfig object reference, and provides several methods that delegate their functionality to the ServletConfig object. It also provides a dummy implementation for init( ) and destroy( ).
(7) ServletInputStream: A subclass of InputStream used for reading the data part of a client's request. It adds a readLine( ) method for convenience.
(8) ServletOutputStream: An OutputStream to which responses for the client are written.
(9) ServletException: Should be thrown when a servlet problem is encountered.
(10) UnavailableException: Should be thrown when the servlet is unavailable for some reason.

Support for HTTP Servlets is provided by the package "javax.servlet.http" which comprises the following components:

(1) HttpServletRequest: A subclass of ServletRequest that defines several methods that parse HTTP request headers.
(2) HttpServletResponse: A subclass of ServletResponse that provides access and interpretation of HTTP status codes and header information.
(3) HttpServlet: A subclass of GenericServlet that provides automatic separation of HTTP request by method type. For example, an HTTP GET request will be processed by the service( ) method and passed to a doGet( ) method.
(4) HttpUtils: A class that provides assistance for parsing HTTP GET and POST requests.

The central abstraction in the Java Servlet API is the Servlet interface. All servlets implement this interface, either directly or more commonly by extending a class that implements it (e.g. such as the HttpServlet class). The Servlet interface declares but does not implement methods that manage the servlet and its communication with clients. The servlet writer will provide some or all of these methods when developing a CPIR-enabling servlet.

Having provided an overview on server-side CPIR-enabling Java Applets (i.e. Servlets) of the present invention and the support framework required thereby in a distributed-computing object oriented programming environment shown in FIG. 2B1, it is appropriate to now describe the method of creating, loading, distributing, embedding and executing server-side CPIR-enabling Java Applets in accordance with the principles of the present invention schematically illustrated in FIGS. 4E1, 4E2, 4F1 and 4F2.

As indicated at Block A1 in FIG. 4E1, the first step of the method involves using the Java Servlet API to write or otherwise author the source code for a server-side CPIR-enabling Java Applet., for each UPN-specified consumer product registered in the UPN/URL Database Management Subsystem 9. In general, the source code for each server-side CPIR-enabling Java Applet (i.e. servlet) will embody one or more of following items of information, namely: (i) the UPN of the particular product on which the CPI search is to be carried out and the search results thereof displayed; (ii) Java classes required for performing a UPN-directed search on the RDBMS Server 9 using one or more Java methods running natively on the Java Web Server 11', and producing a particular Java GUI for displaying the results obtained from the UPN-directed search; and (iii) license-related information specifying the terms and conditions of the CPIR-enabling Servlet license and the conditions under which the CPIR-enabling servlet shall operate.

Notably, such license-related information may specify: (1) one or more specific host domains from which a Web document containing the corresponding servlet tag may launch the CPIR-enabling servlet under a licensing program; (2) one or more general Internet domains (e.g. .com, .org., .gov, .int, .mil, .uk, etc.) from which a Web document containing the corresponding servlet tag may launch the CPIR-enabling servlet under a licensing program; (3) the time duration of the licensing period associated with the CPIR-enabling servlet; and (4) any other restrictions set by the associated manufacturer and/or retailer, and/or administrator of the consumer product information system hereof, that must be observed for a registered CPIR-enabled servlet to operate within a Web-document served from the registered Internet domain.

Notably, the Java source code for each CPIR-enabling Servlet will vary depending upon implementation. However, regardless of the particular implementation, it can be expected that each JDBC-supporting CPIR-enabling servlet when, for example, designed to search an (Oracle JDBC-supported) UPN/URL Database Server 11A for the UPC/URL list currently symbolically linked to a specified UPN and display the search results on the requesting client machine 13, will typically include Java source code specifying:

(1) the importable JDBC classes required by the CPIR-enabling Servlet;
(2) the importable Java classes to be used in the CPIR-enabling Servlet;
(3) the JDBC driver to be loaded for the Oracle-based UPN/URL Database;
(4) the connection strings to the UPN/URL Database;
(5) the CPI query to be executed on the UPN/URL Database, dependent on the UPN of the associated consumer product and possibly other search criteria and Servlet licensing conditions;
(6) the servlet tag, its graphical icon or alias to trigger execution the Servlet and its associated CPI query;
(7) the CPI Search Result GUI to be displayed on the requesting client machine and its relative location to the associated Servlet tag; and
(8) the operations that will be carried out upon execution of the CPI query including
Boolean search logic to be carried out upon initiation of the UPN-directed CPI search;
if a new connection is required between Java Web Server and the UPN/URL Database;
Loading the JDBC driver;
Connecting to the UPN/URL Database;
Creating a SQL statement based on the specified Boolean search logic and UPN;
Executing the SQL query statement; and
Dumping the search results to the CPI Search Result GUI.

In the embodiment depicted in FIG. 2B1, a UPN-encoded Servlet is used to replace a Common Gateway Interface (CGI) script and provide a way of searching the UPN/URL Database on RDBMS Server 11', with the advantage of increased speed and stability. In this instance, CPIR-enabling Servlets are accessed by the user as an HTML tag <SERVLET> embedded in an HTML document served to the client subsystem 13. For example, when the consumer selects the servlet tag (graphically encoded by an icon or image) in an HTML-encoded document, the linked servlet residing on the server-side of the network, is automatically executed, causing a UPN-directed search to be carried on the RDBMS server 9.

After writing/authoring the source code for the Applet, the CPIR-enabling Java servlet is ascribed a unique name such as, for example, "UPNXXXXYYYYYZ" for a 12 digit Uniform Product Code.

Reference can be made to the following technical publication for additional details on writing Java servlets, designing Java GUIs and the like: "Java Servlets and Serialization With RMI" (1999) by Scott McPherson, published by Sun Microsystems, Inc., of Palo Alto, Calif.; "The Java™ Tutorial Second Edition: Object Oriented Programming For The Internet" (1999), by Mary Campione and Kathy Walrath, published by Sun Microsystems, Inc., of Palo Alto, Calif.; and "The JFC Swing Tutorial: A Java Guide To Constructing JAVA GUIs" (1999), by Mary Campione and Kathy Walrath, published by Sun Microsystems, Inc., of Palo Alto, Calif.; "JAVA" (1997) by Ed Tittel and Bill Brogden, published by IDG Books Worldwide, Inc.; "Wilde's WWW: Technical Foundations of the World Wide Web" (1999) by Erik Wilde, published by Springer-Verlag, Berlin, Heidelberg each said publication being incorporated herein by reference.

As indicated at Block A2 in FIG. 4E1, the source code for the authored servlet is compiled into Java bytecode, and java bytecode for the servlet classfiles are placed in the server_root/servlets directory on the Java Web Server 11'. When compiling, the javax.servlet.* package should be placed in the classpath. The easiest way to do this is to include server_root/lib/classes.zip in the classpath, but it is understood that one must look to the compiler's documentation for specific details in this regard.

As indicated at Block B1 in FIG. 4E 1, the second step of the method involves using the Java Server Administration Applet to configure the Java Web Server so as to extend the functionalities thereof and embody (or install) the CPIR-enabling Java servlet within the Java Web Server 11'. This process of extending the functionalities of the Java Web Server 11' involves specify the default parameters and arguments thereof. This configuration step is carried out when using the Servlet Loading facility of the Administration Applet in order. The loading process is achieved by clicking on the Servlets Button, and then selecting Add from the list of choices on the left GUI of the Servlet Loading Facility. Thereafter, to add a new servlet, the following procedure is performed: Enter in the Servlet Name field, the unique name for the CPIR-enabling Java servlet one is loading onto the Java Web Server (e.g. "UPNXXXXXXYYYYYZ"); Enter in the Servlet Class field, a valid class name for the Java class of the CPIR-enabling servlet, i.e., the full package name, e.g. "sun.server.http.FileServlet"; and thereafter Click on the Add button.

As indicated at Block B2 in FIG. 4E1, the fourth step of the method involves invoking the CPIR-enabling Java servlet by creating a URL having the path section "/servlet/" prepended to the assigned Servlet Name, so that the URL can be thereafter embodied within the servlet HTML tag <SERVLET>, prior to its insertion within the HTML code of a Web document. To invoke a servlet, the webmaster/administrator calls the servlet by creating a URL with "/servlet/" prepended to the servlet name. One can confirm that the servlet is correctly invoked by entering this URL into ones Web browser and analyzing the output of the created servlet.

As indicated at Block B3 in FIG. 4E1, the fifth step of the method involves (1) embodying the unique URL, created for each consumer product, within a CPIR-enabling servlet HTML tag <SERVLET>, (2) containing each such servlet HTML tag within an executable file, and (3) storing each such servlet tag containing file in the Central CPIR-Enabling Applet Library on the RDBMS Server 9.

As indicated at Block C in FIG. 4E2, the sixth step of the method involves distributing the CPIR-enabling servlet HTML tags (within the Central CPIR-enabling Applet Library) to retailers, wholesalers, advertisers, and others who desire to deliver UPN-directed CPI search results to their customers, clients and the like. This distribution process can be carried out by downloading servlet tag containing files to a remote computer system connected to the Internet using, for example, ftp or other electronic data or document interchange protocols (e.g. XML/ICE) to carry out the servlet tag transport process. These downloaded CPIR-enabling servlet tags can then be stored in a local CPIR-Enabling Applet/Servlet Library maintained on a client computer 13, as shown in FIG. 4F2, until it is time to embed the same into a particular HTML-encoded document.

As indicated at Block D in FIG. 4E2, the seventh step of the method involves enabling retailers, wholesalers, advertisers, and others to (1) open the downloaded servlet tag containing files, (2) extract the CPIR-enabling servlet tags contained therewithin, and (3) embed (i.e. insert) one or more distributed CPIR-enabled servlets HTML tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may, understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling servlet tag <SERVLET> using, for example, simple commands or drag-and-drop procedures.

As indicated at Block E in FIG. 4E2, the eighth step of the method involves serving "servlet-tag" encoded HTML documents from Internet information servers to Java-enabled client computer subsystems 13 operated by consumers at home, in the office, in EC-enabled or "brick and mortar" retail stores, or on the road, as the case may be. As shown in FIG. 4F, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4E2, the ninth step of the method hereof involves using a Java-enabled client computer subsystems 13 to display served HTML-encoded documents having one or more of CPIR-enabling servlet tags embedded therewithin. This step is carried out by the consumer pointing his or her Java-enabled browser program (e.g. Netscape Navigator, Microsoft Explorer, or Sun Microsystems' HotJava program) to an HTML-encoded document within which a CPIR-enabling Java servlet tag is embedded, at a particular point of presence on the WWW. As shown in FIGS. 4M1 through 4R2, CPIR-enabling Applets can be graphically-encoded in an variety of different ways to provide the consumer with a visual indication that, clicking on the graphical object however manifested, will automatically result in a consumer product information search on a particular product identified by the UPN encoded within the associated servlet. In view of the fact the CPIR-enabling servlet tags are distributed over the Internet and inserted within HTML documents by others than the servlet author, at some future date, graphical encoding of CPIR-enabling servlets will typically occur at the time of writing the servlet.

With the above point in mind, it will be helpful to adopt a standardized icon for graphically indicating the presence of a CPIR-enabling servlet tag within an HTML document. In the illustrative embodiments shown in FIGS. 4P1, 4P2, 4R1, 4R2, 4S1, and 4S2, small predefined images of servicemarks such as "GO: UPC Request Cyber-Service™ URL Search" are served to inform the consumer that the Java object, if selected from the displayed Web page, will automatically cause a product-specific URL search to be performed with respect to the particular consumer product and the results thereof displayed at the "point of presence" of the consumer who may be residing at a particular point in an EC-enabled store (e.g. at the check-out display screen or POS), at on-line auction site, at a Web-based product advertisement, or anywhere else on the WWW. Notably, an important advantage provided by this information search technique of the present invention is that it does not disturb the consumer at his or her point of presence (or sale), where ever that may be. Instead, the CPI search and display method hereof enables the delivery of accurate product-specific manufacturer-defined information at precise points in Cyberspace by performing a single mouse-clicking operation. This enables consumers to make informed decisions threat based on the information displayed in the corresponding Java GUI generated upon launching a CPIR-enabling servlet at the consumer's point of presence on the WWW.

It is understood, however, that other techniques may be used to create a visual indication to the consumer that a CPIR-enabling Applet is located at a particular point on the WWW and that if this Applet is executed (e.g. by a single mouse-clicking operation), then a UPN-directed consumer product information search will be automatically executed and the results therefrom will be displayed within a Java GUI at the consumer's point of presence.

One alternative technique would be to embed within the CPIR-enabling Applet, a thumb-nail or large size photo-image of the consumer product being offered for sale, lease, auction, or other purpose on the WWW. Notably, this product image any reside on the RDBMS server 9, or on the http server from which the HTML-encoded document is served. Using this technique, the consumer need only click on the image to initiate a UPN-directed consumer product information search against the UPN/URL Database Management Subsystem 9 hereof.

Notably, the person or persons responsible for delivering product advertisements to particular locations on one or more WWW sites can use the OPEN ADSTREAM™ (OAS) 5.0 Internet Advertisement Management Solution software from Real Media, Inc., of New York, N.Y., and any other suitable software solution, running on the Internet (http) information server (12, 12', 12A or 12B), and managed using an Web-enabled client subsystem 13, as shown in FIG. 4F1. Using the OAS 5.0 advertisement management solution, and the CPI search and display method of present invention described above, a webmaster or advertising manager assigned to a particular Internet information server (12, 12', 12A or 12B) can: (1) access the Web-based product advertisement for a particular product (i.e. HTML code, image files, and any other rich media content associated therewith); (2) access previously downloaded CPIR-enabling Java servlet(s) for the consumer product, stored in a locally-maintained "Library (i.e. Catalog) of CPIR-Enabling Applets" on a client machine or server on the network, or directly access CPIR-enabling Java servlets from the centrally-maintained "Library (i.e. Catalog) of CPIR-Enabling Applets" illustrated in FIG. 4F1, via the Java Web Server 11'; and (3) use Real Media's OAS 5.0 solution software deliver both the Web-based product advertisement (i.e. its HTML code and other media-rich content) and the corresponding CPIR-enabling Applet tag (and possibly any image files associated therewith) to a designated section on a particular Web page of a specific WWW-site.

It is understood that there are different ways of inserting/embedding both of these objects within a particular section of an HTML-encoded document using the highly-advanced HTML-editing functionalities of the OAS 5.0 software system. For example, the Web-based product advertisement can be inserted within a first spatially-defined portion of the target HTML document (occupying the largest portion of the purchased Internet advertising space), while the CPIR-enabling server-side Applet (i.e. servlet) is inserted within a second spatially-defined portion of the target HTML document occupying the balance of the purchased Internet advertising space. Alternatively, both the CPIR-enabling Applet and the Web-based product advertisement can be inserted within substantially same spatially-defined portion of the target HTML document so as to achieve spatial overlap therebetween. This way when the consumer clicks on the advertisement image, or some preselected portion thereof, the underlying CPIR-enabling servlet will be automatically executed and the corresponding Java GUI generated for displaying the results of the UPN-directed database search.

In situations where the Internet product advertisement (e.g. banner advertisement) embodies a servlet HTML tag which, when executed, produces a new Java GUI (i.e. new browser interface), then a CPIR-enabling servlet can be embedded within the HTML-encoded document displayed in the new Java GUI. This servlet tag embedding technique will be useful in many applications where the display space allocated for the Web advertisement in the target HTML-encoded document is limited, and there is a need to generate a new Java GUI for presenting the content of the advertisement.

Other ways of embedding the Web-based advertisement and the related CPIR-enabling servlet tags will become apparent hereinafter to those skilled in the art having had the benefit of reading the present disclosure.

As indicated at Block G in FIG. 4E2, the tenth step in the method involves the consumer recognizing that a CPIR-enabling servlet tag is embedded within a Web-document displayed on a Java-enabled client computer subsystem, and thereafter launching/executing the associated servlet to initiate a UPN-directed consumer product information search within the RDBMS server 9.

Notably, the above illustrative embodiment has been described with particular focus given to CPIR-enabling servlets encoded with the UPN of a particular consumer product. It is understood, however, that the CPIR-enabling servlets of the present invention can be encoded with the trademark(s) used in connection with a particular consumer product, thus providing Trademark-encoded CPIR-enabling servlets, in contrast with UPN-encoded CPIR-enabling servlets. In such alternative embodiments, the encoded trademark would be used to direct a search through the RDBMS server 9, and display the results thereof in a new (independent) Java GUI generated at the point of servlet tag embodiment. Alternatively, a product descriptor associated with a particular product can be encoded within the corresponding CPIR-enabling servlet, used to direct a search through the RDBMS server 9, and display the results thereof in an independent Java GUI generated at the point of servlet tag embodiment.

The Second Applet-Driven Method of Accessing And Displaying Categorized UPN/URL Link Menus from the UPN/URL Database Management Subsystem the Present Invention After providing a brief overview on the system architecture of FIG. 2B2 and the nature of the client-side CPIR-enabling Applets deployed therewithin, the steps associated with Applet-driven CPI-acquisition method of the second illustrative embodiment will be described in detail with reference to FIGS. 4G1, 4G2, 4H1 and 4H2.

In general, the method of FIGS. 4G1 and 4G2 involves using a client-side CPIR-enabling Applet to automatically conduct a UPN-directed search on the UPN/URL Database Management Subsystem hereof (i.e. RDBMS server 9) in response to a single mouse-clicking operation by the consumer on the HTML tag associated with the CPIR-enabling Applet. In the illustrative embodiment, the CPIR-enabling Applet of the present invention is a program written in the Java™ programming language and has an HTML tag (indicated by <APPLET>) which is designed to be included in an HTML page, much in the same way an image can be included therewithin (according to the HTML 3.2 Specification).

CPIR-enabling Applets of the present invention are designed to work within a request/response processing model, as shown in FIG. 2B2. In this request/response model, a client subsystem 13 sends a request message to the Java Web Server 11" and the Server 11" responds by sending back a reply message. In the illustrative embodiment, requests come in the form of http, although is understood that the use of other protocol as such as ftp, EDI or a custom protocol, may be possible in particular embodiments. The request and the corresponding response reflect the state of the client and the server at the time of the request.

When using a Java-enabled browser to view a Web page containing a client-side CPIR-enabling Applet tag <APPLET>, the Applet's compiled class code is automatically accessed from the Java Web Server 11" and executed on the client-side of the network connection illustrated in FIG. 2B2. Thus, as shown in FIG. 2B2, the Java-enabled client machine 13 in this network architecture must run a Java-enabled browser program that provides a Java Virtual Machine (JVM) for running/executing Java Applets on the client-side of the network in much the same way that Java Web Server 11" must provide a JVM for running Java servlets on the server side thereof, as shown in FIG. 2B1.

As shown in FIG. 2B2, the Java-enabled Web browser 13 includes a number of software components including Java interfaces for fully defining the link between the Java Web browser and the Applets located at the middle tier. In order to write, compile and load Applets onto the Java Web Server 11", the system administrator or webmaster can use the Java API provided for within the Java 2 (development) platform from JavaSoft, a division of Sun Microsystems, Inc. This platform also supports The API specification of the Java 2 Platform, Standard Edition, version 1.2.2, comprises the following Packages:

(1) java.applet: Provides the classes necessary to create an applet and the classes an applet uses to communicate with its applet context.

(2) java.awt: Contains all of the classes for creating user interfaces and for painting graphics and images.

(3) java.awt.color: Provides classes for color spaces.

(4) java.awt.datatransfer: Provides interfaces and classes for transferring data between and within applications.

(5) java.awt.dnd: Drag and Drop is a direct manipulation gesture found in many Graphical User Interface systems that provides a mechanism to information between two entities logically associated with presentation elements in the GUI.

(6) java.awt.event: Provides interfaces and classes for dealing with different types of events fired by AWT components.

(7) java.awt.font: Provides classes and interface relating to fonts.

(8) java.awt.geom: Provides the Java 2D classes for defining and performing operations on objects related to two-dimensional geometry.

(9) java.awt.im: Provides classes and an interface for the input method framework.
(10) java.awt.image: Provides classes for creating and modifying images.
(11) java.awt.image.renderable: Provides classes and interfaces for producing rendering-independent images.
(12) java.awt.print: Provides classes and interfaces for a general printing API.
(13) java.beans: Contains classes related to Java Beans development.
(14) java.beans.beancontext: Provides classes and interfaces relating to bean context.
(15) java.io: Provides for system input and output through data streams, serialization and the file system.
(16) java.lang: Provides classes that are fundamental to the design of the Java programming language.
(17) java.lang.ref: Provides reference-object classes, which support a limited degree of interaction with the garbage collector.
(18) java.lang.reflect: Provides classes and interfaces for obtaining reflective information about classes and objects.
(19) java.math: Provides classes for performing arbitrary-precision integer arithmetic (BigInteger) and arbitrary-precision decimal arithmetic (BigDecimal).
(20) java.net: Provides the classes for implementing networking applications.
(21) java.rmi: Provides the RMI package.
(22) java.rmi.activation: Provides support for RMI Object Activation.
(23) java.rmi.dgc: Provides classes and interface for RMI distributed garbage-collection (DGC).
(24) java.rmi.registry: Provides a class and two interfaces for the RMI registry.
(25) java.rmi.server: Provides classes and interfaces for supporting the server side of RMI.
(26) java.security: Provides the classes and interfaces for the security framework.
(27) java.security.acl: The classes and interfaces in this package have been superseded by classes in the java.security package.
(28) java.security.cert: Provides classes and interfaces for parsing and managing certificates.
(29) java.security.interfaces: Provides interfaces for generating RSA (Rivest, Shamir and Adleman AsymmetricCipher algorithm) keys as defined in the RSA Laboratory Technical Note PKCS#1, and DSA (Digital Signature Algorithm) keys as defined in NIST's FIPS-186.
(30) java.security.spec: Provides classes and interfaces for key specifications and algorithm parameter specifications.
(31) java.sql: Provides the JDBC package.
(32) java.text: Provides classes and interfaces for handling text, dates, numbers and messages in a manner independent of natural languages.
(33) java.util: Contains the collections framework, legacy collection classes, event model, date and time facilities, internationalization, and miscellaneous utility classes (a string tokenizer, a random-number generator, and a bit array).
(34) java.util.jar: Provides classes for reading and writing the JAR (Java ARchive) file format, which is based on the standard ZIP file format with an optional manifest file.
(35) java.util.zip: Provides classes for reading and writing the standard ZIP and GZIP file formats.
(36) javax.accessibility: Defines a contract between user-interface components and an assistive technology that provides access to those components.
(37) javax.swing: Provides a set of "lightweight" (all-Java language) components that, to the maximum degree possible, work the same on all platforms.
(38) javax.swing.border: Provides classes and interface for drawing specialized borders around a Swing component.
(39) javax.swing.colorchooser: Contains classes and interfaces used by the Jcolor Chooser component.
(40) javax.swing.event: Provides for events fired by Swing components.
(41) javax.swing.filechooser: Contains classes and interfaces used by the JfileChooser component.
(42) javax.swing.plaf: Provides one interface and many abstract classes that Swing uses to provide its pluggable look-and-feel capabilities.
(43) javax.swing.plaf basic: Provides user interface objects built according to the Basic look-and-feel.
(44) javax.swing.plafinetal: Provides user interface objects built according to the "metal" look-and-feel.
(45) javax.swing.plaf.multi: The multiplexing look and feel allows users to combine auxiliary look and feels with the default look and feel.
(46) javax.swing.table: Provides classes and interfaces for dealing with java.awt.swing.JTable.
(47) javax.swing.text: Provides classes and interfaces that deal with editable and noneditable text components.
(48) javax.swing.text.html: Provides the class HTMLEditorKit and supporting classes for creating HTML text editors.
(49) javax.swing.text.html.parser
(50) javax.swing.text.rtf: Provides a class (RTFEditorKit) for creating Rich-Text-Format text editors.
(51) javax.swing.tree: Provides classes and interfaces for dealing with java.awt.swing.JTree.
(52) javax.swing.undo: Provides support for undo/redo capabilities in an application such as a text editor.
(53) org.omg.CORBA: Provides the mapping of the OMG CORBA APIs to the Java™ programming language, including the class ORB, which is implemented so that a programmer can use it as a fully-functional Object Request Broker (ORB).
(54) org.omg.CORBA.DynAnyPackage: Provides the exceptions used with the DynAny interface (InvalidValue, Invalid, InvalidSeq, and TypeMismatch).
(55) org.omg.CORBA.ORBPackage: Provides the exception InvalidName, which is thrown by the InconsistentTypeCode, which is thrown by the Dynamic Any creation methods in the ORB class.
(56) org.omg.CORBA.portable: Provides a portability layer, that is, a set of ORB APIs that makes it possible for code generated by one vendor to run on another vendor's ORB.
(57) org.omg.CORBA.TypeCodePackage: Provides the user-defined exceptions BadKind and Bounds, which are thrown by methods in the class TypeCode.
(58) org.omg.CosNaming: Provides the naming service for Java IDL.
(59) org.omg.CosNaming.NamingContextPackage: Provides the exceptions used in the package org.omg.CosNaming (AlreadyBound, CannotProceed, InvalidName, NotEmpty, and NotFound) and also the Helper and Holder classes for those exceptions.

Having provided an overview on client-side CPIR-enabling Java Applets of the present invention and the support framework required thereby in a distributed-computing object oriented programming environment shown in FIG. 2B2, it is appropriate to now describe, the method of creating, loading, distributing, embedding and executing client-side CPIR-enabling Java Applets in accordance with the principles of the present invention schematically illustrated in FIGS. 4G1, 4G2, 4H1 and 4H2.

As indicated at Block A1 in FIG. 4G1, the first step of the method involves using the Java Applet API to write or otherwise author the source code for a client-side CPIR-enabling Java Applet for each UPN-specified consumer product registered in the RDBMS server 9. In general, the source code for each client-side CPIR-enabling Java Applet (i.e. Applet) will embody one or more of following items of information: (i) the UPN of the particular product on which the CPI-based search is to be carried out and the search results thereof displayed; (ii) Java classes required for performing a UPN-directed search on the RDBMS server 9 using a CGI script executing on the Java Web Server 11", and producing a particular Java GUI for displaying the results obtained from the UPN-directed search; and (iii) license-related information specifying the terms and conditions of the CPIR-enabling Applet license and conditions under which the CPIR-enabling Applet shall operate.

Notably, such license-related information may specify: (1) one or more specific host domains from which a Web document containing the corresponding Applet tag may launch the CPIR-enabling Applet under a licensing program; (2) one or more general Internet domains (e.g. .com, .org., .gov, .int, .mil, .uk, etc.) from which a Web document containing the corresponding Applet tag may launch the CPIR-enabling Applet under a licensing program; (3) the time duration of the licensing period associated with the CPIR-enabling Applet; and (4) any other restrictions set by the associated manufacturer and/or retailer, and/or administrator of the consumer product information system of the present invention, that must be satisfied for a registered CPIR-enabled Applet to operate within a Web-document.

Notably, the Java source code for each CPIR-enabling Applet will vary depending upon implementation. However, regardless of the particular implementation, it can be expected that each CPIR-enabling Applet designed, for example, to search an (Oracle-based JDBC) RDBMS Server 9 for a current categorized UPC/URL list/menu symbolically linked to a specified UPN and thereafter display the results in an independent Java GUI, will typically include Java source code specifying:

(1) the importable JDBC classes required by the CPIR-enabling Applet;
(2) the importable Java classes to be used in the CPIR-enabling Applet;
(3) the JDBC driver to be loaded for the Oracle-based RDBMS server 9;
(4) the connection strings to the RDBMS server 9;
(5) the CPI query to be executed on the UPN/URL Database, dependent on the UPN of the associated consumer product and possibly other search criteria and Applet licensing conditions;
(6) the Applet tag, its graphical icon or alias to trigger execution the Applet and its associated CPI query;
(7) the CPI Search Result GUI to be displayed on requesting client and its relative location to the associated applet tag; and
(8) the operations that will be carried out upon execution of the CPI query including
  Boolean search logic to be carried out upon initiation of the UPN-directed CPI search;
  if a new connection is required between Java Web Server 11" and the RDBMS server 9;
  Loading the JDBC driver;
  Connecting to the RDBMS server 9;
  Creating a SQL statement based on the specified Boolean search logic and UPN;
  Executing the SQL query statement; and
    Dumping the search results to the CPI Search Result GUI.

When using earlier versions of the HTML Specification (i.e. HTML 3.2 by the World Wide Web Consortium), the source code for each CPIR-enabling Java Applet would adhere to the following general syntax:

```
[CODEBASE = codebaseURL]
CODE –appletFile
[ALT = alternateText]
[NAME = appletInstanceName]
WIDTH = pixels HEIGHT = pixels
[ALIGN = alignment]
[VSPACE = pixels] [HSPACE = pixels]
>
[<PARAM NAME = Attribute1 VALUE = value >]
[<PARAM NAME = Attribute2 VALUE = value >]
...
[alternateHTML]
</APPLET>
``` wherein the set of brackets [ ] indicates optional parameters within the HTML 3.2 Specification.

The optional <PARAM> tag lets you to specify applet-specific attributes that your applet can retrieve as Strings. These Strings can be used in an HTML document to customize the Applet's behavior and supply their respective values in command-line variables.

CODEBASE, CODE, WIDTH, and HEIGHT are attributes specified by the first part of the <APPLET> tag. The Java-enabled Web browser 13 uses these attributes to locate the CPIR-enabling Applet code on the Java Web Server 11" and to indicate the amount of space to be reserved in the target HTML document during display. CODEBASE directs the Java-enabled Web browser to look for code in the classes directory of the Java Web Server 11". The mandatory parameter CODE provides the name of the Java code file that is to be loaded from the Java Web Server 11". Any other class files used by the Applet are loaded from the Codebase Directory as well.

WIDTH and HEIGHT are attributes that tell the Java-enabled Web browser to reserve space in the document display before the Java code is loaded ("x" pixels wide by "x" pixels high), similar to the way browsers deal with images, reserving space before the complete image is available. To place an invisible Applet on a page, specify height and width of zero.

Current Java-enabled Web browsers ignore the Java language resize( ) method for applets. Although the applet viewer provided in the JDK responds to the resize( ) method, one will have to specify width and height correctly in the CPIR-enabling APPLET tag for general Web browsers.

VSPACE and HSPACE are attributes for specifying the amount of space (in pixels) that surrounds the CPIR-enabling Applet above and below (vspace) and on each side (hspace) of the Applet area.

ALIGN is another attribute used to designate where the Java-enabled Web browser is to place the Applet area in relation to any other design elements. ALIGN can have possible values like those for the IMG tag: left, right, top, texttop, middle, absmiddle, baseline, bottom, and absbottom.

Notably, the optional parameters ALIGN, VSPACE and HSPACE may be set either at the time of CPIR-enabling Applet creation (i.e. when writing the source code therefor), or at the latter time such as, for example, after compiling and loading the Java class code on the Java Web Server, after downloading CPIR-enabling Applet tag files, or after extracting CPIR-enabling Applets, but prior to embedding the CPIR-enabling Applet tag within a HTML-encoded document. Thus, these optional parameters enable the Web page, EC-commerce site and auction site designer to modify (after Java class code compiling and loading operations, but before Applet tag insertion/embedding operations) certain parameters and attributes within each CPIR-enabling Applet tag that determine the precise location where the Java-enabled browser on the client machine 13 will display the CPIR-enabling Applet and its associated image graphics on the browser display screen.

The ALT attribute designates a string to be displayed if the browser understands the <APPLET> tag but does not have Java capabilities. Netscape 2.0 allows turning the Java interpreter on or off via a check box under Options on the Security Preferences menu. The ALT attribute is a way to remind users to turn Java back on after turning it off to avoid wasting time on slow applets (as can often occur on Web pages).

CPIR-enabling Applets that coexist on the same Web page communicate by means of the NAME attribute. The Applet-Context method getApplet(String name) returns a reference to the named Applet if it can be found in the Web page and then allows communication between Applets in the conventional sense.

The PARAM tag is used in transferring text information to the Applet code by way of the getParameter(String param_name) applet method. Since the parameter-matching code is not case sensitive and quote marks are parsed out, the following tags are equivalent:

```
<PARAM name = EMAIL
<param NAME = EMAIL
<param name = "email"
```

Between the last <PARAM> tag and the </APPLET> tag, text and HTML code can be designated for display if the Web browser of a particular client system cannot recognize the <APPLET> tag. Notably, the content of the Applet tag acts as alternate information for client subsystems that do not support this element or are currently configured not to support Applets. Otherwise, the content of the Applet must be ignored.

The final element of the Applet tag must be </applet> in order to tell the Web browser that the Applet has ended.

Notably, in the HTML 4.0 Specification, published by the World Wide Web Consortium, the Applet element has been deprecated in favor of the OBJECT element, which offers an all purpose solution to generic object inclusion. The HTML 4.0 Specification now allows the OBJECT element to include images (via the <IMG> tag) and Applets (via the <APPLET> tag) in the same manner. Thus, when constructing Web documents and CPIR-enabling Applets in accordance with the HTML 4.0 Specification, the source code for each CPIR-enabling Applet will adhere to an entirely different syntax, the details of which are set forth which in the HTML 4.0 Specification, supra, are incorporated herein by reference.

For additional details pertaining to Java Applet construction, embedding techniques and Java GUI design and development, reference can be made to the following technical publications: "JAVA" (1997) by Ed Tittel and Bill Brogden, published by IDG Books Worldwide, Inc.; "Wilde's WWW: Technical Foundations of the World Wide Web" (1999) by Erik Wilde, published by Springer-Verlag, Berlin, Heidelberg; "The Java™ Tutorial Second Edition: Object Oriented Programming For The Internet" (1999), by Mary Campione and Kathy Walrath, published by Sun Microsystems, Inc., of Palo Alto, Calif.; and "The JFC Swing Tutorial: A Java Guide To Constructing JAVA GUIs" (1999), by Mary Campione and Kathy Walrath, published by Sun Microsystems, Inc., of Palo Alto, Calif.; each said publication being incorporated herein by reference.

After writing/authoring the source code for the Applet, the CPIR-enabling Java Applet is ascribed a unique name such as, for example, "UPNXXXXXXYYYYYZ" for a 12 digit Uniform Product Code.

As indicated at Block A2 in FIG. 4G1, the second step of the method involves compiling the source code of the Applet into Java bytecode, and then placing/loading the classfiles for the Applet within the server_root/Applets directory on the Java Web Server 11".

As indicated at Block B1 in FIG. 4G1, the third step of the method involves for each UPN-specified consumer product, (1) containing the complete Applet HTML tag <APPLET> within an executable file, and (2) storing each such Applet tag containing file in the Central CPIR-Enabling Applet Library on the RDBMS server 9, as shown in FIG. 4H1.

As indicated at Block C in FIG. 4G1, the fourth step of the method involves distributing the CPIR-enabling Applet HTML tags to retailers, wholesalers, advertisers, and others who desire to deliver UPN-directed CPI search results to their customers, clients and the like. This distribution process may be carried out in a number of ways.

For example, in one embodiment of the present invention shown in FIG. 4M1, retailers, wholesalers, advertisers, and others would visit the IPI Central WWW site as shown in FIG. 3C and selected the Applet Tag Download/Distribute Mode by selecting mode control button 21F, whereupon a (Java) GUI, is displayed in the display frame 20C. Within this GUI, a "master" list of executable files containing CPIR-enabling Applet tags is displayed for each consumer product registered within the system. The CPIR-enabling Applet tag containing file associated with any particular consumer product can be searched for by UPN, trademark, and/or product descriptor, and once found, can be viewed and simply downloaded to a remote client computer system connected to the Internet using, for example, ftp or other electronic data or document interchange protocols (e.g. XML/ICE) suitable for carrying out the <APPLET> tag transport process. Downloaded CPIR-enabling Applet tag containing files can be then stored in a local CPIR-enabling Applet/Servlet Library maintained on a client computer until it is time to extract the Applet tag therefrom and embed the same into a particular HTML-encoded document.

In an alternative embodiment shown in FIG. 4M2, the distribution of CPIR-enabling Applet tags is enabled by providing a "CPIR-enabling Applet Tag Download" Link/Button 100 on the Web page of each product being offered for sale in an EC-enabled store or product catalog maintained by a manufacturer, retailer or other party. This inventive feature should be most useful in EC-enabled Business-to-Business (i.e. Vendor-to-Retailer) UPC-based Product Catalogs such as, for example, QRS's Keystone UPC Product Catalog, where purchasing agents of retailers could download "Applet tag containing" files, along with product images and other product information after placing a purchase order therethrough, for use in constructing the retailer's EC-enabled (retailer-to-consumer) store or product catalog. Using this method of the present invention, consumers would be provided with instant manufacturer-defined product information prior to, and/or after a consumer purchase at an EC-enable store on the WWW, thereby greatly improving the consumer shopping experience on the WWW.

As indicated at Block D in FIG. 4G2, the fifth step of the method involves enabling retailers, wholesalers, advertisers, and others to (1) open the downloaded Applet tag containing files, (2) extract the CPIR-enabling HTML tags contained therewithin, and (3) embed (i.e. insert) one or more distributed CPIR-enabled Applet tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling Applet HTML tag using, for example, simple commands or drag-and-drop procedures.

As indicated at Block E in FIG. 4G2, the sixth step of the method involves serving HTML documents with inserted CPIR-enabling Applet tags, from Internet information servers to Java-enabled client computer subsystems 13 operated by consumers at home, in the office, in EC-enabled and "brick and mortar" retail stores, or on the road, as the case may be. As shown in FIG. 4H1, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4G2, the seventh step of the method hereof involves using a Java-enabled client computer subsystem 13 to display served HTML-encoded documents having one or more of CPIR-enabling Applet tags embedded therewithin. This step is carried out by the consumer pointing his or her Java-enabled browser program (e.g. Netscape Navigator, Microsoft Explorer, or Sun Microsystems' HotJava program) to an HTML-encoded document within which a CPIR-enabling Java Applet tag is embedded, at a particular point of presence on the WWW.

As shown in FIGS. 4M1 through 4R2, CPIR-enabling Applets can be graphically-encoded in an variety of different ways to provide the consumer with a visual indication that, clicking on the graphical object, however manifested, will automatically result in a CPI search on a particular product identified by a UPN encoded within the associated Applet.

In the illustrative embodiments shown in FIGS. 4P1, 4Q1, 4R1 and 4S1, servicemarks such as "UPC Request™ Cyberservice™ URL Search" serve to inform the consumer that the object, if selected from the displayed Web page, will cause a URL search to be performed with respect to the particular consumer product and the results thereof displayed the "point of presence" of the consumer which may be at a particular point in an EC-enabled store (e.g. at the check-out display screen or POS), at on-line auction site, at a Web-based product advertisement, or anywhere else on the WWW. Notably, an important advantage provided by this information search technique of the present invention is that it does not disturb the consumer at his or her point of presence (or sale), where ever that may be. Instead, the CPI-based search and display method of the present invention enables the delivery of accurate product-specific manufacturer-defined information at a particular point in Cyberspace by the consumer performing a single mouse-clicking operation. This enables the consumer to make an informed decision threat based on the information displayed in the corresponding Java GUI generated upon launching the CPIR-enabling Applet at the consumer's point of presence on the WWW.

It is understood, however, that other techniques may be used to create a visual indication to the consumer that a CPIR-enabling Applet is located at a particular point on the WWW and that if this Applet is executed (e.g. by a single mouse-clicking operation), then a UPN-directed consumer product information search will be automatically executed and the results therefrom will be displayed within a Java GUI at that point of presence. One alternative technique would be to embed the CPIR-enabling Applet within a thumb-nail or large size photo-image of the consumer product being offered for sale, lease, auction, or other purpose on the WWW. Using this technique, the consumer need only click on the image to initiate a UPN-directed consumer product information search on the IPI Registrant Database (e.g. RDBMS Server 9) of the system.

Notably, the person or persons responsible for delivering product advertisements to particular locations on one or more WWW sites can use the OPEN ADSTREAM™ (OAS) 5.0 Internet Advertisement Management Solution software from Real Media, Inc., of New York, N.Y., and any other suitable software solution, running on the Internet (http) information server (12, 12', 12A or 12B), and managed using an Web-enabled client subsystem 13, as shown in FIG. 4H2. Using the OAS 5.0 advertisement management solution, and the CPI search and display method of the present invention described above, a webmaster or advertising manager assigned to a particular Internet information server (12, 12', 12A or 12B) can: (1) access the Web-based product advertisement for a particular product (i.e. HTML code, image files, and any other rich media content associated therewith); (2) access previously downloaded CPIR-enabling Java Applet(s) for the consumer product, stored in a locally-maintained "Library (i.e. Catalog) of CPIR-Enabling Applets" on a client machine or server on the network, or directly access CPIR-enabling Java Applets from the centrally-maintained "Library (i.e. Catalog) of CPIR-Enabling Applets" illustrated in FIG. 4H2; and (3) use Real Media's OAS 5.0 solution software to deliver both the Web-based product advertisement (i.e. its HTML code, and other media-rich content) and the corresponding CPIR-enabling Applet tag (and image files associated therewith) to a designated section on a particular Web page of a specific WWW-site.

It is understood that there are different ways of inserting/embedding both of these objects within a particular section of an HTML-encoded document using the highly-advanced HTML-editing functionalities of the OAS 5.0 software system. For example, the Web-based product advertisement can be inserted within a first spatially-defined portion of the target HTML document (occupying the largest portion of the purchased Internet advertising space), while the CPIR-enabling client-side Applet is inserted within a second spatially-defined portion of the target HTML document occupying the balance of the purchased Internet advertising space. Alternatively, both the CPIR-enabling Applet and the Web-based product advertisement can be inserted within substantially same spatially-defined portion of the target HTML document so as to achieve spatial overlap therebetween. This way when the consumer clicks on the advertisement image, or some preselected portion thereof, the underlying CPIR-enabling Applet will be automatically executed and the corresponding Java GUI generated for displaying the results of the UPN-directed database search.

In situations where the Internet product advertisement (e.g. banner advertisement) embodies a Java Applet tag which, when executed, produces a new Java GUI (i.e. new browser interface), then a CPIR-enabling Applet tag can be embedded within the HTML-encoded document displayed in the new Java GUI.

Other ways of embedding the Web-based advertisement and the related CPIR-enabling Applet tags will become apparent hereinafter to those skilled in the art having had the benefit of reading the present disclosure.

As indicated at Block G in FIG. 4G2, the eight step in the method involves the consumer recognizing that a CPIR-enabling Applet tag is embedded within a Web-document displayed on a Java-enabled client computer subsystem 13, and thereafter launching/executing the associated Applet to initiate a UPN-directed search within the RDBMS server 9 by performing a single mouse clicking operation.

Notably, the second illustrative embodiment described above has been described with particular focus given to CPIR-enabling Applets encoded with the UPN of a particular consumer product. It is understood, however, that the CPIR-enabling Applets of the present invention can be encoded with the trademark(s) used in connection with a particular consumer product, thus providing Trademark-encoded CPIR-enabling Applets, in contrast with UPN-encoded CPIR-enabling Applets. In such alternative embodiments, the encoded trademark would be used to direct a search through the RDBMS server 9, and display the results thereof in a new (independent) Java GUI generated at the point of Applet tag embodiment. Alternatively, a product descriptor associated with a particular product can be encoded within the corresponding CPIR-enabling Applet, used to direct a search through the RDBMS server 9, and display the results thereof in an independent Java GUI generated at the point of Applet tag embodiment.

The Third Applet-Driven Method of Accessing and Displaying Categorized UPN/URL Link Menus from the UPN/URL Database Management Subsystem the Present Invention After providing a brief overview on the system architecture of FIG. 2B3 and the nature of the client-side CPIR-enabling Applets deployed therewithin, the steps associated with Applet-driven CPI-acquisition method of the third illustrative embodiment will be described in detail with reference to FIGS. 4I1, 4I2, 4J1 and 4J2.

In general, the method of FIGS. 4I1 and 4I2, like that of FIGS. 4G1 and 44G2, involves using a client-side CPIR-enabling Applet to automatically conduct a UPN-directed search on the UPN/URL Database Management Subsystem hereof (i.e. RDBMS server 9) in response to a single mouse-clicking operation by the consumer on the HTML tag associated with the CPIR-enabling Applet. In the illustrative embodiment, the CPIR-enabling Applet of the present invention is a program written in the Java™ programming language and has an HTML tag (indicated by <APPLET>) which is designed to be included in an HTML page, much in the same way an image can be included therewithin (in accordance with the HTML 3.2 Specification).

In the method of the second illustrative embodiment, CPIR-enabling Applets are designed to work within a request/response processing model, as shown in FIG. 2B3. In this request/response model, a client subsystem 13 sends a request message to the Java Web Server 11''' and the server 11''' responds by sending back a reply message. In the illustrative embodiment, requests come in the form of http, although it is understood that other protocols (e.g. ftp, EDI or a custom protocol) may be used. The request and the corresponding response reflect the state of the client and the server at the time of the request.

When using a Java-enabled browser to view a Web page containing a client-side CPIR-enabling Applet tag <APPLET>, the Applet's compiled class code is automatically accessed from the Java Web Server 11''' and executed on the client-side of the network connection illustrated in FIG. 2B3. Thus, as shown in FIG. 2B3, the Java-enabled client machine 13 in this network architecture must run a Java-enabled browser program that provides a Java Virtual Machine (JVM) for running/executing Java Applets on the client-side thereof, in much the same way that Java Web Server 11' must provide a JVM for running Java servlets on the server side thereof, as shown in FIG. 2B1.

With reference to FIG. 2B3, the method of creating, loading, distributing, embedding and executing client-side CPIR-enabling Java Applets in accordance with the principles of the present invention schematically illustrated in FIGS. 4I1, 4I2, 4J1 and 4J2 will now be described below.

As indicated at Block A1 in FIG. 4I1, the first step of the method involves using the Java Applet API to write or otherwise author the source code for a client-side CPIR-enabling Java Applet for each UPN-specified consumer product registered in the RDBMS server 9. In general, the source code for each client-side CPIR-enabling Java Applet (i.e. Applet) will embody one or more of following items of information: (i) the UPN of the particular product on which the CPI search is to be carried out and the search results thereof displayed; (ii) Java classes required for performing a UPN-directed search on the RDBMS server 9 using a "socket connection" between the Java-enabled client subsystem 13 and the Java Web Server 11''', producing a particular Java GUI for displaying the results obtained from the UPN-directed search; and (iii) license-related information specifying the terms and conditions of the CPIR-enabling Applet license and conditions under which the CPIR-enabling Applet shall operate.

Notably, such license-related information may specify: (1) one or more specific host domains from which a Web document containing the corresponding Applet tag may launch the CPIR-enabling Applet under a licensing program; (2) one or more general Internet domains (e.g. .com, .org., .gov, .int, .mil, .uk, etc.) from which a Web document containing the corresponding Applet tag may launch the CPIR-enabling Applet under a licensing program; (3) the time duration of the licensing period associated with the CPIR-enabling Applet; and (4) any other restrictions set by the associated manufacturer and/or retailer, and/or administrator of the consumer product information system of the present invention, that must be satisfied for a registered CPIR-enabled Applet to operate within a Web-document.

Notably, the Java source code for each CPIR-enabling Applet will vary depending upon implementation. However, regardless of the particular implementation, it can be expected that each CPIR-enabling Applet designed, for example, to search an (Oracle-based JDBC) RDBMS Server 9 for current UPC/URL list symbolically linked to a specified UPN and thereafter display the results in an independent Java GUI, will typically include Java source code specifying:

(1) the importable JDBC classes required by the CPIR-enabling Applet;
(2) the importable java classes to be used in the CPIR-enabling Applet;
(3) the JDBC driver to be loaded for the Oracle-based RDBMS server 9;
(4) the connection strings to the RDBMS server 9;
(5) the CPI query to be executed on the UPN/URL Database, dependent on the UPN of the associated consumer product and possibly other search criteria and Applet licensing conditions;
(6) the Applet tag, its graphical icon or alias to trigger execution the Applet and its associated CPI query;
(7) the CPI Search Result GUI to be displayed on requesting client and its relative location to the associated Applet tag; and
(8) the operations that will be carried out upon execution of the CPI query including
Boolean search logic to be carried out upon initiation of the UPN-directed CPI search;
if a new connection is required between Java Web Server 11''' and the RDBMS server 9;
Loading the JDBC driver;
Connecting to the RDBMS server 9;
Creating a SQL statement based on the specified Boolean search logic and UPN;
Executing the SQL query statement; and
Dumping the search results to the CPI Search Result GUI.

When using earlier versions of the HTML Specification (i.e. HTML 3.2 by the World Wide Web Consortium), the source code for each CPIR-enabling Java Applet will adhere to the general syntax of that the HTML 3.2 Specification. Also, if the HTML 4.0 Specification is used, then the source code for each CPIR-enabling Java Applet will adhere to the general syntax of the HTML 4.0 Specification, as discussed above.

After writing/authoring the source code for the CPIR-enabling Java Applet, the Applet is ascribed a unique name such as, for example, "UPNXXXXXXXYYYYYZ" for a 12 digit Uniform Product Code.

As indicated at Block A2 in FIG. 4I1, the second step of the method involves compiling the source code of the Applet into Java bytecode, and then placing/loading the classfiles for the Applet within the server_root/Applets directory on the Java Web Server 11'''.

As indicated at Block B1 in FIG. 4I1, the third step of the method involves for each UPN-specified consumer product, (1) containing the complete Applet HTML tag <APPLET> within an executable file, and (2) storing each such Applet tag containing file in the Central CPIR-Enabling Applet Library on the RDBMS server 9, as shown in FIG. 4J1.

As indicated at Block C in FIG. 4I 1, the fourth step of the method involves distributing the CPIR-enabling Applet HTML tags to retailers, wholesalers, advertisers, and others who desire to deliver UPN-directed CPI search results to their customers, clients and the like. This distribution process may be carried out in several different ways which have been detailed hereinabove in connection with the second illustrative method illustrated in FIGS. 4G1 through 4H2 and described above.

As indicated at Block D in FIG. 4G2, the fifth step of the method involves enabling retailers, wholesalers, advertisers, and others to (1) open the downloaded Applet tag containing files, (2) extract the CPIR-enabling HTML tags contained therewithin, and (3) embed (i.e. insert) one or more distributed CPIR-enabled Applet tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling Applet HTML tag using, for example, simple commands or drag-and-drop procedures.

As indicated at Block E in FIG. 4G2, the sixth step of the method involves serving servlet tag encoded HTML documents from Internet information servers to Java-enabled client computer subsystems 13 operated by consumers at home, in the office, in EC-enabled and "brick and mortar" retail stores, or on the road, as the case may be. As shown in FIG. 4H1, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4G2, the seventh step of the method hereof involves using a Java-enabled client computer subsystem 13 to display served HTML-encoded documents having one or more of CPIR-enabling Applet tags embedded therewithin. This step is carried out by the consumer pointing his or her Java-enabled browser program (e.g. Netscape Navigator, Microsoft Explorer, or Sun Microsystems' HotJava program) to an HTML-encoded document within which a CPIR-enabling Java Applet tag is embedded, at a particular point of presence on the WWW. As shown in FIGS. 4M1 through 4R2, CPIR-enabling Applets can be graphically-encoded in an variety of different ways as described in detail detailed hereinabove in connection with the second illustrative method illustrated in FIGS. 4G1 through 4H2 and described above.

As indicated at Block G in FIG. 4G2, the eight step in the method involves the consumer recognizing that a CPIR-enabling Applet tag is embedded within a Web-document displayed on a Java-enabled client computer subsystem, and thereafter launching/executing the associated Applet to initiate a UPN-directed search within the RDBMS server 9 by performing a single mouse clicking operation.

Notably, the third illustrative embodiment has been described with particular focus given to CPIR-enabling Applets encoded with the UPN of a particular consumer product. It is understood, however, that the CPIR-enabling Applets of the present invention can be encoded with the trademark(s) used in connection with a particular consumer product, thus providing Trademark-encoded CPIR-enabling Applets, in contrast with UPN-encoded CPIR-enabling Applets. In such alternative embodiments, the encoded trademark would be used to direct a search through the RDBMS server 9, and display the results thereof in a new (independent) Java GUI generated at the point of Applet tag embodiment. Alternatively, a product descriptor associated with a particular product can be encoded within the corresponding CPIR-enabling Applet, used to direct a search through the RDBMS server 9, and display the results thereof in an independent Java GUI generated at the point of Applet tag embodiment.

The Fourth Applet-Driven Method of Accessing and Displaying Categorized UPN/URL Link Menus from the UPN/URL Database Management Subsystem the Present Invention After providing a brief overview on the system architecture of FIG. 2B4 and the nature of the client-side CPIR-enabling Applets deployed therewithin, the steps associated with Applet-driven CPI-acquisition method of the fourth illustrative embodiment will be described in detail with reference to FIGS. 4K1, 4K2, 4L1 and 4L2.

In general, the method of FIGS. 4K1 and 4K2, like that of FIGS. 4G1 and 4G2 and 4I1 and 4I2 involves using a client-side CPIR-enabling Applet to automatically conduct a UPN-directed search on the UPN/URL Database Management Subsystem hereof (i.e. RDBMS server 9) in response to a single mouse-clicking operation by the consumer on the HTML tag associated with the CPIR-enabling Applet. In the illustrative embodiment, the CPIR-enabling Applet of the present invention is a program written in the Java™ programming language and has an HTML tag (indicated by <APPLET>) which is designed to be included in an HTML page, much in the same way an image can be included therewithin (in accordance with the HTML 3.2 Specification).

In the method of the second illustrative embodiment, CPIR-enabling Applets are designed to work within a request/response processing model, as shown in FIG. 2B4. In this request/response model, a client subsystem 13 sends a request message to the Java Web Server 11″″ and the server 11″″ responds by sending back a reply message. In the illustrative embodiment, requests come in the form of http, although it is understood that other protocols (e.g. ftp, EDI or a custom protocol) may be used. The request and the corresponding response reflect the state of the client and the server at the time of the request.

When using a Java-enabled browser to view a Web page containing a client-side CPIR-enabling Applet tag <APPLET>, the Applet's compiled class code is automatically accessed from the Java Web Server 11″″ and executed on the client-side of the network connection illustrated in FIG. 2B4. Thus, as shown in FIG. 2B3, the Java-enabled client machine 13 in this network architecture must run a Java-enabled browser program that provides a Java Virtual Machine (JVM) for running/executing Java Applets on the client-side thereof, in much the same way that Java Web Server 11' must provide a JVM for running Java servlets on the server side thereof, as shown in FIG. 2B1.

With reference to FIG. 2B4, the method of creating, loading, distributing, embedding and executing client-side CPIR-enabling Java Applets in accordance with the principles of the present invention schematically illustrated in FIGS. 4K1, 4K2, 4L1 and 4L2 will now be described below.

As indicated at Block A1 in FIG. 4K1, the first step of the method involves using the Java Applet API to write or otherwise author the source code for a client-side CPIR-enabling Java Applet for each UPN-specified consumer product registered in the RDBMS server 9. In general, the source code for each client-side CPIR-enabling Java Applet (i.e. Applet) will embody one or more of following items of information: (i) the UPN of the particular product on which the CPI search is to be carried out and the search results thereof displayed; (ii) Java classes required for performing a UPN-directed search on the RDBMS server 9 using a Remote Invocation Method (RMI) executed on the Java Web Server 11″″, producing a particular Java GUI for displaying the results obtained from the UPN-directed search; and (iii) license-related information specifying the terms and conditions of the CPIR-enabling Applet license and conditions under which the CPIR-enabling Applet shall operate.

Notably, such license-related information may specify: (1) one or more specific host domains from which a Web document containing the corresponding Applet tag may launch the CPIR-enabling Applet under a licensing program; (2) one or more general Internet domains (e.g. .com, .org., .gov, .int, .mil, .uk, etc.) from which a Web document containing the corresponding Applet tag may launch the CPIR-enabling Applet under a licensing program; (3) the time duration of the licensing period associated with the CPIR-enabling Applet; and (4) any other restrictions set by the associated manufacturer and/or retailer, and/or administrator of the consumer product information system of the present invention, that must be satisfied for a registered CPIR-enabled Applet to operate within a Web-document.

The RMI on Java Web Server 11″″ enables connectivity between Java Web Server 11″″ and the RDBMS Server 9 using the standard Java native method interface (JNI) or the standard JDBC package. At its most basic level, RMI is Java's remote procedure call (RPC) mechanism enabling connectivity to the RDBMS server 9 using native methods. Further details on the RMI are published in the Technical Paper "Java Remote Method Invocation-Distributed Computing For Java" by JavaSoft, incorporated herein by reference.

Notably, the Java source code for each CPIR-enabling Applet will vary depending upon implementation. However, regardless of the particular implementation, it can be expected that each CPIR-enabling Applet designed, for example, to search an (Oracle-based JDBC) RDBMS Server 9 for current UPC/URL list symbolically linked to a specified UPN and thereafter display the results in an independent Java GUI, will typically include Java source code specifying:

(1) the importable JDBC classes required by the CPIR-enabling Applet;
(2) the importable java classes to be used in the CPIR-enabling Applet;
(3) the JDBC driver to be loaded for the Oracle-based RDBMS server 9;
(4) the connection strings to the RDBMS server 9;
(5) the CPI query to be executed on the UPN/URL Database, dependent on the UPN of the associated consumer product and possibly other search criteria and Applet licensing conditions;
(6) the Applet tag, its graphical icon or alias to trigger execution the Applet and its associated CPI query;
(7) the CPI Search Result GUI to be displayed on requesting client and its relative location to the associated Applet tag; and
(8) the operations that will be carried out upon execution of the CPI query including
  Boolean search logic to be carried out upon initiation of the UPN-directed CPI search;
  if a new connection is required between Java Web Server 11″″ and the RDBMS server 9;
  Loading the JDBC driver;
  Connecting to the RDBMS server 9;

Creating a SQL statement based on the specified Boolean search logic and UPN;

Executing the SQL query statement; and

Dumping the search results to the CPI Search Result GUI.

When using earlier versions of the HTML Specification (i.e. HTML 3.2 by the World Wide Web Consortium), the source code for each CPIR-enabling Java Applet will adhere to the general syntax of that the HTML 3.2 Specification. Also, if the HTML 4.0 Specification is used, then the source code for each CPIR-enabling Java Applet will adhere to the general syntax of the HTML 4.0 Specification, as discussed above.

After writing/authoring the source code for the CPIR-enabling Java Applet, the Applet is ascribed a unique name such as, for example, "UPNXXXXXXYYYYYZ" for a 12 digit Uniform Product Code.

As indicated at Block A2 in FIG. 4K1, the second step of the method involves compiling the source code of the Applet into Java bytecode, and then placing/loading the classfiles for the Applet within the server_root/Applets directory on the Java Web Server 11"".

As indicated at Block B1 in FIG. 4K1, the third step of the method involves for each UPN-specified consumer product, (1) containing the complete Applet HTML tag <APPLET> within an executable file, and (2) storing each such Applet tag containing file in the Central CPIR-Enabling Applet Library on the RDBMS server 9, as shown in FIG. 4J1.

As indicated at Block C in FIG. 4I1, the fourth step of the method involves distributing the CPIR-enabling Applet HTML tags to retailers, wholesalers, advertisers, and others who desire to deliver UPN-directed CPI search results to their customers, clients and the like. This distribution process may be carried out in several different ways which have been detailed hereinabove in connection with the second illustrative method illustrated in FIGS. 4G1 through 4H2 and described above.

As indicated at Block D in FIG. 4K2, the fifth step of the method involves enabling retailers, wholesalers, advertisers, and others to (1) open the downloaded Applet tag containing files, (2) extract the CPIR-enabling HTML tags contained therewithin, and (3) embed (i.e. insert) one or more distributed CPIR-enabled Applet tags into acceptable HTML-encoded documents associated with EC-enabled WWW sites, EC-enabled storefronts and catalogs, Internet product advertisements, on-line auction-based WWW sites, or other types of Web-documents.

In general, this step of the method involves first creating or otherwise procuring a suitable HTML-encoded document which may understandably include other types of code (e.g. XML) therein, other than HTML code. While such HTML documents can be created using any HTML-editing program, such as BBD-Edit, it is expected that in most applications the underlying HTML-encoded document will be generated using tools such as, for example: GO-LIVE® WWW-Site Development and Management solution software from Adobe Systems, Inc. to create the HTML pages associated with a particular WWW site; CatalogMaker™™ and CatalogManager electronic commerce solution software programs from RealEDI, Inc; Intershop 4 Enfinity™ Electronic Commerce Solution software from Intershop Communications, Inc; and/or any other commercially available HTML-authoring tools which enable quick and easy creation of HTML-encoded documents, and easy insertion of any downloaded CPIR-enabling Applet HTML tag using, for example, simple commands or drag-and-drop procedures.

As indicated at Block E in FIG. 4K2, the sixth step of the method involves serving servlet tag encoded HTML documents from Internet information servers to Java-enabled client computer subsystems 13 operated by consumers at home, in the office, in EC-enabled and "brick and mortar" retail stores, or on the road, as the case may be. As shown in FIG. 4H1, such Internet information servers can include, for example, IPI servers 12, retailer-related EC-enabled information servers 12A, manufacturer-related EC-enabled information servers 12B, and/or any other Internet (http or ftp) information servers operating on the Internet from which HTML-encoded document are served for any informational, educational, and/or entertainment purpose.

As indicated at Block F in FIG. 4G2, the seventh step of the method hereof involves using a Java-enabled client computer subsystem 13 to display served HTML-encoded documents having one or more of CPIR-enabling Applet tags embedded therewithin. This step is carried out by the consumer pointing his or her Java-enabled browser program (e.g. Netscape's Navigator, Microsoft's Internet Explorer, or Sun Microsystems' HotJava program) to an HTML-encoded document within which a CPIR-enabling Java Applet tag is embedded, at a particular point of presence on the WWW. As shown in FIGS. 4M1 through 4R2, CPIR-enabling Applets can be graphically-encoded in an variety of different ways as described in detail detailed hereinabove in connection with the second illustrative method illustrated in FIGS. 4G1 through 4H2 and described above.

As indicated at Block G in FIG. 4G2, the eight step in the method involves the consumer recognizing that a CPIR-enabling Applet tag is embedded within a Web-document displayed on a Java-enabled client computer subsystem, and thereafter launching/executing the associated Applet to initiate a UPN-directed search within the RDBMS server 9 by performing a single mouse clicking operation.

Notably, the third illustrative embodiment has been described with particular focus given to CPIR-enabling Applets encoded with the UPN of a particular consumer product. It is understood, however, that the CPIR-enabling Applets of the present invention can be encoded with the trademark(s) used in connection with a particular consumer product, thus providing Trademark-encoded CPIR-enabling Applets, in contrast with UPN-encoded CPIR-enabling Applets. In such alternative embodiments, the encoded trademark would be used to direct a search through the RDBMS server 9, and display the results thereof in a new (independent) Java GUI generated at the point of Applet tag embodiment. Alternatively, a product descriptor associated with a particular product can be encoded within the corresponding CPIR-enabling Applet, used to direct a search through the RDBMS server 9, and display the results thereof in an independent Java GUI generated at the point of Applet tag embodiment.

While the illustrative embodiments described above have employed Java Applet technology, which is designed to work with nearly all modern Internet browser programs, it is understood, however, that it is possible to use Active-X type objects (i.e. Active-X Applets) embedded within Web-documents, such as XML and SGML encoded documents including Active Server Pages (ASPs) from the Microsoft Corporation, in order to implement UPN-directed methods or the present invention at the point of presence of the consumer within a Cyberspace environment. Such alternative embodiments are a straightforward application of the techniques and technology disclosed hereinabove and thus fall within the scope and spirit of the present invention.

Also, while the above-described method of information searching, access and display has been described in connection with consumer products, it is understood that the principles of the present invention can also be used to deliver Web-based information to consumers in connection with a particular consumer service which has been assigned a Universal Service Number (USN) that functions in a similar manner to a UPN used in connection with a particular consumer product. In such alternative embodiments, the UPN/URL Database Management Subsystem 9 can be readily extended to contain symbolic links between Universal Service Numbers (USN) and URLs to form a UPS/URL database along the principles described hereinabove.

Also, the CPIR-enabling Applets of the present invention may be modified to provide consumers with general access to any IPI WWW site in accordance with the present invention, and not necessarily a product-specific Cyber-Service™ search, as described above. Thus, for example, in the case where the CPIR-enabling Applet is not encoded with any particular UPN, then the CPIR-enabling Applet will generate and display a pop-up Java GUI at the point where its Applet tag (or related image IMG) is embedded. Such as Java GUI could be designed to enable either (1) a generalized (unrestricted) consumer product information display, as would be desired at WWW search Engines/Directories such as Yahoo, Lycos, Excite, Alta-Vista, and the like, or (2) a restricted consumer product information display, as would be desired by a particular retailer operating an EC-enabled store or on-line catalog where browsing for merchandise not carried in the store or catalog is not to be encouraged.

An example of a CPIR-enabling Applet designed to produce a Java GUI for the "manufacturer-unrestricted or generalized" UPC Request CPI Service is illustrated in FIGS. 4N1 and 4Q1 by using a graphical icon or button, displayed on the lower portion of each display screen, and labeled as "UPC REQUEST™ CENTRAL Product Information Search". An example of the Java GUIs produced by these CPIR-enabling Applets are illustrated in FIGS. 4N2 and 4Q2, respectively.

An example of a CPIR-enabling Applet designed to produce a CPID-enabling Java GUI for the "manufacturer-restricted" UPC Request Retailer CPI Service is indicated in FIG. 4O1 by a graphical icon or button, displayed on the lower portion of each display screen, and labeled as "UPC REQUEST™ Retail Product Information @ SPORTS PLACE". An example of the Java GUI produced by this CPIR-enabling Applet is indicated in FIG. 4O2. Notably, this type of CPIR-enabling Applet provides consumers with desired information about the UPN-encoded product, while disabling the consumer from browsing for merchandise not carried in the EC-oriented store or catalog of the hosting retailer.

As illustrated above, in the case where the CPIR-enabling Applet is encoded with a particular UPN, then the function of the CPIR-enabling Applet will be to generate and display an independent pop-up Java GUI at the point where the Applet tag (or associated image) is embedded, for displaying the search results made against the consumer product identified by the UPN embodied within the CPIR-enabling Applet. An example of a CPIR-enabling Applet designed to produce a CPID-enabling Java GUI for a Cyber-Service URL Search is indicated in FIGS. 4P1 and 4R1 by a graphical icon or button, displayed on the lower portion of each display screen, and labeled as "UPC REQUEST™ Cyber-Service™ URL Search." Notably, operation of this type of CPIR-enabling Applet can be restricted to a particular retailer (or manufacturer) by the inclusion of a domain name constraint within the Applet itself, as described hereinabove. In the case of the Cyber-Service URL Search of the UPC Request System, the executed CPIR-enabling Applet automatically returns for display a menu of categorized URLs symbolically linked to the encoded UPN by the manufacturer and/or its agent. It would be desirable to embed this type of CPIR-enabling Applet on Web-documents in an EC-enabled stores and on-line catalogs of a particular retailer or manufacturer, displaying consumer products to be purchased, as well as on Web-documents serving as Internet-based product advertisements.

Referring to FIGS. 4N1 and 4N2, the above-described method of CPI searching and display will now be illustrated in the context of browsing a WWW Search Directory or Engine, and looking for a simple yet effective way of finding accurate consumer product related information on a particular product, or class of products. When searching for consumer product information at a WWW Search Directory or Engine, such as Yahoo, Excite, Alta Vista, Lycos, etc., it will be desirable for the consumer to search against all manufacturers within the entire UPN/URL Database Management Subsystem 9 before returning the search results to the consumer for display. Therefore, in this sort of Cyberspace environment, it will be oftentimes desirable to embed a CPIR-enabling Applet in the home-page of the WWW search directory or engine so that, upon clicking the graphical icon thereof, an independent Java GUI to the UPC Request Central WWW site will be automatically produced so that all modes of searching are made available to the consumer against all manufacturers registered (and possibly unregistered) within the UPN/URL Database Management Subsystem 9, as shown in FIG. 4N2. Notably, this Java GUI is very similar to the Java GUI set forth in FIG. 3C.

Referring to FIGS. 4O1 through 4O2, the above-described method of CPI searching and display is illustrated in a different context, wherein a consumer is shopping/browsing an EC-enabled storefront of a particular retailer, and considering whether or not to make an on-line purchase of a particular consumer product displayed within the catalog pages thereof. In this sort of environment, the retailer will typically prefer that the consumer can only search on manufacturers of merchandise being offered for sale within the EC-enabled store, lest the consumer will encouraged to leave upon finding out that what he or she is looking for is available in a different retail store, and not the store at which he or she is present. Therefore, in this sort of Cyberspace environment, it will be oftentimes desirable to embed a CPIR-enabling Applet in the home-page (or other conspicuous locations) of each retailer's WWW EC store so that, upon clicking the graphical icon thereof, an independent Java GUI to the UPC Request Retailer WWW site "@ the retailer store" will be automatically produced so that all modes of searching are made available to the consumer against only those manufacturers registered (and possibly unregistered) with the UPN/URL Database Management Subsystem 9 which supply consumer products for sale within the particular retail store, as shown in FIG. 4O2. Notably, this Java GUI is similar to the Java GUI set forth in FIG. 3C, except that a "manufacturer filter" set by the retailer UPC product catalog is used to filter out the search results displayed on the Java GUI.

Referring to FIGS. 4P1 and 4P2, it can be seen that the consumer within the EC-enabled store shown in FIGS. 4O1 and 4O2 has proceed to look at a particular product in the retail store (e.g. the "Ultralite Dagger Mountain Bike" being offered for sale for $285.00). At this point of presence within the EC-enabled retail store, the consumer might like to review the very best information published wherever on the WWW relating to this particular consumer product. Therefore, in this sort of Cyberspace environment, it will be desirable to embed a CPIR-enabling Applet within or near the image of this product in the retailer's WWW EC store so that, upon clicking the graphical icon thereof, a "UPC Request Cyber-Service URL Search" will be automatically carried out within the UPN/URL Database Management Subsystem 9, and the search results thereof displayed in a Java GUI, as shown in FIG. 4P2. As shown, the Java GUI displays a menu-formatted list of categorized URLs that have been symbolically linked to the UPN of the consumer product on which the search inquiry was initiated. Typically, this menu of URLs, accessed from the UPN/URL Database Management Subsystem 9, would have been updated as early as the night before during UPN/URL link updating/management operations carried out between (i) the UPN/URL catalog maintained in a client computer subsystem 13 within the backoffice of the manufacturer, and (ii) the Manufacturer/Product Registration Subsystem 31, 33, using electronic data interchange processes based on any one of number of protocols (e.g. ftp, EDI, XML/ICE, etc.).

Referring to FIGS. 4Q1 through 4Q2, the above-described method of CPI display is illustrated in the context of a consumer visiting an on-line EC-enabled auction site (e.g. at http://www.ebay.com), and considering whether or not to place a bid on a particular consumer product displayed within the auction listings thereof. In general, this environment is similar to the situation where a consumer finds him/herself searching for consumer product information at a WWW Search Directory or Engine, such as Yahoo, Excite, AltaVista, Lycos, etc. In such an environment, it will be desirable for the consumer to search against all manufacturers within the entire UPN/URL Database Management Subsystem 11 before returning the search results to the consumer for display. Therefore, in this sort of Cyberspace environment, it will be oftentimes desirable to embed a CPIR-enabling Applet in the home-page of the WWW on-line auction site so that, upon clicking the graphical icon thereof, an independent Java GUI to the UPC Request Central WWW site will be automatically produced so that all modes of searching are made available to the consumer against all manufacturers registered (and possibly unregistered) within the UPN/URL Database Management Subsystem 9, as shown in FIG. 4Q2. Notably, this Java GUI is very similar to the Java GUI set forth in FIG. 3C.

Referring to FIGS. 4R1 and 4R2, it can be seen that the consumer within the on-line auction site shown in FIGS. 4Q1 and 4Q2 has proceed to look at a particular item being auctioned off (e.g. the "Sony Mavica MVC-FD8I" at a current bid of $420.50). At this point of presence within the on-line auction site, the consumer might very well like to review the very best information published wherever on the WWW relating to this particular consumer product. Therefore, in this sort of Cyberspace environment, it will also be desirable to embed a CPIR-enabling Applet within or near the title of the product being auctioned (or image thereof if available) so that, upon clicking the graphical icon thereof, a "UPC Request Cyber-Service" URL Search will be automatically carried out within the UPN/URL Database Management Subsystem 9, and the search results thereof displayed in a CPID-enabling Java GUI, as shown in FIG. 4R2. As shown, this Java GUI displays a menu-formatted list of categorized URLs that have been symbolically linked to the UPN of the auctioned consumer product on which the search inquiry was initiated. Typically, this categorized menu of URLs, accessed from the UPN/URL Database Management Subsystem 9, would have been updated as early as the night before during daily UPN/URL link updating/management operations carried out in the manner described hereinabove.

Referring to FIGS. 4S1 through 4S2, the above-described method of CPI searching and display is illustrated in the context of a consumer visiting a typical WWW site (e.g. the Applicant's Intellectual Property Law Firm at http://www.tj-patlaw.com), whereupon an Internet advertisement is presented for a particular consumer product, solely for illustrative purposes. At this point of presence on the WWW, the consumer might very well like to review information published on the WWW relating to the advertised consumer product. Therefore, in this sort of Cyberspace environment, it will also be desirable to embed a CPIR-enabling Applet within, closely near, or immediately about the space of the advertisement so that, upon clicking the image associated thereof, a "UPC Request Cyber-Service" URL Search will be automatically carried out within the UPN/URL Database Management Subsystem 9, and the search results thereof displayed in a CPID-enabling Java GUI, as shown in FIG. 4S2. As shown, this Java GUI displays a menu-formatted list of categorized URLs that have been symbolically linked to the UPN of the advertised consumer product on which the search inquiry was initiated. Typically, this categorized menu of URLs, accessed from the UPN/URL Database Management Subsystem 9, would have been updated as early as the night before UPN/URL link updating/management operations carried out in the manner described hereinabove.

In situations where the advertisement itself embodies a Java-Applet, as in the case of most banner-type advertisements, it would be desirable to embed the CPIR-enabling Applet within the HTML-encoded document displayed within the new Java GUI generated when the Java-Applet is executed by the consumer upon his or her initial encounter of the advertisement. Upon the display of the menu-formatted list of categorized URLs within the CPID-enabling Java GUI, the consumer can easily access different Web-documents containing information related to the advertised consumer product by simply selecting the URL and linking to the information resource to which it points on the WWW. Notably, the displayed URL menu would include (i) one or more URLs pointing to EC-enabled stores and on-line catalogs at which the advertised product can be purchased over the Internet, as well as (ii) one or more URLs pointing to "brick and mortar" type retail stores at which the advertised product can be purchased in the stream of commerce.

As shown in FIG. 4S3, the consumer having accessed the product-specific search results of FIG. 4S2, may then select, from the displayed URL Menu, a URL displayed in the "Buy On The Web" URL category thereof, thereby automatically linking to the EC-enabled store or product catalogue specified by the selected URL, as shown in FIG. 4S2, and thus enabling the purchase of the advertised product or service thereat. Preferably, the EC-enabled store or product catalog employs the "one-click purchase order" placement system and method taught in U.S. Pat. No. 5,960,411 to Hartman, et al., and assigned to Amazon.com, Inc., which is incorporated herein by reference in its entirety. This would simplify ordering the product by the retailer having the consumer's credit card and shipping address information on file.

Thus, the CPI-based search and display method of the present invention gives rise to a new method of and system for purchasing consumer products over the Internet (e.g. WWW) comprising the steps of: embedding a UPN-encoded CPIR-enabling Applet within the HTML-code of a consumer product advertisement, wherein the CPIR-enabling Applet, when executed, automatically displays a categorized URL menu containing one or more URLs pointing to one or more EC-enabled stores or on-line catalogs on the WWW at which the consumer product identified by the encoded UPN can be purchased and delivered to a particular address in physical space.

Referring to FIGS. 4T1 through 4T2, the above-described method of CPI searching and display is illustrated in the context of a consumer visiting a particular on-line electronic trading WWW site. At this site, the consumer is assumed to be reviewing the performance chart of a particular consumer product company displayed at this electronic trading WWW site, and is considering whether or not to buy, keep or sell securities (e.g. stock or bonds) in this consumer product company. At this point of presence on the WWW, the consumer decides that he or she would like to first ascertain specific information about the company's products by initiating a trademark/company name-directed CPI search according to the principles of the present invention. In accordance with the present invention, this would be achieved by the consumer identifying a client-side or server-side CPIR-enabling Java Applet embedded within the HTML code of the performance chart displayed at the on-line electronic trading WWW site. In the illustrated embodiment, the CPIR-enabling Applet is graphically indicated by an associated graphical image (e.g. UPC Request™ Cyber-Service™ Trademark-Directed URL Search) and is encoded with the trademark an/or company name of a particular manufacturer/vendor associated with the display performance chart. Notably, the creation, distribution and embedding of such CPIR-enabling Applets must be carried out well in advance of the consumer arriving at the particular point of presence shown in FIG. 4T1. In accordance with the principles of the present invention, when the consumer performs a single mouse-clicking operation on the graphical image associated with the embedded CPIR-enabling Java Applet, the underlying CPIR-enabling Applet is executed and a trademark-directed URL search is automatically made against the UPN/URL Database Management Subsystem 9 hereof. Quickly thereafter, the results from the trademark/company name directed search are automatically displayed in a Java GUI on the browser of the requesting consumer's client machine, as shown in FIG. 4T2. As shown, the consumer is free to scroll through the displayed GUI, looking for URLs on particular consumer products of the manufacturer/vendor.

Preferably, in above application, each entry in the displayed Trademark Search Results screen shown in FIG. 4T2 is itself a CPIR-enabling Java Servlet which, when clicked upon, automatically initiates a UPN-directed CPI search against a particular product of the manufacturer related to the displayed stock performance chart, as taught in great detail hereinabove. This novel technique will greatly simplify accessing and displaying accurate and up-to-date UPC/URL menus on the products offered by a particular company in which a consumer is considering buying, keeping or selling a particular number of financial securities. Also, while conducting such on-line CPI research, the consumer may also consider purchasing a particular consumer product at an EC-enabled store or product catalog, as illustrated in FIG. 4S3, supra.

Overview of Modes of Operation For IPI Finding and Serving Subsystem

In order to enter a primary mode of operation of the IPI Finding and Serving Subsystem, the consumer, retail sales clerk or retailer selects a particular mode activation button (e.g. 21A, 21B, 21C, 21D, 21E, or 21F) displayed in the control frame 21B of the Java GUI browser program at the requesting client subsystem 13. Upon making the selection, the Web browser at the client subsystem 13 automatically requests a particular HTML-encoded form (typically residing on the IPD Server(s) 11). In general, each mode activation button 21A through 21F can be linked to a client-side or server-side Java Applet tag embedded within an HTML-encoded document, or directly to a predefined static-type HTML form corresponding to the selected mode of operation. In the case of Java Applets, upon selecting the mode selection button, a Java GUI is automatically produced and displayed within the information display frame 20C of the Web browser of the requesting client subsystem. In the case of the directly-linked static-type HTML forms, a GUI in the form of HTML document is automatically produced and displayed within the information display frame 20C of the Web browser of the requesting client subsystem. In either case, the HTML-encoded form corresponds to the selected mode and is linked to a Java method (or CGI script) related to the selected mode and possibly to other methods or forms required to carry out the database access and/or management process associated therewith. The requesting client subsystem then enters the information requested by the HTML form displayed within the information display frame 20C of the Web browser's GUI interface. Information entry into the HTML form can be carried out using bar code symbol reading equipment, keyboard or keypad, speech dictation equipment (by Dragon Systems, Inc. of Newton, Mass.), and the like.

In general, the particular messages which will be displayed within the HTML forms during any particular mode of operation will depend upon several factors namely: whether the IPI Web-site is intended for access by bar code driven kiosks (i.e. client subsystems 13) as shown, for example, in FIGS. 3A2, 3A3, 3A4, and 3A5 located within retail environments; or whether the IPI Web-site is intended for access by desktop, laptop and palmtop client computer systems 13 as shown, for example, in FIG. 3A1 located at home, in the office or on the road.

For example, if the IPI Web-site supported by the IPI Finding and Serving Subsystem hereof is intended for access by bar code driven kiosks, then the HTML documents related to the IPI Website will be particularly adapted to facilitate the use of bar code symbol reader at the client subsystem. This way UPNs (e.g. UPC or EAN symbols) can be easily entered into the subsystem without manual key-entry operations. In contrast, if the IPI Web-site supported by the IPI Finding and Serving Subsystem hereof is intended for access by client subsystems not having bar code symbol readers (e.g. Web-enabled computer systems at home, in the office or on the road), then the HTML documents related to the IPI Website will be particularly adapted to facilitate the use of data-entry display screens at the client subsystem. This way, UPNs (e.g. UPC or EAN symbols) can be easily entered into the subsystem using bar code symbol scanners avoiding manual key-entry operations. In the illustrative embodiment, bar code-code driven and manual data-entry IPI Websites are served from a "framed" Java GUI, in which the control strip 20B has six (5) Check Boxes 21A through 21F described above to enable the consumer, retail sales/service personnel as well as manufacturers to select the particular mode of operation that suits his or her consumer product information needs at any particular instance in time.

It understood that the use of Java Applets (including Servlets) will be most beneficial in constructing Java-based IPI Central and retail WWW sites, as indicated above, and in most instances will be preferable over static HTML documents and CGIs linking the IPD (http) server 11 to the back-end RBDMS servers 9 of the system. However, for purposes of illustration only, the six primary modes of operation of the system will be described below using a CGI implementation, illustrated in FIG. 2B2. However, it is understood that implementations using CPIR-enabling Servlets as shown in FIG. 2B1 can be used to replace such CGI constructions. Also, implementations using CPIR-enabling Applets as shown in FIGS. 2B3 and 2B4 can be used to enable access to the UPN/URL Database Management Subsystem 9 and its supporting RDBMS servers.

Manufacturer/Product Registration Mode of Operation

Figure 5A:
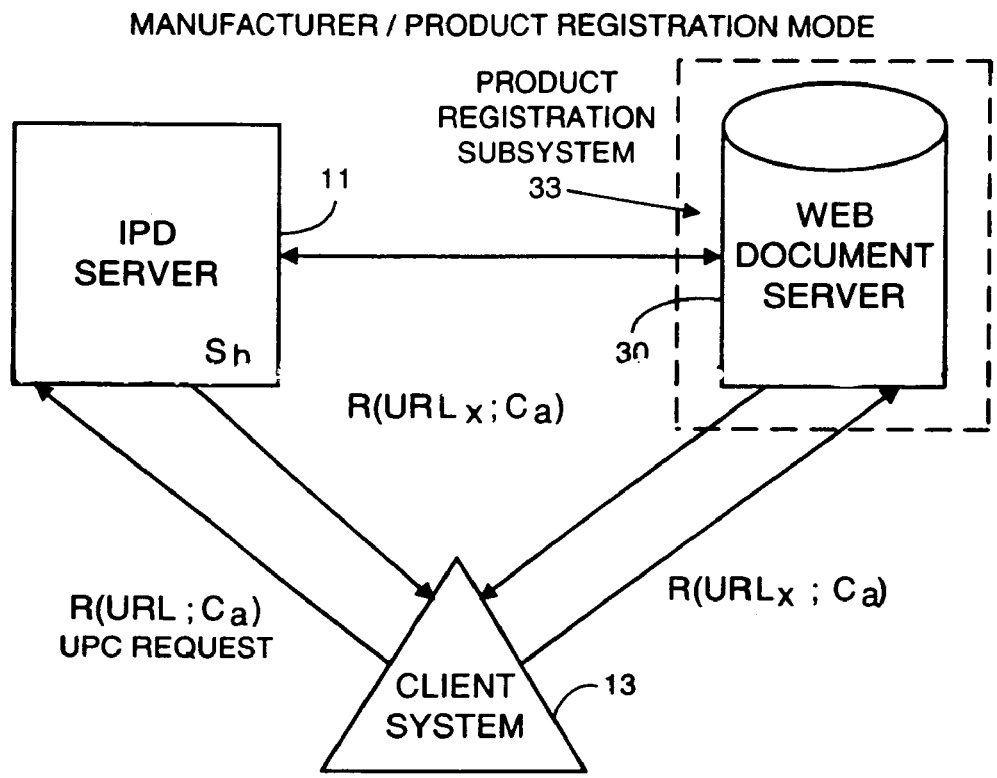
FIG. 5A is a schematic diagram illustrating the high level structure of communication protocol that can be used among the client subsystem $C_a$, the IPD Server $S_b$, and the Web-based Document Server $S_{WD}$ (30) of the IPI Finding And Serving Subsystem hereof when, from any particular client subsystem, the subsystem is engaged is in Manufacturer/Product Registration Mode of operation, requesting as input a URL which automatically connects the client subsystem to the Web Document Server associated with the Manufacturer/Product Registration Subsystem of the present invention.
Figure 6A:
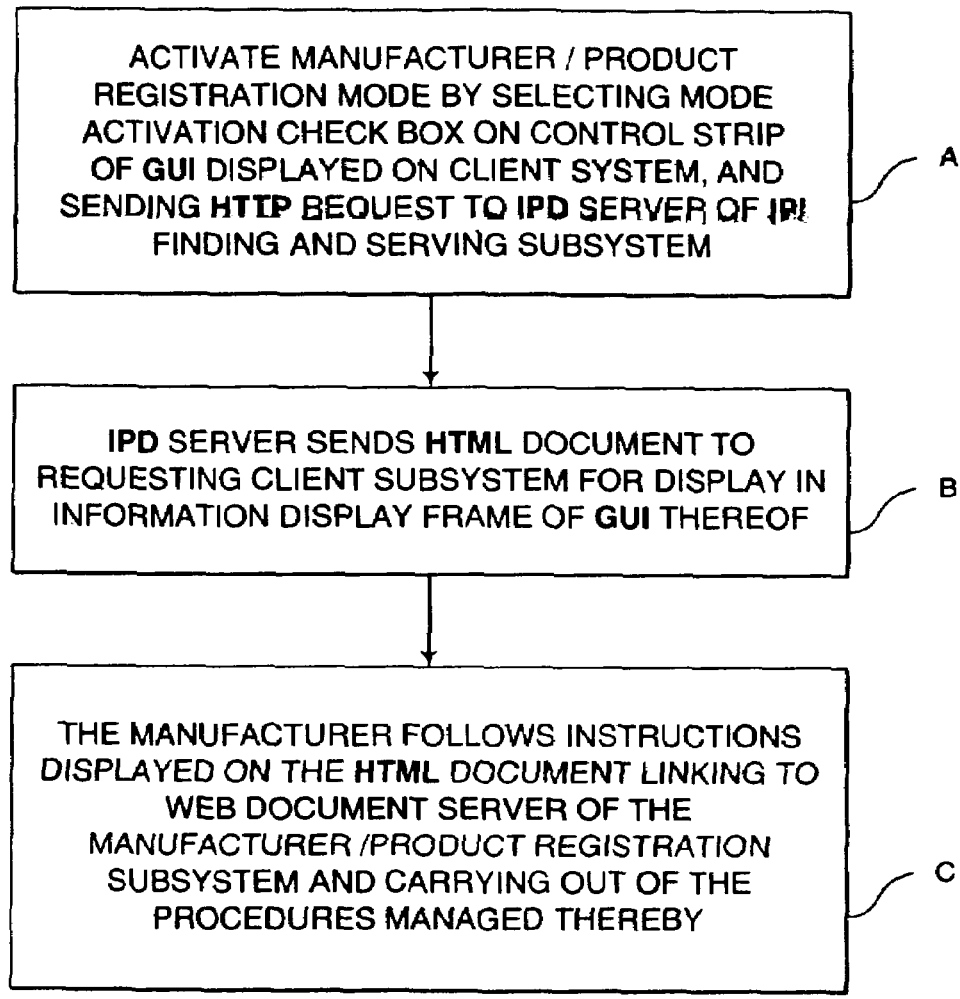
FIG. 6A provides a high level flow chart illustrating the steps involved in carrying out the communication protocol shown in FIG. 5A when the IPI Finding and Serving Subsystem is in its Manufacturer/Product Registration Mode of operation.

Referring to FIG. 5A, the high level structure is shown for a communication protocol that can be used among a client subsystem $C_a$, an IPD Server Sb, and an IPI Server Sc of the IPI finding and serving subsystem hereof when it is induced into the Manufacturer/Product Registration Mode of operation from the point of view of the depicted client subsystem. FIG. 6A provides a high level flow chart illustrating the steps involved in carrying out this communication protocol when the IPI Finding and Serving Subsystem is in its Manufacturer/Product Registration Mode of operation.

As indicated at Block A in FIG. 6A, when selected from the user interface of an IPI Website, the first Check Box type button 21A automatically activates the Manufacturer/Product Registration Mode of the IPI Finding and Serving Subsystem by sending an HTTP request to the IPD Server(s) 11" based on a URL hot-linked to the selected Check Box. As indicated at Block B in FIG. 6A, this causes a HTML-encoded document residing on the IPD Server 11" shown in FIG. 2B2, to requesting client subsystem 13 or display on the information display frame 20C thereof. The HTML document of the illustrative embodiment displays several types of information relevant to the Manufacturer/Product Registration Mode, namely: eligibility requirements (i.e. qualifications) for a manufacturer to register with the IPI Finding and Serving Subsystem; optional ways of registering consumer products and product-related information with the Manufacturer/Product Registration Subsystem hereof 33; ways of acquiring computer software necessary for managing consumer product-related information (e.g. UPNs, URLs, trademarks and product descriptors) on a particular computing platform using EDI (or XML/EDI) techniques supported by the Manufacturer/Product Registration Subsystem 33; etc; and one or more Check Boxes embodying links (i.e. anchors) to HTML documents, CGI scripts and the like designed to facilitate this mode of operation. Notably, at least one of these HTML documents will be located on the Web Document Server 30 of the Manufacturer/Product Registration Subsystem 33, providing manufacturers (and/or their designated information-managers and agents) with a point of entry into the manufacturer/product registration process hereof. As indicated at Block C in FIG. 6A, the manufacturer and or its agent follow the instructions displayed on the HTML document, linking to the Web Document Server 30 of the Manufacturer/Product Registration Subsystem 33 and filling out the various HTML forms transmitted to the requesting client subsystem, downloading Web-based EDI (or XML/EDI) software for UPN/URL management; and the like. While carrying out registration of manufacturers with the subsystem is relatively straightforward, there are a number of different ways of carrying out the Product Registration Mode of the subsystem. These alternative techniques will be described below.

The first method illustrated in FIGS. 2-1 and 2-2 involves by carrying out FTP between a client subsystem of the registering manufacturer (or its agent) Mi and IPD Server 11" in order to update the IPI Registrant Database associated therewith. This can be carried out by the manufacturer's officer or agent surfing to the IPI Website, selecting the "Product Registration Mode" from the control strip, and then following the instructions displayed on the various screens of the Website in this mode. When using the first method, product UPCs, URLs and other information elements can be formatted within suitable Product Registration Forms and transmitted by FTP from the client subsystem or Database Server of a registering manufacturer to the IPD Server 11" so that the IPI Registrant Database thereof can be updated accordingly. The first method will be desirable typically when registering a few consumer-products.

Figure 2A:
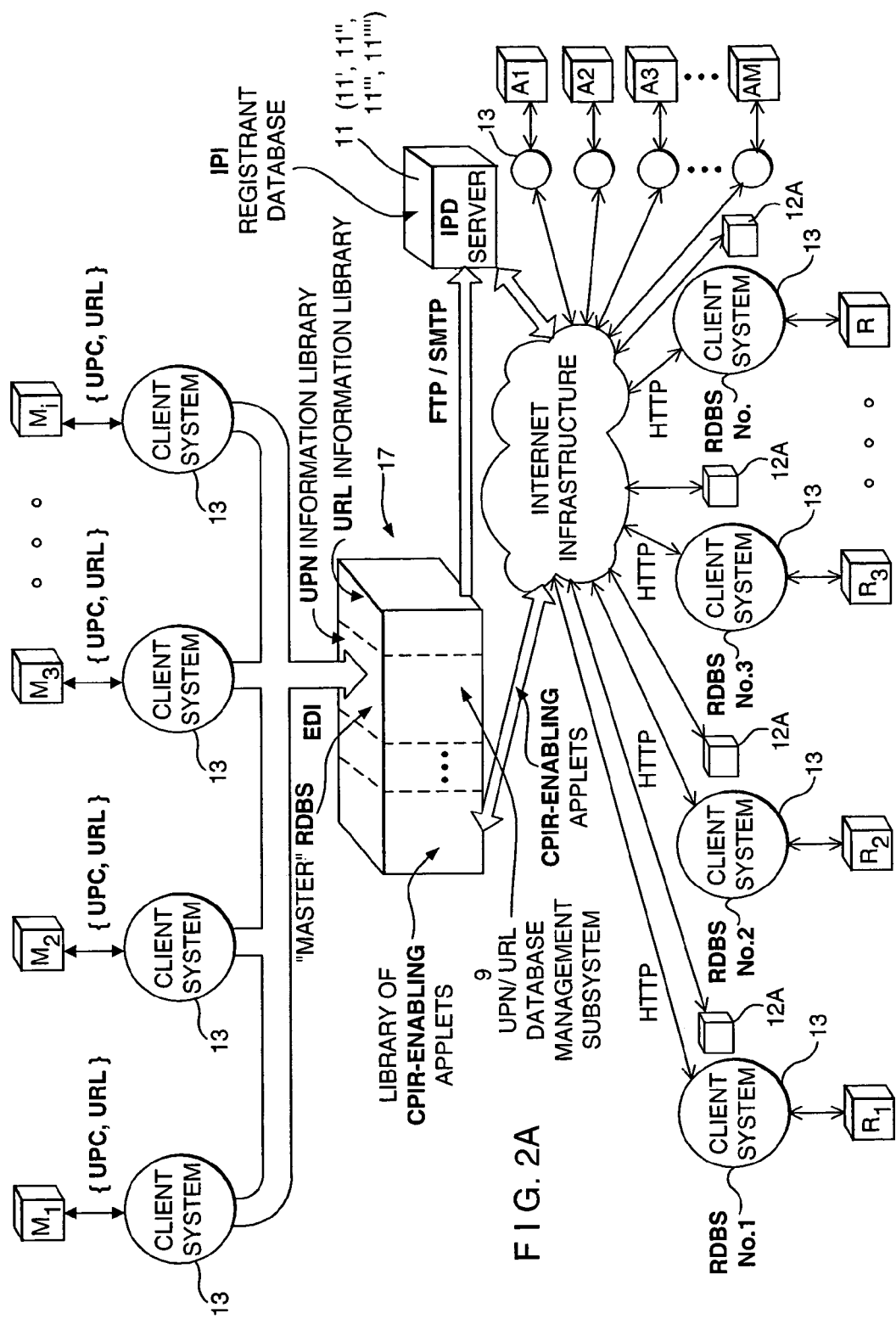
FIG. 2A' is a schematic diagram illustrating the flow of information along the consumer-product supply and demand chain, including (i) the communication link extending between the information subsystems of manufacturers of UPC-encoded products and the centralized (or master) UPN/URL Database Management Subsystem 9 of the consumer-product information collection, transmission and delivery system of the present invention, (ii) the communication link extending between the UPN/URL Database Management Subsystem and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, (vi) the communication link extending between the IPI Servers and the Client Subsystems of consumers, and (vii) the communication link extending between the UPN/URL Database Management Subsystem and the EC-enabled UPN-based Consumer Product Catalogue Server(s) of the present invention for providing consumer product catalogue services to retailer purchasing agents and others and enabling the on-line purchase of consumer products between trading partners (e.g. manufactures and retailers) using EDI (or XML/EDI) based business-to-business electronic commerce transactions.
Figure 2A:
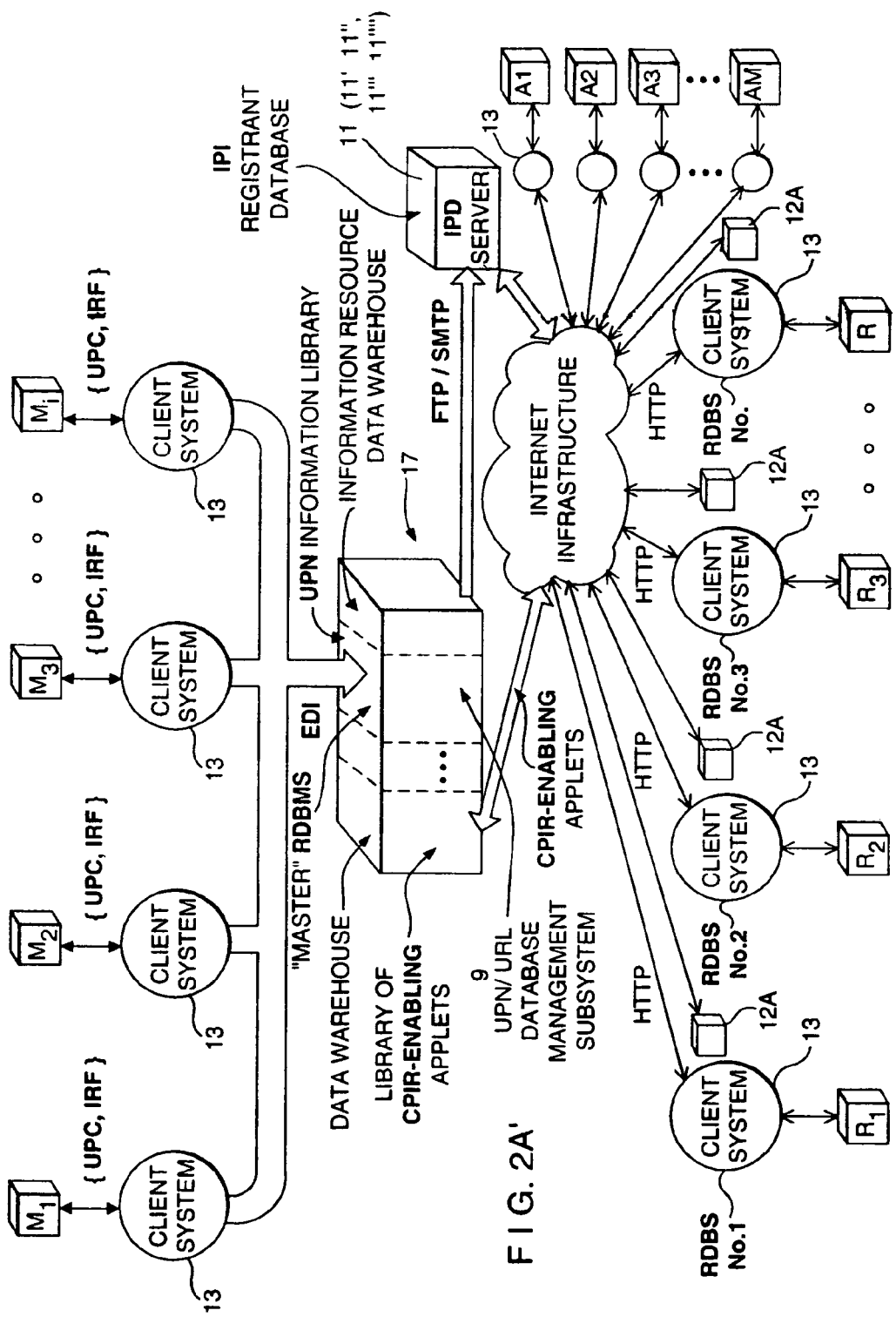

The second method illustrated in FIG. 2A, involves first carrying out EDI between a client subsystem of the registering manufacturer (or its agent) and the UPN/URL Database Subsystem 9, and then carrying out FTP or SMTP between the client subsystem and IPD Server 11" in order to update the IPI Registrant Database maintained therein. The second method will be desirable when a manufacturer needs or desires to register a large number of consumer-products. The details of these information transmission methods will be described below.

When using the second method, conventional EDI protocols or more modern protocols (e.g. XML/ICE) can be used to transmit product UPCs, URLs and other information elements from client subsystems or database servers of manufactures to the UPN/URL Database Subsystem 9 of the present invention. FTP can be used to transmit UPCs and URLs from the UPN/URL Database Subsystem to each IPD Server in the system so that the IPI Registrant Database thereof can be updated accordingly. Once registered with the system using either of these methods in the Product Registration Mode, such consumer-products can be easily found on the Internet by anyone wishing to use the product finding techniques of the present invention.

The third method involves by carrying out electronic data and document interchange over the Internet between the WebDox Remote™ Computer System 13 and the WebDox™ Server 30 of the system of the present invention, and communication between the WebDox™ Server 30 and the WebDox™ Admin computer system 31 of the system hereof. The various steps involved in this embodiment of the consumer product registration process will be described in detail below.

When the manufacturer selects the "Product Registration Mode" of the system, a Manufacturer Registration Form is automatically downloaded from the WebDox™ Server 30 to the Manufacturer's client computer system 13 (i.e. the WebDox Remote™ Computer System). At the end of the downloading process, a Manufacturer Registration Form is presented (i.e. displayed) and the manufacturer then enters some requested identification information (e.g. Manufacturer's Company Name, Address, Name of CEO and President, phone number, 6-digit Manufacturer Identification Number assigned by the UCC, etc.) and presses the "Send" button on the Manufacturer Registration Form. The form is then transmitted immediately via the Internet and received by the WebDox™ Server 30. At the WebDox™ Server 30, an automated process takes the information in the Manufacturer Registration Form and registers the Manufacturer with the system.

Upon registering the manufacturer with the system, the manufacturer is asked to select which version of "customized" WebDox Remote™ software (i.e. the UPN/URL Registration Application) the manufacturer would like downloaded to its client computer system 13 (e.g. WebDox Remote with UPN/URL Database and CGI scripts for MacOS Web-Server, WebDox Remote with UPN/URL Database and CGI scripts for UNIX Web Server, or WebDox Remote with UPN/URL Database and CGI scripts for NT Web Server). Once the manufacturer makes its selection, the customized WebDox Remote software is automatically downloaded to the manufacturer's client computer system 13. This downloaded software includes a computer program that automatically generates (on the manufacturer's) client subsystem, a relational database management system (RDBMS) which allows the manufacturer (or its agents) to easily construct and maintain a UPN/URL database (akin to that specified in FIG. 4A1) but restricted to containing information relating only to the manufacturer's products. Thus, when the manufacturer attempts to enter a UPC number into the manufacturer's UPN/URL database that does not contain the 6-digit Manufacturer Identification Number assigned to the manufacturer by the UCC, the RDBMS automatically blocks all such information entries. Consequently, the UPN/URL database can only maintain information pertaining to the registered manufacturer's products and information relating thereto on the Internet. As the manufacturer adds or removes products from its retail or wholesale line, the database administrator simply adds or removes the UPC and URL information relating thereto from the RDBMS. As will be described in greater detail hereinafter, such database changes are periodically transmitted to the WebDox™ Server 30 so that the IPI Registrant Database (i.e. master UPN/URL database) of the system (maintained on the IPD Servers thereof) can be updated in a timely manner.

Preferably, the limited or restricted version of the UPN/URL database maintained by each registered manufacturer on its client subsystem 13 is connected to the manufacturer's Internet Server 12' (or 12B) by a CGI script or Java method, as shown in FIGS. 2-1 and 2-2. In this way, the manufacturer's limited version of the UPN/URL database can be made accessible to consumers world-wide from the manufacturer's Website which, in the illustrative embodiment, is assumed to be hosted on an Internet information server 12' or 12B that is similar to an IPI Server 12 described in detail hereinabove. In order to simply the process of serving of the manufacturer's limited-version of the UPN/URL database on the WWW, it is preferred that the CGI script 40, input forms, output forms, and methods for searching and the displaying the results from the limited-version UPN/URL database are predesigned for use with manufacturer's Internet Server 12' (taking into consideration its operating system and the like). This way, prior to registration the manufacturer need only make a selection of the type of customized WebDox Remote software it needs for its computing and Internet serving platform(s). Then, during software download, the WebDox Server 30 simply transmits the suitable version of the customized WebDox Remote software to the manufacturer so that it can create, maintain and serve (on the WWW) its limited version of the UPN/URL database in a "turn-key" manner.

In the illustrative embodiment of the present invention, the homepage of each registered manufacturer's Website will display a visually conspicuous radio button labeled "UPC Request™ Product Finder" or the like. Moreover, whenever a consumer attempts to search the manufacturer's limited-version UPN/URL database for products not registerable to the manufacturer (i.e. using UPC numbers not containing the manufacturer's 6-digit UCC Manufacturer Identification Number), the limited-version of the UPN/URL database will automatically display an HTML-encoded message from the manufacturer's Website, urging the consumer to surf to the IPI Registrant Database of the system (maintained on the network of IPD servers 11). Preferably, such HTML-encoded messages will have a hot-linked URL (i.e. anchor) to Website(s) providing consumer access to the "master" UPN/URL database.

The WebDox Remote™ computer system 13 available to each registered manufacturer has both online and offline modes of operation. In the offline mode, the manufacturer responds to a UPN/URL Registration Request from the WebDox™ Server in the following manner. First, the WebDox Remote™ software analyzes the limited-version of the UPN/URL database that it has been currently created and maintained by the manufacturer or its designee. Thereafter, the WebDox software automatically creates a UPN/URL Registration Response document which contains a set of currently active URLs specifying the address location of Web-based information resources associated with each UPC-encoded product of the manufacturer. Then, WebDox Remote™ program establishes an Internet connection with the WebDox™ Server, through a "Get/Send Mail" option. This delivers the UPN/URL Registration Response (document) to the WebDox™ Server 30 and retrieves any documents which are waiting thereat for the manufacturer. These new documents are listed by WebDox Remote™ program and presented in the InBasket of the manufacturer's WebDox Remote™ computer system 13.

In the online mode, WebDox Remote™ (under the control of the Form Application) can also send UPN/URL Registration Request documents immediately. For very sensitive applications (i.e. Just-in-Time), this ensures that the UPN/URL Registration Response document is received at the WebDox™ Server 30 the moment that the manufacturer completes the document.

In general, the WebDox™ Server 30 provides a high-volume document processing and mailboxing environment between the WebDox Server and the WebDox Remote™ system of each registered manufacturer. WebDox™ Server 30 performs: permanent storage and tracking of all UPN/URL Registration Request documents sent and UPN/URL Registration Response documents received; automatic reconciliation of acknowledgments from WebDox Remote™ program; automatic creation of user-friendly receipt messages to the manufacturer; "mailboxing" of outbound UPN/URL Registration documents for retrieval by manufacturer; and automatic manufacturer and profile creation based on forms received from manufacturers. The WebDox™ Server 30 consists of online components that run as extensions to Microsoft's Internet Information Server (IIS) using the ISAPI interface. This provides higher performance and lower hardware requirements than a conventional CGI Web Interface. Processing intensive tasks are performed asynchronously from the Web server. An integrated queuing and dispatching system manages the processing of documents and interaction with the corresponding application. For large volume situations, the WebDox™ Server components can be deployed on different machines, the WebDox™ Server components (ISAPI extensions) on one machine, the processing components and database on another machine.

Data for UPN/URL Registration Request documents to be sent to manufacturers is extracted from the IPI Registrant Database using an interface or utility program. The document data (e.g. information fields associated with UPN/URL registration) can then be accepted by WebDox in a direct manner after formatting. The UPN/URL Registration Request document should be formatted to a file structure created during the design of the UPN/URL Registration Application. The WebDox™ Server 30 then converts the application data into a UPN/URL Registration request document (i.e. data package). The data package for each manufacturer is then stored (as a message) in an assigned Mailbox of the WebDox™ Server 30. These messages are then available to be retrieved by the registered manufacturers using WebDox Remote's™ "Get/Send Mail" feature.

As discussed above, the WebDox Remote™ program transmits messages (e.g. UPN/URL Registration Response documents) to the WebDox™ Server 30, where, after passing security checks, they are placed in the WebDox Mailbox system. Incoming (document) messages are received from the Mailbox, processed, and converted into data files for direct transfer to the database management system handling the IPI Registrant Database.

For each document received, the WebDox™ Server 30 will return a message to the manufacturer confirming receipt of the document. WebDox Remote™ system also returns delivery confirmations to the WebDox Server. These messages are used by the WebDox™ Server to track the status of messages. WebDox™ Server 30 maintains Mailbox Files for all inbound and outbound messages. The status of messages is updated on an ongoing basis as acknowledgement messages are received, allowing timely and precise audits.

WebDox Admin™ Computer system 31 provides an easy-to-use tool to manage the community of manufacturers, review the status of documents, and configure the WebDox™ Server 30, including: ad hoc maintenance of manufacturer information; online display of the Mailbox permitting inquiry into document status or document activity for particular manufacturers, and the ability to reset document status; creation and maintenance of UPN/URL Registration Profiles; preparation of "releases" of new and updated UPN/URL Registration Applications; Distribution of new and updated UPN/URL Registration Applications; and automatic inventory and tracking of UPN/URL Registration Applications distributed to manufacturers.

In the preferred embodiment, UPN/URL Registration Application design and development is carried out on a Windows 95 or NT workstation. The UPN/URL Registration Application is developed, tested, and then fully implemented for production with manufacturers. New or updated UPN/URL Registration Applications are registered with the WebDox Admin™ computer system 31 and are then distributed to the manufacturers as described herein above.

In the preferred embodiment, UPN/URL Registration Applications are developed using Microsoft Visual Basic™ and related software tools. These products provide rapid design and creation of the screen-based forms that the manufacturer uses. In addition, the "intelligence" behind the form, in the UPN/URL Registration Application, can be very powerful, making the manufacturer's work easier while ensuring that the user and Server application receive high quality data.

The WebDox Admin™ system handles the distribution of UPN/URL Registration Applications to manufacturers. New UPN/URL Registration Applications can be sent to some or all of the existing manufacturers assigned UPC Manufacturer Identification Numbers. Updates to UPN/URL Registration Applications can be sent to manufacturers who are currently using that UPN/URL Application. The actual update is distributed by sending a small notification message to each manufacturer, which then results in the remote site downloading the new forms from the WebDox™ Server 30, as hereinbefore described above.

Notably, the WebDoc™ Solution has been described above provides one way and means of implementing a method of electronic data and document interchange between client machines of manufacturers and the IPI Registrant Database (i.e. master UPN/URL database in subsystem 9) of the system of the present invention. It is understood, however, that many different types of electronic data interchange solutions (e.g. XML or XML/EDI) can be used to practice the system and method of UPN/URL database management in an efficient and timely manner so that consumers will always be provided with up-to-date URL links on the Internet. For example, the new CenterStage 4 Application Suite from On Display, Inc. of San Ramon Calif., can be used to enable XML-based electronic data interchange (i.e. transfer) between the client computer subsystems 13 operated within the backoffices of manufacturers, and the IPI Registrant Database (i.e. master UPN/URL database) of the system hereof operated in the backoffice of the system administrator. Manufacturers (i.e. vendors) can format their data transactions in any of the many new languages of electronic-business (e.g. cXML, RosettaNet, CBL, BizTalk, OBI, ICE proprietary formats, or standard EDI formats such as ANSI X12), and the CenterStage 4 platform will automatically convert their transactions into the chosen formats of the system administrator responsible for managing the master UPN/URL database.

For further details on the use of electronic data interchange technologies in order to realize this functionality of the system of the present invention, reference can be made to the following technical publications: "XML/EDI: Cyber Assisted Business in Practice" (1999) by Dick Raman (ISBN: 90-8050233-2-1); The A to Z of EDI and Its Role in E-Commerce™ Second Edition, 1998) by Nahid Jilovec, published by Duke Communications, Inc., Loveland, Colo.; "Electronic Commerce With EDI: A Guide For Decision Makers" (1998), by Robert L. Sullivan, published by Twain, Inc. North Andover, Mass.; and "Wild's WWW: Technical Foundations of the World Wide Web" (1999) by Erik Wilde, published by Springer-Verlag, Berlin, Heidelberg; each said publication incorporated herein by reference as of set forth herein.

In FIG. 2A', there is shown an alternative way of collecting and managing consumer product information along the consumer-product supply and demand chain. While the method of consumer product information collection and management shown in FIG. 2A' is similar in many ways to the method shown in FIG. 2A, there are several important differences. For example, in the method of FIG. 2A', the manufacturer or its agent is still responsible for symbolically linking consumer product information resources to the UPN of its associated product, but there is no need for such information resources to be published on the WWW at the time of linking; all that is required is that the information resource file (IRF) associated with the product be symbolically linked or indexed to its UPN, and then for such linked information to be transported to the UPN/URL database management subsystem 9', realized as a data warehouse (i.e. RDBMS) supported upon a massively-parallel computing platform. Thereafter, each IRF in the data warehouse can be linked a URL specifying the location of the IRF within the data warehouse, and all URLs associated with a particular product can be linked to its UPN. The IRFs can be classified by information type, as well, to facilitate searching by the consumer. According to this method, when a consumer enters the UPN of a particular product into http server of the UPN/URL Database Management Subsystem 9', the http server associated therewith responds by serving (to the consumer) the list or menu of URLs symbolically linked to the UPN, for selection by the consumer.

Figure 2C:
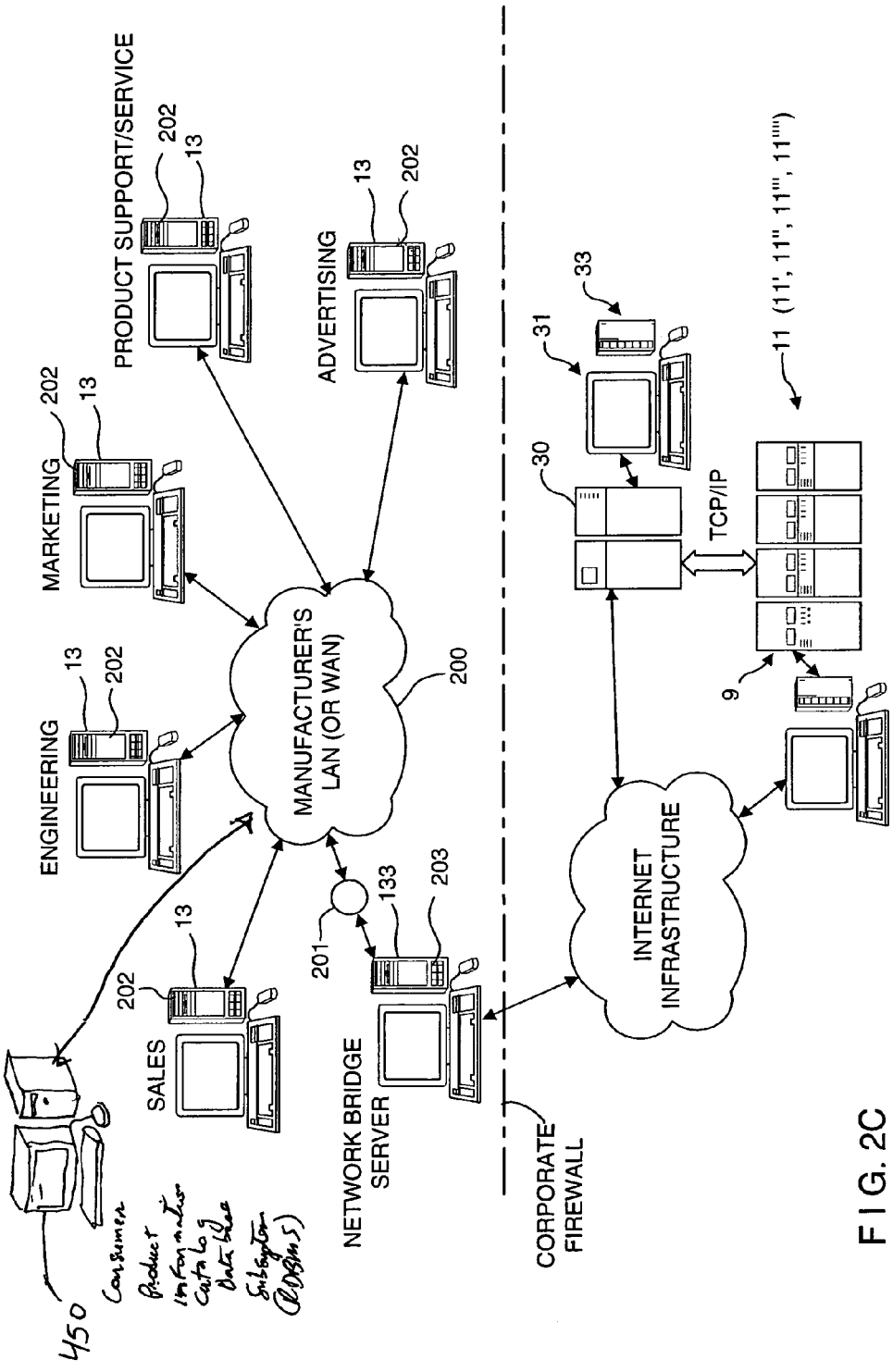
FIG. 2C is a schematic representation of a portion of the system shown in FIGS. 2-1 and 2-2, wherein a plurality of manufacturer-operated client subsystems are shown connected to a local or wide area IP-based network, preferably maintained behind a secure corporate firewall, and the secured manufacturer information network is connected to the infrastructure of the Internet by way of an Internet router and server, for the purpose of enabling different departments within a business organization (e.g. marketing, sales, engineering, support and service, advertising, finance, etc.) manage different types of multi-media consumer product related information, as well as the UPN/URL/trademark/product-descriptor links based on the type of information contained within the URL-specified information resource on the WWW.

In FIG. 2C, there is disclosed a novel distributed method of collecting, managing and transmitting UPN/URL menus for consumer products. Notably, this distributed system and method will be useful in large corporate environments, where departmentalization is the general rule. As shown, instead of each manufacturer having a single EDI-enabled workstation (equipped with EDI or EDI/XML software) 13 for carrying out UPN/URL management operations, a group of EDI-enabled client computers 13 are connected to a local or wide area network 200 via a network-centric Web (http) server 133 using a network router 201 to interface with the infrastructure of the Internet, as well as the other local or wide area network 200 as shown in FIG. 2C. Preferably, each client computer 13 on the LAN or WAN is equipped with UPN/URL management software for managing the consumer product information collected in the UPN/URL Database for a particular manufacturer, as shown in FIGS. 4A1 through 4B.

In one arrangement, each manufacturer-operated client machine 13 would be assigned the task of managing the UPN/URLs associated with a particular department of the manufacturer (e.g. engineering department, sales department, service/support department, marketing department, advertising department, etc.). The UPN/URLs menus and other CPI related information collected by each department is maintained within a local UPN/URL Database 202 on the department's client machine 13, and is periodically transmitted to a Manufacturer's UPN/URL Database 203 hosted on the network Internet server 133 In addition to providing the client machine behind the corporate firewall with http, e-mail and ftp services, the network Internet server 133 is also equipped with an EDI (e.g. EDI or XML/ICE) software solution which enables periodic uploading of the manufacturer's UPN/URL Database 203 to the Central UPN/URL Database Management Subsystem 9, shown in FIG. 2C Another arrangement, each manufacturer-operated client machine 13 would be assigned the task of managing the UPN/URLs associated with a particular department of the manufacturer (e.g. engineering department, sales department, service/support department, marketing department, advertising department, etc.). The UPN/URLs menus and other CPI related information collected by each department is maintained within a local UPN/URL Database 202 on the department's client machine 13, and is periodically transmitted directly to the Central UPN/URL Database Management Subsystem 9, shown in FIG. 2C. In such an alternative embodiment of the present invention, the network Internet server 133 would provide each client machine behind the corporate firewall with http, e-mail and ftp services in a conventional manner, but not maintain a central manufacturer's UPN/URL database 202.

The primary advantage of the above described techniques for distributed UPN/URL management hereof is that such techniques provide manufacturers with a revolutionary way of am and means for enlisting the different departments within the organization, having different business perspectives, goal and resources, to create "up-to-date" links between UPN's on their consumer products and the diverse types of consumer related information resources published on the Internet, all in concerted effort to achieve the sales, marketing and support programs of the company in a unified manner. Using the system and method of the present invention, symbolic links between the manufacturer products and published information resources on the Internet (e.g. WWW) can be impressed upon the minds of consumers as they seek access to such current information at home, in the office, in physical and electronic stores, as well as on the road.

Preferably, each manufacturer-operated client machine 13 on the LAN (or WAN) of FIG. 2C will be equipped with OS program software, Web-browser program software and RDBMS program software configured so that an UPN/URL manager (e.g. assigned to a particular department within the company) can easily link (i) URLs associated with consumer product related information on the WWW, to (ii) the UPN of a particular product registered with the IPI finding subsystem 2 of the present invention. As shown in FIG. 2C1, this can be achieved by providing a UPN/URL data linking function between a GUI-based window associated with a Web-document editing/browser application (e.g. Microsoft Explorer browser program) and a GUI-based window associated with a UPN/URL data link management program (e.g., MicroSoft Access or SQL RDBMS program), running either on each manufacturer-operated client machine, or on a manufacturer-operated server connected to the manufacturer's LAN or WAN, whereto Internet connectivity is enabled in a manner known in the art. As will be described below, this UPN/URL data linking function can be realized in a number of different ways.

One way of realizing this UPN/URL linking function is to create and install a plug-in module within the Web browser program with which consumer product information can be viewed on the WWW. The function of the plug-in module would be to write the URL of the currently viewed Web document (viewed by the browser program) into the currently selected URL field within the UPN/URL data link management program. Using this method, the UPN/URL manager would perform the following procedure: first open the UPN/URL data link management program; select the URL field to be filled (i.e. written into); open the browser program; browse onto a Web document containing consumer product information related to the selected UPN information field; and then select the UPN/URL link button on the browser's control panel enabled by virtue of the plug-in module of the present invention.

Another way of realizing this UPN/URL linking function is to use a multi-tasking/multi-threading operation system (OS), such as UNIX or some version thereof, into which support has been designed to simultaneously run the Web browser program and the UPN/URL data link management program, as shown in FIG. 2C1. Using this method, the UPN/URL data linking program would include URL importing functionalities of the plug-in module designed above so that when a desired Web document is being browsed by the Web browser program, the URL of the currently displayed Web document will be automatically written into the currently selected URL information field in the UPN/URL data link management program upon selecting, for example, a "URL Import" button provided for on the GUI of the UPN/URL data link management program.

Another way of realizing this UPN/URL linking function is to provide the enterprise of each manufacturer with a consumer product information catalog subsystem (RDBMS) 450 (shown in FIG. 2C) for storing and managing media-rich consumer product information content relating to each and every UPN-indexed product that the manufacturer makes, sells and/or distributes to retailers along the retail supply and demand chain. As shown in FIG. 2C, such a consumer product information management database subsystem 450 can be realized as a standalone database application supported on one or more client machines operably connected to the LAN or WAN of the manufacturer's enterprise, and or as a network database information server connected to the LAN or WAN and being accessible to various consumer product information managers working within the manufacturer's enterprise, and using Web-enabled client machines (e.g. 13, 202) to carry out consumer product information content management operations across the enterprise, most likely under the supervision of one or more consumer product brand-managers, responsible for branding of such consumer products. The consumer product information management database subsystem 450 can be constructed using commercially-available catalog software such as, for example, Lexmedia Catalog Pro™ (Regular, Sales Force or Distributer Edition) catalog software, Lexmedia Catalog Pro Express™ catalog software, and/or Lexmedia Catalog Showcase™ catalog software, from Lexmedia Corporation, of Fairfield, Conn., (http://www/lexmedia.com/catalog-software.asp), suitably modified using database structures and data linking techniques o the present invention disclosed herein, and database programming techniques and electronic data interchange (EDI) or communication techniques well known in database construction and data communication arts. The consumer product information management database subsystem (RDBMS) 450 will permit storage of all major information file formats including multimedia files such as MPEG, AVI, MP3, JPEG, GIF, Web Pages (HTML), CAD Drawings, PDF files, and the like.

Also, in accordance with the principles of the present invention, the consumer product information management subsystem 450 will also include one or more computer programs (e.g. scripts) for (i) analyzing the information fields of the RDBMS 450, (ii) automatically generate a set of UPN/URL/Trademark/Product-Descriptor data links for each UPN-indexed product with the RDBMS, (iii) locally store each such set of UPN/URL/Trademark/Product-Descriptor data links within the RDBMS 450, and (iv) ultimately electronic data transport each such set of data links to the UPN/URL Database Management Subsystem 9, shown in FIG. 2A, during periodic database updating operations, described in greater detail hereinafter.

Notably, the structure of the consumer product information management database 450 of the present invention can be similar to the database structure shown in FIGS. 4A1 through 4D, with the exception that the actual (multi-media) files of the consumer product information related to each UPN of the manufacturer will be stored within the RDBMS 450, rather than just the URLs of such information files stored on the Internet, as described in the other illustrative embodiments of the present invention disclosed herein in greater technical detail.

One advantage of using the consumer product information management subsystem (RDBMS) 450 described above is that the brandmanagers are provided with useful tools for managing various types of consumer product information published by the manufacturer, its agents (e.g. advertising agents) or other third parties publishing consumer product related information on the Internet. Another advantage is that, by using such consumer product information tools within the manufacturer's enterprise, the manufacturer (i.e. brandmanager) is given the choice of either storing the URLs of consumer product related information, and also the actual information file content thereof if such multi-media information content is within the control of the manufacturer's operations, or copyable into the RDBMS 450 under its supervision control.

In view of the present disclosure described above, many modifications to the consumer product information management (and data-link generation) subsystem 450 of the present invention will occur to those with ordinary skill in the art.

While the three methods have been described above for realizing the UPN/URL data linking functionalities provided for on manufacturer-operated clients (and servers) of the present invention, it is understood that there will be alternative ways of realizing such functionalities within the scope and spirit of the present invention.

Manufacturer Website Search Mode of Operation

Figure 5B:
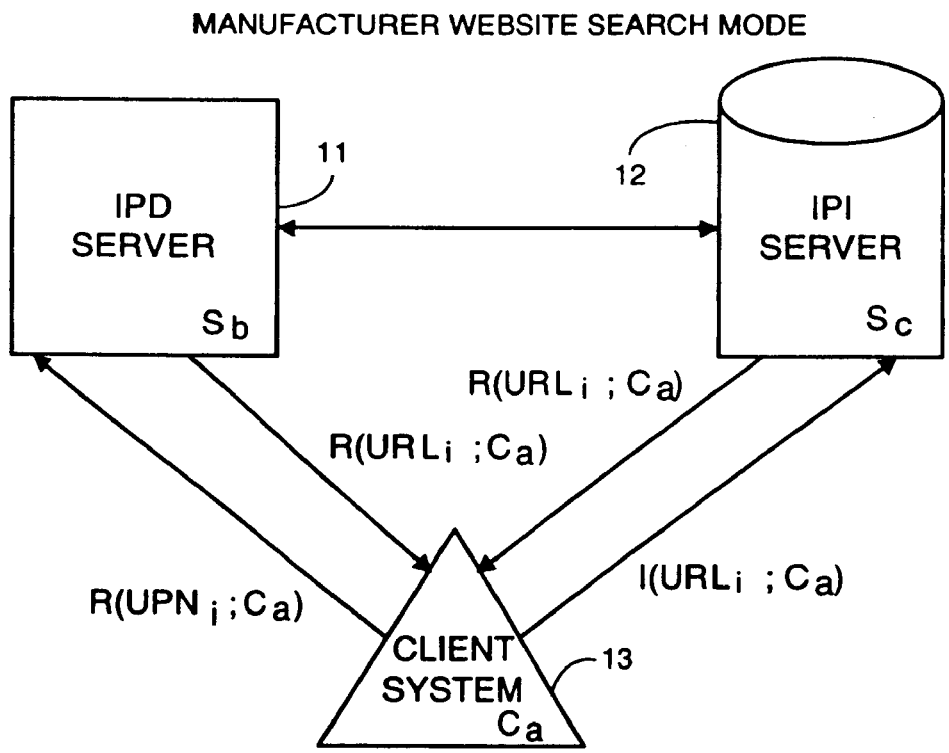
FIG. 5B is a schematic diagram illustrating the high level structure of a communication protocol that can be used among the client subsystem $C_a$, the IPD Server $S_b$, and the IPI Server $S_c$ of the IPI Finding and Serving Subsystem hereof when the subsystem is in its Manufacturer Website Search Mode of operation, requesting as input a UPN (e.g. UPC or EAN) associated with a manufacturer's product, and providing as output the URL of the home page of the manufacturer's Web-site and automatically displaying the same.
Figure 6B:
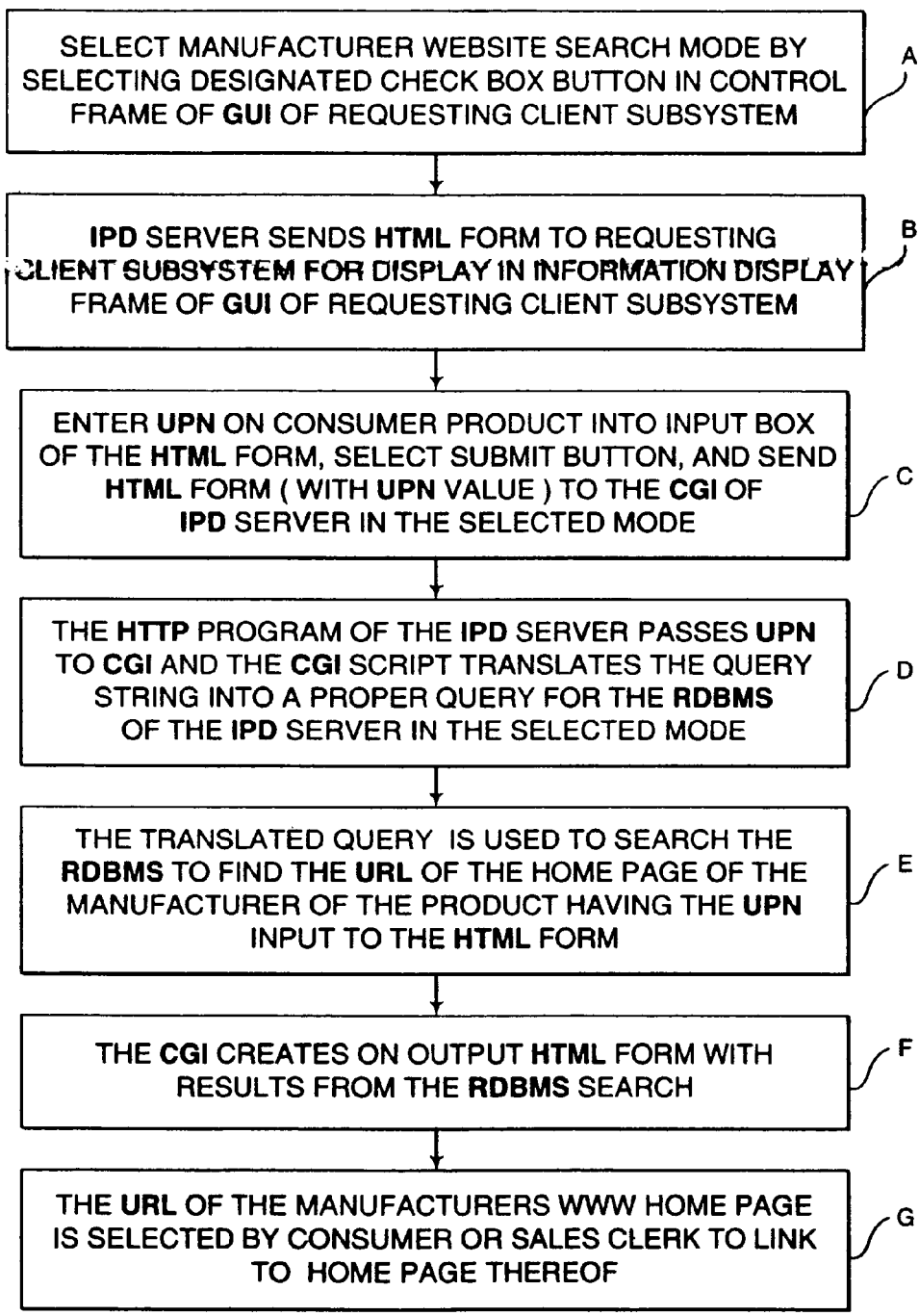
FIG. 6B provides a high level flow chart illustrating the steps involved in carrying out the communication protocol shown in FIG. 5B when the IPI Finding and Serving Subsystem is in its Manufacturer Website Search Mode of operation.

Referring to FIG. 5B, the high level structure is shown for a communication protocol that can be used among a client subsystem Ca, an IPD Server Sb, and an IPI Server Sc of the IPI finding and serving subsystem hereof when it is induced into the Manufacturer Website Search Mode of operation from the point of view of the depicted client subsystem. FIG. 6B provides a high level flow chart illustrating the steps involved in carrying out this communication protocol when the IPI Finding and Serving Subsystem is in its Manufacturer Website Search Mode of operation.

As indicated at Block A in FIG. 6B, when selected from the user-interface of a bar-code driven IPI Website, the second Check Box type button 21B automatically activates the Manufacturer Website Search Mode of the IPI Finding and Serving Subsystem by sending an HTTP request to the IPD Server(s) 11" based on a URL hot-linked to the selected Check Box.

As indicated at Block B in FIG. 6B, this causes a particular type of HTML-encoded document (i.e. called an "HTML form" or "Web form document") residing on the IPD Server(s) 11" to be sent to the Web browser of the requesting client subsystem 13 and displayed on the information display frame 20C thereof (requesting this mode of service). As in the Manufacturer Website Search Mode described above, the HTML form sent in the Manufacturer Website Search Mode may also use any HTML format commands, such as headers, paragraphs, and lists, but must include three unique items, namely: the METHOD by which the user input is to be sent; the ACTION, which specifies a URL to which the user input is to be sent, presumably, the IPD Server 11" that will act upon the request appropriately; and a SUBMIT button, to send the completed form over the Internet via HTTP. In the illustrative embodiment, user input (i.e. a UPC or EAN number associated with a particular consumer product) is obtained by an Input Box, which allows the user (i.e. retail sales clerk or consumer) to type in or scan in a UPC or EAN number assigned to a consumer product on which product related information is sought.

As indicated at Block C in FIG. 6B, the consumer or retail clerk scans the bar coded consumer product, or enters the UPC or EAN number thereon into the Input Box of the HTML form, and selects the SUBMIT button thereon. In response thereto, the Web browser on the client subsystem 13 sends a GET request to the IPD server 11B" shown in FIG. 2B2. When selecting the SUBMIT button on the HTML form, the Web browser executes the METHOD associated with the HTML form and sends the stored UPC (or EAN) value to the URL specified by ACTION associated with the HTML form (i.e. the Web browser performs the action specified in the ACTION). The ACTION of the HTML form specifies the URL of the CGI script within the http server 11" that will process the request from the HTML form. This amounts to the Web browser constructing a GET request for that URL, with the arguments (the query string) being attached to the end of the URL. The arguments of the HTML form are specified by the INPUT items of the HTML form (i.e. the UPC or EAN number on the consumer product on which information is sought).

In general, the HTTP and HTML protocols provide three ways to pass the input (e.g. UPC or EAN number) from the users to CGI scripts on the IPD Server 11 (i.e. HTTP Server). All three CGI scripts accomplish the same thing: they allow the Web browser to pass information to the IPD Server 11".

Figure 6C:
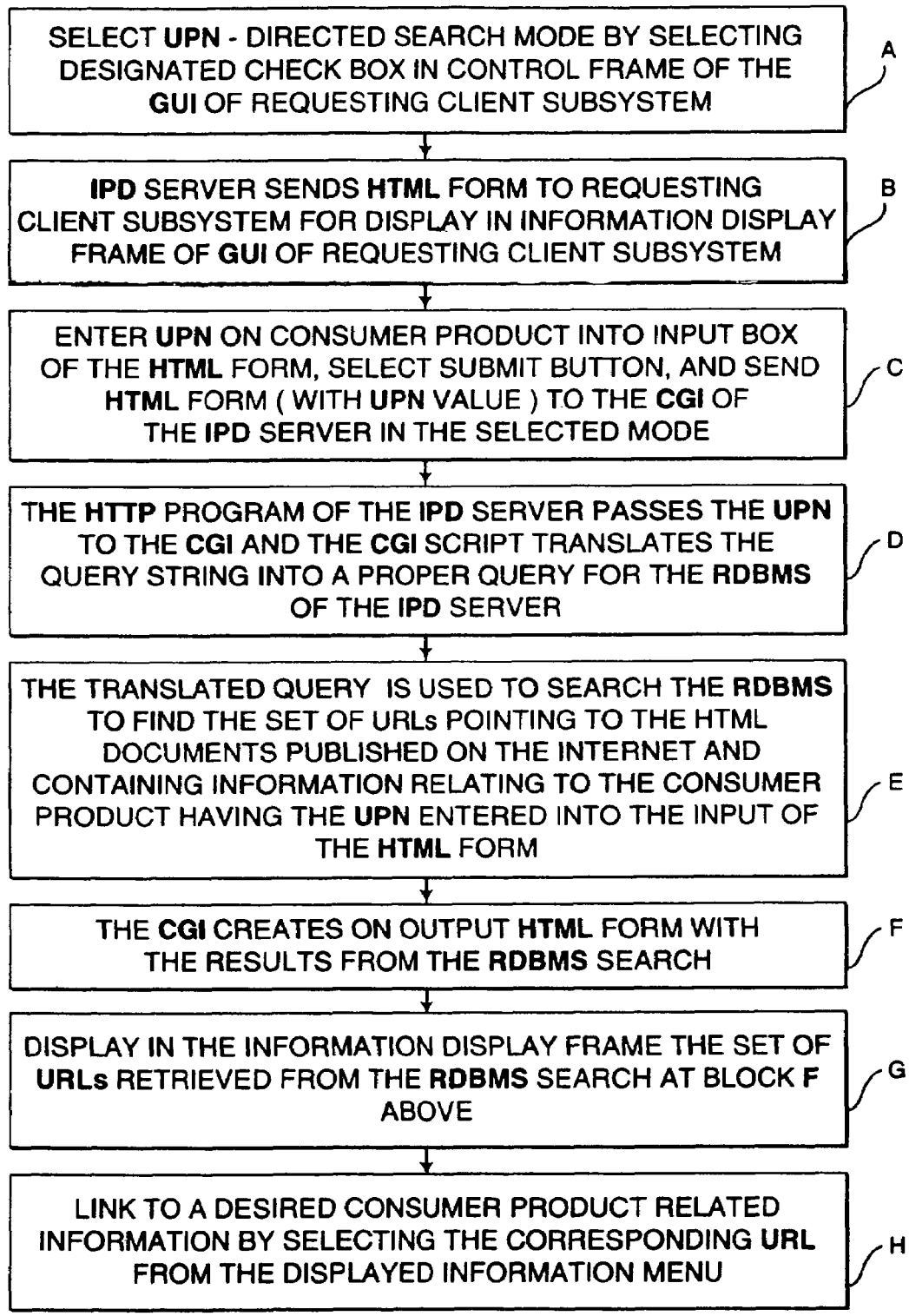
FIG. 6C provides a high level flow chart illustrating the steps involved in carrying out the communication protocol shown in FIG. 5D when the IPI Finding and Serving Subsystem is in its UPN-Directed Information Access Mode of operation.

As indicated at Block D in FIG. 6C, the HTTP (http) program on IPD server 11" passing the arguments (the UPC or EAN numbers in the query string) to the CGI script thereon and the CGI script translates the query string into a proper query for use in searching the RDBMS 9 shown in FIG. 2B2.

As indicated at Block E in FIG. 6C, the translated query is used to search the RDBMS 9 in order to find the set of URLs pointing to HTML documents (i.e. Web Pages) published on the Internet and containing information relating to the consumer product having the input UPC or EAN number. The result returned from the RDBMS 9 is an ASCII record specifying the set of URLs pointing to HTML documents published on the Internet and containing information relating to the consumer product having the input UPC or EAN number entered into the HTML form. In order for the Web browser of the requesting client subsystem to display the results of the database search using the UPC or EAN input, the ASCII record must be converted into a HTML document (i.e. output HTML form). As indicated at Block F in FIG. 6B, the IPD Server 11" creates the elements of an output HTML form (Web output form), inserts the result from the RDBMS 11" into the output form, and sets the Content-type to be text/html. The CGI script may translate, filter, augment and reformat the result from the database search in any way so long as the result is an HTML document or some format that the Web browser of the client subsystem can display.

As indicated at Block G, the menu of URLs retrieved from the database search is displayed in the Web output form. At Block H, the consumer or retail sales clerk can link to a desired consumer product related information resource (HTML document) by selecting from the information menu, the URL anchored to the information resource in the displayed information menu.

UPN-Directed Information Access Mode of Operation

Figure 5C:
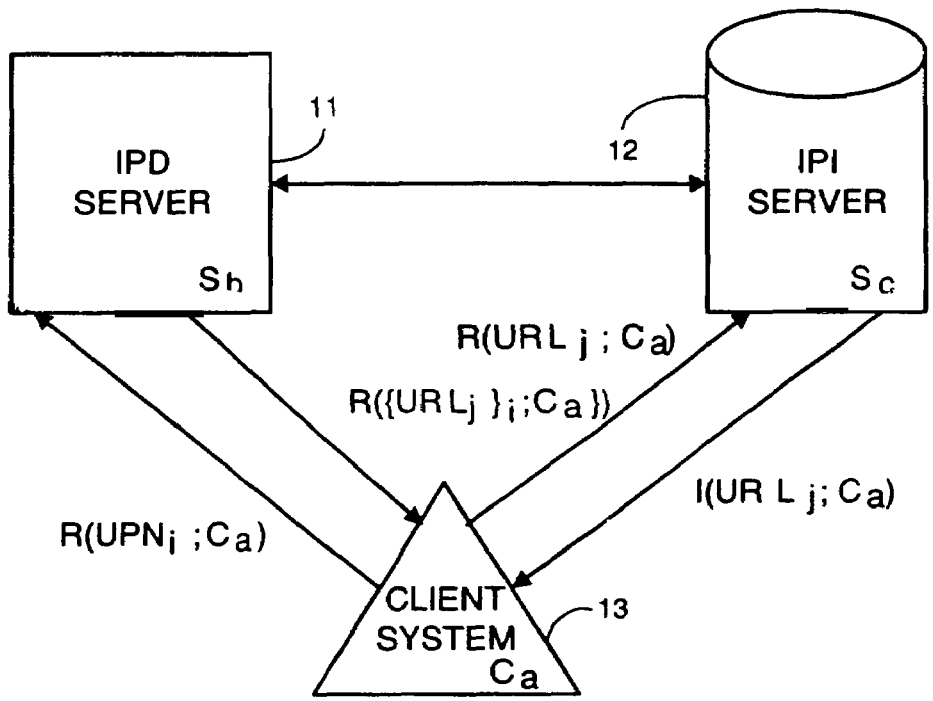
FIG. 5C is a schematic diagram illustrating the high level structure of a communication protocol that can be used among the client subsystem $C_a$, the IPD Server $S_b$, and the IPI Server $S_c$ of the IPI Finding And Serving Subsystem hereof when the subsystem is in its UPN-Directed Information Access Mode of operation, requesting as input a UPN associated with the consumer product, and providing as output the set of URL(s) registered with the consumer product identified by the UPN within the database of the system and pointing to HTML-encoded documents containing particular types of product-related information.

Referring to FIG. 5C, the high level structure is shown for a communication protocol that can be used among a client subsystem Ca, an IPD Server Sb, and an IPI Server Sc of the IPI finding and serving subsystem hereof when it is induced into the UPN-Directed Information Access Mode of operation from the point of view of the depicted client subsystem. FIG. 6C provides a high level flow chart illustrating the steps involved in carrying out this communication protocol when the IPI Finding and Serving Subsystem is in its UPN-Directed Information Access Mode of operation.

As indicated at Block A in FIG. 6C, when selected from the user-interface of an IPI Website, the third Check Box type button 21C automatically activates the UPN-Directed Information Access Mode of the IPI Finding and Serving Subsystem by sending an HTTP request to the IPD Server(s) 11 based on a URL hot-linked to the selected Check Box.

As indicated at Block B in FIG. 6C, this causes a particular type of HTML-encoded document (i.e. called an "HTML form" or "Web form document") residing on the IPD Server(s) 11" to be sent to the Web browser of the requesting client subsystem 13 and displayed on the information display frame 20C thereof (requesting this mode of service). As in the Manufacturer Website Search Mode described above, the HTML form sent in the UPN-Directed Information Access Mode may also use any HTML format commands, such as headers, paragraphs, and lists, but must include three unique items, namely: the METHOD by which the user input is to be sent; the ACTION, which specifies a URL to which the user input is to be sent, presumably, IPD Server 11' that will act upon the request appropriately; and a SUBMIT button, to send the completed form over the Internet via HTTP. In the illustrative embodiment, user input (i.e. a UPC or EAN number associated with a particular consumer product) is obtained by an Input Box, which allows the user (i.e. retail sales clerk or consumer) to type in or scan in a UPC or EAN number assigned to a consumer product on which product related information is sought.

As indicated at Block C in FIG. 6C, the consumer or retail clerk scans the bar coded consumer product, or enters the UPC or EAN number thereon into the Input Box of the HTML form, and selects the SUBMIT button thereon. In response thereto, the Web browser on the client subsystem 13 sends a GET request to the IPD Server 11™ shown in FIG. 2B2. When selecting the SUBMIT button on the HTML form, the Web browser executes the METHOD associated with the HTML form and sends the stored UPC (or EAN) value to the URL specified by ACTION associated with the HTML form (i.e. the Web browser performs the action specified in the ACTION). The ACTION of the HTML form specifies the URL of the IPD SERVER 11 that will process the request from the HTML form. This amounts to the Web browser constructing a GET request for that URL, with the arguments (the query string) being attached to the end of the URL. The arguments of the HTML form are specified by the INPUT items of the HTML form (i.e. the UPC or EAN number on the consumer product on which information is sought).

As indicated at Block D, the IPD server 11" passes the arguments (the UPC or EAN numbers in the query string) to a CGI script running therewithin which translates the Web query string into a proper query to the RDBMS 9 shown in FIG. 2B1.

As indicated at Block E, the translated query is used to search the RDBMS 11A and find the set of URLs (i) linked to the registered consumer product (by the manufacturer or agent thereof) assigned the UPC or EAN number entered into the Input Box of the HTML form, and (ii) pointing to HTML documents on the WWW containing particular types of consumer product related information. The result returned from the RDBMS 9 is an ASCII record specifying the set of URLs satisfying the above criteria. In order for the Web browser of the requesting client subsystem to display the results of the database search during this mode, the ASCII record must be converted into a HTML document (i.e. Web output form).

As indicated at Block F, a CGI script within IPD server 11" creates the elements of an HTML document (Web output form), inserts the result from the RDBMS 9 into the Web output form, and sets the Content-type of this HTML document to text/html. In the illustrative embodiment, when the Web output form is displayed by the requesting client subsystem, a set of URLs categorized by particular product information types is displayed on the information display frame 20C. Notably, this set of URLs points to particular types of consumer product related information registered within the RDBMS 9 of the system.

As indicated at Block G, the consumer or retail sales clerk can then access and display any HTML document (Web page) located at a particular URL within the information menu by selecting the same using a touch screen, mouse, or other input selection device.

Trademark-Directed Search Mode of Operation

Figure 5D:
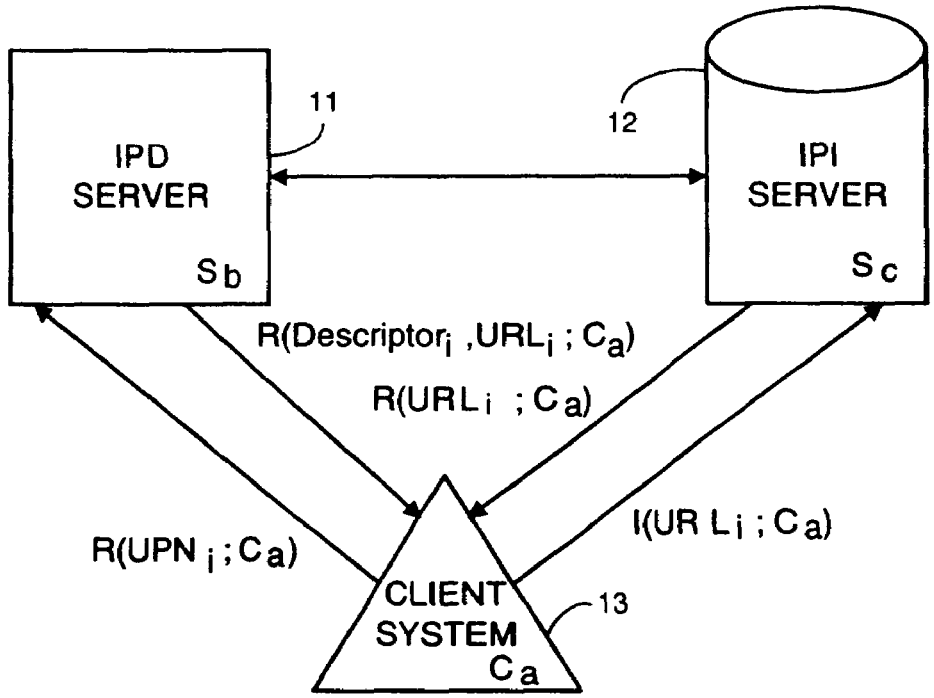
FIG. 5D is a schematic diagram illustrating the high level structure of a communication protocol that can be used among the client subsystem $C_a$, the IPD Server $S_b$, and the IPI Server $S_c$ of the IPI Finding And Serving Subsystem hereof when the subsystem is in its Trademark-Directed Search Mode of operation, requesting as input a trademark and/or company name, and providing as output the product descriptor(s) and a UPN (or set thereof) related to the trademark within the database of the system and pointing to HTML-encoded documents containing particular types of product-related information.

Referring to FIG. 5D, the high level structure is shown for a communication protocol that can be used among a client subsystem Ca, an IPD Server Sb, and an IPI Server Sc of the IPI finding and serving subsystem hereof when it is induced into the Trademark-Directed Search Mode of operation from the point of view of the depicted client subsystem. FIGS. 6D1 through 6D23, taken together, provides a high level flow chart illustrating the steps involved in carrying out this communication protocol when the IPI Finding and Serving Subsystem is in its Trademark-Directed Search Mode of operation.

As indicated at Block A in FIG. 6D1, when selected from the user-interface of an IPI Website, the fourth Check Box type button 21D automatically activates the Trademark-Directed Search Mode of the IPI Finding and Serving Subsystem by sending an HTTP request to the IPD Server(s) 11" based on a URL hot-linked to the selected Check Box.

As indicated at Block B in FIG. 6D1, this causes a particular type of HTML-encoded document (i.e. called an "HTML form" or "Web input form document") residing on the IPD Server(s) 11" to be sent to the Web browser of the requesting client subsystem 13 and displayed on the information display frame 21C thereof (requesting this mode of service). As in the UPN-Directed Information Access Mode described above, the HTML form sent in the Trademark-Directed Search Mode may also use any HTML format commands, such as headers, paragraphs, and lists, but must include three unique items, namely: the METHOD by which the user input is to be sent; the ACTION, which specifies a URL to which the user input is to be sent, (e.g. a CGI script running within http server 11" that will act upon the request appropriately); and a SUBMIT button, to send the completed form over the Internet via HTTP. In the illustrative embodiment, user input (i.e. the trademark or tradename used with a particular consumer product on which information is sought) is obtained by an Input Box, which allows the user (i.e. retail sales clerk or consumer) to type in the trademark or tradename believed or otherwise known to be used in connection with a particular consumer product on which information is sought.

As indicated at Block C in FIG. 6D1, the consumer or retail clerk enters the trademark or tradename into the Input Box of the HTML form, and selects the SUBMIT button thereon. In response thereto, the Web browser on the client subsystem 13 sends a GET request to the IPD server 11" shown in FIG. 2B2. When selecting the SUBMIT button on the HTML form, the Web browser executes the METHOD associated with the HTML form and sends the stored trademark value to the URL specified by ACTION associated with the HTML form (i.e. the Web browser performs the action specified in the ACTION). The ACTION of the HTML form specifies the URL of the CGI script running within the IPD server 11" that will process the request from the HTML form. This amounts to the Web browser constructing a GET request for that URL, with the arguments (the query string) being attached to the end of the URL. The arguments of the HTML form are specified by the INPUT items of the HTML form (i.e. the trademark or tradename used in connection with the consumer product on which information is sought).

As indicated at Block D in FIG. 6D1, the IPD server 11" passes the arguments (the trademark or tradename in the query string) to a CGI script running therewithin and the CGI script translates the Web query string into a proper query to the RDBMS 9, as shown in FIG. 2B2.

As indicated at Block E in FIG. 6D1, the translated query is used to search the RDBMS 9 in order to find all registered consumer products having product descriptions (PD) registered within the RDBMS 9 that are related to the trademark or tradename entered into the Input Box of the HTML form. The result returned from the RDBMS 9 is an ASCII record specifying each triplet data set (Product Description, UPN and Manufacturer) which satisfies the above trademark search criteria (to a particular degree) entered into the Input Box of the HTML form. In order for the Web browser of the requesting client subsystem to display the results of the database search during this mode, the ASCII record must be converted into another HTML form for use in refining the consumer product information display.

At Block F in FIG. 6D2, a CGI script within IPD server 11" creates the elements of another HTML document (Web auxiliary input form), inserts the preliminary search result from the RDBMS 9 into the Web auxiliary input form, and sets the Content-type of this HTML document to text/html. In the illustrative embodiment, the Web auxiliary-input form has an ACTION which specifies the URL of a CGI script within the IPD server 11" that will act upon the request appropriately as if the system were in the UPN-Directed Information Access Mode. The Web auxiliary input form includes an Input Box listing all triplet data sets (i.e. Product Description, Manufacturers and UPN number) satisfying the input trademark search criteria entered in the primary Web input document, described hereinabove. The qualifying triplets listed in the Input Box are provided with a Radio-Button to allow the consumer or retail sales clerk to select one of the triplets from the list thereof for use in a subsequent refined search of the RDBMS 9. The Web auxiliary-input form also has a SUBMIT button for sending the HTML form back to the IPD server 11" for processing.

As indicated at Block G in FIG. 6D2, when the consumer or retails sales clerk makes a selection with the Radio-Button and then selects the SUBMIT button, the Web browser on the client subsystem 13 sends a request to the HTTP program on the IPD server 11" to get the completed HTML form.

As indicated at Block H in FIG. 6D2, the HTTP (httpd) program on IPD server 11" passes the arguments (the trademark or tradename in the query string) to a CGI script running therewithin and the CGI script translates the Web query string into a proper query for use in searching RDBMS 9, as shown in FIG. 2B2.

At Block I in FIG. 6D2, the query is used to search the RDBMS 9 in order to find the set of URLs (i) related to the registered consumer product (by the manufacturer or agent thereof) assigned the UPN, (Product Description and Manufacturer) entered into the Input Box of the HTML (auxiliary) form, and (ii) pointing to HTML (or FTP) documents on the WWW containing particular types of consumer product related information. The result returned from the RDBMS 9 is an ASCII record specifying the set of URLs satisfying the above criteria. In order for the Web browser of the requesting client subsystem to display the results of the database search during this mode, the ASCII record must be converted into an HTML document (i.e. Web output form).

At Block J in FIG. 6D2, the IPD Server 11" creates the elements of an HTML document (Web output form), inserts the result from the RDBMS 9 into the Web output form, sets the Content-type of this HTML document to text/html, and sends the HTML form to the requesting client subsystem.

At Block K in FIG. 6D3, the set of URLs categorized by particular product information types is displayed within the output HTML form on the information display frame 20C. Notably, this set of URLs points to particular types of consumer product related information registered within the RDBMS 9 of the system by the manufacturer of the product or its agent(s) thereof using the UPN/URL management tools accessible during the Manufacturer/Product Registration Mode hereof.

As indicated at Block L in FIG. 6D3, the consumer or retail sales clerk can access and display any HTML document (Web page) located at a particular URL within the displayed information menu by selecting the same using a touch screen, mouse, or other input selection device available at the requesting client subsystem 13.

Product-Description Directed Mode of Operation

Figure 5E:
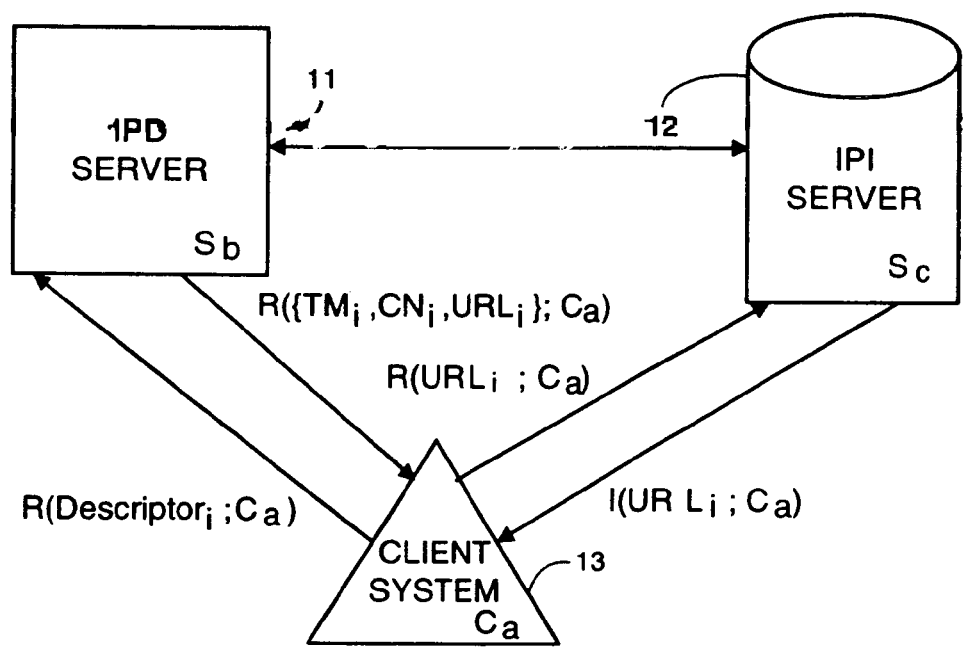
FIG. 5E is a schematic diagram illustrating the high level structure of a communication protocol that can be used among the client subsystem $C_a$, the IPD Server $S_b$, and the IPI Server $S_c$ of the IPI Finding And Serving Subsystem hereof when the subsystem is in its Product-Description Directed Search Mode of operation, requesting as input a product descriptor related to the consumer product on which information is sought and providing as output the trademark, company name and URL(s) related to the product descriptor within the database of the system and pointing to HTML-encoded documents containing particular types of product-related information.

Referring to FIG. 5E, the high level structure is shown for a communication protocol that can be used among a client subsystem Ca, an IPD Server Sb, and an IPI Server Sc of the IPI Finding and Serving Subsystem hereof when it is induced into the Product-Description Directed Mode of operation from the point of view of the depicted client subsystem. FIGS. 6E1 through 6E3 provides a high level flow chart illustrating the steps involved in carrying out this communication protocol when the IPI Finding and Serving Subsystem is in its Product-Description Directed Mode of operation.

As indicated at Block A in FIG. 6E1, when selected from the user-interface of an IPI Website, the fifth Check Box type button 21E automatically activates the Product-Description Directed Search Mode of the IPI Finding and Serving Subsystem by sending an HTTP request to the IPD Server(s) 11" based on a URL hot-linked to the selected Check Box.

As indicated at Block B in FIG. 6E1, this causes a particular type of HTML-encoded document (i.e. called an "HTML form" or "Web input form document") residing on the IPD Server(s) 11" to be sent to the Web browser of the requesting client subsystem 13 and displayed on the information display frame 21C thereof (requesting this mode of service). As in the Trademark-Directed Search Mode described above, the HTML form sent in the Product-Description Directed Search Mode may also use any HTML format commands, such as headers, paragraphs, and lists, but must include three unique items, namely: the METHOD by which the user input is to be sent; the ACTION, which specifies a URL to which the user input is to be sent, (e.g. a CGI script running within the IPD server 11" that will act upon the request appropriately); and a SUBMIT button, to send the completed form over the Internet via HTTP. In the illustrative embodiment, user input (i.e. the description or descriptor for a particular consumer product on which information is sought) is obtained by an Input Box, which allows the user (i.e. retail sales clerk or consumer) to type in the product description for a particular consumer product on which information is sought.

As indicated at Block C in FIG. 6E1, the consumer or retail clerk enters the product description into the Input Box of the HTML form, and selects the SUBMIT button thereon. In response thereto, the Web browser on the client subsystem 13 sends a GET request to the IPD server 11". When selecting the SUBMIT button on the HTML form, the Web browser executes the METHOD associated with the HTML form and sends the stored product description to the URL specified by ACTION associated with the HTML form (i.e. the Web browser performs the action specified in the ACTION). The ACTION of the HTML form specifies the URL of a CGI script within the IPD server 11" that will process the request from the HTML form. This amounts to the Web browser constructing a GET request for that URL, with the arguments (the query string) being attached to the end of the URL. The arguments of the HTML form are specified by the INPUT items of the HTML form (i.e. the product description for the consumer product on which information is sought).

As indicated at Block D in FIG. 6E1, the http program on the IPD server 11" passes the arguments (the product description in the query string) to a CGI script therewithin and the CGI script translates the Web query string into a proper query to the RDBMS 9 shown in FIG. 2B2'.

As indicated at Block E in FIG. 6E1, the translated query is used to search the RDBMS 9 in order to find all registered consumer products having trademarks or tradenames within the RDBMS 9 that are linked to the product description entered into the Input Box of the HTML form. The result returned from the RDBMS 9 is an ASCII record specifying each triplet data set (Trademark, UPN and Manufacturer) which satisfies the above product-description search criteria (to a particular degree) entered into the Input Box of the HTML form. In order for the Web browser of the requesting client subsystem to display the results of the database search during this mode, the ASCII record must be converted into another HTML form for use in refining the consumer product information display.

At Block F in FIG. 6E2, the IPD server 11" creates the elements of another HTML document (Web auxiliary input form), inserts the preliminary search result from the RDBMS 9 into the Web auxiliary input form, and sets the Content-type of this HTML document to text/html. In the illustrative embodiment, the Web auxiliary-input form has an ACTION which specifies the URL of a CGI script within IPD server 11" that will act upon the request appropriately as if the system were in the UPN-Directed Information Access Mode. The Web auxiliary input form includes an Input Box listing all triplet data sets (i.e. Trademark, Manufacturer, and UPN number) satisfying the input product-description search criteria entered in the primary Web input document, described hereinabove. The qualifying triplets listed in the Input Box are provided with a Radio-Button to allow the consumer or retail sales clerk to select one of the triplets from the list thereof for use in a subsequent refined search of the RDBMS 9. The Web auxiliary-input form also has a SUBMIT button for sending the HTML form back to the IPD server 11" for processing.

As indicated at Block G in FIG. 6E2, when the consumer or retails sales clerk makes a selection with the Radio-Button and then selects the SUBMIT button, the Web browser on the client subsystem 13 sends a request to the IPD server 11".

As indicated at Block H in FIG. 6E2, the http program on the IPD server 11" passes the arguments (the product description in the query string) to a CGI script therewithin and the CGI script translates the Web query string into a proper query for use in searching RDBMS 9 shown in FIG. 2B2.

At Block I in FIG. 6E2, the query is used to search the RDBMS 9 in order to find the set of URLs (i) linked to the registered consumer product (by the manufacturer or agent thereof) assigned the UPN, (Trademark and Manufacturer) entered into the Input Box of the HTML (auxiliary) form, and (ii) pointing to HTML (or FTP) documents on the WWW containing particular types of consumer product related information. The result returned from the RDBMS 9 is an ASCII record specifying the set of URLs satisfying the above search criteria. In order for the Web browser of the requesting client subsystem to display the results of the database search during this mode, the ASCII record must be converted into a HTML document (i.e. output HTML form).

At Block J in FIG. 6E2, the IPD server 11" creates the elements of an output HTML form, inserts the result from the RDBMS 9 thereinto, and sets the Content-type of this HTML document to text/html and sends a request to the IPD server 11" to get the HTML form.

At Block K in FIG. 6E3, the set of URLs categorized by particular product information types is displayed within the output HTML form on the information display frame 20C. Notably, this set of URLs points to particular types of consumer product related information registered within the RDBMS 9 of the system by the manufacturer of the product or its agent(s) thereof using the UPN/URL management tools accessible during the Manufacturer/Product Registration Mode hereof.

As indicated at Block L in FIG. 6E3, the consumer or retail sales clerk can access and display any HTML document (Web page) located at a particular URL within the displayed information menu by selecting the same using a touch screen, mouse, or other input selection device available at the requesting client subsystem 13.

The protocols described above can be realized using any suitable programming language including, for example, an object-oriented programming language such as the Java™ programming language.

CPIR-Enabling Applet Download/Distribution Mode of System Operation

As illustrated in FIGS. 4F1, 4F2, 4H1, 4H2, 4J1, 4J2, 4L1 and 4L2, a centralized Library of CPIR-enabling Applets/Servlets is created, management and stored within the UPN/

URL Database Management Subsystem 9 hereof in accordance with the above-described methods. In accordance with the principles of the present invention, these CPIR-enabling Applets/Servlets must be widely distributed to retailers, manufacturers, advertisers and others about the globe and thereafter widely embedded within HTML-encoded documents, as taught in detail hereinabove, to practice this aspect of the present invention in a commercially successful manner. The function of the CPIR-enabling Applet Download/Distribution mode of operation of the system is to enable the worldwide distribution of this centralized Library of CPIR-enabling Applets/Servlets, in accordance with the licensing program associated with each such CPIR-enabling Applet.

As shown in FIG. 3C, the CPIR-enabling Applet Download/Distribution mode is automatically initiated by the user depressing mode control button 21F displayed on the control panel 20B of the UPC Request (Central or Retail) GUI of the illustrative embodiment, but certainly elsewhere in practice. The user can be anyone with the requisite authority to use the Applets in accordance with the terms of the licensing program to be enforced in connection therewith. Understandably, the terms of such licensing programs will be based on prevailing business conditions and will vary from embodiment to embodiment of the present invention.

As best illustrated in FIG. 4F2, upon entering the UPC-Encoded-Applet-Download/Distribution mode, the IPD server 11 of the illustrative embodiment will serve a custom Java GUI as shown in FIGS. 4M1 and 4M2, for carrying out Applet tag downloading and licensing procedures. The GUI will provide (1) links to the centralized Library of CPIR-Enabling Applets/Servlets maintained within the UPN/URL Database Management Subsystem 9, as well as (2) launchable GUIs for downloading selected UPN-identifiable CPIR-enabling Applets to specified Internet-enabled client computer subsystems 13 or Internet information/application servers operated by the user interfacing with this mode of system operation. Notably, electronic data interchange/exchange processes (e.g. based on EDI, XML/ICE or other protocols) can be used to carry out the downloading of CPIR-enabling Applets and other files between client computers and the IPD server 11 during this and other modes of operation.

For licensing purposes, it may be desirable or necessary to have the user supply "end-use" types of information to the IPD server 11 during this mode of operation in order to identify on which information servers or domains (e.g. www.ipfcorp.com) particular CPIR-enabling Applets are to be used (i.e. embedded within HTML-documents and launched therefrom by the end-user which will typically be the consumer). In some instances, licenses for CPIR-enabling Applets will carry a fee to be paid by the downloader; in other instances, there will be no fee requirements. Such details will depend on prevailing business conditions along the retail supply and demand chain.

Once a user has downloaded CPIR-enabling Applets onto a designated (target) client machine or server, the user will have built a local Library (or Catalog) of CPIR-enabling Applets for use during Applet embedding operations which will typically be carried out alongside of other HTML-code authoring and management operations involving, for example, the design, construction, management and maintenance of Webpages, EC-stores, on-line (retail and wholesale) product catalogs, on-line auction site pages, Web advertisements, and the like.

As shown in FIG. 4F2, during Step D1 of the Applet embedding process, CPIR-enabling requests are accessed from the local Library of CPIR-enabling Applets typically over an IP-type local area network (LAN) or wide area network (WAN). Then during Step D2, the accessed CPIR-enabling Applet is inserted within the HTML code of the target document. This step of the process will typically involve use of HTML-editing tools of one sort or another, as discussed herein above.

Once the CPIR-enabling Applet has been embedded within the target HTML-encoded documents, the HTML-encoded can then be published in its intended publishing environment so that consumers can instantly initiate UPN-directed searches within the centralized UPN/URL Database Management Subsystem 9 hereof by clicking on the CPIR-enabling Applet, and thereafter display the search results within an independent Java GUI which performs the function of a "cyber-kiosk" provided at the consumer's point of presence on the WWW.

Accessing the Modes of Operation of the IPI Finding System Hereof by Launching CPIR-Enabling Applets Embedded within HTML-Encoded Documents Associated with Electronic-Commerce Enabled Stores and Product Catalogues, Internet Advertisements, On-Line WWW Auction Sites, and the Like As described in detail hereinabove, a consumer can automatically produce a CPID-enabling Java GUI (i.e. "cyber-kiosk") by clicking upon a CPIR-enabling Java Applet that has been embedded within the HTML code of any Web-document. As illustrated in FIGS. 4N2, 4O2, 4P2, 4Q2, 4R2 and 4S2, each consumer product information display (CPID) enabling GUI of the illustrative embodiment is a new and independent Web browser having a Netscape-type framework, in which the six mode selection buttons 21A through 21G of the illustrative embodiment are displayed. When such CPID-enabling GUIs are displayed at the consumer's point of presence on the WWW, the consumer is free to select any one of the mode selection buttons and cause the system to enter the selected mode and precisely deliver the information service associated therewith without disturbing his or her present Cyberspace experience. The description of these modes will be described in detail hereinbelow with reference to FIGS. 2-1, 2-2, 2A and 2C.

Registration Solicitation Mode of the IPI Finding and Serving Subsystem

In the illustrative embodiments of the present invention, the data-synchronized IPD Servers of the system hereof 11 are also provided with an "Automated Registration Solicitation Mode" programmed by the webmaster (or administrator) of the IPI Web-site(s). In this mode, each IPD Server 11 analyzes the data collected within its Non-IPI Registrant Database. The data analysis procedure seeks to determine: (1) which "unregistered" products in the Non-IPI Registrant Database were the subject of an information request at the IPD Server; (2) how many hits (requests) were made for the product within a predetermined length of time (e.g. one week) by Internet users; and (3) whether the number of requests exceeds a particular "request threshold" (e.g. 100 requests in week period). Then for each unregistered product which has exceeded the request threshold, the IPD Server automatically sends an E-mail message to the associated company. Preferably, the E-mail message is designed to (i) inform the company of recent information requests for their products, and (ii) solicit the registration of such products with the IPD Server. Once registered with the system, such products can be easy found on the Internet by anyone wishing to use the product information finding techniques of the present invention.

Operation of the IPI Finding and Serving Subsystem and Method Hereof

When the Check Box button 21C is selected from the control frame 20B, the IPI Finding and Serving Subsystem enters its "UPN-Directed Information Access Mode" illustrated in FIG. 6C. Preferably, the user is provided with a choice of language (e.g. English, German, French, Japanese, Korean, Russian, Chinese, etc.) by way of an appropriate menu-selection screen. After the desired language selection is made, the home page is displayed upon the client subsystem's display screen. A typical display screen produced from the IPD Server might read as follows:

"Welcome to UPC-REQUEST™, the only Universal Product-Information Finding and Serving System on the Internet.

Have you purchased a particular product, are you considering the purchase of a particular product, on which you would like current, up-to-date information from the manufacturer or advertiser?

Look no further than the UPC-REQUEST™ Universal Product-Information Finding and Serving System."

When the subsystem is in its "UPN-Directed Information Access Mode", a Web-based information resource pertaining to any commercial product registered with the system can be displayed and selected by the user in order to automatically access the same from the Internet. Such information resources can include advertisements, specifications, operation descriptions, product simulations, purchase information, maintenance information, warranty and servicing information, product updates, distributor/reseller information, incentives (e.g. discounts, rebates, coupons, etc.), electronic data transaction screens, etc. In this mode, desired product information is obtained by simply entering the registered product's UPN (e.g. its UPC's 12 digit numerical string) into the Inout Box of the HTML form displayed in the information display frame 20C. Such data entry can be carried out manually using a keyboard data entry techniques, or automatically using a bar code symbol reader connected to the client subsystem as discussed in detail above. When using the seeded IPI Database described hereinabove, only the first six digits of the UPC number need be entered into the dialogue box. An exemplary display screen produced from the IPD Server might be as follows:

"Simply enter the 12 digit UPC the particular product; click REQUEST, and then wait for the display of the list of Web locators (URLs) at which the desired product information can be found on the Internet?"

In response to such data entry operations, a list or menu of URLs organized according to information subfield classifications as set forth, for example, in FIG. 4A2, are displayed on client subsystem Ca making the request of the IPD Server 11. At this stage, another display screen associated with the HTML form produced from the IPD Server 11 would appear with an exemplary message as follows:

"Please select the URL from the displayed URL Menu using the information subfield product information category displayed above. This will connect you to the product information related to the selected URL. You can return to the URL display list at anytime."

Upon selecting a particular URL from the displayed URL menu, video and audio information content are automatically served from the IPI Server 12 hosting the selected URL and thereafter displayed on the client subsystem 13.

When the Check Box button 21D is selected, the IPI Finding and Searching Subsystem enters its Trademark-Directed Search Mode, illustrated in FIGS. 6D1 through 6D3. Preferably, the user is provided with a choice of language (e.g. English, German, French, Japanese, Chinese, etc.) by way of an appropriate menu-selection screen.

When the system is in its Trademark-Directed Search Mode, a predesignated information resource pertaining to any commercial product registered with the system can be automatically accessed from the Internet and displayed from the Internet browser of a client subsystem 13. Such information resources can include advertisements, specifications, operation descriptions, product simulations, product upgrade information, purchase information, maintenance information, warranty and servicing information, etc. In this mode, desired product information is obtained by simply entering the registered product's trademark(s) and/or associated company name into the Input Box of the HTML form displayed on the information display frame 20C of the client subsystem. An exemplary message associated with the HTML form produced from the IPD Server 11 might be as follows:

"Simply enter the trademark used in connection with the particular product and/or the company name of the product's manufacturer; click REQUEST, and then wait for the display of a list of Web locators (URLs) at which desired types of product information can be found on the Internet"

In response to such data entry operations, a list of URLs organized according to the information subfield classifications set forth in FIG. 4A2 are displayed on client subsystem placing the request. Upon selecting a particular URL from the displayed list thereof, video and audio information content are automatically served from the IPI Server hosting the selected URL and thereafter displayed on the client subsystem.

In an alternative embodiment of the present invention, the UPN-Directed Information Access Mode and the Trademark-Directed Search Mode can be integrated into a single server application so that there is no need or desire to manually select between mode activation buttons 21C and 21D, respectively. In such an embodiment, the interaction between the IPD Server and the requesting client subsystem can be designed to support the following Web server display screens and script underlying the same:

"Welcome to UPC-REQUEST™, the only Universal Product-Information Finding and Serving System on the Internet.

Have you purchased a particular product, or considering the purchase of a particular product, on which you would like current, up-to-date information from the manufacturer or advertiser?

"Look no further than the UPC-REQUEST™ Universal Product Information Finding and Serving System."

"Simply enter the 12 digit UPC number of the particular product, click REQUEST, and select from the displayed menu of Web locators (URLs) to find the desired product information on the WWW.

"If you do not know the UPC number associated with the product you are looking for, then simply enter the trademark used in connection with the particular product and/or the company name of the manufacturer, then click REQUEST, and wait for the display of the list of Web locators (URLs) at which the desired product information can be found.

"Please select the URL from the displayed URL list by clicking on it. This will connect you to the product information related to the selected URL. You can return to the URL display list at anytime."

Notably, such an integrated Web server application can be realized in a variety of ways. The exact words and graphics used to create an interactive script for an integrated Web server application will vary from embodiment to embodiment of the present invention.

In instances when an IPI Website in accordance with the present invention is being served to consumers in retail environments using a computer-based kiosk as shown in FIG. 3A2, the consumer as well as retail sales clerk is presented with the option of ascertaining the price of an product in the store. This is achieved by simply depressing the "Price Display" button 21F on Control Strip 20B, shown in FIG. 3C, to engage the system in its price lookup/display mode. In this mode of operation, the consumer then need only scan the UPC bar code symbol on the product using bar code scanner 26 in order for the price to be looked-up in the Product Price Database maintained in the Retailer's Price Server (RPS) 35, and displayed on the kiosk display screen. In general, the Product Price Database of the hosting retailer can be made accessible by the computer-based kiosk in several possible ways. As shown in FIGS. 2-1 and 2-2, one way is to place the retailer's RPS on Internet (by using an HTTP server) and connect the RPS to the IPD Server 11 of the system by way of a CGI well known in the art. The CGI can be made accessible only by authorized client subsystems (e.g. computer-based kiosks installed in the hosting retailer's store and possibly administrators of the information delivery system). An alternative technique of connecting the Product Price Database to each computer-based kiosk would involve providing the RPS with a direct interface to each computer-based kiosk in the hosting retailer's store(s). This alternative technique may require the use of computer networking technology well known in the art.

Method of Accessing and Displaying and Consumer Product Related Information within Retail Shopping Environments and Transporting the Same to Remote Locations for Subsequent Use and/or Review by Consumers at Home, Work, School or on the Road As explained hereinabove, the problem of providing consumers with copies of accessed consumer product information within retail shopping environments is addressed by enabling the consumer at retail-based bar code driven kiosks to: (1) display an e-mail envelope within the display frame 20C of the Web browser program thereof, by manually selecting control button 21G provided along the control frame 20B, shown, for example, in FIGS. 3A14A and 3A14B; (2) capturing, saving, and attaching any accessed/displayed consumer product document to the displayed e-mail envelope 116 by manual selection of the "capture, save and attach" button 110 (or voiced-directed selection thereof) within the displayed e-mail envelope of FIG. 3A14, or capturing and recording the URL of the CPI-related document being displayed by manual selection of the "capture and record" button 112 (or voice-directed selection thereof) within the displayed e-mail envelope 116 of FIG. 3A16B; (3) addressing the e-mail envelope 116 with the consumer/shopper's home, office or like e-mail address by either reading an e-mail address encoded within a bar code (or magnetic-stripe) structure or manually entering the same within the addressee field 115; and (4) sending the stuffed e-mail envelope by manual selection of the "send" button 114 within the displayed e-mail envelope.

At this stage, the first illustrative embodiment of the CPI transport method (i.e. service) of the present invention referred for hereinafter as the "SEND-IT-HOME™" e-mail service will now be described with reference to FIGS. 3413A through 3A14.

As indicated at Block A in FIG. 3A13A, the first step of the first illustrative embodiment of the CPI transport method involves launching a consumer product information (CPI) capture and transport application/service on an Internet-enabled bar code driven (BCD) CPI kiosk of the present invention, as shown in FIGS. 3A9 through 2A10D. As indicated in FIG. 3A14, this application launching process can be initiated by selecting application/service button 21G in the control strip of the kiosk browser display screen. When the application has been launched, a CPI-transporting "electronic-mail" envelope 116 will appear within the display frame of the browser's GUI, as shown in FIG. 3A14. As shown therein, the (Java-enabled) GUI for the CPI transporting email envelope is provided with:

(i) a first single-click button 110 for capturing and storing thereon, as an HTML-encoded document, any CPI related document that is being displayed on the display screen of the BCD CPI kiosk 13 within the retail shopping environment, shown in FIGS. 3A9 through 3A10D;

(ii) a second single-click button 114 for transporting copies of the envelope 116 to the e-mail address of the consumer/shopper or friend/agent thereof;

(iii) a consumer e-mail address field 115 for entering the e-mail address of the consumer/shopper or friend thereof, to which a copy of the e-mail envelope 116 can be automatically sent during envelope transport; and (iv) a retailer e-mail address field 117 containing a preset e-mail address of the retailer operating the kiosk, indicating the retail store location, and possibly the retail department from which the CPI-transporting envelope 116 was sent on the time and date of the electronic message transmission.

As indicated at Block B in FIG. 3A13A, the consumer enters into the consumer e-mail address field of the envelope 116, either his or her e-mail address or the e-mail address of a friend to which he or she would like to send consumer product related information. Notably, this operation can be achieved in a variety of different ways, namely: by manually typing the e-mail address using a pop-up keyboard or keypad provided for by the kiosk itself; using voice recognition command technology embodied within the kiosk; by reading a bar coded consumer identification card 150, as shown in FIG. 3A10B, having the consumer's e-mail address and possibly other information items (e.g. shopper/consumer identification number, credit card information, name, address and/or status within a particular loyalty/courtesy program encoded therewithin if desired; or, by reading a magnetic-stripe type consumer identification card 150 encoded with the same or similar information using a magnetic stripe reader 46 interfaced with the BCD CPI kiosk, as shown in FIG. 3A10B.

As indicated at Block C in FIG. 3A13B, the consumer/shopper uses the UPN, trademark, product descriptor and/or company name associated with the sought after product, to access consumer product related information resource of interest on the WWW, and display the same on the display screen of the BCD CPI kiosk within the retail shopping environment. When using the UPN-Directed Search Mode of operation of the system, a UPN/URL menu as shown in FIGS. 4P2, 4R2 and 452, will be displayed in the display frame of the browser screen. When using the Trademark Directed Search Mode, a list of URLs linked to the input trademark will be displayed in the display frame of browser screen.

As indicated at Block D in FIG. 3A13B, each instant the consumer/shopper has found a consumer product information resource of particular interest on the WWW, which he or she wants to send a copy thereof to a home or work e-mail address, the consumer/shopper selects the first single-click button 110 on the CPI-transporting envelope (indicated as "CAPTURE, SAVE & ATTACH" in FIG. 3A14). This causes the information resource being displayed on the display screen of the BCD CPI kiosk to be automatically captured and stored as an HTML-encoded document attached to the CPI-enabling envelope, as intended in FIG. 3A14.

As indicated at Block E in FIG. 3A13B, the consumer/shopper sequentially repeats Steps C and D for each consumer product information resource on the WWW to be captured, stored and attached to the opened CPI-transporting envelope 116 being displayed on the display screen of the kiosk. Typically, there will be a maximum number of documents to be attached to the CPI-enabling envelope using present e-mail protocols at 6 understood, however, that a larger number of documents may be transportable within a single e-mail envelope using future 3-mail protocols.

As indicated at Block F in FIG. 3A13C, upon capturing, storing and attaching a desired number of consumer product related information resources to the CPI-transporting envelope 116, the consumer/shopper then selects the second single-click button 114 on the CPI-transporting envelope (i.e. indicated as "SEND" in FIG. 3A14) so as to transport the CPI-transporting envelope 116 to the e-mail address entered within the consumer e-mail address field of the CPI-transporting envelope.

As indicated at Block G in FIG. 3A13C, an information record of each CPI-transporting envelope and the contents thereof is maintained at the retailer e-mail server 84 and a copy thereof is transported to the central e-mail server 88, shown in FIGS. 3A9 and 3A10. Thereafter, such information on the central e-mail server 88 can be analyzed to determine trends and patterns in consumer shopping behavior in different geographic locations and retail shopping departments and the like. The results of such analysis are stored in retailer and manufacturer RDBMSs 88A and 89B, respectively.

The second illustrative embodiment of the CPI transport method (i.e. service) of the present invention, referred to hereinafter as the SEND-IT-HOME™ e-mail service, will now be described with reference to FIGS. 3A15A through 3A1G.

As indicated at Block A in FIG. 3A15A, the first step of the second illustrative embodiment of the CPI transport method involves launching a consumer product information (CPI) capture and transport application/service on an Internet-enabled bar code driven (BCD) CPI kiosk of the present invention, as shown in FIGS. 3A9 through 3A10D. As indicated in FIG. 3A16, this application launching process can be initiated by selecting application/service button 21G in the control strip of the kiosk browser display screen. When the application has been launched, a CPI-transporting "electronic-mail" envelope will appear within the display frame of the browser's GUI, as shown in FIG. 3A16. As shown therein, the (Java-enabled) GUI for the CPI transporting email envelope is provided with:

(i) a first single-click button 110 for capturing and storing therein, as an HTML-encoded document, any CPI related document that is being displayed on the display screen of the BCD CPI kiosk 13 within the retail shopping environment, as shown in FIGS. 3A9 through 3A10D;

(ii) a second single-click button 114 for transporting copies of the envelope 116 to the e-mail address of the consumer/shopper or friend/agent thereof;

(iii) a consumer e-mail address field 115 for entering the e-mail address of the consumer/shopper, to which a copy of the e-mail envelope 116 can be automatically sent during envelope transport;

(iv) a retailer e-mail address field containing a preset e-mail address of the retailer operating the kiosk, indicating retailer store location, and possibly retailer department from which the CPI-transporting envelope 116 was sent on the time and date of the electronic message transmission; and (v) a message field 119 to record captured URLs, as well as other notes of the consumer.

As indicated at Block B in FIG. 3A15A, the consumer enters his or her e-mail address into the consumer e-mail address field of the envelope 116, his or her e-mail address or the e-mail address of a friend to which he or she would like to send consumer product related information. Notably, this operation can be achieved in a variety of different ways, namely: by manually typing the e-mail address using a pop-up keyboard or keypad provided for by the kiosk itself; using voice recognition command technology; by reading a bar coded consumer identification card 150, as shown in FIG. 3A10B, having the consumer's e-mail address and possibly other information items (e.g. shopper/consumer identification number, credit card information, name, address, and/or status within a particular retailer loyalty/country program) encoded therewithin if desired; or by reading a magnetic-stripe type consumer identification card 150' encoded with the same or similar information using a magnetic stripe reader 46 interfaced with the BCD CPI kiosk, as shown in FIG. 3A10B.

As indicated at Block C in FIG. 3A15B, the consumer/shopper uses the UPN, trademark, product descriptor and/or company name associated with the sought after product, to access a consumer product related information resource of interest on the WWW, and display the same on the display screen of the BCD CPI kiosk within the retail shopping environment. When using the UPN-Directed Search mode of operation of the system, a UPN/URL menu, as shown in FIGS. 4D2, 4R2 and 4S2, will be displayed in the display frame of the browser screen. When using the Trademark Directed Search mode, a list of URLs linked to the input trademark, as shown in FIG. 4T2, will be displayed in the display frame of browser screen.

As indicated at Block D in FIG. 3A15B, each instant the consumer/shopper has found a consumer product information resource of particular interest, which he or she wants to send the corresponding URL to a home or work e-mail address, the consumer/shopper selects the first single-click button 110 on the CPI-transporting envelope 116' (indicated as "CAPTURE AND RECORD" in FIG. 3A16). This causes the URL of the information resource being displayed on the display screen of the BCD CPI kiosk to be automatically captured and recorded within the message field 119 of the CPI-enabling envelope 116''. Optionally, the consumer may type a short note in this field using a "pop-up" keyboard launched by "pop-up" keypad button 121 on envelope 116'.

As indicated at Block E in FIG. 3A15B, the consumer/shopper sequentially repeats Steps C and D for each consumer product information related URL to be captured and recorded within the message field 119 of the opened CPI-transporting envelope 116'.

As indicated at Block F in FIG. 3A15C, upon capturing and recording a desired number of consumer product related URLs to the CPI-transporting envelope 116', the consumer/shopper then selects the second single-click button 114 on the CPI-transporting envelope (i.e. indicated as "SEND" in FIG. 3A16) so as to transport the CPI-transporting envelope to the e-mail address entered within the consumer e-mail address field 115 of the CPI-transporting envelope.

As indicated at Block G in FIG. 3A15C, an information record of each CPI-transporting envelope and the contents thereof is maintained at the retailer e-mail server 84 and a copy thereof is automatically transported to the central e-mail server 88. Thereafter, such information on the central e-mail server 88 can be analyzed to determine trends and patterns in consumer shopping behavior in different geographic locations and retail shopping departments and the like. The results of such analysis are stored in retailer and manufacturer RDBMSs 89A and 89B, respectively.

The above-described methods of e-mail based CPI transport may be modified in various ways to satisfy particular requirements of the application at hand. Also, these methods may be modified to provide novel ways of transporting displayed CPI-related Web documents to remote e-mail addresses while a consumer/shopper is visiting an E-commerce enabled store or on-line product catalog.

A Best Mode Embodiment of IPI Finding and Serving Subsystem of the Present Invention The IPI finding system (i.e. subsystem) of the present invention can be realized on the Internet in a variety of different ways. Each embodiment of the system will provide manufacturers, retailers, consumers and sponsors with various benefits hitherto unachievable using prior art systems and methodologies. A best mode embodiment of the system will now be described below with reference to Intent-to-Use (ITU) servicemarks that Assignee hereof has sought to register under the Lanham Act and ultimately use in reducing the Internet-based consumer product information finding system to commercial practice in the near future. The inventive subject matter herein disclosed can be readily applied to carry out such an Internet-based information finding and delivery system.

According to the best mode embodiment, the IPI Finding and Serving Subsystem 2, referred to hereinabove as the "UPC REQUEST™ Consumer Product Information Finding System" in FIGS. 7 and 8 hereof, comprises an integration of several subsystems including, for example: the UPC REQUEST™ Manufacturer/Product Registration Subsystem 33 (e.g. Web Document Server 30 and Workstation 31) including Web-based and Value Added Networks (VAN)-based infrastructure and processes 14 for supporting EDI and UPN/URL database management operations by manufacturers and/or their agents; the UPC REQUEST™ Database Management Subsystem 9 interfaced with the UPC REQUEST™ Manufacturer/Product Registration Subsystem 33; numerous UPC REQUEST™ kiosks (e.g. client subsystems 13) installed in retail stores, retail outlets and the like, each having a bar code symbol driven Internet browser providing access to the Internet through an Internet Service Provider (ISP); and all of the Web-enabled client subsystems 13 located in consumer homes, in consumer offices and on the road, having access to the Internet through an ISP. While distributed geographically, these subsystems are integrated through the infrastructure of the Internet.

The function of the UPC REQUEST™ Manufacturer/Product Registration Subsystem 33 is two-fold: (1) to enable qualified manufacturers to quickly and easily register their companies with the System (i.e. the UPC REQUEST™ Database Management Subsystem 9) by way of a Web-enabled computer system of their choice; and (2) to enable manufacturers and/or their agents to (i) easily link, manage and update their UPC numbers and linked URLs using any Web-enabled computer system 13 running the EDI (or XML/EDI) based UPN/URL Database Management software (downloaded during manufacturer registration), and periodically transmit such updated information to the UPC REQUEST™ Database Management Subsystem in order to update each manufacturer's information within the UPC REQUEST™ Database (i.e., IPI Database shown in FIGS. 4A1 and 4A2).

The function of the UPC REQUEST™ Database Management Subsystem 9 is to maintain and update the UPC REQUEST™ Database (shown in FIGS. 4A1, 4A2 and FIGS. 4C through 4C4), which contains various information items regarding registered manufacturers, service-subscribing retailers, and registered consumer products including, for example, UPC (and/or UPC/EAN) numbers assigned to consumer products and linked URLs pointing to published HTTP-encoded documents (i.e. Web pages) containing particular types of information related to such products.

Within the store of each retailer subscribing to the UPC REQUEST™ Consumer Information Service, the function of the UPC REQUEST™ kiosk is to provide consumer access to the UPC REQUEST Retailer Website (e.g. UPC REQUEST Retail@ Wal-Mart, UPC REQUEST Retail@ Home Depot, etc.). The UPC REQUEST™ Retailer Website served to both physical-kiosk and cyber-kiosks within the retailer's brick and mortar and EC stores, respectively, provides consumer access to UPN/URL information links (i) relating only to those products sold by the retailer and maintained within the UPC REQUEST™ Database Management System by the manufacturer or agent thereof (i.e. achieved by applying MIN-based UPN-filtering techniques to the UPN/URL database, and (ii) not containing distribution channel information. If desired by the subscribing retailer, its UPC REQUEST™ Retailer Website can be freely served to customers over the Internet, e.g. accessible from a hot-link embedded somewhere in the retailer's Web-site.

Within the realm of the UPC REQUEST™ System 2, the function of the Web-enabled client computer system 13 of each consumer, wherever it may be located (e.g. at home, in the office or on the road), is to provide consumer access the UPC REQUEST™ Central Website which is freely served over the Internet to any consumer having a Web-enabled computer system. Unlike each UPC REQUEST Retailer Website maintained by the UPC REQUEST™ Database Management System, the UPC REQUEST™ Central Website provides consumer access to UPN/URL information links relating to every product maintained within the UPC REQUEST™ Database Management System by every registered manufacturer. Any attempt by a consumer to access information from a particular UPC REQUEST™ Retailer Website regarding a product not sold in the retailer's store will automatically result in a link over to the UPC REQUEST™ Central Website.

Depending on the particular implementation of the system hereof, it might be desirable or necessary for particular or all UPC Request™ Central Website(s) to be designed so that is does no support "Web-clipping" or functionally equivalent techniques so that hand-held wireless (client) computing devices 13, whether or not equipped with a bar code symbol reader, and free to move anywhere including Retail stores subscribing to UPC Request Retailer WWW site services, cannot receive "Web-Clipped" HTML-encoded pages served from UPC Request™ Central WWW Site, Retailers subscribing to UPC Request Retailer WWW sites can be confident the consumers/shoppers cannot access UPC Request™ Central WWW Service within retail store environmentally using wireless web-enabled hand-held devices having display panels substantially smaller than the dimensions of web pages being served therefrom.

A Brief Description of the UPC REQUEST™ Information Service Suite

When installed in retail stores, the UPC REQUEST™ System provide will provide seven revolutionary Internet-based consumer information services under the servicemarks HOME-PAGE™, INFO-LINK™, CYBER-SERVICE™, TRADE-MARK™, PRODUCT-TYPE™, UPC-ENCODED-APPLET-DOWNLOAD, and SEND-IT-HOME™, respectively. Each of these information services is accessible to consumers and sales clerks alike from a UPC REQUEST™ Retailer Website (e.g. UPC REQUEST™ @ Home Depot Website) accessed within a retail store, as well as from on the UPC REQUEST™ Central Website.

In the UPC REQUEST™ version of the IPI Finding and Serving Subsystem of the present invention, the INFO-LINK™ provision is supported during and enabled by Manufacturer/Product Registration Mode; the HOME-PAGE™ provision is supported during and enabled by the Manufacturer Website Search Mode; the CYBER-SERVICE™ provision is supported during and enabled by UPN-Directed Information Access Mode; TRADE-MARK™ provision is supported during and enabled by the Trademark-Directed Search Mode; PRODUCT-TYPE™ provision is supported during and enabled by the Product-Description Directed Search Mode; and UPC-ENCODED-APPLET-TAG-DOWNLOAD/DISTRIBUTE(, provision is supported during and enabled by the UPC-Encoded Applet Tag Download/Distribution Mode. Each of these system modes have been described in great detail hereinabove.

To constantly remind the public at large of the "fee-paying" sponsors of the UPC REQUEST™ System, all Web pages displayed by the UPC REQUEST™ System in a retail store (e.g. on UPC REQUEST™ @ Home Depot Website), or on the UPC REQUEST™ Central Website, will be displayed within a three-frame display "framework" comprising a sponsor frame, a control frame, and an information frame.

The "sponsor frame", located on the upper-most portion of the Internet browser screen, displays the sponsor's greeting such as, for example, "Welcome to UPC REQUEST, sponsored by Visa and Federal Express."

The "control frame", located on the left-most side of the Internet browser screen, will provide six mode activation buttons. The first mode activation button 21A enables consumers to request the INFO-LINK™ service. The second mode activation button 21B enables consumers to request the HOME-PAGE™ service. The third mode activation button 21C enables consumers to request CYBER-SERVICE. The fourth mode activation button 21D enables consumers to request TRADE-MARK™. The fifth mode activation button 21E enables consumers to request PRODUCT-TYPE™. The sixth mode activation button 21F enables consumers to request UPC-ENCODED-APPLET-DOWNLOAD/DISTRIBUTE™. A seventh button 21G enables the launching of the SEND-IT-HOME™ e-mail transport service of the present invention. An additional button can be provided to enable the download a free plug-in software module which automatically installs a "Product Information" button on the graphical user interface of the consumer's Internet browser, so that the UPC REQUEST™ Central Website can be accessed anywhere in the world with a single click of the mouse button on any pointing device.

The "information frame", occupying the balance of the Internet browser screen, will display: all HTTP (i.e. Web) and FTP pages launched by in-store scanning of UPC-labeled products during HOME-PAGE™ or CYBER-SERVICE™; all HTTP and FTP pages launched by clicking on hypertext-links embedded within Web pages accessed through a particular UPC REQUEST™ Retailer Website in retail stores or from the UPC REQUEST™ Central Website; as well as all information search and display (menu) screens served by a UPC REQUEST™ Retailer Website to the UPC REQUEST™ Central Website.

While the web-enabled kiosks of the present invention 13 have been shown herein as employing a commercial-type Internet browser program (i.e. http client program), preferably with instructions on browsing in retail shopping environments, it is understood that the browser programs employed in such kiosks can be customized for each retailer in whose store the kiosk is installed, and could be provided with "minimal" browser control buttons (e.g. Page Forward→, Page Backward←, Stop, and Reload), which, in cooperation with the control buttons in the control frame 20B, provide a suitable GUI for use in both brick and mortar and electronic retail shopping environments.

In retail stores subscribing to the UPC REQUEST™ System, HOMEPAGE™ manufacturer's Website search site will enable consumers to automatically access the WWW Home Page of any registered manufacturer by scanning the UPC (or UPC/EAN) bar code symbol on any product thereof using the bar code symbol reader associated with a UPC REQUEST™ kiosk. In general, the UPC REQUEST™ kiosk can be realized by any Web-enabled computer system 13 having an Internet browser program, on-line access to the UPC REQUEST™ Retailer Website, and optionally a touch-screen display panel. The UPC REQUEST™ kiosk may, however, be realized as an inexpensive Internet access terminal comprising a Web-enabled network computer (NC), an LCD touch-screen panel, and a laser scanning bar code symbol reader integrated within an ultra-compact housing that is mountable within diverse locations within retail stores. As shown in FIG. 3A5, the UPC REQUEST™ kiosk may also be integrated within a conventional Point Of Sale (POS) station having a laser scanning bar code symbol reader and a large rotatable LCD display panel. Being as easy to install as a telephone modem, UPC REQUEST™ kiosks of this design can be widely deployed throughout retail stores world-wide with minimal modifications to the preexisting information infrastructure, and illustrated hereinabove.

At home, in the office, or on the road, HOME-PAGE™ enables consumers to automatically access the WWW Home Page of any registered manufacturer by entering the UPN (or UPC/EAN number) on any product into the search screen served up by a particular UPC REQUEST™ Retailer Website, or by the UPC REQUEST™ Central Website.

INFO-LINK™, carried out using EDI (or XML/EDI) based UPN/URL Database Management software (downloaded from Manufacturer/Product Registration Subsystem 33), enables manufacturers to simply relate (link), manage and update therein (i) the UPN (or UPC/EAN number) on any product with (ii) the Internet address (i.e. URL) of product-related Web pages published on the Internet by the manufacturer, its agents, or others, for subsequent access and display by consumers using CYBER-SERVICE™. While the INFO-LINK™ service would be made accessible through UPC REQUEST™ kiosks 13 in retail stores (i.e. for the sake of vendors who frequent the same), the actual UPN/URL information linking and management operations associated with the INFO-LNK™ service will typically occur in the "back-offices" of registered manufacturers using Internet-enabled computer systems accessing INFO-LINK™ through a hot-linked URL posted on the UPC REQUEST™ Retailer Website and/or the UPC REQUES™ Central Website.

UPC-ENCODED-APPLET-DOWNLOAD™, carried out using EDI (or XML/EDI) based processes, enables manufacturers (via the system administrator) to distribute CPIR-enabling Applets/Servlets to retailers, manufacturers, advertisers and others about the globe so that they may embed the same within HTML-encoded documents in order that consumers can instantly initiate single mouse-click UPN-directed, Trademark-directed and/or Product-Descriptor-directed CPI searches within the centralized UPN/URL Database Management Subsystem 9 hereof and display the search results within a CPID-enabling Java GUI which performs the function of a "cyber-kiosk" provided at the consumer's point of presence on the WWW. In the context of the illustrative embodiment of the system of the present invention, such single mouse-click initiated CPI searches solve a major fear of most retailers in both Physical and Cyber Space retail environments, namely: getting a customer into their store, and then having them step out to get some more advice, information or endorsement before making a purchase, or worse yet, never returning to make a purchase, and instead shopping elsewhere for the sought after product.

CYBER-SERVICE™, accessible through a particular UPC REQUEST™ Retail Website or the UPC REQUEST™ Central Website, enables consumers at home, in the office, on the road, and in retail stores, to quickly access particular types of product-related information which have been published on the WWW by registered manufacturers, their agents and others about consumer products registered with the UPC REQUEST™ Database Management System. CYBER-SERVICE™ displays such product-related information in a menu-like format organized by particular information types (e.g., Product Advertisements, Product Endorsements, Product Reviews, Product Rebates and Incentives, Product Description, Product Manual/Instructions, Product Updates (at FTP Sites), Product Returns, Warranty and Repair Service, Direct Product Purchase, Retailers, Wholesalers, Complementary Products, Company Annual Report, Stock Purchase, etc.). Each displayed information menu associated with a consumer product contains hyper-linked URLs pointing to HTML-documents containing particular types of product-related information linked to the product by the manufacturer or its agent.

When CYBER-SERVICE™ is selected from a particular UPC REQUEST™ Retail Website, each product-related Web page listed in the displayed "information menu" can be accessed and displayed simply by touching the corresponding Internet address (i.e. URL) displayed on the touch-screen display panel of the UPC REQUEST™ kiosk in the retail store. When CYBER-SERVICE™ is selected from the UPC REQUEST™ Central Website, each product-related Web page listed in the displayed "information menu" can be accessed and displayed simply by clicking the display screen thereof accessed by an Internet-enabled computer system.

TRADE-MARK™, accessible through a particular UPC REQUEST™ Retail Website or the UPC REQUEST™ Central Website, enables consumers to quickly access particular types of product-related information from the UPC REQUEST™ Database, by using the trademark or tradename of the related product. When this mode of service is requested, a search screen is displayed within the information frame so that the consumer or sales clerk can enter the trademark or tradename for the related consumer product.

PRODUCT-TYPE™, accessible through a particular UPC REQUEST™ Retail Website or the UPC REQUEST™ Central Website, enables consumers to quickly access particular types of product-related information from the UPC REQUEST™ Database, by using a descriptive term for the related product. When this mode of service is requested, a search screen is displayed within the information frame so that the consumer or sales clerk can enter a descriptive term for the related consumer product.

SEND-IT-HOME$^{SM}$ e-mail service, accessible through a particular UPC REQUEST™ Retail Website or UPC REQUEST™ Central Website, enables a consumer to send to a desired e-mail address at home, work or elsewhere, consumer product information on the WWW, accessed from a Web/e-mail-enabled kiosk in a retail shopping environment.

To maximize value to a particular retail store's customers, each UPC REQUEST™ Retail Website served at each retail store subscriber would be made accessible to consumers outside their retail stores (e.g. at home, in the office or on the road) by several Internet access methods including, for example: through a hot-linked URL posted on the retail store's Website, pointing to the UPC REQUEST™ Retail Website; through a publicly accessible URL, e.g. http://www.upcrequest.com/@ retail store; etc.

Benefits Provided to Sponsors Promoting the UPC REQUES™ System

HOME-PAGE™ and CYBER-SERVICE™ will foster customer loyalty and patronage with sponsors by providing consumers with valuable product-related information before and after product purchases.

CYBER-SERVICE™ will provide sponsors with an economical and effective way of marketing products and services to their customers and shoppers worldwide.

HOME-PAGE™ will provide sponsors with valuable advertising space on the UPC REQUEST™ Central Website, for subleasing to retailers, manufacturers and business concerns.

INFO-LINK™ and UPC-ENCODED-APPLET-DOWNLOAD/DISTRIBUTE will provide sponsors with an effective way of promoting their products and/or services among manufacturers, retailers and consumers using the UPC REQUEST™ System.

Benefits Provided to Customers Using the UPC REQUEST™ System in Retail Stores

HOME-PAGE™ will allow customers to automatically access Home Page of any manufacturer's Website by simply scanning the UPC bar code symbol on any product thereof at any UPC REQUEST™ information kiosk in a retailer's store.

CYBER-SERVICE™ will allow customers to quickly access (by touch-screen URL selection) particular types of product-related information that have been published on the World Wide Web (WWW) by manufacturers, their agents or others, and registered within the UPC REQUEST™ Database through INFO-LINK™.

TRADE-MARK™ will allow customers to quickly access product related information menus from the UPC REQUEST™ Database using trademarks or tradenames used in connection with the product on which information is being sought.

PRODUCT-TYPE™ will allow customers to quickly access product related information menus from the UPC REQUEST™ Database using descriptive terms related to the product on which information is being sought.

SEND-IT-HOME™ will allow customers to simply transport home, to the office or elsewhere, consumer product information accessed from Web-enabled kiosks installed in retail shopping environments.

Benefits Provided to Customers Using the UPC REQUEST™ System at Home, in the Office, or on the Road HOME-PAGE™ will allow customers to automatically access the Home Page of any manufacturer's Website by simply entering the UPC (or UPC/EAN) number on any consumer product, into a UPC REQUEST™ search screen served from the UPC REQUEST™ Central Website and accessible to anyone using an Internet-enabled computer system at home, in the office, or on the road.

CYBER-SERVICE™ will allow customers to quickly access from the UPC REQUEST™ Database, particular types of product-related information that have been published on the WWW by manufacturers, their agents or others, and registered within the UPC REQUEST™ Database through the INFO-LNK™ service.

TRADE-MARK™ will allow customers to quickly access product related information menus from the UPC REQUEST™ Database using trademarks or tradenames used in connection with the product on which information is being sought.

PRODUCT-TYPE™ will allow customers to quickly access product related information menus from the UPC REQUEST™ Database using descriptive terms related to the product on which information is being sought.

Benefits Provided to Retailers Providing UPC REQUEST™ System in their Stores

HOME-PAGE™ and CYBER-SERVICE™ will foster customer loyalty and patronage with retailers by providing shoppers with valuable product-related information before and after product purchases.

CYBER-SERVICE™ will provide retailers with an economical and effective way of marketing its products to customers and shoppers within its stores.

CYBER-SERVICE™ will provide retail sales personnel with an opportunity to learn about a retailer's products by scanning the UPC bar code symbols on such products, and selecting product-related Web pages for in-store review and sales-training sessions whenever customer demand allows.

HOME-PAGE™ and CYBER-SERVICE™ will provide retailers with valuable advertising space in their stores for subleasing to manufacturers and others (e.g. local sponsors) in order to self-finance the store-wide delivery of the UPC REQUES™ Service.

TRADE-MARK™ will allow sales clerks and customers to quickly access product related information menus from the UPC REQUEST™ Database using trademarks or tradenames used in connection with the product on which information is being sought.

PRODUCT-TYPE™ will allow sales clerks and customers to quickly access product related information menus from the UPC REQUEST™ Database using descriptive terms related to the product on which information is being sought.

SEND-IT-HOME™ will allow retail sales clerks to send information requests on products to product manufacturers.

Proposed Revenue Model for the UPC REQUEST™ System

The UPC REQUEST™ System will generate revenue from at least four sources: Manufacturer Fees paid by manufacturers who want to register their products and product-related Web pages with the UPC REQUEST™ Database; Retailer Fees paid by retailers who want to provide bar code driven access to the UPC REQUEST™ System in retail stores; Sponsor Fees paid by Sponsors of the UPC REQUEST™ System; and Advertiser Fees paid by advertisers on the UPC REQUEST™ Central Website.

Manufacturers desiring to register their consumer products and product-related Web pages within the UPC REQUEST™ Database would pay a one-time Manufacture Registration Fee, based on volume of sales. An annual maintenance fee may be desired or necessary. Minimally, such fees should cover the cost of the EDI and UPN/URL Database Management software (and updates) automatically downloaded to each manufacturer upon registration. Such Web-based EDI software enables manufacturers to easily manage the UPC numbers and Web page URLs associated with their changing product lines, and automatically transmit such information to the UPC REQUEST™ Manufacturer/Product Registration Subsystem in order that the UPC REQUEST™ Database Management Subsystem is periodically updated.

Retailers providing bar code driven access to the UPC REQUEST™ System in their retail stores would pay an annual Retailer License Fee based on the number of UPC REQUEST™ kiosks deployed therein (within store isles, at POS stations and behind information/service counters).

Each sponsor of the UPC REQUEST™ System would pay an annual Sponsor Fee for the right to display its name, trademark/servicemark and/or message in hypertext within a selected portion of the sponsor frame displayed by licensed UPC REQUEST™ kiosks in retail stores, as well as Internet-enabled computer systems accessing the UPC REQUEST™ Central Website. For marketing reasons, it would be desirable to limit the number of sponsors of the UPC REQUEST™ System at any instant in time.

Advertisers, who advertise on the UPC REQUEST™ Central Website(s), would pay an Advertiser Fee based on the time and location that the Web advertisement is displayed.

Usage of the UPC REQUEST™ In Diverse Retail Markets

The UPC REQUEST™ System can be used to provide consumers quick access to useful product-related information in diverse types of retail shopping environments including, for example, retail superstores, discount department stores, home-improvement stores, computer superstores, drugstores and pharmacies, music stores, video rental stores, bookstores, supermarkets, grocery stores and the like. Each of these retail markets provides a unique environment in which the UPC REQUEST™ System can be used by manufacturers of consumer products to effectively deliver product-related information to consumers in retail stores, at home, in the office or on the road, before and after consumer purchases.

As the UPC REQUEST™ System provides manufacturers with an effective way and means of making direct contact with present and future customers, it enables both manufacturers and retailers alike to influence demand in ways that have hitherto have been unavailable. Such features of the UPC REQUEST™ System present enormous growth opportunities in retail supply and demand chain management across diverse markets within our ever expanding global economy.

Modifications of the Illustrative Embodiments of the Invention

The present invention has been described in great detail with reference to the above illustrative embodiments. It is understood, however, that numerous modifications will readily occur to those with ordinary skill in the art having had the benefit of reading the present disclosure.

For example, in the illustrative embodiments described hereinabove, separate databases are maintained by each data-synchronized IPD Server for (i) registered products within the system, and (ii) non-registered products within the system. Notably, the reasons for using a dual database design of this sort would be based largely on economics, namely: only those companies who have paid the required maintenance (or registration) fees get their products and linked-URLs "registered" with the system, whereas non-paying companies and organizations do not get their products and linked-URLs registered with the system, regardless of how such product-URL information is ascertained (e.g. by solicitation versus data-mining).

Thus it is contemplated that in some embodiments of the present invention, each IPD Server will be designed to maintain only a single database for maintaining product-URL information currently available on the Internet. In such embodiments of the present invention, the concept of "non-registered" products will be altogether avoided, since the system implementation and administration may be designed not to require companies to pay maintenance (or registration) fees in order that their products and linked URLs are registered with the IPI system. Instead, some alternative income producing scheme will be used in such embodiments of the present invention (e.g. user fees, subscription fees, Internet browser-licensing fees, etc.) for system maintenance and administration.

When practicing the system and method of the present invention, it is preferred that the UPC label (with its human-readable UPC number) assigned to the particular product be attached, embossed or otherwise embodied on an accessible surface thereof. In addition to applying the UPC label to the external packaging of the product, it is preferred that the UPC label also be printed on any and all product instructions and manuals provided with the product. In this way, the UPC number can be easily read by a human being and then used to access a desired type of product information using the system and method of the present invention.

In order that the system hereof can be used to find information pertaining to large products such as automobiles, motorcycles, skidoos, farm machinery, boats, etc., the present invention also contemplates assigning UPNs (e.g. UPC or EAN numbers) to such products and attaching, embossing or otherwise embodying the same on an accessible surface thereof. Also, the UPN label can be printed on all instruction booklets and/or operating manuals normally provided with the product. In this way, information related to any particular product that is posted anywhere on the Internet and linked to URLs registered with the IPD Servers 11 of the system hereof can be readily found using the uniquely assigned UPC number assigned thereto by the manufacturer at the time of sale. Notably, multimedia information about such products can be most helpful in regard to the operation, repair and servicing of such products.

The system and method of the present invention has been shown to combine the use of UPNs, trademarks and company names when making a product information request of the system. It is understood, however, that the present invention can be practiced using any one of these items of information, alone or in combination with each other, in order to place a product information request with the system hereof.

Also, while the system of the illustrative embodiment has been shown used to collect, transport and serve information related to consumer products, it is understood that the system can be used to link the URLs of HTML (and other Internet) documents with consumer services assigned uniform service numbers (USN) which may be based on the UPC or EAN numbering system, or some other suitable system. In such alternative embodiments, the IPI Database would contain information pertaining to uniform service numbers (USN) that have been linked to the URLs of HTML or like documents on the Internet by the manufacturer or its agents, in essentially the same manner as conducted for consumer products. Such USN/URL management operations can be carried out in a similar to that described in connection with UPN/URL management along the retail supply and demand chain.

In connection with the consumer service information embodiment of the present invention, it is understood that at present, few (if any) services have been assigned a UPC (or EAN) number in the manner that nearly all consumer products have been assigned in the contemporary period. In spite of this fact, however, the present invention contemplates the need and utility of widespread assignment of UPC, EAN or similar numbers by service providers to particular services (as well as the imprinting of UPC, EAN or similar symbols on printed service brochures and advertisements. Notably, assigning uniform service numbers (USNs) to particular services, and labeling printed and graphical brochures and advertisements with such universal numbers, will provide a number of new opportunities hitherto unavailable.

In particular, service-related information could be easily found (i.e. located and accessed) on Web-sites using the system and method of the present invention, and thereafter the service easily procured through an electronic data transaction. In accordance with the present invention, this can be achieved by uniquely identifying and assigning "particular" services by a Universal Service Code (USC) which has many if not all of the attributes of a conventional UPC. While not necessary, a single digit may be optionally added to the USC in order to demark that services, rather than products, are being identified. An example of such USC labeling would be printing an assigned UPC label (number) on: admission tickets to a theatrical, dramatic or musical performance and/or its playbill; admission tickets to a movie; admission tickets to a concert and/or its concert program; admission tickets to a sporting event and/or its sports program; admission tickets to an art, science or history museum; admission tickets to the zoo or botanical gardens; and the like. The UPC label would be encoded to identify a particular event at which an entertainment, educational or professional service is provided. The UPC label printed on the tangible medium associated with the promotion of or access to the particular service would then be registered with the IPSI Registrant Database of the system hereof, along with the name of the provider of the service, and a list of URLs that identify the Web locations at which particular kinds of information related to the particular service can be found (in accordance with the categories of FIG. 4A2).

Application of the System and Methods of the Present Invention to Print and Electronic Publishing Industries Notably, newspaper and magazine articles, product and service brochures, product discount coupons, certificates, documents and other forms of information-carrying products embodied within a print medium (e.g. paper, plastic, metal, glass, etc.) are properly deemed "consumer products" within the scope and spirit of the present invention, regardless of whether of not such products are assigned a UPC or UPC/EAN label by its manufacturer (e.g. publisher/printer). Thus, the system and methods of the present invention described hereinabove can be used to manage and serve print-media related information on the WWW to consumers (e.g. readers), relating to particular publications (e.g. articles, stories, product advertisements, etc.) embodied in a published print-medium.

Stated more specifically, the system and methods of the present invention can be used to manage symbolic links created between (i) an UPN uniquely assigned to an information carrying product or object embodied in any form of media (e.g. printed publication existing in physical space, or other form of information carrying media), and (ii) the URL specifying the location of an information resource (e.g. Web document) on the Internet (e.g. WWW). In such application environments, the UPN can be any unique number assigned to the information carrying product embodied in any physical medium. In general, each UPN can be expressed in numerical or alphanumerical form, and in the case of print-type media, will be encoded within a machine-readable structure, such as a bar code symbol structure, associated with the information carrying product. Preferably, each unique UPN will be assigned to the information carrying product by a source of an authority assuming managerial responsibility for the universal product/service (i.e. object) numbering system being used. Such organizations may be public, quasi-public, or private, depending on the circumstances at hand.

In general, Web-based information resources located at URLs to be symbolically linked to particular UPNs assigned to information carrying products by a particular publisher can be served from any Internet (http) information server, including e-commerce enabled servers 12, 12', 12A and 12B, shown in FIGS. 2-1 and 2-2 and described in great detail hereinabove.

Figure 2D:
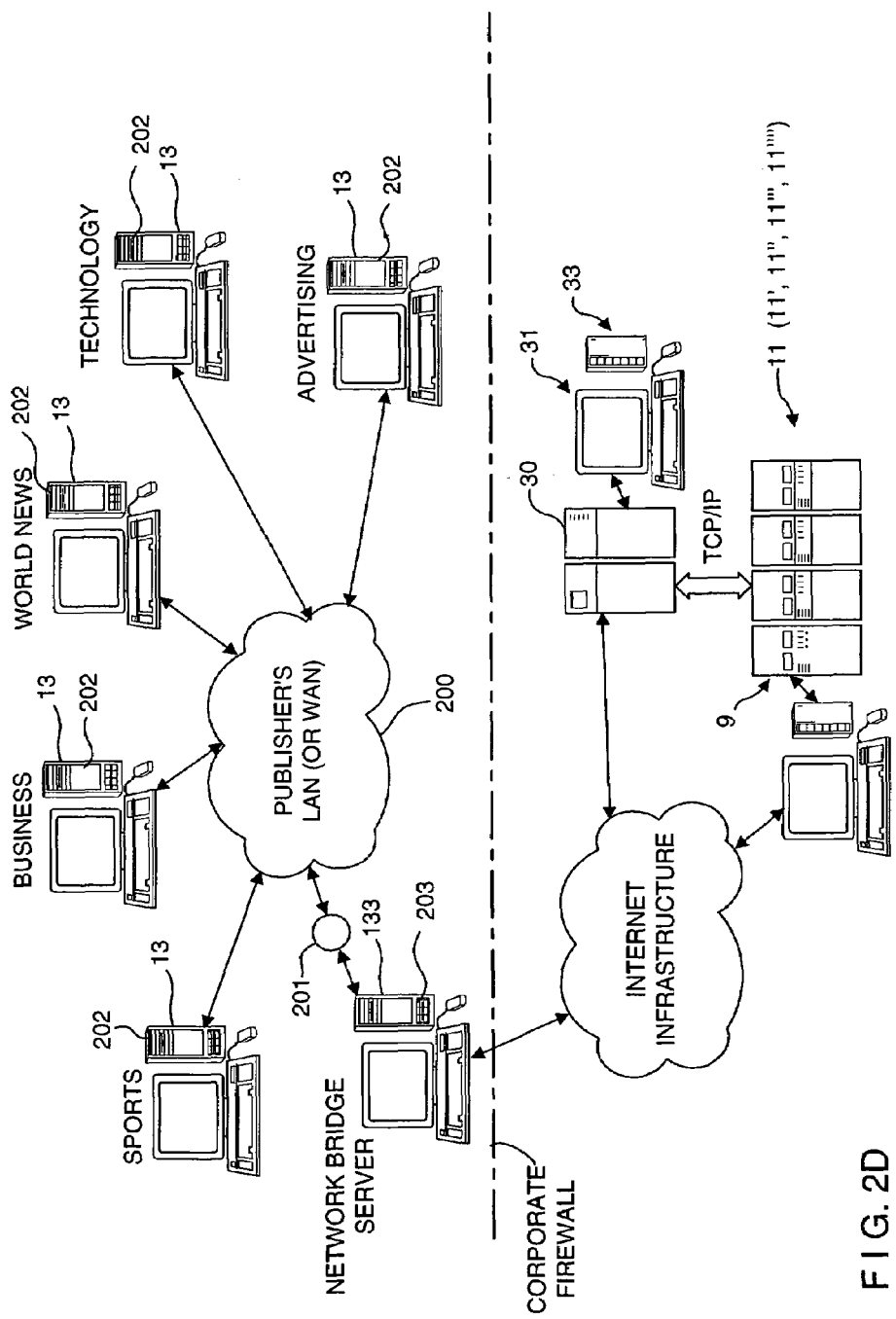
FIG. 2D is a schematic representation of a portion of the system shown in FIGS. 2-1 and 2-2, wherein a plurality of publisher-operated client subsystems (i.e. manufacturer-operated client subsystems) are shown connected to a local or wide area IP-based network, preferably maintained behind a secure corporate firewall, and the secured manufacturer information network is connected to the infrastructure of the Internet by way of an Internet router and server, for the purpose of enabling different departments within the publishing organization (e.g. advertising, world news, business, technology, sports, finance, education, arts and leisure, etc.) manage different types of UPN/URL links based on the type of information contained within the URL-specified information resource on the WWW.

UPN/URL management subsystem 9, server 33, administration computer 32, and the EDI-enabled client subsystems shown in FIGS. 2-1, 2-2, 2A, and 2C, and described in great detail hereinabove can be used by publishers (e.g. a particular type of product manufacturer) to symbolically link each UPN assigned to particular information carrying products (e.g. newspaper and magazine articles, product advertisements, etc.) to one or more URLs specifying product-related information on the Internet. As shown in FIG. 2D, a plurality of publisher-operated client subsystems (i.e. manufacturer-operated client subsystems) are connected to a local or wide area TCP/IP-based network, for the purpose of enabling different departments within the publishing organization (e.g. advertising, world news, business, technology, sports, finance, education, arts and leisure, etc.) manage different types of UPN/URL links based on the type of information contained within the URL-specified information resource on the WWW. In the back-offices of publishing firms (e.g. newspaper publishing houses, magazine publishers, product advertisement flyer publishers/printers, product coupon publishing/marketing firms and the like) UPN/URL data link management operations will be carried out prior to print publication using distributed UPN/URL link management methods.

In the case of a newspaper or magazine publisher firm, each client computer subsystem within a particular department (e.g. sports, international news, national news, local news, business, arts & entertainment, science & technology, etc.) as shown in FIG. 2D, would be provided with one or more of the following software programs, namely: (i) computer-based publishing software having integrated UPN/URL data link management capabilities; and (ii) UPN/URL management software in the form of a stand-alone application or utility.

Operation of computer-based publishing software with integrated UPN/URL data link management capabilities is shown in FIGS. 2E1 and 2E2. In general, this publishing software program has at least three modes of operation, namely: (1) a composition/editorial mode illustrated in FIG. 2E1, in which literary and graphical content can be composed and edited in much the same way as conventional word processing and graphics programs; (2) a UPN/URL data linking mode illustrated in FIG. 2E2, in which the author/composer can create symbolic links between URL indexed sections of Web documents and UPN indexed sections of print-media documents, using drag, drop and click procedures similar to those used in conventional "flow charting" and graphics software programs; and (3) a UPN/URL data link table generation mode, in which a "UPN/URL data link table" is generated for each corresponding set of Web and print-media documents, as shown in FIG. 2E3, and is electronically transportable to the UPN/URL database management subsystem 9 hereof using electronic data interchange techniques described in detail hereinabove.

In the first and second modes of operation, in a split-screen structure 300 as shown in FIG. 2E1 is displayed, wherein the first (e.g. left) side document frame 301 contains information relating to a particular Web document and has an independent scroll bar 302 within a 304B windows-type GUI-based data structure, and wherein second (e.g. right) side document frame 303 contains information relating to a particular print-media document and has an independent scroll bar 304 within a windows-type GUI-based data structure. By providing such a split-screen display screen GUIs in both of these modes of operation, the publishing software program of the present invention enables the author to independently scroll literary and graphical context in the Web document frame 301 of the GUI, and the print-media document frame 303 thereof, thereby facilitating alignment of corresponding sections during both the composition/editorial mode of operation as well as during the UPN/URL data linking mode of operation.

When in the composition/editorial mode, the publishing software program of the present invention enables the electronic layout of a Web-based document or publication (e.g. expressible in HTML or SGML code) 300 in frame 301, and a print-media based document or publication (e.g. expressible in a desired font) in frame 303, as shown in FIG. 2E1. As shown therein, the Web-based document in frame 301 has different content and advertising sections 306 and 308 associated with each Web-page thereof and each such Web-page being located on the WWW at a particular URL. The print-media based document in frame 303 has different content sections and advertising sections 310 and 312 associated with each printed-page thereof. As illustrated in FIG. 2E1, each content section in the Web-based document is assigned a Universal Product Number (UPN) (i.e. UPN-encoded bar code symbol) which is symbolically linked or related to a particular content section on the corresponding Web-page located at a specified URL. Likewise, each advertising section in the Web-based document is assigned a Universal Product Number (UPN) which is symbolically linked or related to a particular advertising section on the corresponding Web-page located at a specified URL. During the composition/editorial mode of operation, content in the Web and print-media documents is displayable in the split-screen display structure 300, so that a particular content section in a Web document is displayed along side of the corresponding section in a print-media document.

Typically, the author enters the a URL/UPN (or UPN/URL) data linking mode of operation of the program, shown in FIG. 2E2, after authoring or otherwise composing literary and/or graphic context within (i) a specific content section on a particular Web document and (ii) a corresponding content section on a particular print-media document. While in this mode of operation, the author is able to create "UPN/URL data links" between pairs of corresponding content sections, pairs of corresponding advertising sections, and/or pairs of content and advertising sections. In accordance with the principles of the present invention, such UPN/URL data links are created by: (1) drawing graphical boundaries around the content (or advertising) section on a particular Web document using a mouse-pointing device and automatically assigning thereto a relative URL index 400 as shown in FIGS. 2E2 and 2E3; (2) drawing graphical boundaries around the corresponding content (or advertising) section on the corresponding print-media document and automatically assigning thereto a UPN (i.e. UPN-encoded bar code symbol) as shown in FIG. 2E2 (e.g. obtained from the system administrator using on-line or real-time UPN assignment methods implemented over the Internet); and (3) then drawing a graphical link between such graphically bounded sections between the Web and print-media documents displayed in frames 301 and 303. During this mode of operation, the UPN/URL data links are graphically represented as double-arrow type links for the author to review, and are editable in much the same manner that such graphical elements are created and edited. However, when returning to the composition/editorial mode, such graphical links are suppressed, and instead, alpha-numeric type UPN/URL links are displayed on the Web and print-media documents.

After the Web and print-media documents have been finalized and approved for publishing, the computer-based publishing program of the present invention enters the UPN/URL data link table generation mode, shown in FIG. 2E3. In this mode, a UPN/URL data link table 400 is generated for each corresponding set of Web and print-media document, as shown in FIG. 2E3. Thereafter, this data table is electronically transportable to the UPN/URL database management subsystem 9 hereof using electronic data interchange techniques described in detail hereinabove. This ensures that the UPN/URL data links are stored in the UPN/URL database management subsystem 9 hereof so that when the UPNs (on published print-media) are entered into the browser of a client subsystem 13 hereof, pointing to a IPI Website of the present invention, the corresponding URL or set thereof is automatically displayed thereon.

The above-described publishing software program will have great value in publishing applications where both Web and print-media versions of documents, articles and the like are simultaneously published on the WWW and in the world of print-media, as in the case of many newspapers, magazines, journals, subscriptions, product discount flyers, and the like. In such instances, each publication will have numerous "Sections" or "Parts", classified by the type of subject matter being addressed, and contributed to by authors and composers from categorically different departments (e.g. business, sports, world news, local news, arts and entertainment, technology, etc.). Thus, in such instances, a "client" copy of the publishing program of the present invention discussed above will run on different client computing subsystems on the LAN or WAN of the publisher, as shown in FIG. 2D, while a "server" copy runs on at least one client computing subsystem on the LAN or WAN. Such a client-server solution enables an editorial manager to oversee the entire Web/print-media publication process, while individual writers are permitted to labor on their literary and graphical art assignments, whatever they may be. In short, the novel publishing tools and methods of the present invention have now made linking the worlds of electronic and print-media simple, efficient and reliable.

In some publishing applications such as coupons, books, financial instruments, notes, product specifications, and the like, there is a need for an alternative way of and means for creating UPN/URL data links between the print-media and electronic media worlds, and automatically generate UPN/URL data link tables for electronic transport to the UPN/URL database management subsystem 9. In this alternative embodiment of the present invention, shown in FIGS. 2E4 and 2E5, the way of and means for UPN/URL data linking is realized by an operating system (OS) based function that enables the author to generate "UPN/URL data links between (i) Web documents authored using a first arbitrary content-creating browsing application (e.g. Netscape Navigator browser, HTML Editor program) running on a computing platform, and (ii) UPN-encoded elements of print-media authored using a second arbitrary content-creating/browsing application (e.g. Adobe® Illustrator drawing program or Microsoft Word® word processing program) running on the same platform.

In practice, such the UPN/URL data linking capabilities are integrated into the multi-tasking and/or multi-threading operating system (OS) (e.g. MAC OS, Window 2000, MS NT, Linux, etc.) on the client computer used to run the first and second arbitrary content-creating/browsing applications 330 and 332, shown in FIG. 2E4. For illustrative purposes, the firs application 330 is the Netscape Navigator browser, whereas the second application 332 is the Adobe® Illustrator graphics program. UPN/URL data links produced from this OS-based UPN/URL data linking functionality are stored in a UPN/URL data link GUI table 400 shown in FIG. 2E4, and are electronically transportable to the UPN/URL database management subsystem 9 using electronic data interchange techniques described hereinabove. The end result of this OS-based UPN/URL data linking function of the present invention is to enable consumers (e.g. readers) to create UPN/URL data links between print-media documents and corresponding Web-based media documents, and also, to transport the same to the UPN/URL database management subsystem 9 hereof.

In FIG. 2E4, the OS-based UPN/URL data linking function (i.e. utility) is shown in its composition/editorial mode, wherein the GUI-based window for the first content creating/browsing application 330 is displayed on the OS GUI, along with the GUI-based window for the second content creating/browsing application 332, and the GUI-based window for the UPN/URL Data Link Table/Palette 400.

In FIG. 2E5, the OS-based UPN/URL data linking function (i.e. utility) is shown in its UPN/URL Data Linking Mode, wherein graphically expressed UPN/URL data links are created in a manner similar to that carried out in the first illustrative embodiment shown in FIGS. 2E1 through 2E3 and described hereinabove.

In the UPN/URL data linking mode, the UPN/URL table is generated and electronically transported to subsystem 9 hereof.

Preferably, the OS-based UPN/URL data linking utility of the present invention is launchable by selecting a command in a pull-down or like window provided on the OS GUI. Once this utility has been launched, then its different modes of operation can be selected by a designated control button provided on the windows-based GUI-structure for the UPN/URL.

Notably, by using the EDI-based UPN/URL data link management and serving techniques of the present invention, described in great detail hereinabove, publishers of print-media based products can quickly update the UPN/URL Database Management Subsystem 9 to contain current UPN/URL links created only minutes before hand in the back-offices of the publishing firm (e.g. just after final approval by the chief editor assigned to a particular print-media publication). This enables consumers to automatically link to related URLS at the time distribution of the print publication, using Web-enabled client subsystems 13 in accordance with the principles of the present invention.

These and all other such modifications and variations are deemed to be within the scope and spirit of the present invention as defined by the accompanying claims to Invention.

What is claimed is:

1. An Internet-based system for managing and delivering consumer product brand information to consumers at points of presence along the World Wide Web (WWW), said Internet-based system comprising:

a plurality of Web-based information servers, operably connected to the infrastructure of the Internet, serving a plurality of Web-sites on the WWW, wherein each said Web-site includes a plurality of HTML-encoded pages;

a plurality of Internet-based consumer product information (CPI) servers, operably connected to the infrastructure of the Internet, and serving a plurality of consumer product information (CPI) resources located on the WWW, and related to a particular consumer product or group of consumer products registered with said Internet-based system and being marketed along the WWW;

a first Internet-based subsystem, operably connected to the infrastructure of the Internet, and configured to allow manufacturer team members associated with said particular consumer product or group of consumer products, and/or authorized parties, to implement a plurality of consumer product information (CPI) requesting and graphical user interface (GUI) displaying subsystems (CPI-requesting and GUI-displaying subsystems) for said plurality of consumer products being marketed along the WWW, so that each said CPI-requesting and GUI-displaying subsystem is accessed by consumers at points of presence along the WWW, using a client subsystem supporting a Web browser;

an object-oriented server operably connected to the infrastructure of the Internet;

wherein each said CPI-requesting and GUI-displaying subsystem is implemented by (i) a consumer product information request (CPIR) enabling servlet stored on and executed within said object-oriented server independent of the operation of said CPI resource servers, and (ii) an HTML servlet tag embodied with a unique URL referencing said CPIR-enabling servlet, and embedded within at least one of said plurality of HTML-encoded pages, at a point of presence on the WWW;

wherein said object-oriented server generates each said CPI-requesting and GUI-displaying subsystem, and serves a CPI graphical user interface (GUI) at the point of presence, for displaying a set of said plurality of CPI resources for selection by the consumer;

a UPN/TM/URL database, operably connected to said object-oriented server, for storing and managing a UPN/TM/URL link structure for each consumer product registered with said Internet-based system, wherein each said UPN/TM/URL link structure includes a Universal Product Number (UPN) assigned to the consumer product registered within said Internet-based system;

a Trademark (TM) assigned to the consumer product; and a set of URLs for said plurality of CPI resources being served from said plurality of Internet-based CPI servers;

wherein said CPIR-enabling servlet installed on said object-oriented server, for each said consumer product, includes code stored on a medium operable to execute said code specifying:

(i) a connection to said UPN/TM/URL database;

(ii) a CPI query to be executed on said UPN/TM/URL database, dependent on the UPN assigned to said consumer product, and returning a set of URLs stored in said UPN/TM/URL database and associated with said UPN; and (iii) a CPI GUI, object-oriented controlled, displaying the results of the UPN-dependent CPI query at the point of presence where said corresponding HTML servlet tag is embedded within at least one said HTML-encoded page along the WWW;

wherein said HTML servlet tag embodies the unique URL referencing said corresponding CPIR-enabling servlet;

a second Internet-based subsystem configured to allow manufacturer team members associated with a particular consumer product or group of consumer products, and/or authorized parties, to program said set of CPI resources for display in the CPI GUI of each said CPI-requesting and GUI-displaying subsystem; and wherein, upon the Web-browser of the consumer encountering said HTML servlet tag installed in said HTML-encoded page, (a) the CPIR-enabling servlet corresponding to said HTML servlet tag is automatically executed, (b) the CPI GUI of said corresponding CPI-requesting and GUI-displaying subsystem is automatically generated by said object-oriented server, (c) said object-oriented controlled CPI GUI is served to the Web browser at the point of presence where said HTML servlet tag is embedded, and (d) then said object-oriented controlled CPI GUI displays information content that is (i) associated with one or more CPI resources having URLs returned by said UPN-dependent CPI query, and (ii) served from one or more of said plurality of Internet-based CPI servers, display and review by the consumer at the point of presence along the WWW where said HTML servlet tag has been encountered by the Web browser.

2. The Internet-based system of claim 1, wherein each said UPN comprises a Universal Product Code (UPC).

3. The Internet-based system of claim 1, wherein said UPN/TM/URL link structure further comprises, for each consumer product:

a Product Descriptor (PD) associated with the consumer product.

4. The Internet-based system of claim 1, wherein said set of CPI resources are selected from the group consisting of product videos, audio files, product images, product specifications, product advertisements, and product promotions.

5. The Internet-based system of claim 1, wherein said second Internet-based subsystem is further configured to allow manufacturer team members associated with a particular consumer product or group of consumer products, and/or authorized parties, to program said set of CPI resources for display in the GUI of each said CPI-requesting and GUI-displaying subsystem by creating and managing said UPN/TM/URL link structure for each said consumer product.

6. The Internet-based system of claim 1, wherein said HTML-encoded document is selected from the group consisting of Web-pages, product images, product documents, and graphical icons.

7. The Internet-based system of claim 3, wherein said Universal Product Number (UPN), said Trademark (TM) and said Product Descriptor (PD) associated with each said UPN/URL link structure are imported into said UPN/TM/URL database from a supply-chain information management system, using electronic file transfer techniques.

8. The Internet-based system of claim 1, wherein said client subsystem supporting said Web browser is a computing machine selected from the group of a desktop computer, a portable computer, a portable digital assistant (PDA), and physical retail kiosk.

9. The Internet-based system of claim 1, wherein said Web browser of the consumer encountering said HTML tag, further comprises the consumer clicking on a graphical component at which said HTML tag is embedded in said HTML-encoded page.

10. The Internet-based system of claim 1, wherein said authorized parties include agents of the manufacturer.

11. The Internet-based system of claim 1, wherein said points of presence along the WWW include market spaces selected from the group consisting of BC-enabled WWW-sites, EC-enabled stores and EC-enabled online product catalogs.

12. The Internet-based system of claim 1, wherein each said set of CPI resources are arranged within a consumer product information menu, within said CPI GUI, for selection by consumers using said Web browser.

13. The Internet-based system of claim 1, wherein said HTML servlet tag is embedded within a graphical object within said HTML-encoded page; and wherein, upon the Web-browser of the consumer clicking on said graphical object,
(i) said object-oriented server automatically executes the CPIR-enabling servlet corresponding to the HTML servlet tag, and generates the CPI GUI of the corresponding CPI-requesting and GUI-displaying subsystem,
(ii) said object-oriented controlled CPI GUI is served to the Web browser at the point of presence where said HTML servlet tag is embedded, and
(iii) then said object-oriented controlled CPI GUI displays information content that is associated with one or more CPI resources having URLs returned by said UPN-dependent CPI query, and served from one or more of said plurality of Internet-based CPI servers, for display and review by the consumer at the point of presence along the WWW where said HTML servlet tag has been encountered by the Web browser.

14. The Internet-based system of claim 1, wherein said object-oriented server is a Java server, and each said CPIR-enabling servlet is a Java-implemented CPIR-enabling servlet loaded within said Java server.

15. The Internet-based system of claim 1, which further comprises a Web-based servlet tag server for serving a library of HTML servlet tags on the WWW, for downloading the HTML servlet. tag corresponding to each said CPI-requesting and GUI-displaying subsystem implemented within said object-oriented server, so that the downloaded HTML servlet tag can be subsequently embedded within one or more said HTML-encoded pages on the WWW.

* * * * *